(12) United States Patent
Falasca et al.

(10) Patent No.: US 12,503,426 B2
(45) Date of Patent: Dec. 23, 2025

(54) SYNTHETIC DERIVATIVES OF OLEOYL-LYSOPHOSPHATIDYLINOSITOL (OLEOYL-LPI) AND USES THEREOF

(71) Applicant: LIPOVEXA SRL, Maglie (IT)

(72) Inventors: Marco Falasca, Mount Claremont (AU); Massimiliano Massi, Wilson (AU); Peter Vernon Simpson, Joondanna (AU)

(73) Assignee: LIPOVEXA SRL, Maglie (IT)

( * ) Notice: Subject to any disclaimer, the term of this patent is extended or adjusted under 35 U.S.C. 154(b) by 1462 days.

(21) Appl. No.: 16/643,165

(22) PCT Filed: Aug. 31, 2018

(86) PCT No.: PCT/AU2018/050941
§ 371 (c)(1),
(2) Date: Feb. 28, 2020

(87) PCT Pub. No.: WO2019/040992
PCT Pub. Date: Mar. 7, 2019

(65) Prior Publication Data
US 2023/0271915 A1      Aug. 31, 2023

(30) Foreign Application Priority Data

Sep. 1, 2017   (AU) ................................ 2017903548
Oct. 13, 2017  (AU) ................................ 2017904142

(51) Int. Cl.
| C07C 255/60 | (2006.01) |
| A61K 31/192 | (2006.01) |
| C07C 233/55 | (2006.01) |
| C07D 257/04 | (2006.01) |

(52) U.S. Cl.
CPC .......... *C07C 255/60* (2013.01); *A61K 31/192* (2013.01); *C07C 233/55* (2013.01); *C07D 257/04* (2013.01)

(58) Field of Classification Search
None
See application file for complete search history.

(56) References Cited

U.S. PATENT DOCUMENTS

| 2,654,722 A | 10/1953 | Young et al. |
| 2014/0371316 A1 | 12/2014 | Lalezari et al. |

FOREIGN PATENT DOCUMENTS

| EP | 2813486 A1 | 12/2014 |
| JP | 62223159 A * | 10/1987 |
| JP | 4927404 B1 | 7/2007 |
| WO | WO 2007/044742 | 4/2007 |
| WO | WO 2012/086406 | 6/2012 |

OTHER PUBLICATIONS

Grant & Hackh's Chemical Dictionary (5th Ed. 1987) at p. 148.*
CAPLUS printout of Foreign Patent No. JP62223159A published on Oct. 1, 1987.*
Chemical Abstract Registry No. 873549-96-3, indexed in the Registry File on STN CAS Online Feb. 6, 2006.*
Urbani et al., "New metabolically stable fatty acid amide ligands of cannabinoid receptors: Synthesis and receptor affinity studies," Bioorganic & Medicinal Chemistry Letters, vol. 16:138-141, Oct. 2005.
Di Marzo et al., "The anandamide membrane transporter. Structure-activity relationships of anandaide and oleoylethanolamine analogs with phenyl rings in the polar head group region," Bioorganic & Medicinal Chemistry, vol. 12:5161-5169, Aug. 2004.
Hopper et al., "Structure-Activity Relationships of Lysophosphatidic Acid: Conformationally Restricted Backbone Mimetics," J. Med. Chem, vol. 42:963-970, Mar. 1999.
Semakov et al., Synthesis and properties of lipophilic derivatives of 5-fluorouracil, Russian Journal of Bioorganic Chemistry, vol. 39(3):299-305, May 2013.
Széki, Relation between chemical constitution and pungency of acylamines, Archiv der Pharmazie und Berichte der Deutschen Pharmazeutischen Gesellschaft, vol. 268:151-7, Jan. 1930. (CAPLUS printout only).
CAS Registry No. 199530-96-6, Chemical Name: Benzoic acid, 3-[(1-oxohexadecyl)amino], Jan. 1998.
CAS Registry No. 101631-32-7, Chemical Name: Octadecanamide, N-(4-fluorophenyl), Apr. 1986.
CAS Registry No. 71412-39-0, Chemical Name: Octadecanamide, N-(4-hydroxyphenyl)-, calcium salt, Nov. 1984.
De'Conno, The action of aromatic amines on the fatty acids, E. Gazzetta Chimica Italiana, vol. 47(I):93-132, Jan. 1917. (CAPLUS printout only).
CAS Registry No. 135391-08-1, Chemical Name: 9-Octadecenamide, N-(4-hydroxyphenyl), Aug. 1991.
CAS Registry No. 873549-96-3, Chemical Name: 9-Octadecenamide, N-(4-methoxyphenyl), Feb. 2006.
CAS Registry No. 855379-97-4, Chemical Name: 9-Octadecenamide, N-(4-hydroxyphenyl), Jul. 2005.

(Continued)

*Primary Examiner* — Po-Chih Chen
(74) *Attorney, Agent, or Firm* — Howson & Howson LLP; Colleen M. Schaller

(57) ABSTRACT

The invention relates to oleoyl-lysophosphatidy linositol (oleoyl-LPI) and new synthetic derivatives thereof and uses thereof, and to pharmaceutical compositions comprising such compounds. The invention provides activators and/or up-regulators of glucoregulatory hormones such as glucagon like peptide-1 (GLP-1), and more specifically to agonists, partial agonists and reverse antagonists of GPR119 or activators of GLP-1 activity and/or synthesis and/or secretion, and pharmaceutical compositions comprising same, uses thereof in therapy of diabetes, obesity and other metabolic disorders.

12 Claims, 39 Drawing Sheets
Specification includes a Sequence Listing.

(56) References Cited

OTHER PUBLICATIONS

Arifin et al., Oleoyl-lysophosphatidylinositol enhances glucagon-like peptide-1 secretion from enteroendocrine L-cells through GPR119, BBA-Molecular and Cell Biology of Lipids, vol. 1863(9):1132-1141, Sep. 2018.
International Search Report and Written Opinion issued on International Patent Application No. PCT/AU2018/050941 dated Nov. 14, 2018.
CAS Registry No. 1031502-77-8; STN Entry Date Jun. 29, 2008.
CAS Registry No. 1090573-94-6; STN Entry Date Dec. 28, 2008.
CAS Registry No. 1194728-89-6, STN Entry Date Dec. 1, 2009.
CAS Registry No. 1438984-39-4, STN Entry Date Jun. 19, 2013.
CAS Registry No. 1456813-96-9, STN Entry Date Oct. 10, 2013.
CAS Registry No. 1512000-35-9; STN Entry Date Jan. 6, 2014.
CAS Registry No. 1777507-61-5; STN Entry Date Jun. 10, 2015.
CAS Registry No. 1778481-20-1; STN Entry Date Jun. 11, 2015.
CAS Registry No. 1884413-94-8, STN Entry Date Mar. 28, 2016.
CAS Registry No. 2004260-30-2; STN Entry Date Oct. 3, 2016.
CAS Registry No. 2097779-73-0, STN Entry Date Jun. 7, 2017.
CAS Registry No. 2102909-27-1; STN Entry Date Jul. 25, 2017.
CAS Registry No. 782480-66-4, STN Entry Date Nov. 17, 2004.
CAS Registry No. 858027-83-5, STN Entry Date Aug. 3, 2005.
CAS Registry No. 858186-46-6, STN Entry Date Aug. 4, 2005.
CAS Registry No. 873549-96-3, STN Entry Date Feb. 6, 2006.
CAS Registry No. 947489-03-4, STN Entry Date Sep. 18, 2007.
Crosignani et al., Discovery of a Novel Series of CRTH2 (DP2) Receptor Antagonists Devoid of Carboxylic Acids. ACS Med Chem Lett. Oct. 10, 2011;2(12):938-42.
Han et al., Design, synthesis and CoMFA studies of OEA derivatives as FAAH inhibitors. Med Chem Res 26, 2951-2966, Jul. 2017.
Mao et al., Discovery of scmR as a global regulator of secondary metabolism and virulence in Burkholderia thailandensis E264. Proc Natl Acad Sci U S A. Apr. 4, 2017;114(14):E2920-E2928. Epub Mar. 20, 2017.
Overton et al., GPR119, a novel G protein-coupled receptor target for the treatment of type 2 diabetes and obesity. Br J Pharmacol. Mar. 2008; 153 Suppl 1(Suppl 1):S76-81. Epub Nov. 26, 2007.
Shou et al., Antibacterial anthranilic acid derivatives from Geijera parviflora. Fitoterapia. Mar. 2014;93:62-6. Epub Dec. 25, 2013.
Soga et al., Lysophosphatidylcholine enhances glucose-dependent insulin secretion via an orphan G-protein-coupled receptor. Biochem Biophys Res Commun. Jan. 28, 2005;326(4):744-51. Erratum in: Biochem Biophys Res Commun. Apr. 1, 2005;329(1):417.
Suzuki, Y., Studies on amide derivatives of higher fatty acids. I. The relationship between chemical structure and cholesterol lowering activity (author's transl). Yakugaku Zasshi. Jan. 1977;97(1):5-13. (Eng. abstract only).
Examination Report issued in Australian Patent Application No. 2018326396, dated Sep. 22, 2023.
Examination Report issued in Australian Patent Application No. 2018326396, dated Sep. 27, 2023.
First Office Action issued in corresponding Chinese Patent Application No. 201880070700.4 dated Aug. 26, 2022, in an unofficial English translation provided by local Agent. (Eng. translation only).
Second Office Action issued in corresponding Chinese Patent Application No. 201880070700.4 dated Apr. 17, 2023, in an unofficial English translation provided by local Agent.
CAS Registry No. 1821350-83-9, STN Entry Date Nov. 30, 2015.
CAS Registry No. 99450-38-1, STN Entry Date Dec. 15, 1985.
Extended European Search Report issued in European Patent Application No. 1851286.7, dated Apr. 23, 2021.

\* cited by examiner

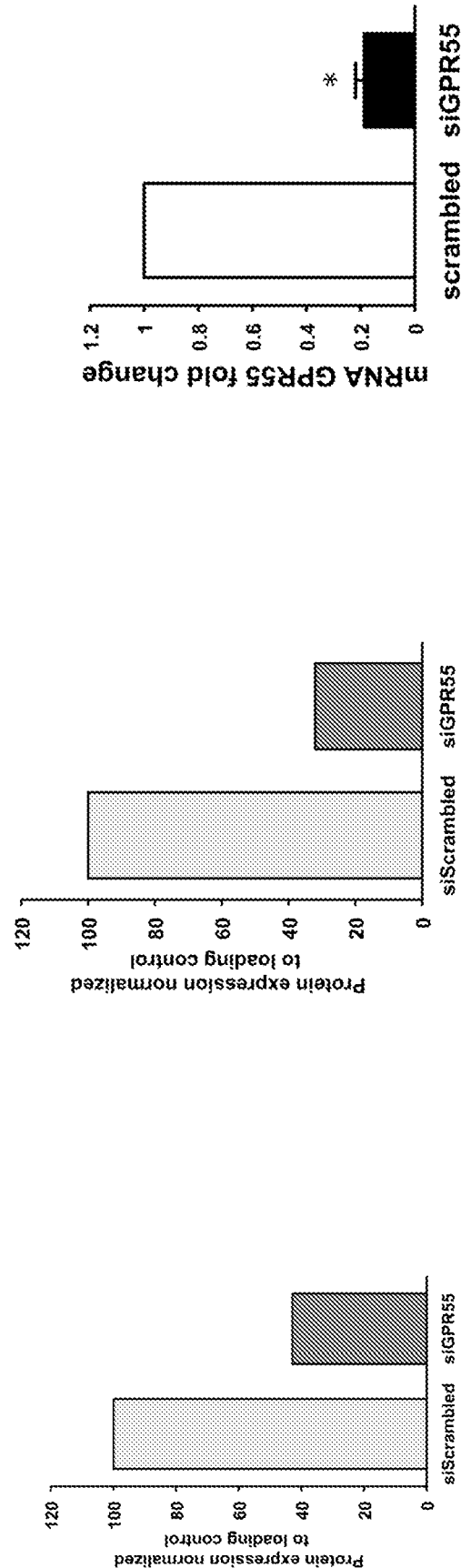
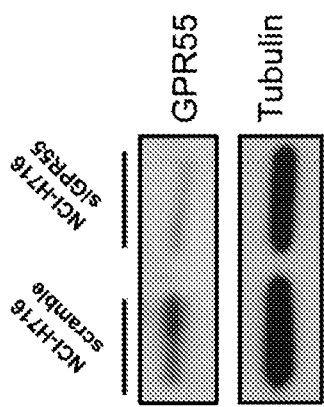
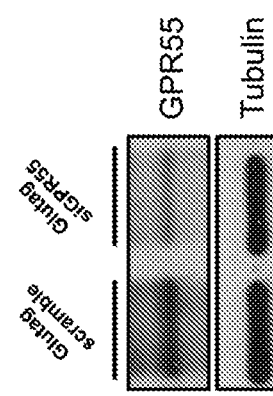
Figure 3A
Figure 3B
Figure 3C
Figure 3D
Figure 3E

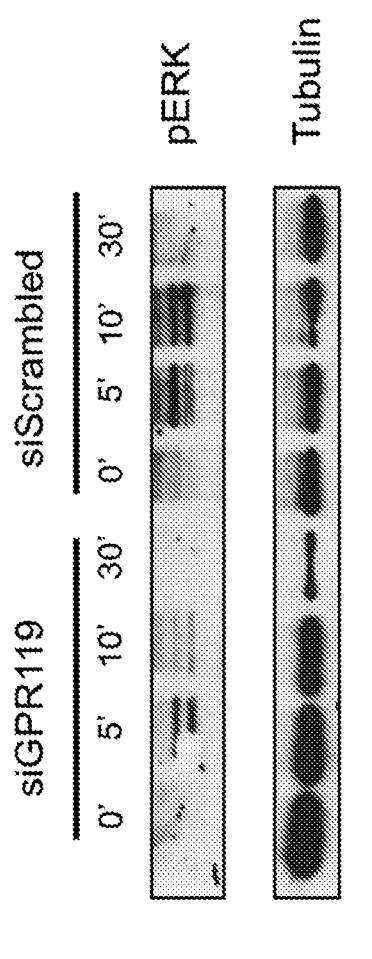
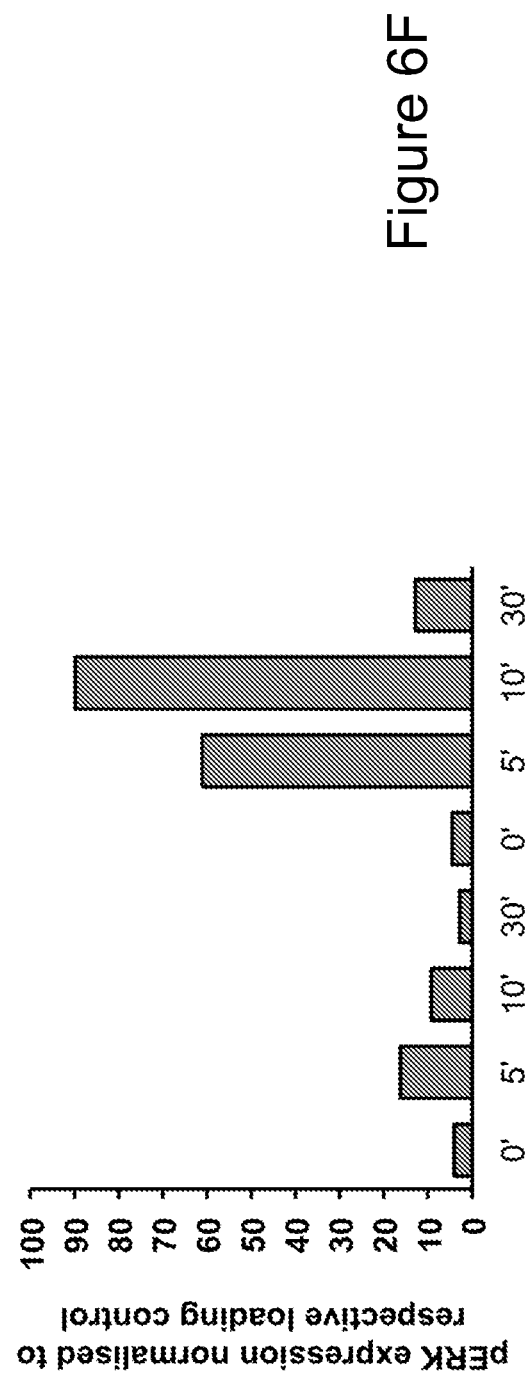
Figure 6E
Figure 6F

| Sigmoidal dose-response (variable slope) | OEA |
|---|---|
| Best-fit values | |
| Bottom | -1.715 |
| Top | 101.4 |
| LogEC50 | -6.663 |
| HillSlope | = 0.7500 |
| EC50 | 2.173e-007 |
| Std. Error | |
| Bottom | 13.64 |
| Top | 12.33 |
| LogEC50 | 0.4415 |
| 95% Confidence Intervals | |

OEA: EC50=-6.66+/-0.44

| Sigmoidal dose-response (variable slope) | Normalize of LPi |
|---|---|
| Best-fit values | |
| Bottom | 3.347 |
| Top | 96.83 |
| LogEC50 | -6.632 |
| HillSlope | = 0.7500 |
| EC50 | 2.335e-007 |
| Std. Error | |
| Bottom | 14.22 |
| Top | 22.92 |
| LogEC50 | 0.6631 |

LPi: EC50=-6.63+/-0.66

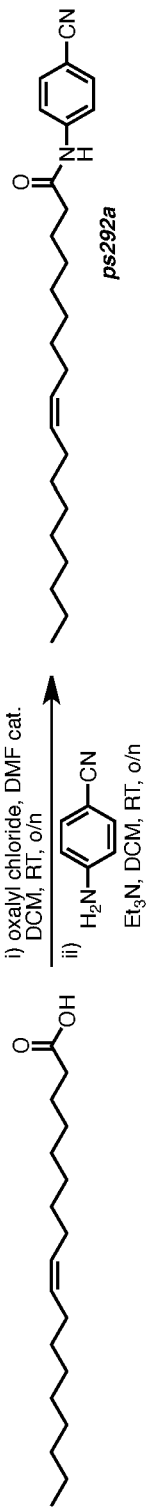
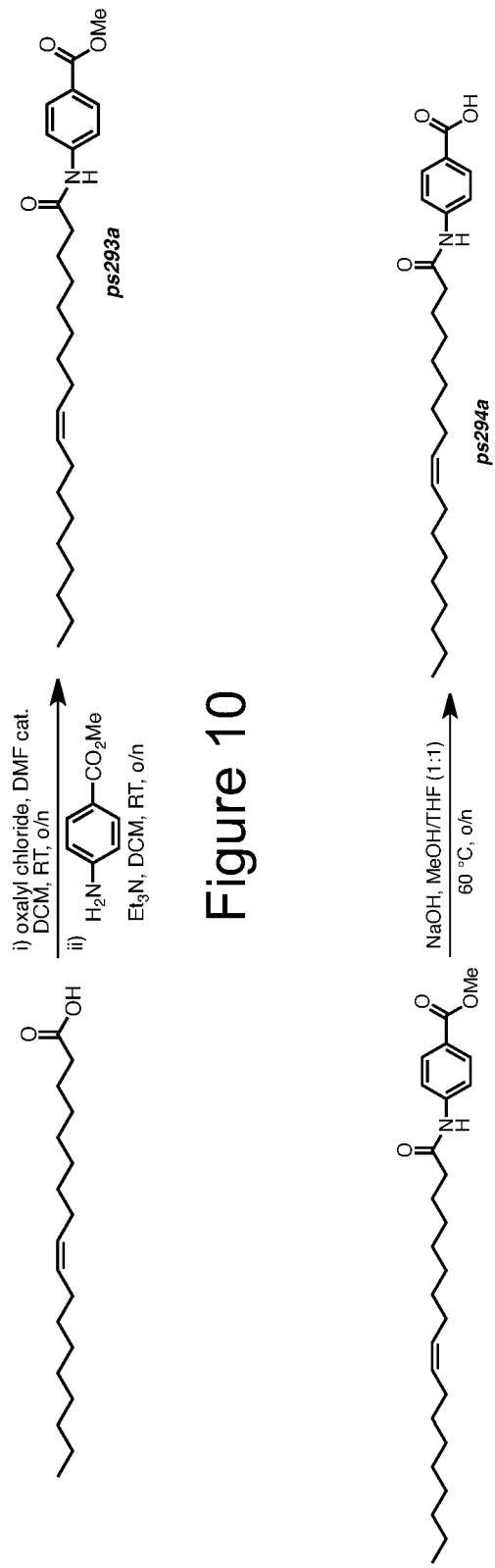
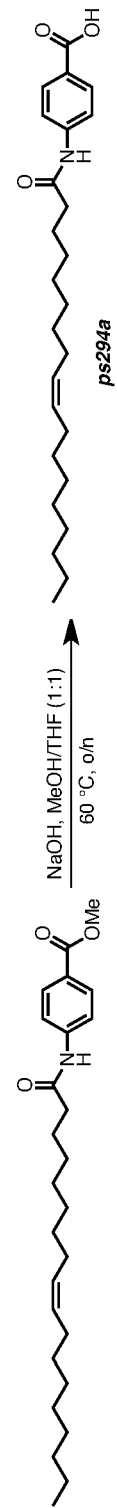
Figure 9
Figure 10
Figure 11

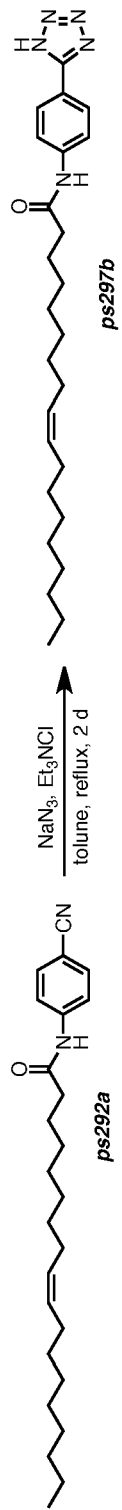
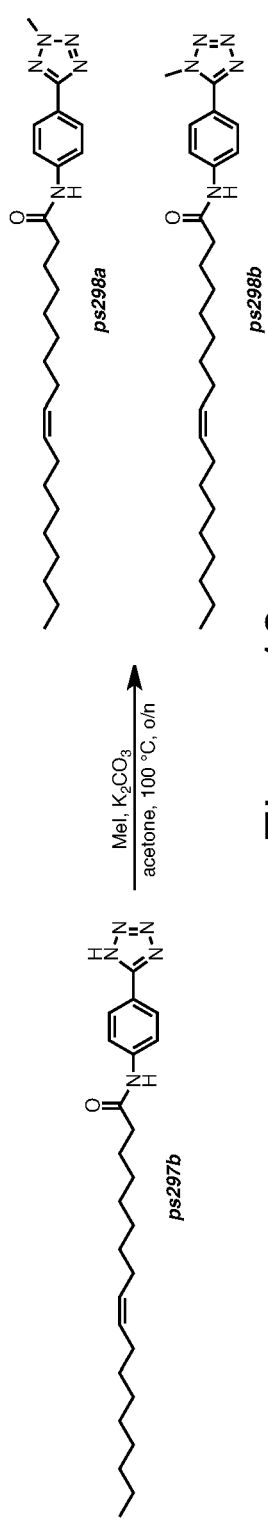
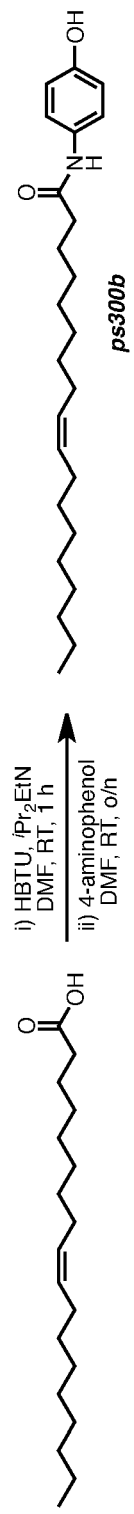
Figure 12
Figure 13
Figure 14

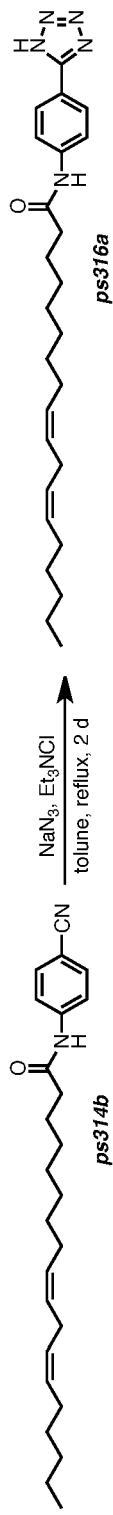
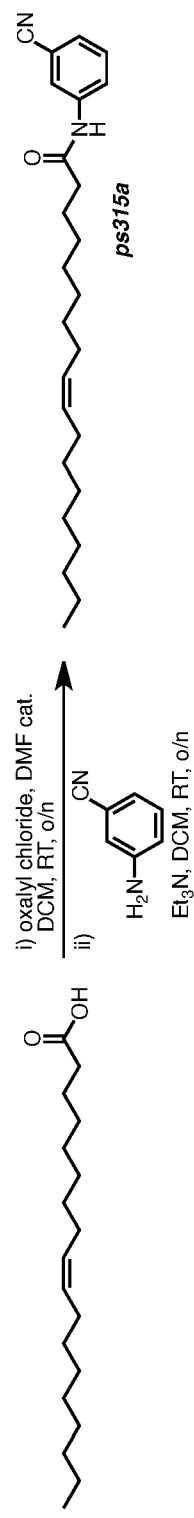
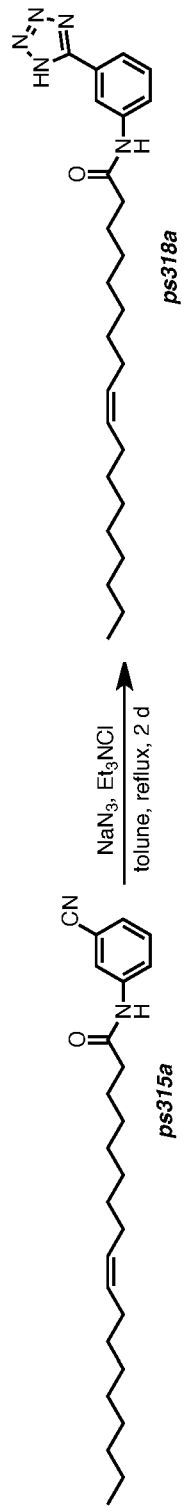
Figure 21
Figure 22
Figure 23

SYNTHETIC DERIVATIVES OF OLEOYL-LYSOPHATIDYLINOSITOL (OLEOYL-LPI) AND USES THEREOF

TECHNICAL FIELD

The invention relates to the field of oleoyl-lysophosphatidylinositol (oleoyl-LPI) and new synthetic derivatives thereof and uses thereof, and to pharmaceutical compositions comprising such compounds. In one example, the present invention also relates to the field of activators and/or up-regulators of glucoregulatory hormones such as glucagon like peptide-1 (GLP-1), and more specifically to agonists, partial agonists and reverse antagonists of GPR119 or activators of GLP-1 activity and/or synthesis and/or secretion, and pharmaceutical compositions comprising same, uses thereof in therapy of diabetes, obesity and other metabolic disorders.

BACKGROUND ART

The following discussion of the background art is intended to facilitate an understanding of the present invention only. The discussion is not an acknowledgement or admission that any of the material referred to is or was part of the common general knowledge or common wisdom as at the priority date of the application.

Metabolic disorders e.g., diabetes and obesity can be associated with chronic hyperglycemia and hyperlipidaemia, which together can induce metabolic stress in pancreatic β-cells and can trigger the activation of β-cells apoptotic pathway. For example, type 2 diabetes is characterised by defects in both insulin secretion and insulin sensitivity and in associated with chronic hyperglycemia and hyperlipidaemia ultimately resulting in the above-mentioned stress and activation of β-cells apoptotic pathway.

Although the pancreas has been the focus of insulin secretion and glucose homeostasis to avoid onset of metabolic disorders, more recently, the gastrointestinal (GI) tract has been increasingly viewed as an important organ in glucose metabolism because of its role in delivering glucose to the circulation, and because of the role of the GI tract in secreting multiple glucoregulatory hormones. Examples of such glucoregulatory hormones secreted by the GI tract include glucagon like peptide-1 (GLP-1) and glucose dependent insulinotropic peptide (GIP), each of which contribute to regulating glucose metabolism and can play an important role in insulin secretion and glucose homeostasis, and therefore in avoiding, e.g., preventing, onset of metabolic disorders or in therapy of metabolic disorders such as diabetes (e.g., type 2 diabetes) and obesity.

The GLP-1 hormone is released from the intestine postprandially and it stimulates insulin secretion from the pancreatic β-cell in a glucose-dependent manner. To date, preventative and/or therapeutic strategies of metabolic disorders such as diabetes (e.g., type 2 diabetes) and obesity based on GLP-1 have focused on either the administration of exogenous GLP-1 or on targeting options that result in increasing endogenous GLP-1 secretion (rather than administering exogenous GLP-1). Earlier methods that focused on increasing endogenous GLP-1 secretion included GLP-1 mimetics that have been used to treat type 2 diabetes patients. However, the use of such mimetics has raised several important public health safety concerns because their use has been associated with onset of pancreatitis and/or medullary carcinoma of the thyroid (Drucker, D. J., et al (2010), *Diabetes Care*, Vol 33(2), pp 428-433).

Glucose-stimulated insulin secretion (GSIS) of GLP-1 may be also modulated by certain amino acids, certain fatty acids and certain lipids. However, most of the endogenous GLP-1 secretion may be mediated by G-protein coupled receptors (GPCRs) such as G-protein coupled receptor 119 (GPR119) and G-protein coupled receptor 120 (GPR120).

GPR119 is a member of the class A family of GPCRs. This receptor binds to long-chain fatty acids including oleoylethanolamide (OEA) and lysophosphatidylcholine (LPC). The expression of GPR119 mRNA has been reported in a number of tissues including brain, heart, pancreas, spleen and stomach. The highest level of GPR119 expression occurs in islets of Langerhans, β-cell lines (e.g., pancreatic islet β-cells), and intestinal L-cells. Furthermore, activation of GPR119 has been shown to positively modulate incretin and insulin hormone secretion that causes reduction in food intake and body weight gain in rats (Overton, H. A., et al (2006) *Cell Metabolism*, Vol 3(3), pp 167-75; Reimer, R. A. et al (2001) *Endocrinology*, Vol 142(10), pp 4522-8). This activation was shown to be correlated with increased secretion of GLP-1, GIP and enhanced glucose-stimulated insulin release.

Currently, there is a need in the art for alternative and/or improved strategies for therapy of metabolic disorders such as diabetes (e.g., type 2 diabetes) and/or obesity. For example, there is a need in the art for alternative and/or improved strategies for the treatment and/or prevention of such metabolic disorders which are based on increasing endogenous GLP-1 secretion rather than administering exogenous GLP-1.

There also remains a need in the art for identification of new activators and/or up-regulators of glucoregulatory hormones such as GLP-1 and for pharmaceutical compositions comprising such activators and/or up-regulators of GLP-1. For example, there remains a need in the art for identification of agonists, partial agonists and reverse antagonists of GPR119 which are able to induce and/or enhance in vitro and in vivo activity and/or synthesis and/or secretion of GLP-1, and for pharmaceutical compositions comprising such agonists, partial agonists and reverse antagonists. These activators and/or up-regulators of GLP-1 and the pharmaceutical compositions which comprise these activators and/or up-regulators of GLP-1 have the potential to be employed in much needed therapy of metabolic disorders such as diabetes (e.g., type 2 diabetes) and/or obesity.

It is against this background that the present invention has been developed. More particularly, the present invention seeks to overcome, or at least ameliorate, one or more of the deficiencies of the prior art mentioned above, or to provide the consumer with a useful or commercial choice.

SUMMARY OF INVENTION

The present invention provides a principal of general application directed to lysophospholipids (lysophosphatidylinositol (LPI)) having a univalent carbonyl radical of oleic acid, including derivatives and analogues thereof, and their use as mediators of G-protein coupled receptor 119 (GPR119) activity and in particular GLP-1 secretion. The invention is derived from a finding by the inventors that secretion and/or synthesis of oleoyl-LPI by enteroendocrine L cells of the GI tract induces and/or increases GPR119 activity and that such activity can be modulated by oleoyl-LPI, derivatives or analogue compounds thereof and/or compositions thereof prepared and/or identified herein.

A further unexpected and surprising finding of the research presented herein is that oleoyl-LPI induced secretion of GLP-1 with higher efficacy than the identified GPR119 ligand, OEA. These data appear to be in contrast with earlier studies by other research groups which concluded that OEA induced much stronger GLP-1 secretion when tested in the same concentration. Further, the inventors have found that that oleoyl-LPI induced GLP-1 secretion occurs in a glucose independent manner.

In addition, the inventors have found that down-regulation of GPR119 using siRNA technology impairs the secretion of GLP-1 when stimulated with oleoyl-LPI, indicating that GPR119 is involved in LPI mediated GLP-1 secretion.

Overall, the results of the work presented herein demonstrated, inter alia, that oleoyl-LPI is involved in LPI secretion e.g., by enteroendocrine L-cells. The results further demonstrate that compounds of this invention or salts or solvates thereof as described herein throughout and/or oleoyl-LPI can be employed to promote GLP-1 secretion e.g., by enteroendocrine L-cells.

The work shown herein implicate oleoyl-LPI and compounds of this invention or salts or solvates thereof as described herein induce and/or increase (enhance) endogenous GLP-1 synthesis and/or secretion from e.g., enteroendocrine cells and have a role in improve glucose homeostasis e.g., in metabolic disorders where glucose homeostasis is compromised e.g., obesity and/or diabetes such as in type 2 diabetes.

Accordingly, in one broad and general form the invention provides compounds (including pharmaceutically acceptable salts thereof), compositions (including therapeutical or pharmaceutical compositions thereof) and methods for activating and/or up-upregulating glucoregulatory hormones. In particular, it provides methods for the treatment of GPR119 associated diseases, disorders or conditions. More particularly, the invention resides in the use of lysophospholipids (lysophosphatidylinositol (LPI)) having a univalent carbonyl radical of oleic acid, including derivatives and analogues thereof (such as oleoyl-LPI and derivative or analogue compounds thereof) as agonists, partial agonists or reverse antagonists of GPR119 in vitro and/or in vivo, such as in pancreatic cells and/or in cells of the GI tract such as L cells to treat metabolic disorders.

As discussed herein a "GPR119 associated disease, disorder or condition" or a "metabolic disorder" may include by way of illustration and without limitation: hyperlipidemia, obesity, type 1 diabetes, type 2 diabetes mellitus, idiopathic type 1 diabetes (Type Ib), latent autoimmune diabetes in adults (LADA), early-onset type 2 diabetes (EOD), youth-onset atypical diabetes (YOAD), maturity onset diabetes of the young (MODY), malnutrition-related diabetes, gestational diabetes, atherosclerosis, arteriosclerosis, cardiovascular disease, stroke, cerebrovascular ischemia, heart disease, coronary heart disease, ischemic heart disease, angina and heart attack, Non-alcoholic fatty liver disease (NAFLD), Non-Alcoholic Steatohepatitis (NASH), fatty liver, liver fibrosis, cirrhosis, hepatocarcinoma (HCC), liver disease related to iron overload disorder and alcoholic liver disease, coronary heart disease, ischemic stroke, restenosis after angioplasty, peripheral vascular disease, intermittent claudication, myocardial infarction (e.g. necrosis and apoptosis), dyslipidemia, post-prandial lipemia, conditions of impaired glucose tolerance (IGT), conditions of impaired fasting plasma glucose, metabolic acidosis, ketosis, arthritis, obesity, osteoporosis, hypertension, congestive heart failure, left ventricular hypertrophy, peripheral arterial disease, diabetic retinopathy, macular degeneration, cataract, diabetic nephropathy, glomerulosclerosis, chronic renal failure, diabetic neuropathy, metabolic syndrome, syndrome X, premenstrual syndrome, coronary heart disease, angina pectoris, thrombosis, atherosclerosis, myocardial infarction, transient ischemic attacks, stroke, vascular restenosis, hyperglycemia, hyperinsulinemia, hyperlipidemia, hypertryglyceridemia, insulin resistance, impaired glucose metabolism, conditions of impaired glucose tolerance, conditions of impaired fasting plasma glucose, obesity, erectile dysfunction, skin and connective tissue disorders, foot ulcerations and ulcerative colitis, endothelial dysfunction and impaired vascular compliance.

In one preferred form, the invention is directed to therapeutically (or pharmaceutically) effective amounts of oleoyl-LPI, derivatives or analogue compounds thereof and/or compositions thereof prepared and/or identified herein for us in either the manufacture of medicaments or to provide therapies to emeliorate or treat metabolic disorders such as diabetes (e.g., type 2 diabetes) and/or obesity.

In another preferred form, the invention is directed to methods of administration of a therapeutically or pharmaceutically effective amount of an oleoyl-LPI or a derivative or analogue compounds thereof and/or compositions thereof prepared and/or identified herein in the prevention and/or treatment of metabolic disorders such as diabetes (e.g., type 2 diabetes) and/or obesity.

In addition, or in the alternative, the invention provides a method of preventing, inhibiting or ameliorating a pathology and/or symptomology of a GPR119 associated disease, disorder or condition, which method comprises administering to an animal a therapeutically or pharmaceutically effective amount of a compound of the invention, or a pharmaceutically acceptable salt thereof.

According to the invention, oleoyl-LPI derivative compounds have a hydrophilic head unit, a linker and a lipophilic tail, which are direct or indirect derivatives of the endogenous oleoyl-LPI ligand of GPR119, that are effective at modulating GPR119 activity. For example, the inventors have prepared and/or identified synthetic derivatives of oleoyl-LPI comprising a hydrophilic head unit, a simplified linker (e.g., but not limited to phenylamide), and a lipophilic tail and found they were particularly effective at modulating GPR119 activity. In this respect, the inventors have prepared and/or identified new synthetic oleoyl-LPI derivative compounds and/or compositions that are derived either directly or indirectly from oleoyl-LPI that modulate GPR119 activity.

In addition, the inventors have found that the synthetic compounds produced herein may be synthesized chemically in fewer steps than oleoyl-LPI, and once produced these compounds may be more stable than chemically synthesized oleoyl-LPI. For example, the compounds of the present invention may be synthesised in fewer steps relative to oleoyl-LPI, in gram scale quantities. In some examples, the compounds of the present invention may be synthesised in two or three steps from commercially available starting materials, in gram scale quantities. Accordingly, the synthetic compounds of the present invention provide a significant commercial advantage over the use of any endogenous ligand of GPR119.

In a particular embodiment of the invention oleoyl-LPI or a derivative or analogue compounds thereof and/or compositions thereof prepared and/or identified herein and/or compositions prepared and/or identified herein may also be used to enhance endogenous GLP-1 secretion and/or synthesis and/or activity and improve glucose homeostasis in patients suffering from metabolic disorders such as diabetes (e.g., type 2 diabetes) and/or obesity. In this respect the inventors have also found that oleoyl-LPI stimulates release and/or synthesis and/or activity of GLP-1 in vitro in murine and human L-cells and in ex vivo mixed colonic primary cell preparations. Thus, compounds of the present invention are capable of inducing and/or increasing secretion and/or synthesis of GLP-1 from cells of the GI tract. Accordingly, as exemplified herein, the compounds of the present invention also serve as compounds capable of inducing and/or increasing secretion and/or synthesis of GLP-1 in vitro, in vitro and/or ex vivo.

Without being bound be theory, the inventors believe that GLP-1 activity arises from the compounds of the invention acting as agonists, partial agonis or reverse antagonists of GPR119, such as in pancreatic cells and/or cells of the GI tract. In particular, as exemplified herein the inventors have employed siRNA technology to down-regulate the GPR119 and GPR55 and have shown that that secretion and/or synthesis of GLP-1 by siRNA GPR119-transfected cells, but not siRNA GPR55, is impaired when stimulated with oleoyl-LPI. This finding demonstrates that GPR119 is involved in LPI mediated GLP-1 secretion and/or synthesis and provides a significant advantage of implicating a role for GPR119 activation in GLP-1 secretion and/or synthesis and/or activation, preferably secretion of GLP-1.

In addition, as exemplified herein, the inventors have identified oleoyl-LPI as an endogenous ligand of the GPR119 but not of GPR55. The inventors have shown that oleoyl-LPI is capable of inducing secretion of GLP-1 with higher potency than the known GPR119 ligand, oleoylethanolamide (OEA). As exemplified herein, the inventors have further shown that phosphorylation of ERK, activation of protein kinase A (PKA) and stimulation of cyclic AMP-response element binding (CREB) constitutes potential signalling pathways involving oleoyl-LPI induced GLP-1 secretion and/or synthesis. Preferably, the activation of PKA and stimulation of CREB constitutes potential signalling pathways involving oleoyl-LPI induced GLP-1 secretion and/or synthesis.

Therefore, in an embodiment of the invention, the above oleoyl-LPI derivative compounds, when either alone or in combination, can be used to induce and/or increase secretion and/or synthesis and/or activity of GLP-1 in vitro and/or in vivo. For example, herein the inventors have prepared and/or identified compounds and/or compositions that induce secretion of GLP-1 such as from cells of the GI tract e.g., the cells of the intestine, such as murine and/or human L cells. More particularly the inventors have identified and/or prepared compounds and compositions that are capable of inducing and/or increasing secretion and/or synthesis and/or activity of GLP-1 by agonising, partially agonising or reverse antagonising activity of GPR119 in vitro and/or in vivo, such as in pancreatic cells and/or in cells of the GI tract such as L cells.

Specific Aspects of the Invention

The scope of the invention will be apparent from the claims as filed with the application that follow the examples. The claims as filed with the application are hereby incorporated into the description. The scope of the invention will also be apparent from the following description of specific embodiments and/or detailed description of the preferred embodiments.

In a first aspect, there is provided a compound of formula I or salt or solvate thereof:

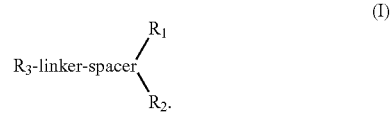

wherein:
(i) the "spacer" represents a $C_{5-8}$ aryl, $C_3$ heterocycle with 1 to 2 heteroatom(s), $C_4$ heterocycle with 1 to 3 heteroatom(s), $C_5$ heterocycle with 1 to 4 heteroatom(s), $C_6$ heterocycle with 1 to 5 heteroatom(s), $C_{2-8}$ alkyl chain, $C_{2-8}$ alkenyl chain, or $C_{2-8}$ alkyneyl chain;
(ii) the "linker" represents an amide, ester, ether, thioether, ketone, sulfoxide, sulfone, carbamate, carbonate, amine, imine or sulphonamide;
(iii) $R_1$ represents H, OH, CN, ester, ether, $C_{1-8}$ alkyl chain, $C_{1-8}$ alkenyl chain, $C_{1-8}$ alkynyl chain, aldehyde, halogen, carboxylic acid, tetrazole, N(1)-alkylated tetrazole or a salt thereof, N(2)-alkylated tetrazole or a salt thereof, $C_{5-6}$ aryl, $C_3$ heterocycle with 1 to 2 heteroatoms, $C_4$ heterocycle with 1 to 3 heteroatoms, $C_5$ heterocycle with 1 to 4 heteroatoms, or $C_{6-8}$ heterocycle with 1 to 5 heteroatoms;
(iv) $R_2$ represents H, OH, CN, ester, ether, $C_{1-8}$ alkyl chain, $C_{1-8}$ alkenyl chain, $C_{1-8}$ alkynyl chain, aldehyde, halogen, carboxylic acid, tetrazole, N(1)-alkylated tetrazole or a salt thereof, N(2)-alkylated tetrazole or a salt thereof, $C_{5-6}$ aryl, $C_3$ heterocycle with 1 to 2 heteroatoms, $C_4$ heterocycle with 1 to 3 heteroatoms, $C_5$ heterocycle with 1 to 4 heteroatoms, or $C_{6-8}$ heterocycle with 1 to 5 heteroatoms; and
(v) $R_3$ represents a $C_{4-24}$ unsaturated fatty acid chain or a $C_{3-38}$ saturated fatty acid chain.

In developing the present invention, the inventors produced an array of compounds of formula I (as described herein) and have shown that each of those compounds are able to activate and/or up-upregulate glucoregulatory hormones. In particular, they are capable of ameliorating, more particularly, inducing and/or increasing GPR119 activity, which stimulates release of GLP-1 in vitro in murine and human L-cells. Such results establish that compounds of formula I or salts or solvates thereof as described according to any broad aspect or embodiment or example hereof, are able to induce and/or increase GPR119 activity and as one outcome induce GLP-1 secretion and biosynthesis e.g., by similar mechanism to the endogenous oleoyl-LPI. Such data establish a role for both oleoyl-LPI and for compounds of formula I or salts or solvates thereof to emeliorate or treat metabolic disorders such as diabetes (e.g., type 2 diabetes) and/or obesity and in particular to provide a means for regulating glucose metabolism and maintaining glucose homeostasis.

In some examples, wherein $R_3$ represents a $C_{4-24}$ unsaturated fatty acid chain selected from crotonic acid or a derivative thereof, myristoleic acid or a derivative thereof, palmitoleic acid or a derivative thereof, sapienic acid or a derivative thereof, oleic acid or a derivative thereof, elaidic acid or a derivative thereof, vaccenic acid or a derivative thereof, gadoleic acid or a derivative thereof, eicosenoic acid or a derivative thereof, erucic acid or a derivative thereof, nervonic acid or a derivative thereof, linoleic acid or a derivative thereof, eicosadienoic acid or a derivative thereof, docosadienoic acid or a derivative thereof, linolenic acid or a derivative thereof, pinolenic acid or a derivative thereof, eleostearic acid or a derivative thereof, mead acid or a derivative thereof, dihomo-gamma-linolenic acid or a derivative thereof, eicosatrienoic acid or a derivative thereof, stearidonic acid or a derivative thereof, arachidonic acid or a derivative thereof, eicosatetraenoic acid or a derivative thereof, adrenic acid or a derivative thereof, bosseopentaenoic acid or a derivative thereof, eicosapentaenoic acid or a derivative thereof, ozubondo acid (also known as osbond acid) or a derivative thereof, sardine acid (also known as clupanodonic acid) or a derivative thereof, tetracosanolpentaenoic acid or a derivative thereof, docosahexaenoic acid or a derivative thereof, and herring acid or a derivative thereof.

In some such preferred examples, $R_3$ represents a unsaturated fatty acid chain selected from crotonic acid, myristoleic acid, palmitoleic acid, sapienic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, eleostearic acid, mead acid, dihomo-gamma-linolenic acid, eicosatrienoic acid, stearidonic acid, arachidonic acid, eicosatetraenoic acid, adrenic acid, bosseopentaenoic acid, eicosapentaenoic acid, ozubondo acid, sardine acid, tetracosanolpentaenoic acid, docosahexaenoic acid, and herring acid.

In other examples, $R_3$ represents a $C_{3-38}$ saturated fatty acid chain selected from is selected from propionic acid or a derivative thereof, butyric acid or a derivative thereof, valeric acid or a derivative thereof, caproic acid or a derivative thereof, enanthic acid (also known as heptanoic acid) or a derivative thereof, caprylic acid or a derivative thereof, pelargonic acid (also known as nonanoic acid) or a derivative thereof, capric acid (also known as decanoic acid) or a derivative thereof, undecylic acid or a derivative thereof, lauric acid or a derivative thereof, tridecylic acid or a derivative thereof, myristic acid or a derivative thereof, pentadecylic acid or a derivative thereof, palmitic acid or a derivative thereof, margaric acid or a derivative thereof, stearic acid or a derivative thereof, nonadecylic caid or a derivative thereof, archidic acid or a derivative thereof, heneicosylic acid or a derivative thereof, behenic acid or a derivative thereof, tricosylic acid or a derivative thereof, lignoceric acid or a derivative thereof, pentacosylic acid or a derivative thereof, cerotic acid or a derivative thereof, heptacosylic acid or a derivative thereof, montanic acid or a derivative thereof, nonacosylic acid or a derivative thereof, melissic acid or a derivative thereof, henatriacontylic acid or a derivative thereof, lacceroic acid or a derivative thereof, psyllic acid or a derivative thereof, geddic acid or a derivative thereof, ceroplastic acid or a derivative thereof, hexatriacontylic acid or a derivative thereof, heptatriacontanoic acid or a derivative thereof, and octatriacontanoic acid or a derivative thereof.

In some such preferred examples, $R_3$ represents a saturated fatty acid chain selected from propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic caid, archidic acid, heneicosylic acid, behenic acid, tricosylic acid, lignoceric acid, pentacosylic acid, cerotic acid, heptacosylic acid, montanic acid, nonacosylic acid, melissic acid, henatriacontylic acid, lacceroic acid, psyllic acid, geddic acid, ceroplastic acid, hexatriacontylic acid, heptatriacontanoic acid, and octatriacontanoic acid.

In particularly preferred examples, $R_3$ represents palmityl, oleoyl or linoleyl.

In other examples, $R_1$ may be a heterocycle selected from benzimidazole, benzothiazole, indazole. Alternatively, or in addition, $R_1$ may be a heterocycle selected from benzimidazole, benzothiazole, indazole.

In some examples, the linker may preferably be an amide, ester, ether or carbamate linker.

In some exemplary embodiments of the compound or salt or solvate according to any aspect described hereof, the compound has a structure of formula II:

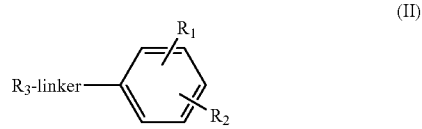

(II)

wherein,
(i) the "linker" represents amide, ester, ether or carbamate;
(ii) $R_1$ represents H, halogen, $C_{1-8}$ alkyl chain; $C_{1-8}$ alkenyl chain, $C_{1-8}$ alkynyl chain, $C_{5-6}$ aryl, $C_{5-8}$ heterocycle with 1 to 4 heteroatoms;
(iii) $R_2$ represents OH, CN, OMe, $CO_2H$, $CO_2Me$, tetrazole, N(2)-methyltetrazole, N(1)-methyltetrazole, sodium tetrazolate, triazole, imidazole, a $C_{5-6}$ N-heterocycle comprising NH and 1 to 4 heteroatom(s); and
(iv) $R_3$ represents a fatty acid chain selected from oleic acid or a derivative thereof, linoleic acid or a derivative thereof, myristoleic acid or a derivative thereof, palmitoleic acid or a derivative thereof, sapienic acid or a derivative thereof, elaidic acid or a derivative thereof, vaccenic acid or a derivative thereof, linoelaidic acid or a derivative thereof, α-linolenic acid or a derivative thereof, erucic acid or a derivative thereof, arachidonic acid or a derivative thereof, eicosapentaenoic acid or a derivative thereof, and docosahaexanoic acid or a derivative thereof.

Preferably, $R_3$ may represent a fatty acid chain selected from oleic acid linoleic acid, myristoleic acid, palmitoleic acid, sapienic acid, elaidic acid, vaccenic acid, linoelaidic acid, α-linolenic acid, erucic acid, arachidonic acid, eicosapentaenoic acid, and docosahaexanoic acid.

In one such exemplary embodiment, the compound has a $R_1$ which represents by a halogen, $C_{1-8}$ alkyl chain, $C_{1-8}$ alkenyl chain, $C_{1-8}$ alkynyl chain, $C_{5-6}$ aryl, $C_{5-8}$ heterocycle with 1 to 4 heteroatoms; and $R_2$ which represents imidazole, a $C_{5-6}$ N-heterocycle comprising NH and 1 to 4 heteroatom(s). Preferably, $R_1$ represents a halogen in the meta position to the heterocycle of $R_2$, and $R_2$ is a $C_{5-6}$ N-heterocycle comprising NH and 1 to 4 heteroatom(s). It will be understood that the compounds of this exemplary embodiment, have strong chemical similarities of substituents of those compounds exemplified by the inventors to have strong activity in inducing and/or increasing secretion of GLP-1 from cells of the GI tract.

In some exemplary embodiments of the compound or salt or solvate according to any aspect described hereof, the compound has a structure of formula II:

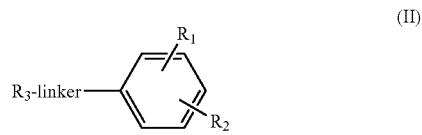

(II)

wherein,
(i) the "linker" represents amide, ester, ether or carbamate;
(ii) $R_1$ represents H, halogen, $C_{1-8}$ alkyl chain;
(iii) $R_2$ represents OH, ON, OMe, $CO_2H$, $CO_2Me$, tetrazole, N(2)-methyltetrazole, N(1)-methyltetrazole, sodium tetrazolate, or triazole; and
(iv) $R_3$ represents oleoyl, linoleoyl, or palmitoyl.

In one particular example, according to this embodiment, $R_1$ represents halogen in the meta position to the triazole of $R_2$, or $C_{1-8}$ alkyl chain, and $R_2$ represents a triazole comprising a polar head group having NH. Also, $R_3$ represents oleoyl or linoleoyl. It will be understood that triazoles in $R_1$ position share similar chemical features as tetrazoles present in the compounds shown herein to be able to strongly induce and/or increasing secretion of GLP-1 from cells of the GI tract. For example, both triazoles and tetazoles contain hydrogen bond receptors and one acidic hydrogen bond donor.

In other exemplary embodiments of the compound or salt or solvate according to any aspect described hereof, the compound has a structure of formula II:

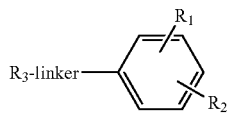

(II)

wherein
(i) the "linker" represents amide, ester, ether or carbamate;
(ii) $R_1$ represents H, halogen, $C_{1-8}$ alkyl chain;
(iii) $R_2$ represents OH, CN, OMe, $CO_2H$, $CO_2Me$, tetrazole, N(2)-methyltetrazole, N(1)-methyltetrazole, or sodium tetrazolate; and
(iv) $R_3$ represents oleoyl, linoleoyl, or palmitoyl.

In one particular example, according to this embodiment, $R_1$ represents halogen in the meta position to the tetrazol of $R_2$, or $C_{1-8}$ alkyl chain. $R_2$ represents tetrazole. Also, $R_3$ represents oleoyl or linoleoyl. It will be understood that these substituents are similar or the same to those substituents of the present in the compounds shown herein to strongly induce and/or increase secretion of GLP-1 from cells of the GI tract.

In other exemplary embodiments of the compound or salt or solvate according to any aspect described hereof, the compound has a structure of formula II:

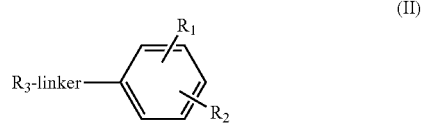

(II)

wherein
(i) the "linker" is

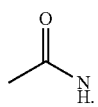

(ii) $R_1$ represents H or a halogen, wherein the halogen is fluorine.
(iii) $R_2$ represents OH, CN, OMe, $CO_2H$, $CO_2Me$, tetrazole, N(2)-methyltetrazole, N(1)-methyltetrazole, or sodium tetrazolate.
(iv) $R_3$ represents oleoyl, linoleoyl, or palmitoyl.

In one such exemplary embodiment of a compound or salt or solvate thereof, the compound is selected from the group consisting of compounds having the structure as shown in Formulae III to XXIII:

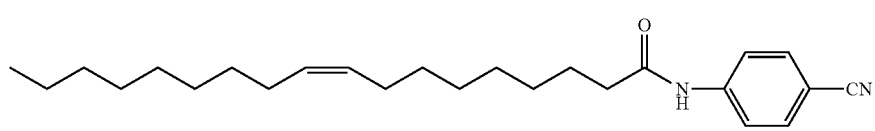

(III)

ps292a

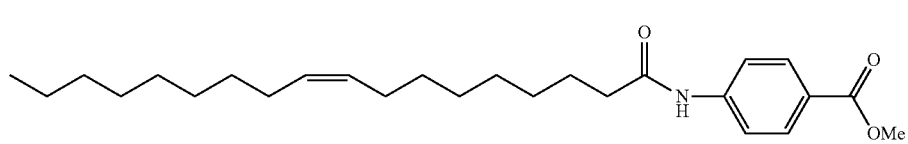

(IV)

ps293a

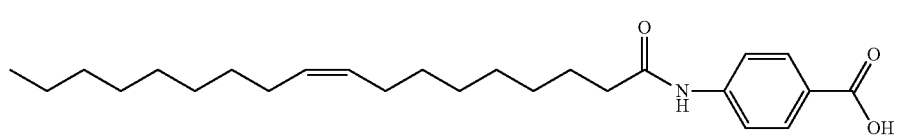

(V)

ps294a

-continued
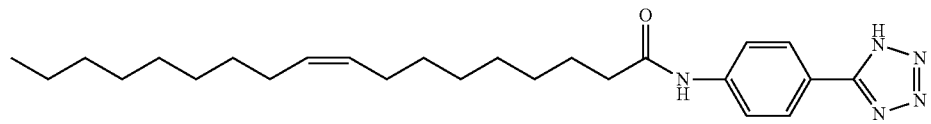
ps297b (VI)
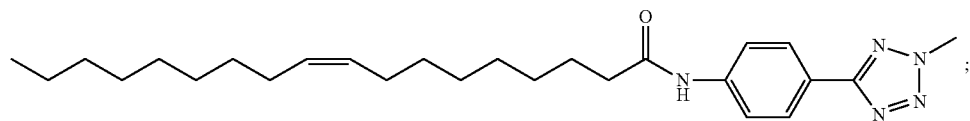
ps298a (VII)
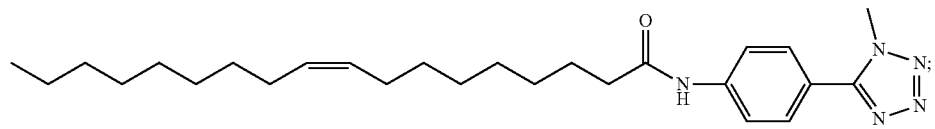
ps298b (VIII)
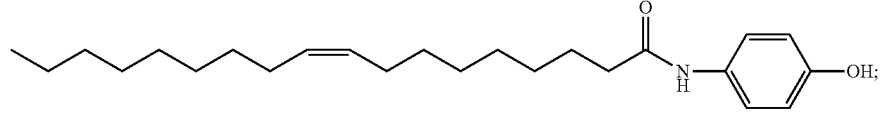
ps300b (IX)
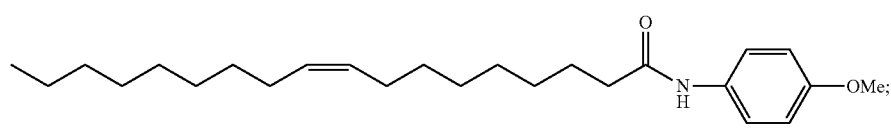
ps301a (X)
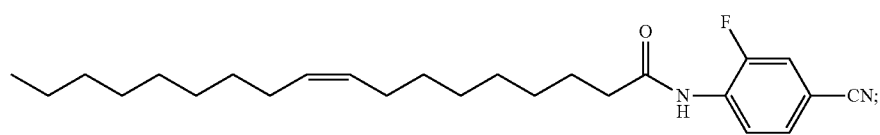
ps306a (XI)
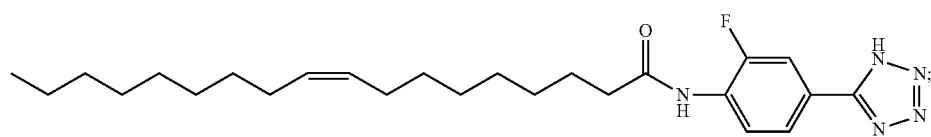
pa309a (XII)
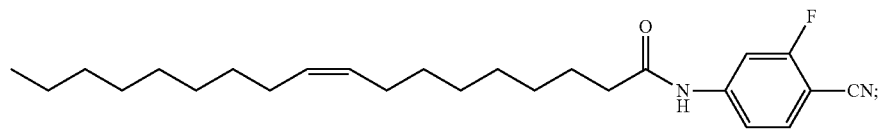
ps308c (XIII)
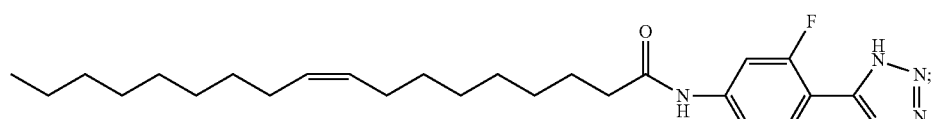
ps312a (XIV)

-continued
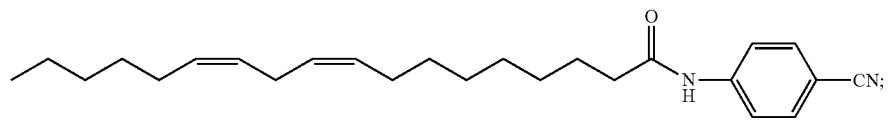
ps314a
(XV)
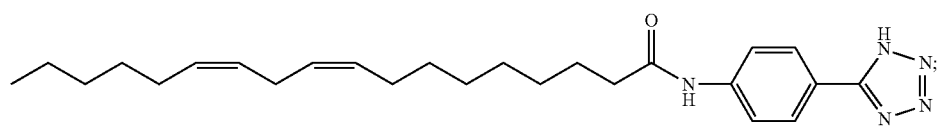
ps316a
(XVI)
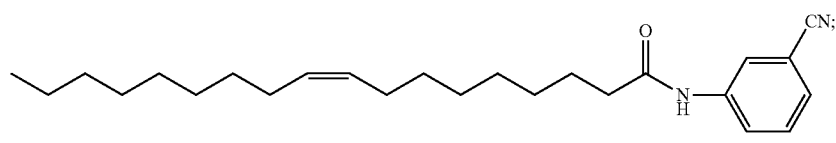
ps315a
(XVII)
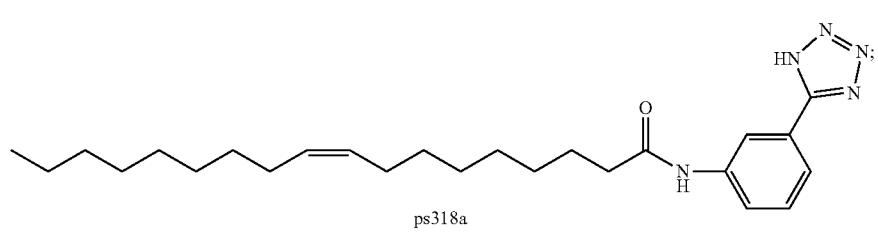
ps318a
(XVIII)
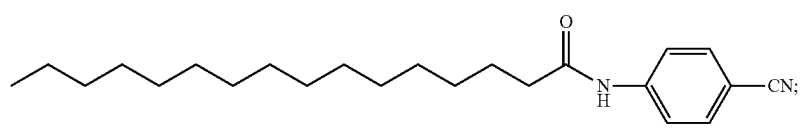
ps317b
(XIX)
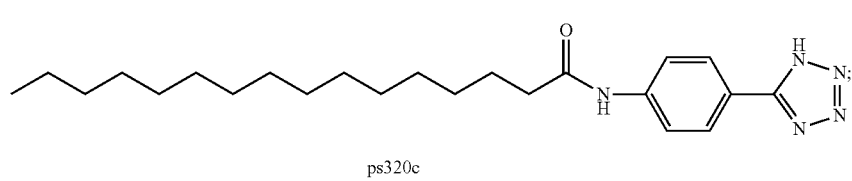
ps320c
(XX)
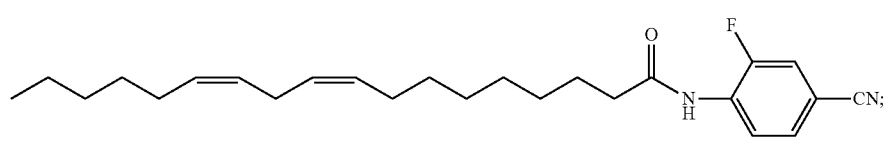
ps319
(XXI)
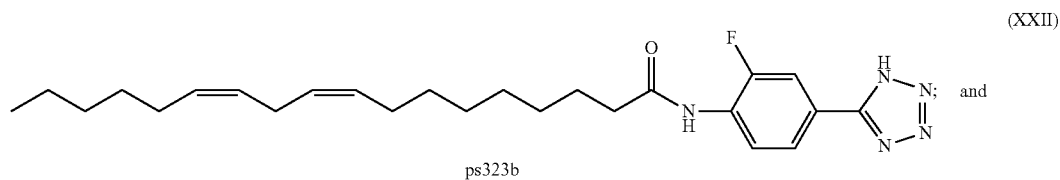
ps323b
(XXII)
and (XXIII)

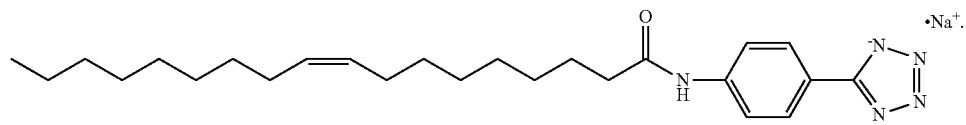

ps321a

In one preferred example, of a compound or salt or solvate thereof according to any aspect or embodiment or example described hereof, the compound is selected from the group consisting of compounds of formulae VI, XII, XVI and XVIII:

(VI)

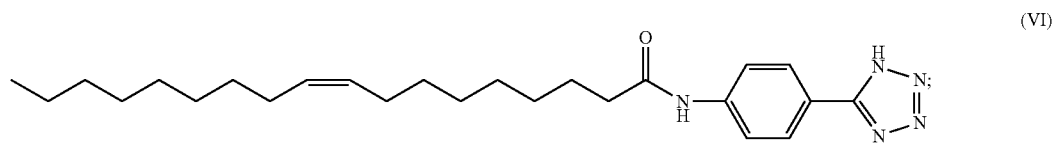

ps297b (XII)

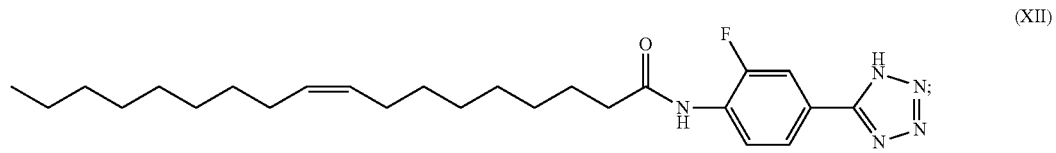

ps309a (XVI)

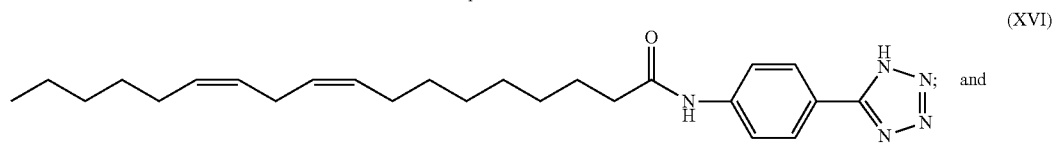

ps316a and (XVIII)

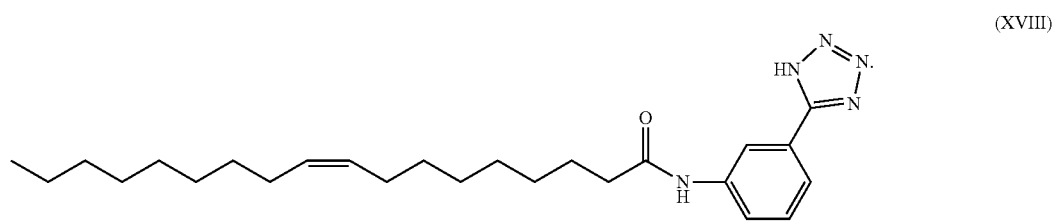

ps318a

In one example of a compound or salt or solvate thereof according to any aspect or embodiment or example described hereof, the compound is the compound of formula VI:

(VI)

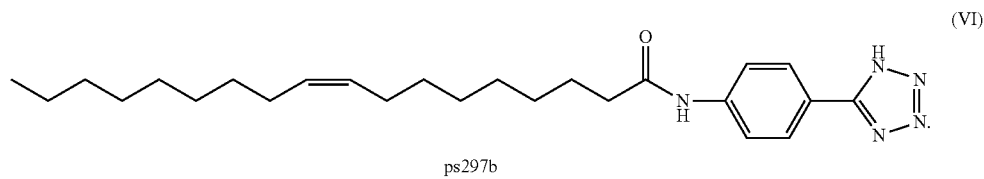 [SMILES: CCCCCCCC/C=C\CCCCCCCC(=O)Nc1ccc(-c2nnn[nH]2)cc1]

ps297b

In another example of a compound or salt or solvate thereof according to any aspect or embodiment or example described hereof, the compound is the compound of formula XII:

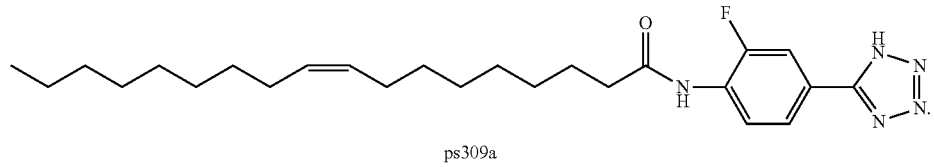 [SMILES: CCCCCCCC/C=C\CCCCCCCC(=O)Nc1ccc(-c2nnn[nH]2)cc1F]

ps309a

In another example of a compound or salt or solvate thereof according to any aspect or embodiment or example described hereof, the compound is the compound of formula XVI:

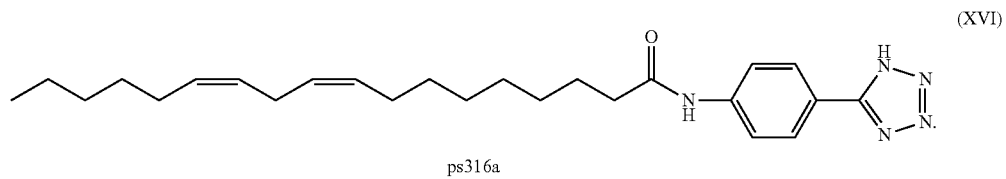 [SMILES: CCCCC/C=C\C/C=C\CCCCCCCC(=O)Nc1ccc(-c2nnn[nH]2)cc1]

ps316a

In some exemplary embodiments, the compound or salt or solvate according to this aspect, is a derivative of oleoyl-lysophosphatidylinositol (oleoyl-LPI). For example, the compound or salt or solvate is produced synthetically directly or indirectly from oleoyl-LPI. Alternatively, or in addition, the compound or salt or solvate according to this aspect is an analog of oleoyl-LPI, such as a synthetic analog of oleoyl-LPI.

In yet another example of a compound or salt or solvate thereof according to any aspect or embodiment or example described hereof, the compound is the compound of formula XVIII:

In some examples, the compound or salt or solvate according to this aspect is capable of binding to GPR119. For example, the compound or salt or solvate binds GPR119.

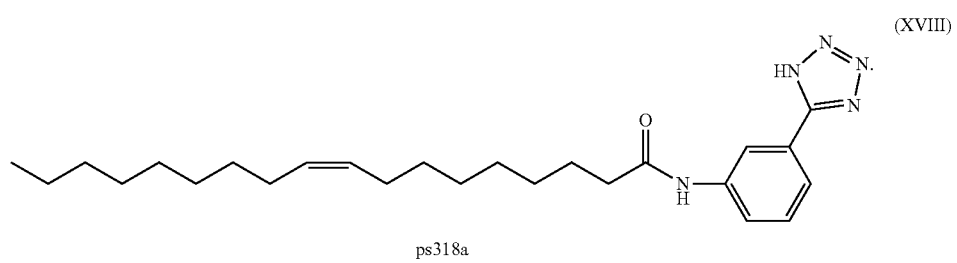 [SMILES: CCCCCCCC/C=C\CCCCCCCC(=O)Nc1cccc(-c2nnn[nH]2)c1]

ps318a

In one form of the invention according to the first broad aspect, the compound or salt or solvate thereof according to this aspect is a salt of a compound of formula I.

In one exemplary embodiment, the compound of formula I, has an $R_1$ and/or or $R_2$ which is/are a tetrazol. In once such exemplary embodiment, the compound of formula I, has an $R_1$ which is a tetrazole and/or $R_2$ which is a tetrazole. For example, when $R_1$ and/or $R_2$ are independently N(1)-alkylated tetrazole or N(2)-alkylated tetrazole, then the salt of the compound of formula I, may be a salt of the deprotonated tetrazole.

In another exemplary form of the invention, the compound or salt or solvate thereof according to any broad aspect, embodiment or example hereof, is a solvate of a compound of formula I.

Preferably, the compound or salt or solvate according to this aspect may be a ligand of GPR119.

In some exemplary embodiments, the compound or salt or solvate according to this aspect or any embodiment or any example as described hereof, is an agonist and/or a partial agonist and/or a reverse antagonist of GPR119 expression and/or activity ex vivo or in vivo e.g., in cells of the GI tract. In some examples, the compound or salt or solvate is capable of agonising and/or partially agonising and/or reverse antagonising expression and/or activity of GPR119 e.g., in cells of the GI tract such as human and/or murine L cells and/or pancreatic β cells in vivo and/or in vitro. In other example, the compound or salt or solvate agonises and/or partially agonises and/or reverse antagonises expression and/or activity of GPR119 in vitro or ex vivo such as in cells of the GI tract. For example, the compound or salt or solvate agonises and/or partially agonises and/or reverse antagonises expression and/or activity of GPR119 in human and/or murine L cells and/or pancreatic β cells in vivo and/or in vitro.

In some exemplary embodiments, the compound or salt or solvate according to this aspect or any embodiment or any example as described hereof is used in methods for the treatment of GPR119 associated diseases, disorders or conditions. In one preferred form, the invention is directed to therapeutically (or pharmaceutically) effective amounts of oleoyl-LPI, derivatives or analogue compounds thereof and/or compositions thereof prepared and/or identified herein for us in either the manufacture of medicaments or to provide therapies to emeliorate or treat metabolic disorders such as diabetes (e.g., type 2 diabetes) and/or obesity. In an alternate preferred form, the invention is directed to methods of administration of a therapeutically or pharmaceutically effective amount of an oleoyl-LPI or a derivative or analogue compounds thereof and/or compositions thereof prepared and/or identified herein in the prevention and/or treatment of metabolic disorders such as diabetes (e.g., type 2 diabetes) and/or obesity.

In particular, the invention provides a method of preventing, inhibiting or ameliorating a pathology and/or symptomology of a GPR119 associated disease, disorder or condition, which method comprises administering to an animal a therapeutically or pharmaceutically effective amount of a compound of the invention, or a pharmaceutically acceptable salt thereof. As discussed herein a GPR119 associated disease, disorder or condition may include by way of illustration and without limitation: obesity, type 1 diabetes, type 2 diabetes mellitus, hyperlipidemia, idiopathic type 1 diabetes, latent autoimmune diabetes in adults, early-onset type 2 diabetes, youth-onset atypical diabetes, maturity onset diabetes of the young, malnutrition-related diabetes, gestational diabetes, atherosclerosis, arteriosclerosis, cardiovascular disease, stroke, cerebrovascular ischemia, heart disease, coronary heart disease, ischemic heart disease, angina and heart attack, NAFLD, NASH, fatty liver, liver fibrosis, cirrhosis, HCC, liver disease related to iron overload disorder and alcoholic liver disease in a subject.

In some more preferable exemplary embodiments, the compound or salt or solvate according to this aspect or any embodiment or any example as described hereof, is capable of inducing and/or increasing secretion and/or synthesis and/or activity of GLP-1. For example, the compound or salt or solvate is capable of inducing and/or increasing secretion and/or synthesis and/or activity of GLP-1 in cells of the GI tract such as such as in human and/or murine L cells and/or pancreatic β cells e.g., ex vivo and/or in vivo. In one such example, the compound or salt or solvate is capable of inducing and/or increasing secretion and/or synthesis and/or activity of GLP-1 in human and/or murine L cells and/or pancreatic β cells in vivo and/or in vitro. In one particularly preferred example, the compound or salt or solvate induces and/or increases secretion and/or synthesis and/or activity of GLP-1 as describe herein above. In one particularly preferred example, the compound or salt or solvate induces and/or increases secretion of GLP-1 from cells of the GI tract such as in human and/or murine L cells and/or pancreatic β cells in vivo and/or in vitro.

In a second aspect, there is provided a pharmaceutical composition comprising at least one compound or salt or solvate according to the first aspect or any other broad aspect or embodiment or example thereof. Alternatively, or in addition, the pharmaceutical composition may further comprise oleoyl-LPI or a pharmaceutically acceptably salt or solvate thereof. Preferably, the pharmaceutical composition according to this aspect further comprises a pharmaceutically acceptable carrier and/or excipient and/or diluent.

In one particularly preferred embodiment according to this second aspect, pharmaceutical composition comprises the compound, or salt or solvate according to the first aspect and any example of embodiment thereof. Preferably, the salt or solvate is pharmaceutical acceptable. Also preferably, the pharmaceutical composition according to this embodiment also comprises a pharmaceutically acceptable carrier and/or excipient and/or diluent.

In a third aspect, there is provided a method of agonizing and/or a partially agonizing and/or a reverse antagonizing GPR119 in a cell, comprising contacting a cell capable of expressing GPR119 with an effective amount of the compound, or salt or solvate thereof according to the first aspect, or any embodiment or example thereof and/or oleoyl-LPI or a salt or solvate thereof and/or the pharmaceutical composition according to the second aspect or embodiment or example described herein throughout.

The contacting can be performed ex vivo and/or in vivo. Further, the cell can be a pancreatic cell or a cell of the GI tract e.g., the cell is an L-cell or a pancreatic β cell.

In one example the method comprises contacting the cell with the compound, or salt or solvate according to the first aspect.

In another example, the method comprises contacting the cell with an effective amount of oleoyl-LPI or a salt or solvate thereof.

In yet a further example, the method comprises contacting the cell with an effective amount of the pharmaceutical composition according to the second broad aspect.

In each of the above examples, the method is used for to emeliorate or treat GPR119 associated diseases, disorders or conditions such as diabetes (e.g., type 2 diabetes) and/or obesity.

In an alternate preferred form, the invention is directed to methods of administration of a therapeutically or pharmaceutically effective amount of an oleoyl-LPI or a derivative or analogue compounds thereof and/or compositions thereof prepared and/or identified herein in the prevention and/or treatment of metabolic disorders such as diabetes (e.g., type 2 diabetes) and/or obesity. In particular, the invention provides a method of preventing, inhibiting or ameliorating a pathology and/or symptomology of a GPR119 associated disease, disorder or condition, which method comprises administering to an animal a therapeutically or pharmaceutically effective amount of a compound of the invention, or a pharmaceutically acceptable salt thereof. As discussed herein a GPR119 associated disease, disorder or condition may include by way of illustration and without limitation: hyperlipidemia, obesity, type 1 diabetes, type 2 diabetes mellitus, idiopathic type 1 diabetes (Type Ib), latent autoimmune diabetes in adults (LADA), early-onset type 2 diabetes (EOD), youth-onset atypical diabetes (YOAD), maturity onset diabetes of the young (MODY), malnutrition-related diabetes, gestational diabetes, atherosclerosis, arteriosclerosis, cardiovascular disease, stroke, cerebrovascular ischemia, heart disease, coronary heart disease, ischemic heart disease, angina and heart attack, Non-alcoholic fatty liver disease (NAFLD), Non-Alcoholic Steatohepatitis (NASH), fatty liver, liver fibrosis, cirrhosis, hepatocarcinoma (HCC), liver disease related to iron overload disorder and alcoholic liver disease, coronary heart disease, ischemic stroke, restenosis after angioplasty, peripheral vascular disease, intermittent claudication, myocardial infarction (e.g.

necrosis and apoptosis), dyslipidemia, post-prandial lipemia, conditions of impaired glucose tolerance (IGT), conditions of impaired fasting plasma glucose, metabolic acidosis, ketosis, arthritis, obesity, osteoporosis, hypertension, congestive heart failure, left ventricular hypertrophy, peripheral arterial disease, diabetic retinopathy, macular degeneration, cataract, diabetic nephropathy, glomerulosclerosis, chronic renal failure, diabetic neuropathy, metabolic syndrome, syndrome X, premenstrual syndrome, coronary heart disease, angina pectoris, thrombosis, atherosclerosis, myocardial infarction, transient ischemic attacks, stroke, vascular restenosis, hyperglycemia, hyperinsulinemia, hyperlipidemia, hypertrygliceridemia, insulin resistance, impaired glucose metabolism, conditions of impaired glucose tolerance, conditions of impaired fasting plasma glucose, obesity, erectile dysfunction, skin and connective tissue disorders, foot ulcerations and ulcerative colitis, endothelial dysfunction and impaired vascular compliance.

In a fourth aspect, there is provided a method of inducing and/or increasing secretion and/or synthesis and/or activity of GLP-1 in a cell, comprising contacting a cell capable of secreting and/or expressing GLP-1 with an effective amount of the compound, or salt or solvate thereof according to the first aspect, or any embodiment or example thereof and/or oleoyl-LPI or a salt or solvate thereof and/or the pharmaceutical composition of according to second broad aspect or any embodiment or example thereof.

In one example, upon contacting the cell with the compound, or salt or solvate thereof, and/or the oleoyl-LPI or the salt or solvate thereof and/or the pharmaceutical composition GLP-1 is secreted from the cell. In another example, upon said contact the cells GLP-1 secretion from the cell is increased. In one preferred example, the cell is contacted with an effective amount of the compound, or salt or solvate thereof according to the first aspect. In another example, the cell is contacted with an effective amount of oleoyl-LPI or a salt or solvate thereof.

For example, said contacting with the cell is performed ex vivo and/or in vivo. Alternatively, or in addition, the cell is a pancreatic cell or a cell of the GI tract e.g., the cell is an L-cell or a pancreatic β cell.

In yet a fifth aspect, there is provided a method of agonizing and/or a partially agonizing and/or a reverse antagonizing GPR119 in a cell, comprising contacting a cell comprising or already expressing GPR119 with an effective amount of the compound, or salt or solvate thereof according to the first aspect, embodiment or example thereof and/or oleoyl-LPI or a salt or solvate thereof and/or the pharmaceutical composition according to the second aspect or embodiment or example described herein throughout. For example, the contacting is performed ex vivo and/or in vivo. In one such example, wherein the cell is a pancreatic cell or a cell of the GI tract e.g., the cell is an L-cell or a pancreatic β cell. In one example the method comprises contacting the cell with the compound, or salt or solvate according to the first broad aspect. In another example, the method comprises contacting the cell with an effective amount of oleoyl-LPI or a salt or solvate thereof. In yet a further example, the method comprises contacting the cell with an effective amount of the pharmaceutical composition according to the second broad aspect.

In some examples of the methods according to the third, fourth and fifth aspects described herein, each method may be performed in a subject suffering from or suspected of having or is at a risk of developing a metabolic disorder. For example, the metabolic disorder is selected from obesity and diabetes e.g., a type 2 diabetes.

In another example of the methods according to the third, fourth and fifth aspects described herein, each method may be performed in a subject suffering from or suspected of having or is at a risk of developing atherosclerotic.

In yet another sixth aspect, there is provided a use of the compound, or salt or solvate thereof according to the first broad aspect or any embodiment or example thereof, and/or oleoyl-LPI or a salt or solvate thereof and/or the pharmaceutical composition according to the second broad aspect or any embodiment or example thereof in inducing and/or increasing secretion GLP-1 from a cell and/or inducing and/or increasing synthesis and/or activity of GLP-1 in a cell ex vivo or in vivo. In one such example, the cell is a pancreatic cell or a cell of the GI tract e.g., the cell is an L-cell or a pancreatic β cell.

In yet another seventh aspect, there is provided a use of the compound, or salt or solvate thereof according to the first broad aspect or any embodiment or example thereof, and/or oleoyl-LPI or a salt or solvate thereof and/or the pharmaceutical composition according to the second broad aspect or any embodiment or example thereof in agonizing and/or a partially agonizing and/or a reverse antagonizing GPR119 in a cell e.g., ex vivo or in vivo. In one such example, the cell is a pancreatic cell or a cell of the GI tract e.g., the cell is an L-cell or a pancreatic β cell.

In yet another eighth aspect, there is provided a use of a therapeutically effective amount of the compound, or salt or solvate thereof according to the first broad aspect or any embodiment or example thereof, and/or oleoyl-LPI or a salt or solvate thereof in the preparation of a medicament for inducing and/or increasing secretion GLP-1 from a cell and/or inducing and/or increasing synthesis and/or activity of GLP-1 in a cells of a subject in need thereof. Preferably, the subject is subject suffering from or suspected of having or is at a risk of developing a metabolic disorder. For example, the metabolic disorder is selected from obesity and diabetes e.g., a type 2 diabetes.

In yet a ninth aspect, there is provided a use of a therapeutically effective amount of the compound, or salt or solvate thereof according to the first broad aspect or any embodiment or example thereof, and/or oleoyl-LPI or a salt or solvate thereof in the preparation of a medicament for agonizing and/or a partially agonizing and/or a reverse antagonizing GPR119 in a subject in need thereof and/or for up-regulating activity and/or synthesis and/or secretion of GLP-1 in a subject in need thereof. Preferably, the subject is subject suffering from or suspected of having or is at a risk of developing a metabolic disorder. For example, the metabolic disorder is selected from obesity and diabetes e.g., a type 2 diabetes.

In a tenth aspect, there is provided a method of treating or preventing a metabolic disorder in a subject in need thereof, said method comprising administering to the subject a therapeutically effective amount of the compound, or salt or solvate thereof according to the first broad aspect or any embodiment or example thereof, and/or oleoyl-LPI or a salt or solvate and/or the pharmaceutical composition according to second aspect or any embodiment or example thereof.

In one example, the administration of induces and/or increases secretion of GLP-1 from cells of the GI tract in the subject and/or induces and/or increases synthesis and/or activity of GLP-1 in cells of the subject. Alternatively, or in addition, the administration agonizes and/or a partially agonizes and/or a reverse antagonizes GPR119 in the subject.

In one example, the metabolic disorder is diabetes and/or obesity. For example, the metabolic disorder is type 2 diabetes. For example, the subject is suffering from or is at a risk of developing one or more metabolic disorders such as obesity and/or diabetes (e.g., type 2 diabetes).

In an eleventh aspect, there is provided a use of a therapeutically effective amount of the compound, or salt or solvate thereof according to the first broad aspect or any embodiment or example thereof, and/or oleoyl-LPI or a salt or solvate and/or the pharmaceutical composition according to second aspect or any embodiment or example thereof in the treatment or prevention of one or more metabolic disorders in a subject in need thereof.

In twelfth aspect, there is provided a use of an effective amount of the compound, or salt or solvate thereof according to the first broad aspect or any embodiment or example thereof, and/or oleoyl-LPI or a salt or solvate in the preparation of a medicament for the treatment or prevention of one or more metabolic disorders in a subject in need thereof.

In another aspect, there is provided a use of a therapeutically effective amount of the compound, or salt or solvate thereof according to the first broad aspect or any embodiment or example thereof, and/or oleoyl-LPI or a salt or solvate and/or the pharmaceutical composition according to second aspect or any embodiment or example thereof in agonizing and/or a partially agonizing and/or a reverse antagonizing GPR119 in subject and/or for inducing and/or increasing secretion and/or synthesis of GLP-1 in a subject.

In yet a further broad aspect, there is provided a use of the compound, or salt or solvate thereof according to the first broad aspect or any embodiment or example thereof, and/or oleoyl-LPI or a salt or solvate and/or the pharmaceutical composition according to second aspect or any embodiment or example thereof in the preparation of a medicament for agonizing and/or a partially agonizing and/or a reverse antagonizing GPR119 in subject and/or for inducing and/or increasing secretion and/or synthesis of GLP-1 in a subject.

In one example, according to any method or use described in any broad aspect hereof, or embodiment or example thereof, the subject is having or suffering from or is at a risk of developing one or more metabolic disorders. For example, the metabolic disorders are selected from obesity, diabetes and a combination thereof. In one preferred example, the diabetes is a type 2 diabetes. In one preferred example, the subject is a human.

In a further aspect, the present invention provides a functional food, nutraceutical, food supplement or dietary supplement comprising a therapeutically effective amount of at least one compound or salt or solvate according to the first broad aspect of the invention, or any other broad aspect or embodiment or example thereof. In one embodiment, the functional food, nutraceutical, food supplement or dietary supplement comprises oleoyl-LPI or a pharmaceutically acceptable salt or solvate thereof.

In another embodiment, the present invention provides the use of a functional food, nutraceutical, food supplement, or dietary supplement comprising a compound of Formula I or a salt or solvate thereof

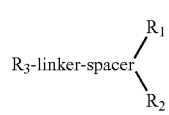

(I)

wherein the "spacer" is $C_{5-8}$ aryl, $C_3$ heterocycle with 1 to 2 heteroatom(s), $C_4$ heterocycle with 1 to 3 heteroatom(s), $C_5$ heterocycle with 1 to 4 heteroatom(s), $C_6$ heterocycle with 1 to 5 heteroatom(s), $C_{2-8}$ alkyl chain, $C_{2-8}$ alkenyl chain, or $C_{2-8}$ alkyneyl chain;

the "linker" is amide, ester, ether, thioether, ketone, sulfoxide, sulfone, carbamate, carbonate, amine, imine or sulphonamide;

$R_1$ is H, OH, CN, ester, ether, $C_{1-8}$ alkyl chain, $C_{1-8}$ alkenyl chain, $C_{1-8}$ alkynyl chain, aldehyde, halogen, carboxylic acid, tetrazole, N(1)-alkylated tetrazole or a salt thereof, N(2)-alkylated tetrazole or a salt thereof, $C_{5-8}$ aryl, $C_3$ heterocycle with 1 to 2 heteroatoms, $C_4$ heterocycle with 1 to 3 heteroatoms, $C_5$ heterocycle with 1 to 4 heteroatoms, or $C_{8-8}$ heterocycle with 1 to 5 heteroatoms;

$R_2$ is H, OH, CN, ester, ether, $C_{1-8}$ alkyl chain, $C_{1-8}$ alkenyl chain, $C_{1-8}$ alkynyl chain, aldehyde, halogen, carboxylic acid, tetrazole, N(1)-alkylated tetrazole or a salt thereof, N(2)-alkylated tetrazole or a salt thereof, $C_{5-8}$ aryl, $C_3$ heterocycle with 1 to 2 heteroatoms, $C_4$ heterocycle with 1 to 3 heteroatoms, $C_5$ heterocycle with 1 to 4 heteroatoms, or $C_{6-8}$ heterocycle with 1 to 5 heteroatoms; and $R_3$ is a $C_{4-24}$ unsaturated fatty acid chain or a $C_{3-38}$ saturated fatty acid chain, in the treatment or prevention of one or more metabolic disorders in a subject in need thereof.

In one embodiment, the present invention provides a functional food, nutraceutical, food supplement or dietary supplement comprising a compound of Formula I or a salt or solvate thereof.

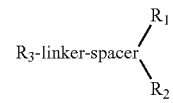

(I)

wherein the "spacer" is $C_{5-8}$ aryl, $C_3$ heterocycle with 1 to 2 heteroatom(s), $C_4$ heterocycle with 1 to 3 heteroatom(s), $C_5$ heterocycle with 1 to 4 heteroatom(s), $C_6$ heterocycle with 1 to 5 heteroatom(s), $C_{2-8}$ alkyl chain, $C_{2-8}$ alkenyl chain, or $C_{2-8}$ alkyneyl chain;

the "linker" is amide, ester, ether, thioether, ketone, sulfoxide, sulfone, carbamate, carbonate, amine, imine or sulphonamide;

$R_1$ is H, OH, CN, ester, ether, $C_{1-8}$ alkyl chain, $C_{1-8}$ alkenyl chain, $C_{1-8}$ alkynyl chain, aldehyde, halogen, carboxylic acid, tetrazole, N(1)-alkylated tetrazole or a salt thereof, N(2)-alkylated tetrazole or a salt thereof, $C_{5-8}$ aryl, $C_3$ heterocycle with 1 to 2 heteroatoms, $C_4$ heterocycle with 1 to 3 heteroatoms, $C_5$ heterocycle with 1 to 4 heteroatoms, or $C_{6-8}$ heterocycle with 1 to 5 heteroatoms;

$R_2$ is H, OH, CN, ester, ether, $C_{1-8}$ alkyl chain, $C_{1-8}$ alkenyl chain, $C_{1-8}$ alkynyl chain, aldehyde, halogen, carboxylic acid, tetrazole, N(1)-alkylated tetrazole or a salt thereof, N(2)-alkylated tetrazole or a salt thereof, $C_{5-6}$ aryl, $C_3$ heterocycle with 1 to 2 heteroatoms, $C_4$ heterocycle with 1 to 3 heteroatoms, $C_5$ heterocycle with 1 to 4 heteroatoms, or $C_{6-8}$ heterocycle with 1 to 5 heteroatoms; and $R_3$ is a $C_{4-24}$ unsaturated fatty acid chain or a $C_{3-38}$ saturated fatty acid chain.

In particular the inventive compounds described herein can be used as therapeutic and prophylatic anti atherosclerotic agents, for, atherosclerosis, arteriosclerosis, cardiovascular disease, stroke, cerebrovascular ischemia, heart disease, coronary heart disease, ischemic heart disease, angina and heart attack.

In yet another aspect, there is provided a method of treating or preventing Non-alcoholic fatty liver disease (NAFLD), Non-Alcoholic Steatohepatitis (NASH), fatty liver, liver fibrosis, cirrhosis, hepatocarcinoma (HCC), liver disease related to iron overload disorder, alcoholic liver disease in a subject in need thereof, said method comprising administering to the subject a therapeutically effective amount of the compound, or salt or solvate thereof according to the first broad aspect or any embodiment or example thereof, and/or oleoyl-LPI or a salt or solvate and/or the pharmaceutical composition according to second aspect or any embodiment or example thereof.

In yet another aspect, there is provided use of a therapeutically effective amount of the compound, or salt or solvate thereof according to the first broad aspect or any embodiment or example thereof, and/or oleoyl-LPI or a salt or solvate and/or the pharmaceutical composition according to second aspect or any embodiment or example thereof, for treating or preventing atherosclerotic in a subject in need thereof.

In yet another aspect, there is provided use of a therapeutically effective amount of the compound, or salt or solvate thereof according to the first broad aspect or any embodiment or example thereof, and/or Oleoyl-LPI or a salt or solvate and/or the pharmaceutical composition according to second aspect or any embodiment or example thereof, in the manufacture of a medicament in treating or preventing atherosclerotic conditions in a subject in need thereof.

In another aspect, there is provided a method for preparing a medicament or a pharmaceutical composition according to the second broad aspect. The method comprises combining and/or admixing (i) a therapeutically effective amount of oleoyl-LPI or a pharmaceutically acceptable salt or solvate thereof and/or compound of formula I or salt or solvate thereof according to the first broad aspect or any embodiment or example thereof, and (ii) a pharmaceutically acceptance carrier, excipient and/or diluent.

In yet a further aspect, there is provided a method for manufacturing the compound, or salt or solvate thereof according to the first broad aspect or any embodiment or example thereof. In a related further broad aspect, the present invention also provides those compounds, or salts or solvates thereof produced by performing this method.

In yet another aspect, there is provided a method of treating or preventing atherosclerotic in a subject in need thereof, said method comprising administering to the subject a therapeutically effective amount of the compound, or salt or solvate thereof according to the first broad aspect or any embodiment or example thereof, and/or oleoyl-LPI or a salt or solvate and/or the pharmaceutical composition according to second aspect or any embodiment or example thereof.

Additional objectives, advantages and novel features will be set forth in the description which follows or will become apparent to those skilled in the art upon examination of the drawings and the ensuing detailed description of several non-limiting embodiments which follows.

BRIEF DESCRIPTION OF THE DRAWINGS

The disclosure will provide details in the following description of preferred embodiments with reference to the following figures wherein:

FIG. 9 is a pictorial representation of the chemical process used herein to produce the analog and/or derivative of oleoyl-LPI having the general formula (III) and referred to herein as compound "ps292a".

FIG. 10 is a pictorial representation of the chemical process used herein to produce the analog and/or derivative of oleoyl-LPI having the general formula (IV) and referred to herein as compound "ps293a".

FIG. 11 is a pictorial representation of the chemical process used herein to produce the analog and/or derivative of oleoyl-LPI having the general formula (V) and referred to herein as compound "ps294a".

FIG. 12 is a pictorial representation of the chemical process used herein to produce the analog and/or derivative of oleoyl-LPI having the general formula (VI) and referred to herein as compound "ps297b".

FIG. 13 is a pictorial representation of the chemical process used herein to produce the analog and/or derivative compounds of oleoyl-LPI having the general formulae (VII) and (VIII) and referred to herein as compounds "ps298a and ps298b" respectively.

FIG. 14 is a pictorial representation of the chemical process used herein to produce the analog and/or derivative of oleoyl-LPI having the general formula (IX) and referred to herein as compounds "ps300b".

FIG. 21 is a pictorial representation of the chemical process used herein to produce the analog and/or derivative of oleoyl-LPI having the general formula (XVI) and referred to herein as compounds "ps316a".

FIG. 22 is a pictorial representation of the chemical process used herein to produce the analog and/or derivative of oleoyl-LPI having the general formula (XVII) and referred to herein as compounds "ps315a".

FIG. 23 is a pictorial representation of the chemical process used herein to produce the analog and/or derivative of oleoyl-LPI having the general formula (XVIII) and referred to herein as compounds "ps318a".

DETAILED DESCRIPTION OF THE PREFERRED EMBODIMENTS

Figure 1A:
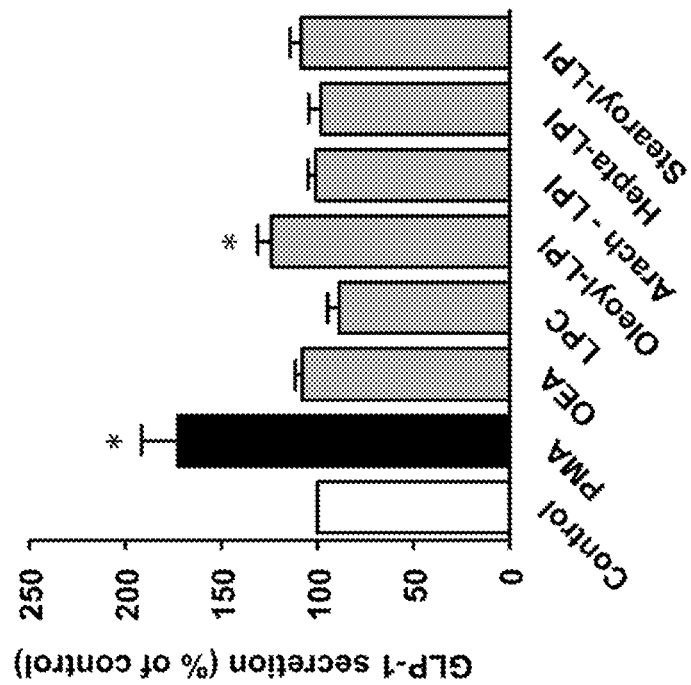
FIG. 1 is a graphical representation demonstrating that oleoyl-LPI enhances secretion of GLP-1 in vitro and ex-vivo preparation. The effect of OEA, LPC, oleoyl-LPI, Steoryl-LPI, Arachidonyl-LPI and Heptadecenoyl-LPI on GLP-1 secretion. Panel A) shows results where Glutag cells were incubated with vehicle alone, different species of LPI, OEA, LPC and forskolin as positive control (10 µM) for 2 hours. Panel B) shows the results of similar experiments as in Panel A but which were conducted on NCI-H716 cells with Phorbol myristate acetate as positive control. Panel C and panel D) show result of dose-response study of different concentration of oleoyl-LPI in Glutag cells and NCI-H716-H716. Results in all panels were normalised as percentage of cell treated with vehicle (control). Data are shown as means±SEM of n=3 from independent experiments performed in duplicates. Student t-test: *p<0.05.

The present invention is based on a finding by the inventors that oleoyl-LPI (including, derivatives or analogue thereof) can modulate GPR119 activity and that such agonists, (compounds which can be shown to raise intracellular cAMP levels in vitro e.g., in pancreatic β-cell and L cells of the GI tract expressing endogenous GPR119), are capable of ameliorating, more particularly, activating and/or up-up-regulating glucoregulatory hormones. In particular they have found that these compounds are capable of potentiating glucose-stimulated insulin secretion in a similar manner to the GLP-1 and GIP hormones.

In particular, the inventors, have found that GPR119 acts as a potential oleoyl-LPI receptor, where activation of GPR119 in the pancreas is correlated with enhance glucose stimulated insulin secretion and activation of this receptor in the gut results in increased secretion of incretin hormones GLP-1 and GIP. Further the inventors have determined that GPR119 activation can contribute to reduce blood glucose levels by acting on L-cells to stimulate GLP-1 release that in turn stimulate β-cells to promote glucose stimulated insulin secretion. Accordingly, the inventors have found that activation of GPR119 by oleoyl-LPI can provide a therapeutic treatment of metabolic disorders such as obesity and/or diabetes e.g., type 2 diabetes.

Based on these results the Inventors explored the potential role for oleoyl-LPI on secretion of GLP-1 e.g., by enteroendocrine L cells through activation of GPR119 and the mechanism underlying this secretion process. They postulated that although OEA can act as a ligand for GPR119, other phospholipid such as lysophospholipids may also be potential ligands for this receptor. In particular, the inventors postulated that lysophospholipid LPI, which was originally discovered as a ligand for GPR55 may show other physiological and pathological roles relevant to activating GPR119.

As demonstrated in the examples that follow, the inventors observed that oleoyl-LPI stimulates the release of GLP-1 in vitro in murine and human L-cells and in ex-vivo mixed colonic primary cell preparations. Interestingly, secretion of GLP-1 by siRNA GPR119-transfected cells, but not siRNA GPR55, is impaired when stimulated with oleoyl-LPI, suggesting a role for GPR119 activation in GLP-1 release. Importantly as also demonstrated herein, oleoyl-LPI-induced increases in GLP-1 as well as insulin release from pancreatic β cells is impaired in GPR119 null mice.

The inventors have identified and produced 21 compounds of formula I (as described herein) and shown that the compounds produced are able to stimulate release of GLP-1 in vitro in murine and human L-cells. Such results also implicate a role for compounds of formula I or salts or solvates thereof as described according to any broad aspect or embodiment or example hereof, in inducing GLP-1 secretion and biosynthesis e.g., by similar mechanism to the endogenous oleoyl-LPI. Such data implicate a role for both the oleoyl-LPI and for compounds of formula I or salts or solvates thereof of this invention as described herein throughout in glucose metabolism and maintaining glucose homeostasis.

Further features of the present invention are more fully described in the following description of several non-limiting aspects, embodiments, and examples thereof. This description is included solely for the purposes of exemplifying the present invention. It should not be understood as a restriction on the broad summary, disclosure or description of the invention as set out above. The description will be made with reference to the accompanying drawings.

A. General

Those skilled in the art will appreciate that the invention described herein is susceptible to variations and modifications other than those specifically described without departing from the spirit and scope of the invention as herein described. The invention includes all such variations and modifications. The invention also includes all the steps, features, compositions and components, referred to or indicated in the specification, individually or collectively, and any and all combinations or any two or more of said steps or features. Functionally equivalent products, compositions of matter and methods are clearly within the scope of the invention as described herein.

All publications, references, documents, patents and patent applications cited in the herein, whether supra or infra, are hereby incorporated herein by reference in their entirety, which means that those publications, references, documents, patents and patent applications should be read and considered as part of this text. That any publication, reference, document, patent and patent application cited in this text is not repeated in this text is merely for reasons of conciseness. However, publications, references, documents, patents and patent applications mentioned herein are cited for describing and disclosing the protocols, reagents and products that which are reported in the publications and which might be used in connection with the invention. Nothing herein is to be construed as an admission that the invention is not entitled to antedate such disclosure by virtue of prior invention or for any other reason. All statements as to the date or representation as to the contents of these documents is based on the information available to the applicants and does not constitute any admission as to the correctness of the dates or contents of these documents.

Any manufacturer's instructions, descriptions, product specifications, and product sheets for any products mentioned herein or in any document incorporated by reference herein, are hereby incorporated herein by reference, and may be employed in the practice of the invention.

Definitions for selected terms used herein may be found within the summary of invention and the detailed description of the invention and apply throughout. Unless otherwise defined, all other scientific and technical terms used herein have the same meaning as commonly understood to one of ordinary skill in the art to which the invention belongs.

B. Definitions

For convenience, the meaning of certain terms and phrases used in the specification, examples, and appended claims, are provided below. If there is an apparent discrepancy between the usage of a term in the art and its definition provided herein, the definition provided within the specification shall prevail.

Other than in the operating examples, or where otherwise indicated, all numbers expressing quantities of ingredients or reaction conditions used herein should be understood as modified in all instances by the term "about." For example, the term "about" when used in connection with percentages can mean±10%.

Unless the context requires otherwise, or the specification specifically states to the contrary, integers, steps, or elements of the invention recited herein as singular integers, steps or elements clearly encompass both singular and plural forms of the recited integers, steps or elements. Throughout this specification, unless stated otherwise or the context requires otherwise, reference to a single step, composition or matter, group of steps or group of compositions of matter shall be taken to encompass one and a plurality (i.e., one or more) or those steps, compositions or matter, group of steps or group of compositions of matter. Accordingly, as used herein and in the appended claims, the singular forms "a, "an" and "the" include plural references unless the context clearly dictates otherwise. Thus, for example, reference to "a synthetic analog and/or derivative of Oleoyl-LPI" includes a plurality of such synthetic analogs of Oleoyl-LPI or a plurality of derivatives of Oleoyl-LPI, and so forth.

As used herein throughout, the term "oleoyl-LPI" will be understood to refer to a lysophospholipid with inositol head and oleoyl acyl chain (18:1).

As used herein the term "derived from" of "derivative of" shall be taken to indicate that a specified integer may be obtained from a particular source albeit not necessarily directly from that source. Accordingly, the term "derivative of oleoyl-LPI" will be taken to indicate a compound of formula I or a salt or solvate thereof according to any aspect or embodiment or example of the invention described hereof or any composition of matter comprising such compound or salt or solvate which is obtained directly or indirectly from oleoyl-LPI, and may include those compounds or composition which are chemically synthesized from the same starting materials as those of oleoyl-LPI.

Throughout the specification and claims, unless the context requires otherwise, the word "comprise" or variations such as "comprises" or "comprising", will be understood to imply the inclusion of a stated step or element or integer or group of steps or elements or integers but not the exclusion of any other step or element or integer or group of steps or elements or integers.

Similarly, the use of the term "including", as well as variations such as "includes" and "included", will also be understood to be not limiting.

Also, terms such as "element" or "component" encompass both elements and components comprising one unit and elements and components that comprise more than one subunit unless specifically stated otherwise. Also, the use of the term "portion" can include part of a moiety or the entire moiety.

In this application, the use of "or" means "and/or" unless stated otherwise.

The invention described herein may include one or more range of values (for example, size, displacement and field strength etc.). A range of values will be understood to include all values within the range, including the values defining the range, and values adjacent to the range that lead to the same or substantially the same outcome as the values immediately adjacent to that value which defines the boundary to the range. For example, a person skilled in the relevant field will understand that a 10% variation in upper or lower limits of a range can be totally appropriate and is encompassed by the invention. More particularly, the variation in upper or lower limits of a range will be 5% or as is commonly recognized in the art, whichever is greater.

As used herein the term "analog of oleoyl-LPI" will be taken to indicate a compound of formula I or salt of solvate thereof according to any aspect or embodiment or example described hereof or any composition of matter comprising such compound, salt or solvate which exhibits or is capable of exhibiting activity of oleoyl-LPI in promoting secretion form and/or synthesis of GLP-1 in cells of the GI tract such as enteroendocrine L cells and/or pancreatic β cells. It will be understood that an analog of oleoyl-LPI accordingly to the present invention exhibits or is capable of exhibiting any level of activity that results in induction and/or increase in secretion form and/or synthesis of GLP-1 in cells of the GI tract such as enteroendocrine L cells and/or pancreatic β cells. For example, the analogs of oleoyl-LPI include any compound of formula I or salt of solvate thereof or any composition comprising such compound, salt or solvate that upon contact with the cells of the GI tract exhibits or in capable of exhibiting a level of activity of inducing and/or increasing secretion form and/or synthesis of GLP-1 in the cells which is about 5% to about 100% or more than the level of activity exhibited by oleoyl-LPI or a salt or solvate therefore in inducing and/or increasing secretion form and/or synthesis of GLP-1 in the cells, under the same or comparable conditions. In one example, the analogs of oleoyl-LPI exhibit or are capable of exhibiting a level of activity which is at least about 5% to about 100% or at least about 5% or at least about 10% or at least about 15% or at least about 20% or at least about 25% or at least about 30% or at least about 35% or at least about 405% or at least about 45% or at least about 50% or at least about 55% or at least about 60% or at least about 65% or at least about 70% or at least about 75% or at least about 80% or at least about 85% or at least about 90% or at least about 95% or at least about 100% of the level of activity exhibited by oleoyl-LPI or a salt or solvate therefore. In another example, the analogs of oleoyl-LPI exhibit or are capable of exhibiting a level of activity which is about at least 1.1 folds to 10 folds or higher than the level of activity exhibited by oleoyl-LPI or a salt or solvate therefore under the same or comparable conditions. For example, the analogs of oleoyl-LPI exhibit or are capable of exhibiting a level of activity which is at least about 1.1 fold or at least about 1.2 fold or at least about 1.3 fold or at least about 1.4 fold or at least about 1.5 fold or at least about 1.6 fold or at least about 1.7 fold or at least about 1.8 fold or at least about 1.9 fold or at least about 2 fold or at least about 2.5 fold or at least about 3 fold or at least about 3.5 fold or at least about 4 fold or at least about 4.5 fold or at least about 5 fold or at least about 5.5 fold or at least about 6 fold or at least about 6.5 fold or at least about 7 fold or at least about 7.5 fold or at least about 8 fold or at least about 8.5 fold or at least about 9 fold or at least about 9.5 fold or at least about 10 fold or higher than 10 fold compared with level of activity exhibited by oleoyl-LPI or a salt or solvate therefore under the same or comparable conditions.

Alternatively or in addition, term "analog of oleoyl-LPI" will be taken to indicate a compound of formula I or salt of solvate thereof according to any aspect or embodiment or example described hereof or any composition of matter comprising such compound, salt or solvate which exhibits or is capable of exhibiting activity of oleoyl-LPI in agonizing GPR119 expression and/or activity in cells of the GI tract such as enteroendocrine L cells and/or pancreatic β cells. It will be understood that an analog of oleoyl-LPI accordingly to the present invention exhibits or is capable of exhibiting any level of activity that results in agonizing GPR119 expression and/or activity in cells of the GI tract. For example, the analogs of oleoyl-LPI include any compound of formula I or salt of solvate thereof or any composition comprising such compound, salt or solvate that upon contact with the cells of the GI tract exhibits or in capable of exhibiting a level of activity of agonizing GPR119 expression and/or activity in cells of the GI tract which is about 5% to about 100% or more than the level of activity exhibited by oleoyl-LPI or a salt or solvate therefore in agonizing GPR119 expression and/or activity in cells of the GI tract, under the same or comparable conditions. In one example, the analogs of oleoyl-LPI exhibit or are capable of exhibiting a level of activity which is at least about 5% to about 100% or at least about 5% or at least about 10% or at least about 15% or at least about 20% or at least about 25% or at least about 30% or at least about 35% or at least about 405% or at least about 45% or at least about 50% or at least about 55% or at least about 60% or at least about 65% or at least about 70% or at least about 75% or at least about 80% or at least about 85% or at least about 90% or at least about 95% or at least about 100% of the level of activity exhibited by oleoyl-LPI or a salt or solvate therefore. In another example, the analogs of oleoyl-LPI exhibit or are capable of exhibiting a level of activity which is about at least 1.1 folds to 10 folds or higher than the level of activity exhibited by oleoyl-LPI or a salt or solvate therefore under the same or comparable conditions. For example, the analogs of oleoyl-LPI exhibit or are capable of exhibiting a level of activity which is at least about 1.1 fold or at least about 1.2 fold or at least about 1.3 fold or at least about 1.4 fold or at least about 1.5 fold or at least about 1.6 fold or at least about 1.7 fold or at least about 1.8 fold or at least about 1.9 fold or at least about 2 fold or at least about 2.5 fold or at least about 3 fold or at least about 3.5 fold or at least about 4 fold or at least about 4.5 fold or at least about 5 fold or at least about 5.5 fold or at least about 6 fold or at least about 6.5 fold or at least about 7 fold or at least about 7.5 fold or at least about 8 fold or at least about 8.5 fold or at least about 9 fold or at least about 9.5 fold or at least about 10 fold or higher than 10 fold compared with level of activity exhibited by oleoyl-LPI or a salt or solvate therefore under the same or comparable conditions.

The phrases "GPR119 associated disease, disorder or condition" or a "metabolic disorder" may include by way of illustration and without limitation: hyperlipidemia, obesity, type 1 diabetes, type 2 diabetes mellitus, idiopathic type 1 diabetes (Type Ib), latent autoimmune diabetes in adults (LADA), early-onset type 2 diabetes (EOD), youth-onset atypical diabetes (YOAD), maturity onset diabetes of the young (MODY), malnutrition-related diabetes, gestational diabetes, atherosclerosis, arteriosclerosis, cardiovascular disease, stroke, cerebrovascular ischemia, heart disease, coronary heart disease, ischemic heart disease, angina and heart attack, Non-alcoholic fatty liver disease (NAFLD), Non-Alcoholic Steatohepatitis (NASH), fatty liver, liver fibrosis, cirrhosis, hepatocarcinoma (HCC), liver disease related to iron overload disorder and alcoholic liver disease, coronary heart disease, ischemic stroke, restenosis after angioplasty, peripheral vascular disease, intermittent claudication, myocardial infarction (e.g. necrosis and apoptosis), dyslipidemia, post-prandial lipemia, conditions of impaired glucose tolerance (IGT), conditions of impaired fasting plasma glucose, metabolic acidosis, ketosis, arthritis, obesity, osteoporosis, hypertension, congestive heart failure, left ventricular hypertrophy, peripheral arterial disease, diabetic retinopathy, macular degeneration, cataract, diabetic nephropathy, glomerulosclerosis, chronic renal failure, diabetic neuropathy, metabolic syndrome, syndrome X, premenstrual syndrome, coronary heart disease, angina pectoris, thrombosis, atherosclerosis, myocardial infarction, transient ischemic attacks, stroke, vascular restenosis, hyperglycemia, hyperinsulinemia, hyperlipidemia, hypertrygliceridemia, insulin resistance, impaired glucose metabolism, conditions of impaired glucose tolerance, conditions of impaired fasting plasma glucose, obesity, erectile dysfunction, skin and connective tissue disorders, foot ulcerations and ulcerative colitis, endothelial dysfunction and impaired vascular compliance.

The terms "decrease", "reduced", "reduction", "decrease" or "inhibit" are all used herein generally to mean a decrease by a statistically significant amount. However, for avoidance of doubt, "reduced", "reduction" or "decrease" or "inhibit" means a decrease by at least 10% as compared to a reference level, e.g., in in the absence of an agent, for example a decrease by at least about 20%, or at least about 30%, or at least about 40%, or at least about 50%, or at least about 60%, or at least about 70%, or at least about 80%.

The terms "increased", 'increase" or "enhance" or "activate" or "induce" are all used herein to generally mean an increase by a statically significant amount; for the avoidance of any doubt, the terms "increased", "increase" or "enhance" or "activate" "or "induce" means an increase of at least 10% as compared to a reference level, e.g., in in the absence of an agent, for example an increase of at least about 20%, or at least about 30%, or at least about 40%, or at least about 50%), or at least about 60%, or at least about 70%, or at least about 80%, or at least about a 2-fold, or at least about a 3-fold, or at least about a 4-fold, or at least about a 5-fold or at least about a 10-fold increase, or any increase between 2-fold and 10-fold or greater as compared to a reference level.

As used herein, the term "administer" refers to the placement of a composition into a subject by a method or route which results in at least partial localization of the composition at a desired site such that desired effect is produced. A compound or composition described herein can be administered by any appropriate route known in the art including, but not limited to, oral or parenteral routes, including intravenous, intramuscular, subcutaneous, transdermal, airway (aerosol), pulmonary, nasal, rectal, and topical (including buccal and sublingual) administration. In certain embodiments, the compound comprises the compounds of the invention or the pharmaceutically acceptable salt thereof or any composition such as a therapeutic or a therapeutic composition comprising same is administered by parenterally administration, or other method allowing delivery to a target site. Some exemplary modes of administration include, but are not limited to, injection, infusion, instillation, inhalation, or ingestion.

As used herein, the term "Injection" includes, without limitation, intravenous, intramuscular, intraarterial, intrathecal, intraventricular, intracapsular, intraorbital, intracardiac, intradermal, intraperitoneal, transtracheal, subcutaneous, subcuticular, intraarticular, sub capsular, subarachnoid, intraspinal, intracerebro spinal, and intrasternal injection and infusion. In preferred embodiments, the compositions are administered by intravenous infusion or injection.

As used herein in the context of expression, the terms "treat," "treatment," "treating" and the like, in the context of the present invention insofar as it relates to any of the conditions or diseases recited herein means to relieve, alleviate, ameliorate, inhibit, slow down, reverse, or stop the progression, aggravation, deterioration, progression, anticipated progression or severity of at least one symptom or complication associated with such condition or disease. In an embodiment, the symptoms of a condition or disease are alleviated by at least 5%, at least 10%, at least 20%, at least 30%, at least 40%, or at least 50%.

In the context of this specification the phrase "effective amount" "therapeutically effective amount" or "effective dose" (used interchangeably herein) includes within its meaning a sufficient but non-toxic amount of a compound or composition of the invention to provide the desired effect. The exact amount required will vary from subject to subject depending on factors such as the desired effect, the species being treated, the age and general condition of the subject, the severity of the condition being treated, the agent being administered, the mode of administration, and so forth. Thus, it is not possible to specify an exact "effective amount". However, for any given case, an appropriate effective amount (dose) may be determined by one of ordinary skill in the art using only routine experimentation. Generally, a therapeutically effective amount can vary with the subject's history, age, condition, sex, as well as the severity and type of the medical condition in the subject, and administration of other pharmaceutically active agents.

It is to be noted that reference herein to use in therapeutic applications will be understood to be equally applicable to human and non-human, such as veterinary, applications. Hence it will be understood that, except where otherwise indicated, reference to a "patient", "subject" or "individual" (used interchangeably herein) means a human or non-human, such as an individual of any species of social, economic or research importance including but not limited to, mammalian, avian, lagomorph, ovine, bovine, equine, porcine, feline, canine, primate and rodent species. More preferably the patient, subject or individual is an animal belonging to a mammalian species. The mammalian species is desirably a human or non-human primate or a companion animal such as a domesticated dog, cat, horse, monkey, mouse, rat, rabbit, sheep, goat, cow or pig. In one particularly preferred example, the patient, subject or individual is a human.

The term "functional food" includes any edible or drinkable foods or dietary components which comprise the compound of the present invention. The functional food can be, for example, a solid, a liquid, a semisolid, a powder, or a combination thereof.

The term "nutraceutical" refers to any product derived from a food source which provides extra health benefits in addition to the nutritional value of the product. Non-limiting examples of nutraceuticals include yoghurt, breakfast cereals and fluids, such as milk and fruit juices.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

C. Illustrative Embodiments of the Invention

1. Oleoyl-LPI Compounds

In one broad aspect, the present invention is directed to a compound of formula I or salt or solvate thereof:

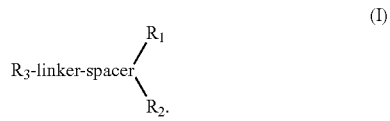

(I)

wherein:
(i) the "spacer" represents $C_{5-8}$ aryl, $C_3$ heterocycle with 1 to 2 heteroatom(s), $C_4$ heterocycle with 1 to 3 heteroatom(s), $C_5$ heterocycle with 1 to 4 heteroatom(s), $C_6$ heterocycle with 1 to 5 heteroatom(s), $C_{2-8}$ alkyl chain, $C_{2-8}$ alkenyl chain, or $C_{2-8}$ alkyneyl chain;
(ii) the "linker" represents amide, ester, ether, thioether, ketone, sulfoxide, sulfone, carbamate, carbonate, amine, imine or sulphonamide;
(iii) $R_1$ represents H, OH, CN, ester, ether, $C_{1-8}$ alkyl chain, $C_{1-8}$ alkenyl chain, $C_{1-8}$ alkynyl chain, aldehyde, halogen, carboxylic acid, tetrazole, N(1)-alkylated tetrazole or a salt thereof, N(2)-alkylated tetrazole or a salt thereof, $C_{5-6}$ aryl, $C_3$ heterocycle with 1 to 2 heteroatoms, $C_4$ heterocycle with 1 to 3 heteroatoms, $C_5$ heterocycle with 1 to 4 heteroatoms, or $C_{6-8}$ heterocycle with 1 to 5 heteroatoms;
(iv) $R_2$ represents H, OH, CN, ester, ether, $C_{1-8}$ alkyl chain, $C_{1-8}$ alkenyl chain, $C_{1-8}$ alkynyl chain, aldehyde, halogen, carboxylic acid, tetrazole, N(1)-alkylated tetrazole or a salt thereof, N(2)-alkylated tetrazole or a salt thereof, $C_{5-6}$ aryl, $C_3$ heterocycle with 1 to 2 heteroatoms, $C_4$ heterocycle with 1 to 3 heteroatoms, $C_5$ heterocycle with 1 to 4 heteroatoms, or $C_{6-8}$ heterocycle with 1 to 5 heteroatoms; and
(v) $R_3$ represents a $C_{4-24}$ unsaturated fatty acid chain or a $C_{3-38}$ saturated fatty acid chain.

In developing the present invention the inventors produced an array of compounds of formula I (as described herein) and have shown that each of those compounds are able to induce and/or increase GPR119 activity, which stimulates release of GLP-1 in vitro in murine and human L-cells. Such results establish that compounds of formula I or salts or solvates thereof as described according to any broad aspect or embodiment or example hereof, are able to induce and/or increase GPR119 activity and as one outcome induce GLP-1 secretion and biosynthesis e.g., by similar mechanism to the endogenous oleoyl-LPI. Such data establish a role for both oleoyl-LPI and for compounds of formula I or salts or solvates thereof to emeliorate or treat metabolic disorders such as diabetes (e.g., type 2 diabetes) and/or obesity and in particular to provide a means for regulating glucose metabolism and maintaining glucose homeostasis.

Accordingly, in one broad and general form the invention provides compounds (including pharmaceutically acceptable salts thereof), compositions (including therapeutical or pharmaceutical compositions thereof) and methods for the treatment of GPR119 associated diseases, disorders or conditions. More particularly, the invention resides in the use of lysophospholipids (lysophosphatidylinositol (LPI)) having a univalent carbonyl radical of oleic acid, including derivatives and analogues thereof (such as oleoyl-LPI and derivative or analogue compounds thereof) as agonists, partial agonists or reverse antagonists of GPR119 activity and or to induce and/or increase (enhance) endogenous GLP-1 synthesis and/or secretion in vitro and/or in vivo (such as, in pancreatic cells and/or in cells of the GI tract such as L cells) to treat metabolic disorders (e.g., in metabolic disorders where glucose homeostasis is compromised e.g., obesity and/or diabetes such as in type 2 diabetes).

As discussed herein a "GPR119 associated disease, disorder or condition" or a "metabolic disorder" may include, by way of illustration and without limitation: obesity, type 1 diabetes, type 2 diabetes mellitus, idiopathic type 1 diabetes (Type Ib), latent autoimmune diabetes in adults (LADA), early-onset type 2 diabetes (EOD), youth-onset atypical diabetes (YOAD), maturity onset diabetes of the young (MODY), malnutrition-related diabetes, gestational diabetes, atherosclerosis, arteriosclerosis, cardiovascular disease, stroke, cerebrovascular ischemia, heart disease, coronary heart disease, ischemic heart disease, angina and heart attack, Non-alcoholic fatty liver disease (NAFLD), Non-Alcoholic Steatohepatitis (NASH), fatty liver, liver fibrosis, cirrhosis, hepatocarcinoma (HCC), liver disease related to iron overload disorder and alcoholic liver disease, coronary heart disease, ischemic stroke, restenosis after angioplasty, peripheral vascular disease, intermittent claudication, myocardial infarction (e.g. necrosis and apoptosis), dyslipidemia, post-prandial lipemia, conditions of impaired glucose tolerance (IGT), conditions of impaired fasting plasma glucose, metabolic acidosis, ketosis, arthritis, obesity, osteoporosis, hypertension, congestive heart failure, left ventricular hypertrophy, peripheral arterial disease, diabetic retinopathy, macular degeneration, cataract, diabetic nephropathy, glomerulosclerosis, chronic renal failure, diabetic neuropathy, metabolic syndrome, syndrome X, premenstrual syndrome, coronary heart disease, angina pectoris, thrombosis, atherosclerosis, myocardial infarction, transient ischemic attacks, stroke, vascular restenosis, hyperglycemia, hyperinsulinemia, hyperlipidemia, hypertryglyceridemia, insulin resistance, impaired glucose metabolism, conditions of impaired glucose tolerance, conditions of impaired fasting plasma glucose, obesity, erectile dysfunction, skin and connective tissue disorders, foot ulcerations and ulcerative colitis, endothelial dysfunction and impaired vascular compliance.

In some examples, wherein $R_3$ represents a $C_{4-24}$ unsaturated fatty acid chain selected from crotonic acid or a derivative thereof, myristoleic acid or a derivative thereof, palmitoleic acid or a derivative thereof, sapienic acid or a derivative thereof, oleic acid or a derivative thereof, elaidic acid or a derivative thereof, vaccenic acid or a derivative thereof, gadoleic acid or a derivative thereof, eicosenoic acid or a derivative thereof, erucic acid or a derivative thereof, nervonic acid or a derivative thereof, linoleic acid or a derivative thereof, eicosadienoic acid or a derivative thereof, docosadienoic acid or a derivative thereof, linolenic acid or a derivative thereof, pinolenic acid or a derivative thereof, eleostearic acid or a derivative thereof, mead acid or a derivative thereof, dihomo-gamma-linolenic acid or a derivative thereof, eicosatrienoic acid or a derivative thereof, stearidonic acid or a derivative thereof, arachidonic acid or a derivative thereof, eicosatetraenoic acid or a derivative thereof, adrenic acid or a derivative thereof, bosseopentaenoic acid or a derivative thereof, eicosapentaenoic acid or a derivative thereof, ozubondo acid (also known as osbond acid) or a derivative thereof, sardine acid (also known as clupanodonic acid) or a derivative thereof, tetracosanolpentaenoic acid or a derivative thereof, docosahexaenoic acid or a derivative thereof, and herring acid or a derivative thereof.

In some such preferred examples, $R_3$ represents a unsaturated fatty acid chain selected from crotonic acid, myristoleic acid, palmitoleic acid, sapienic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, eleostearic acid, mead acid, dihomo-gamma-linolenic acid, eicosatrienoic acid, stearidonic acid, arachidonic acid, eicosatetraenoic acid, adrenic acid, bosseopentaenoic acid, eicosapentaenoic acid, ozubondo acid, sardine acid, tetracosanolpentaenoic acid, docosahexaenoic acid, and herring acid.

In other examples, $R_3$ represents a $C_{3-38}$ saturated fatty acid chain selected from is selected from propionic acid or a derivative thereof, butyric acid or a derivative thereof, valeric acid or a derivative thereof, caproic acid or a derivative thereof, enanthic acid (also known as heptanoic acid) or a derivative thereof, caprylic acid or a derivative thereof, pelargonic acid (also known as nonanoic acid) or a derivative thereof, capric acid (also known as decanoic acid) or a derivative thereof, undecylic acid or a derivative thereof, lauric acid or a derivative thereof, tridecylic acid or a derivative thereof, myristic acid or a derivative thereof, pentadecylic acid or a derivative thereof, palmitic acid or a derivative thereof, margaric acid or a derivative thereof, stearic acid or a derivative thereof, nonadecylic caid or a derivative thereof, archidic acid or a derivative thereof, heneicosylic acid or a derivative thereof, behenic acid or a derivative thereof, tricosylic acid or a derivative thereof, lignoceric acid or a derivative thereof, pentacosylic acid or a derivative thereof, cerotic acid or a derivative thereof, heptacosylic acid or a derivative thereof, montanic acid or a derivative thereof, nonacosylic acid or a derivative thereof, melissic acid or a derivative thereof, henatriacontylic acid or a derivative thereof, lacceroic acid or a derivative thereof, psyllic acid or a derivative thereof, geddic acid or a derivative thereof, ceroplastic acid or a derivative thereof, hexatriacontylic acid or a derivative thereof, heptatriacontanoic acid or a derivative thereof, and octatriacontanoic acid or a derivative thereof.

In some such preferred examples, $R_3$ represents a saturated fatty acid chain selected from propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic caid, archidic acid, heneicosylic acid, behenic acid, tricosylic acid, lignoceric acid, pentacosylic acid, cerotic acid, heptacosylic acid, montanic acid, nonacosylic acid, melissic acid, henatriacontylic acid, lacceroic acid, psyllic acid, geddic acid, ceroplastic acid, hexatriacontylic acid, heptatriacontanoic acid, and octatriacontanoic acid.

In particularly preferred examples, $R_3$ represents palmityl, oleoyl or linoleyl.

In other examples, $R_1$ may be a heterocycle selected from benzimidazole, benzothiazole, indazole. Alternatively, or in addition, $R_1$ may be a heterocycle selected from benzimidazole, benzothiazole, indazole.

In some examples, the linker may preferably be an amide, ester, ether or carbamate linker.

In some exemplary embodiments of the compound or salt or solvate according to any aspect described hereof, the compound has a structure of formula II:

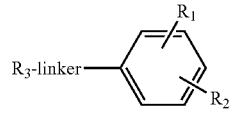

(II)

wherein,
(i) the "linker" represents amide, ester, ether or carbamate;
(ii) $R_1$ represents H, halogen, $C_{1-8}$ alkyl chain; $C_{1-8}$ alkenyl chain, $C_{1-8}$ alkynyl chain, $C_{5-6}$ aryl, $C_{5-8}$ heterocycle with 1 to 4 heteroatoms;
(iii) $R_2$ represents OH, CN, OMe, $CO_2H$, $CO_2Me$, tetrazole, N(2)-methyltetrazole, N(1)-methyltetrazole, sodium tetrazolate, triazole, imidazole, a $C_{5-6}$ N-heterocycle comprising NH and 1 to 4 heteroatom(s); and
(iv) $R_3$ represents a fatty acid chain selected from oleic acid or a derivative thereof, linoleic acid or a derivative thereof, myristoleic acid or a derivative thereof, palmitoleic acid or a derivative thereof, sapienic acid or a derivative thereof, elaidic acid or a derivative thereof, vaccenic acid or a derivative thereof, linoelaidic acid or a derivative thereof, α-linolenic acid or a derivative thereof, erucic acid or a derivative thereof, arachidonic acid or a derivative thereof, eicosapentaenoic acid or a derivative thereof, and docosahaexanoic acid or a derivative thereof.

Preferably, $R_3$ may represent a fatty acid chain selected from oleic acid linoleic acid, myristoleic acid, palmitoleic acid, sapienic acid, elaidic acid, vaccenic acid, linoelaidic acid, α-linolenic acid, erucic acid, arachidonic acid, eicosapentaenoic acid, and docosahaexanoic acid.

In one such exemplary embodiment, the compound has a $R_1$ which represents by a halogen, $C_{1-8}$ alkyl chain, $C_{1-8}$ alkenyl chain, $C_{1-8}$ alkynyl chain, $C_{5-6}$ aryl, $C_{5-8}$ heterocycle with 1 to 4 heteroatoms; and $R_2$ which is represents imidazole, a $C_{5-6}$ N-heterocycle comprising NH and 1 to 4 heteroatom(s). Preferably, $R_1$ represents a halogen in the meta position to the heterocycle of $R_2$, and $R_2$ is a $C_{5-6}$ N-heterocycle comprising NH and 1 to 4 heteroatom(s). It will be understood that the compounds of this exemplary embodiment, have strong chemical similarities of substituents of compounds of formulae IV, XII, XVI, and XVIII (i.e., compounds ps297b, ps309a, ps316a, and ps318a) shown in the examples that follow to have strong activity in inducing and/or increasing secretion of GLP-1 from cells of the GI tract.

In some exemplary embodiments of the compound or salt or solvate according to any aspect described hereof, the compound has a structure of formula II:

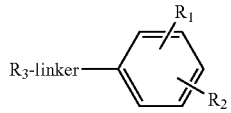

wherein,
(i) the "linker" represents amide, ester, ether or carbamate;
(ii) $R_1$ represents H, halogen, $C_{1-8}$ alkyl chain;
(iii) $R_2$ represents OH, ON, OMe, $CO_2H$, $CO_2Me$, tetrazole, N(2)-methyltetrazole, N(1)-methyltetrazole, sodium tetrazolate, or triazole;
(iv) $R_3$ represents oleoyl, linoleoyl, or palmitoyl.

In one particular example, according to this embodiment, $R_1$ represents halogen in the meta position to the triazole of $R_2$, or $C_{1-8}$ alkyl chain, and $R_2$ represents a triazole comprising a polar head group having NH. Also, $R_3$ represents oleoyl or linoleoyl. It will be understood that triazoles in $R_2$ position share similar chemical features as tetrazoles present in the compounds of formulae IV, XII, XVI, and XVIII (i.e., compounds ps297b, ps309a, ps316a, and ps318a) shown in the examples that follow to have strong activity in inducing and/or increasing secretion of GLP-1 from cells of the GI tract. For example, both triazoles and tetazoles contain hydrogen bond receptors and one acidic hydrogen bond donor.

In other exemplary embodiments of the compound or salt or solvate according to any aspect described hereof, the compound has a structure of formula II:

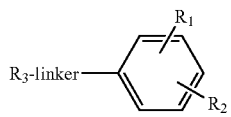

wherein,
(i) the "linker" represents amide, ester, ether or carbamate;
(ii) $R_1$ represents H, halogen, $C_{1-8}$ alkyl chain;
(iii) $R_2$ represents OH, CN, OMe, $CO_2H$, $CO_2Me$, tetrazole, N(2)-methyltetrazole, N(1)-methyltetrazole, or sodium tetrazolate; and
(iv) $R_3$ represents oleoyl, linoleoyl, or palmitoyl.

In one particular example, according to this embodiment, $R_1$ represents halogen in the meta position to the tetrazol of $R_2$, or $C_{1-8}$ alkyl chain. $R_2$ represents tetrazole. Also, $R_3$ represents oleoyl or linoleoyl. It will be understood that these substituents are closely similar to or the same as those substituents of the compounds of formulae IV, XII, XVI, and XVIII (i.e., compounds ps297b, ps309a, ps316a, and ps318a) shown in the examples that follow to have strong activity in inducing and/or increasing secretion of GLP-1 from cells of the GI tract.

In other exemplary embodiments of the compound or salt or solvate according to any aspect described hereof, the compound has a structure of formula II:

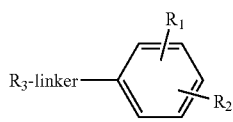

wherein,
(i) the "linker" is

(ii) $R_1$ represents H or a halogen, wherein the halogen is fluorine.
(iii) $R_2$ represents OH, CN, OMe, $CO_2H$, $CO_2Me$, tetrazole, N(2)-methyltetrazole, N(1)-methyltetrazole, or sodium tetrazolate.
(iv) $R_3$ represents oleoyl, linoleoyl, or palmitoyl.

In one such exemplary embodiment of a compound or salt or solvate thereof, the compound is selected from the group consisting of compounds having the structure as shown in Formulae III to XXIII:

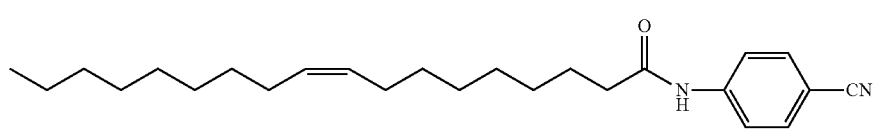

ps292a

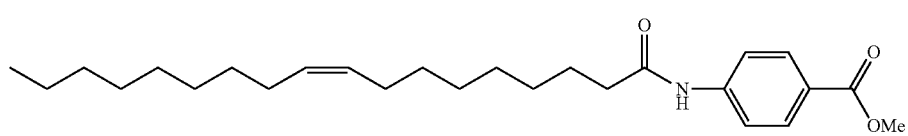

ps293a

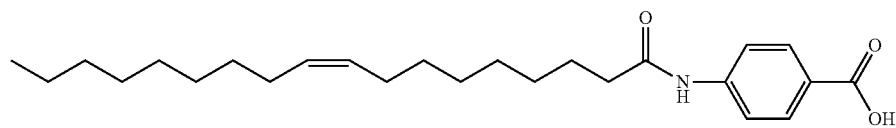
ps294a (V)
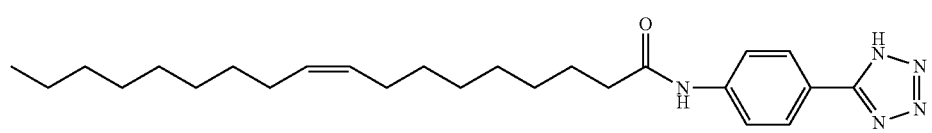
ps297b (VI)
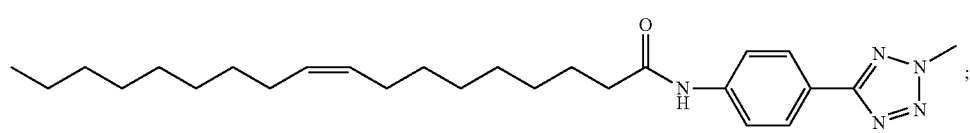
ps298a (VII)
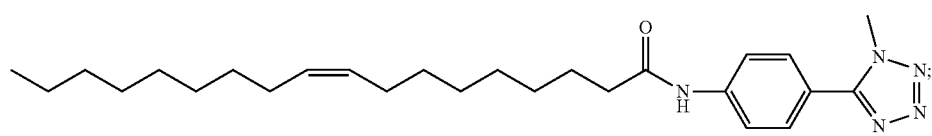
ps298b (VIII)
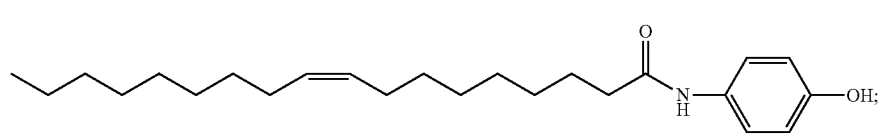
ps300b (IX)
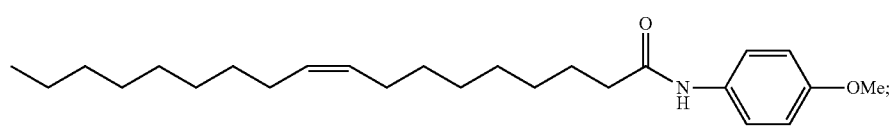
ps301a (X)
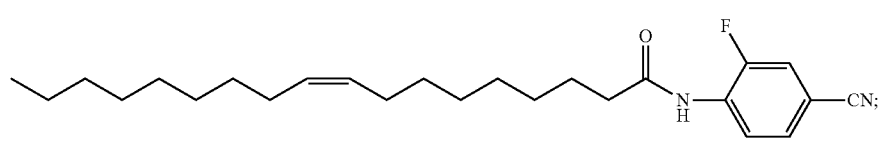
ps306a (XI)
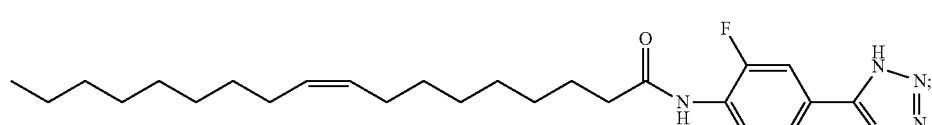
ps309a (XII)
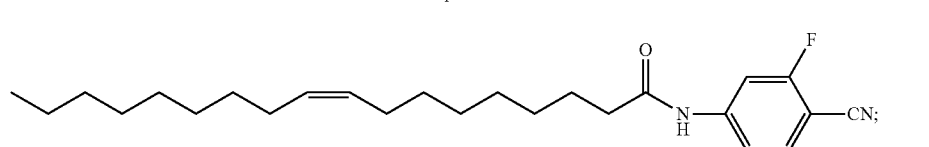
ps308c (XIII)

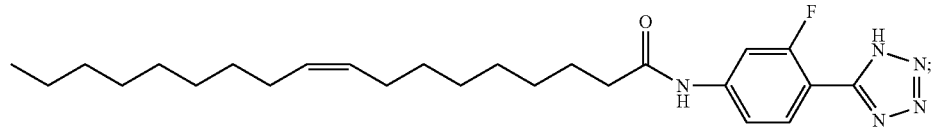
ps312a (XIV)
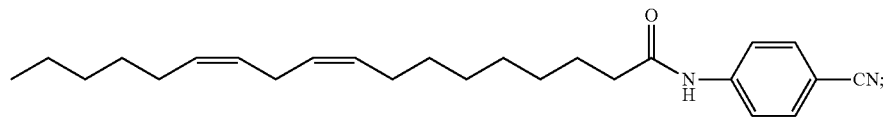
ps314b (XV)
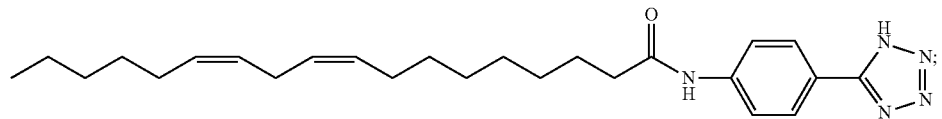
ps316a (XVI)
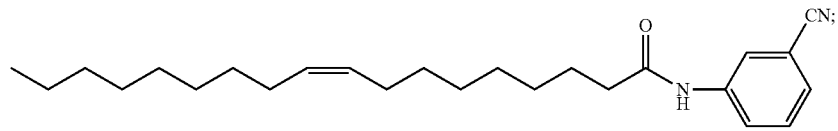
ps315a (XVII)
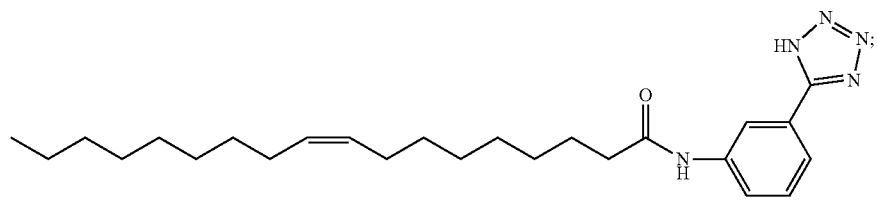
ps318a (XVIII)
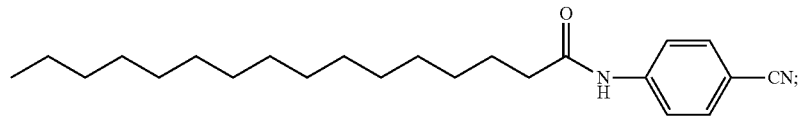
ps317b (XIX)
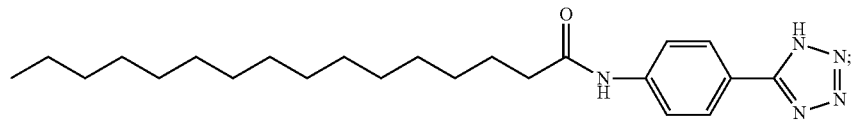
ps320c (XX)
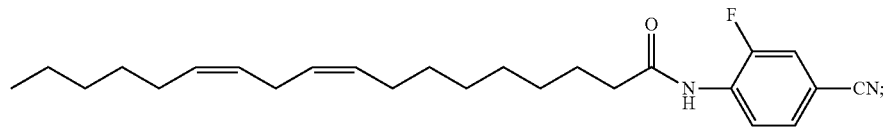
ps319 (XXI)

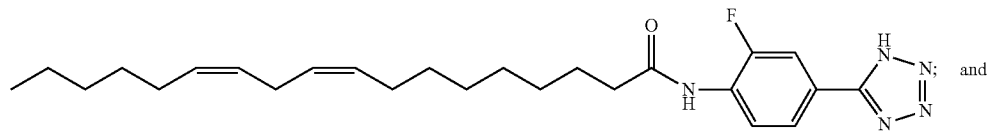
ps323b (XXII)
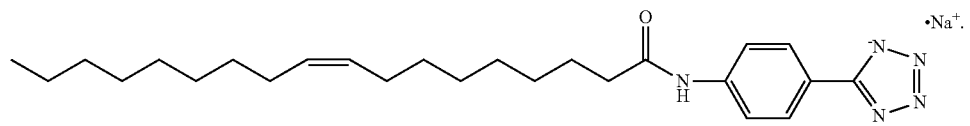
ps321a (XXIII)
In one preferred example, of a compound or salt or solvate thereof according to any aspect or embodiment or example described hereof, the compound is selected from the group consisting of compounds of formulae VI, XII, XVI and XVIII:
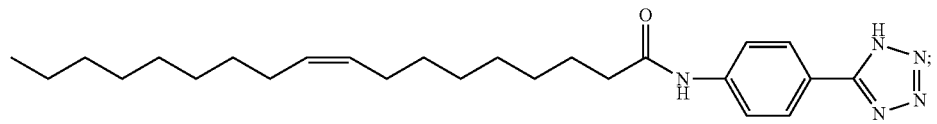
ps297b (VI)
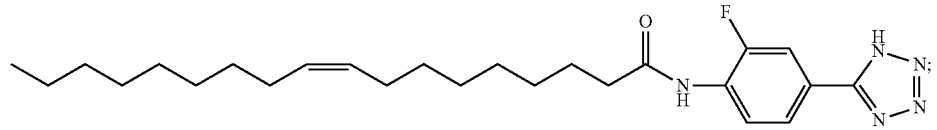
ps309a (XII)
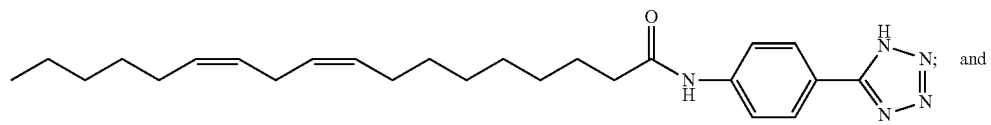
ps316a (XVI)
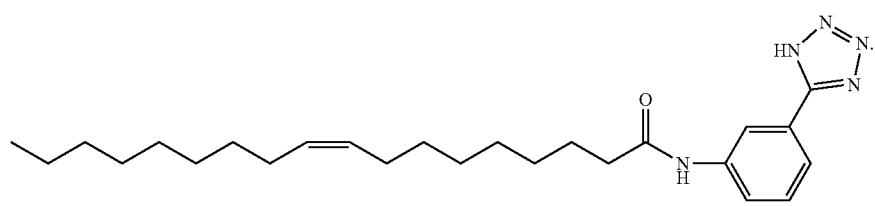
ps318a (XVIII)

In one example of a compound or salt or solvate thereof according to any aspect or embodiment or example described hereof, the compound is the compound of formula VI:

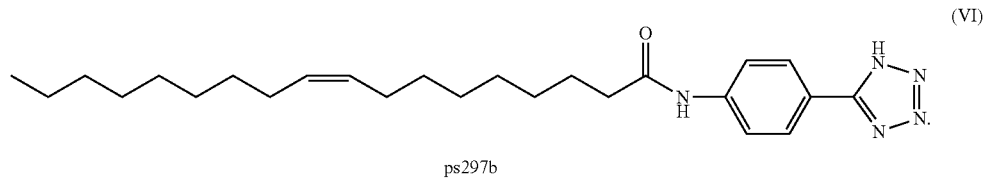 [SMILES: CCCCCCCC/C=C\CCCCCCCC(=O)Nc1ccc(-c2nnn[nH]2)cc1]

(VI)

ps297b

In another example of a compound or salt or solvate thereof according to any aspect or embodiment or example described hereof, the compound is the compound of formula XVI:

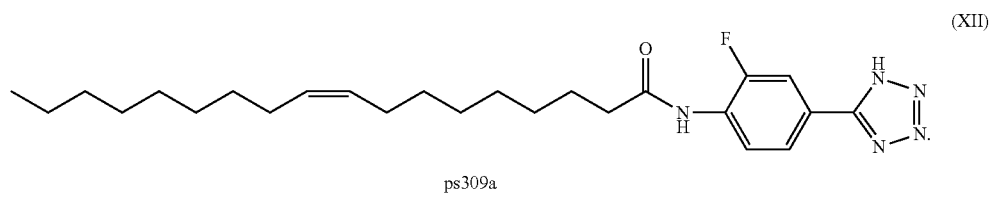

(XII)

ps309a

In another example of a compound or salt or solvate thereof according to any aspect or embodiment or example described hereof, the compound is the compound of formula XVI:

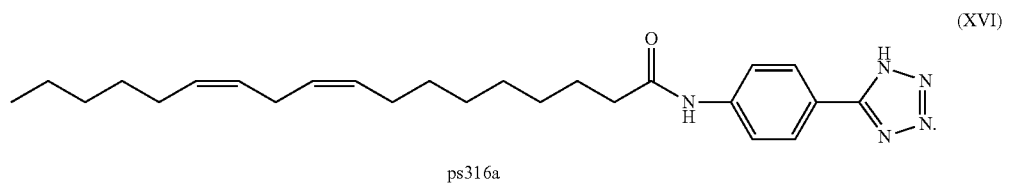 [SMILES: CCCCC/C=C\C/C=C\CCCCCCCC(=O)Nc1ccc(-c2nnn[nH]2)cc1]

(XVI)

ps316a

In yet another example of a compound or salt or solvate thereof according to any aspect or embodiment or example described hereof, the compound is the compound of formula XVIII:

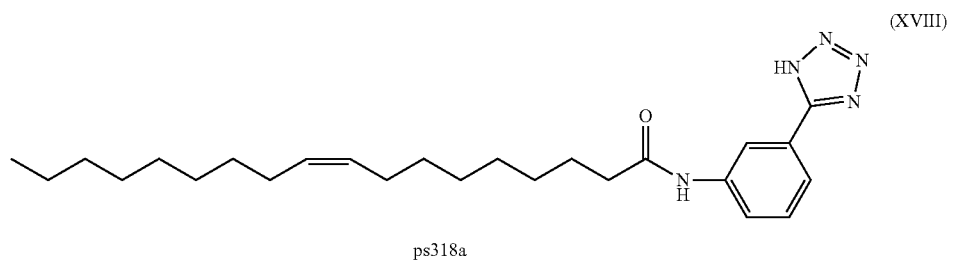 [SMILES: CCCCCCCC/C=C\CCCCCCCC(=O)Nc1cccc(-c2nnn[nH]2)c1]

(XVIII)

ps318a

In one particularly preferred example, the compound is selected from the group consisting of compounds having the structure as shown in Formulae III to XXIII (i.e., compounds ps292a, ps293a, ps294a, ps297b, ps298a, ps298b, ps300a, ps301a, ps306a, ps309a, ps308c, ps312a, ps314b, ps316a, ps315a, ps318a, ps317b, ps320c, ps319, ps323b, and ps321a). Preferably, the compound is selected from the group consisting of compounds of formulae VI, XII, XVI and XVIII (i.e., compounds ps297b, ps309a, ps316a, and ps318a). Even more preferably, the compound is a compound of formula VI (compound ps297b). Alternatively, the compound is a compound of formula XII (compound ps309a). Alternatively, the compound is a compound of formula XVI (compound ps316a). Alternatively, the compound is a compound of formula XVIII (compound ps318a).

In one form of the invention, a compound or salt or solvate thereof according to any broad aspect or embodiment or example described herein throughout, the compound or salt or solvate is a salt of the compound of formula I. In one example, the compound of formula I, has an $R_1$ which is a tetrazole and/or $R_2$ which is a tetrazole. For example, when $R_1$ and/or $R_2$ are independently N(1)-alkylated tetrazole or N(2)-alkylated tetrazole, then the salt of the compound of formula I, may be a salt of the deprotonated tetrazole.

In another form of the invention, the compound or salt or solvate thereof according to any broad aspect, embodiment or example described herein throughout, is a solvate of the compound of formula I.

In some examples, the compound of formula I or the salt or solvate thereof is a derivative of oleoyl-LPI. For example, the compound or salt or solvate is produced synthetically directly or indirectly from oleoyl-LPI. Alternatively, or in addition, the compound or salt or solvate according to this aspect is an analog of oleoyl-LPI, such as a synthetic analog of oleoyl-LPI.

In some examples, the compound of formula I or the salt or solvate thereof is capable of binding to GPR119. For example, the compound or salt or solvate binds GPR119. Preferably, the compound or salt or solvate according to this aspect may be a ligand of GPR119.

In some examples, the compound or salt or solvate of formula I is an agonist and/or a partial agonist and/or a reverse antagonist of GPR119 expression and/or activity ex vivo or in vivo e.g., in cells of the GI tract. In some examples, the compound or salt or solvate is capable of agonising and/or partially agonising and/or reverse antagonising expression and/or activity of GPR119 e.g., in cells of the GI tract such as human and/or murine L cells and/or pancreatic β cells in vivo and/or in vitro. In other example, the compound or salt or solvate agonises and/or partially agonises and/or reverse antagonises expression and/or activity of GPR119 in vitro or ex vivo such as in cells of the GI tract. For example, the compound or salt or solvate agonises and/or partially agonises and/or reverse antagonises expression and/or activity of GPR119 in human and/or murine L cells and/or pancreatic β cells in vivo and/or in vitro.

In other examples, the compound of formula I or the salt or solvate thereof is capable of inducing and/or increasing secretion and/or synthesis and/or activity of GLP-1. For example, the compound or salt or solvate is capable of inducing and/or increasing secretion and/or synthesis and/or activity of GLP-1 in cells of the GI tract such as in human and/or murine L cells and/or pancreatic β cells e.g., ex vivo and/or in vivo. In one such example, the compound or salt or solvate is capable of inducing and/or increasing secretion and/or synthesis and/or activity of GLP-1 in human and/or murine L cells and/or pancreatic β cells in vivo and/or in vitro. In one particularly preferred example, the compound or salt or solvate induces and/or increases secretion and/or synthesis and/or activity of GLP-1 as describe herein above. In one particularly preferred example, the compound or salt or solvate induces and/or increases secretion of GLP-1 from cells of the GI tract such as in human and/or murine L cells and/or pancreatic β cells in vivo and/or in vitro.

Based on the results presented herein, the inventors identified a role for oleoyl-LPI compounds of formula I or salts or solvates thereof as described herein throughout in biosynthesis and/or secretion of GLP-1 which the inventors understand is mediated by GPR119 e.g., in enteroendocrine L-cells and primary cells preparation. Investigation of the mechanism of the oleoyl-LPI induced GLP-1 synthesis and/or secretion from cells revealed that GPR119 activation regulates the GLP-1 secretion through phosphorylation of ERK and stimulation of CREB.

More specifically, the work outlined in this application demonstrates that stimulation of enteroendocrine L-cells with a specific species of LPI, the oleoyl-LPI and/or with the compounds of formula I or salts or solvates thereof as described herein throughout, which for example, may be derivatives and/or analogs of oleoyl-LPI, are able to stimulate e., induce and/or increase GLP-1 secretion in in-vitro and ex-vivo preparation of cells of the GI tract.

2. Synthesis of oleoyl-LPI Compounds

The compounds of formula I or salts or solvates thereof as described herein throughout when compared to oleoyl-LPI, retain a hydrophilic head unit, but have a simplified linker (e.g., phenylamide), and comprise a lipophilic tail.

Surprisingly, the inventors found that the structure of the compounds of formula I results in improvements in the synthesis of the compounds of formula I or salts or solvates thereof when compared to oleoyl-LPI or the salts or solvates thereof. For example, the inventors surprisingly found that the synthetic compounds of formula I or salts or solvates thereof according to any broad aspect or embodiment or example of the present invention are more stable than oleoyl-LPI or any oleoyl-LPI produced synthetically.

Further, the inventors surprisingly found that the compounds of formula I or salts or solvates thereof described herein can be synthesized chemically in only a few steps (e.g., merely two or three steps) from commercially available starting materials, in gram quantities. Unexpectedly, the inventors also found that the compounds of formula I or salts or solvates thereof, can be produced chemically in fewer and more simple steps than the process involved in synthesizing oleoyl-LPI or other compounds not falling within formula I but which are based on the oleoyl-LPI skeleton.

Also, replacing the inositol group of oleoyl-LPI with a hydrophilic polar head unit in the compounds of formula I can result in an ease of synthesis of the compounds of formula I (or their salts or solvates) relative to the chemical synthesis of oleoyl-LPI.

Further, replacing the ester linkage of oleoyl-LPI with a $C_{5-8}$ aryl or a O3-6 heterocycle or $C_{2-8}$ alkyl or alkenyl or alkyneyl chain in the compounds of formula I, can render the compounds of formula I less susceptible to enzymatic breakdown in the gut or other *biological systems relative to oleoyl*-LPI, therefore such modification may contribute to the enhanced stability of the synthetic compounds of the present invention relative to oleoyl-LPI.

As exemplified herein compounds of formula I were able to promote GLP-1 secretion from and/or synthesis in enteroendocrine L-cells. Surprisingly some of the compounds such as those of formulae IV, XII, XVI, and XVIII (i.e., compounds ps297b, ps309a, ps316a, and ps318a) were demonstrated to have strong activity in inducing and/or increasing secretion of GLP-1 from cells of the GI tract, which was equal to or higher than oleoyl-LPI.

Accordingly, the present invention demonstrates that the compounds of formula I or salts or solvates thereof as described herein throughout may be less complex to produce than oleoyl-LPI. The compounds of formula I of the invention can contain a hydrophilic head unit, a simplified linker and a lipophilic which provides advantages in both manufacture and in promoting GLP-1 secretion and/or synthesis. Removal of the hydrophilic head and/or us of a fully saturated tail of the compounds of formula I can also result in loss of activity in promoting GLP-1 secretion and/or synthesis.

(i) Methods of Preparing the Synthetic Compounds of the Invention.

The compounds of the invention may be prepared by any suitable method known in the art, or by the following processes which form part of the present invention and are further exemplified in detail in the working examples and drawings that follow.

Thus, a process of preparing a compound of formula (III) (i.e., compound ps292a) comprises treating oleic acid with oxalyl chloride and DMF, conveniently overnight, to thereby form acyl chloride. The process may further comprise treating the acyl chloride with amine to form an amide.

A compound of formula (IV) (i.e., compound ps293a) may conveniently be prepared by a process comprising treating oleic acid with oxalyl chloride and DMF, conveniently overnight and preferably at room temperature, to thereby form acyl chloride. The process may further comprise treating the acyl chloride with amine to form an amide.

A compound of formula (V) (i.e., compound ps294a) may conveniently be prepared by a process comprising hydrolysing the compound of formula (IV) with a base, conveniently at about 60° C. and preferably overnight.

A compound of formula (VI) (i.e., compound ps297b) may conveniently be prepared by a process comprising tetrazolation the compound of formula (III) (i.e., compound ps292a).

A compound of formula (VII) and formula (VIII) (i.e., compounds ps298a and ps298b) may conveniently be prepared by a process comprising alkylation of the compound of formula (VI) (i.e., compound ps297b).

A compound of formula (IX) (i.e., compound ps300b) may conveniently be prepared by a process comprising treating oleic acid with oxalyl chloride, DMF, HBTU (i.e., 2-(1H-benzotriazol-1-yl)-1,1,3,3-tetramethyluronium hexafluorophosphate), conveniently for about 45 minutes, to thereby form acyl chloride. The process may further comprise treating the acyl chloride with amine to form an amide.

A compound of formula (X) (i.e., compound ps301a) may conveniently be prepared by a process comprising alkylation of the compound of formula (IX) (i.e., compound ps300b).

A compound of formula (XI) (i.e., compound ps306a) may conveniently be prepared by a process comprising treating oleic acid with oxalyl chloride and DMF, conveniently overnight and preferably at room temperature, to thereby form acyl chloride. The process may further comprise treating the acyl chloride with amine to form an amide.

A compound of formula (XII) (i.e., compound ps309a) may conveniently be prepared by a process comprising tetrazolation the compound of formula (XI) (i.e., compound ps306a).

A compound of formula (XIII) (i.e., compound ps308c) may conveniently be prepared by a process comprising treating oleic acid with oxalyl chloride and DMF, conveniently overnight and preferably at room temperature, to thereby form acyl chloride. The process may further comprise treating the acyl chloride with amine to form an amide.

A compound of formula (XIV) (i.e., compound ps312a) may conveniently be prepared by a process comprising tetrazolation the compound of formula (XIII) (i.e., compound ps308c).

A compound of formula (XV) (i.e., compound ps314b) may conveniently be prepared by a process comprising treating linoleic acid with oxalyl chloride and DMF, conveniently overnight and preferably at room temperature, to thereby form acyl chloride. The process may further comprise treating the acyl chloride with amine to form an amide.

A compound of formula (XVI) (i.e., compound ps316a) may conveniently be prepared by a process comprising tetrazolation the compound of formula (XV) (i.e., compound ps314b).

A compound of formula (XVII) (i.e., compound ps315a) may conveniently be prepared by a process comprising treating oleic acid with oxalyl chloride and DMF, conveniently overnight and preferably at room temperature, to thereby form acyl chloride. The process may further comprise treating the acyl chloride with amine to form an amide.

A compound of formula (XVIII) (i.e., compound ps318a) may conveniently be prepared by a process comprising tetrazolation the compound of (XVII) (i.e., compound ps315a).

A compound of formula (XIX) (i.e., compound ps317b) may conveniently be prepared by a process comprising treating palmitic acid with oxalyl chloride and DMF, conveniently overnight and preferably at room temperature, to thereby form acyl chloride. The process may further comprise treating the acyl chloride with amine to form an amide.

A compound of formula (XXI) (i.e., compound ps320) may conveniently be prepared by a process comprising tetrazolation the compound of (XIX) (i.e., compound ps317b).

A compound of formula (XXI) (i.e., compound ps319) may conveniently be prepared by a process comprising treating linoleic acid with oxalyl chloride and DMF, conveniently overnight and preferably at room temperature, to thereby form acyl chloride. The process may further comprise treating the acyl chloride with amine to form an amide.

A compound of formula (XXII) (i.e., compound ps323b) may conveniently be prepared by a process comprising deprotonation the compound of (VI) (i.e., compound ps297b).

A compound of formula (XXIII) (i.e., compound ps321a) may conveniently be prepared by a process comprising tetrazolation the compound of (XXI) (i.e., compound ps319).

The table below outlines the chemistry results of the synthetic compounds produced and described herein and exemplified on the working examples that follow.

| Compound | Structure | ¹H NMR | ¹³C NMR | MS | IR |
|---|---|---|---|---|---|
| ps293a | Chemical Formula: $C_{26}H_{41}NO_3$<br>Molecular Weight: 415.61 | 4 | 4 | 6 | 4 |
| ps294a | Chemical Formula: $C_{25}H_{39}NO_3$<br>Molecular Weight: 401.58 | 4 | 4 | 6 | 4 |
| ps297b | Chemical Formula: $C_{25}H_{39}N_5O$<br>Molecular Weight: 425.61 | 4 | 4 | 6 | 4 |
| ps298a | Chemical Formula: $C_{26}H_{41}N_5O$<br>Molecular Weight: 439.64 | 4 | 4 | 6 | 4 |
| ps298b | Chemical Formula: $C_{26}H_{41}N_5O$<br>Molecular Weight: 439.64 | 4 | 4 | 6 | 4 |
| ps300b | Chemical Formula: $C_{24}H_{39}NO_2$<br>Molecular Weight: 373.57 | 4 | 4 | 6 | 4 |
| ps301a | Chemical Formula: $C_{25}H_{41}NO_2$<br>Molecular Weight: 387.60 | 4 | 4 | 6 | 4 |
| ps306a | Chemical Formula: $C_{25}H_{37}FN_2O$<br>Molecular Weight: 400.57 | 4 | 4 | 6 | 4 |

-continued

| Compound | Structure | $^1$H NMR | $^{13}$C NMR | MS | IR |
|---|---|---|---|---|---|
| ps309a | 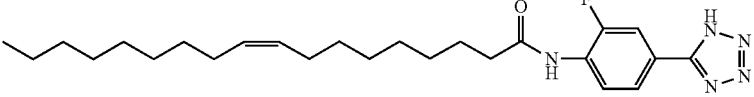<br>Chemical Formula: $C_{25}H_{38}FN_5O$<br>Molecular Weight: 443.60 | 4 | 4 | 6 | 4 |
| ps308c | 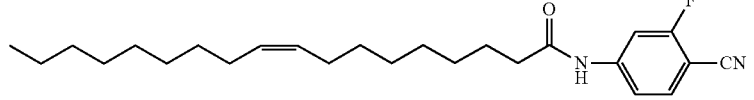<br>Chemical Formula: $C_{25}H_{37}FN_2O$<br>Molecular Weight: 400.57 | 4 | 4 | 6 | 4 |
| ps312a | 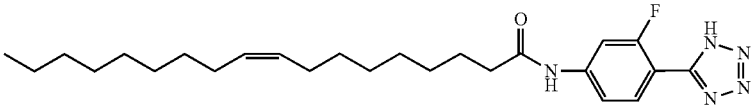<br>Chemical Formula: $C_{25}H_{38}FN_5O$<br>Molecular Weight: 443.60 | 4 | 4 | 6 | 4 |
| ps314b | 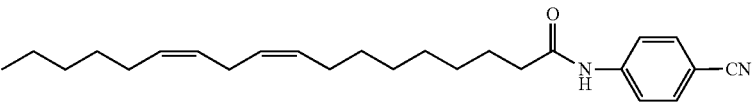<br>Chemical Formula: $C_{25}H_{36}N_2O$<br>Molecular Weight: 380.57 | 4 | 4 | 6 | 4 |
| ps316a | 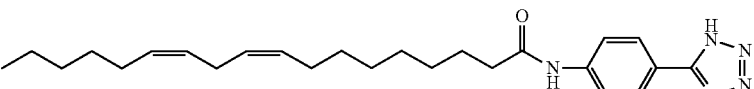<br>Chemical Formula: $C_{25}H_{37}N_5O$<br>Molecular Weight: 423.59 | 4 | 4 | 6 | 4 |
| ps315a | 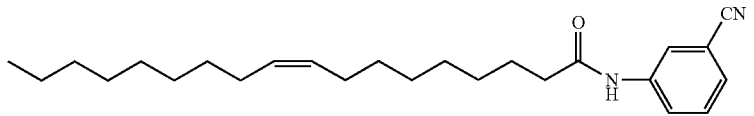<br>Chemical Formula: $C_{25}H_{38}N_2O$<br>Molecular Weight: 382.58 | 4 | 4 | 6 | 4 |
| ps318a | 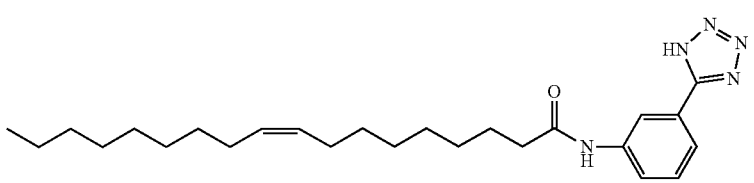<br>Chemical Formula: $C_{25}H_{39}N_5O$<br>Molecular Weight: 425.61 | 4 | 4 | 6 | 4 |
| ps317b | 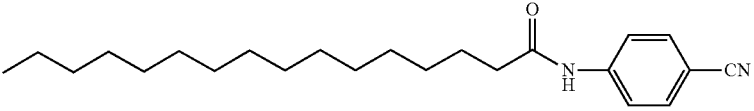<br>Chemical Formula: $C_{23}H_{36}N_2O$<br>Molecular Weight: 356.54 | 4 | 4 | 6 | 4 |

-continued

| Compound | Structure | $^1$H NMR | $^{13}$C NMR | MS | IR |
|---|---|---|---|---|---|
| ps321a | Chemical Formula: $C_{25}H_{38}FN_5NaO$ <br> Molecular Weight: 447.59 | 4 | 4 | 6 | 4 |
| ps320c | Chemical Formula: $C_{23}H_{37}N_5O$ <br> Molecular Weight: 399.57 | 4 | 4 | 6 | 4 |
| ps319 | Chemical Formula: $C_{25}H_{35}N_2O$ <br> Molecular Weight: 398.56 | 4 | 4 | 6 | 4 |
| ps323 | Chemical Formula: $C_{25}H_{36}FN_5O$ <br> Molecular Weight: 441.58 | 4 | 4 | 6 | 4 |

(ii) Testing Toxicity of Synthetic Compounds of Formula I

The compounds of the invention having the structure set forth in formula I described herein according to any aspect, embodiment or example hereof, may be tested for toxicity by any suitable method known in the art, or by testing toxicity on zebrafish e.g., by following the method described herein.

About two-days old *Danio rerio* larvae may be dechorionated and treated for about 3 days with increasing amount of any synthetic compound of formula I or salt or solvate thereof of this invention. The cardiotoxicity effect of the compound or salt or solvate may be assessed by measuring the heartbeat, the movement, and teratogenicity (hatching rate, mortality rate (LD50). The experiment may be repeated for three times or more times e.g., with about 10 larvae per concentration tested.

In an alternative method, Zebrafish embryos of the AB wild-type strain (originally obtained from the Zebrafish International Resource Center, Eugene, Oregon, USA) were raised at 28° C. Zebrafish husbandry, embryo collection, and embryo and larva maintenance were performed as described in Westerfield M (1994) The zebrafish book: a guide for the laboratory use of zebrafish (*Brachydanio rerio*). Oregon: University of Oregon Press. 385 p and Nüsslein-Volhard C, Dahm R (2002) Zebrafish: a practical approach. New York: Oxford University Press USA. 303 p. Toxicity assays were standardly performed in 24-well microtiter plates (wrapped with Parafilm to limit solvent evaporation) using 10 embryos per well in 1 ml of 0.3× Danieau's medium (17 mM NaCl, 2 mM KCl, 0.12 mM MgSO4, 1.8 mM Ca(NO3)2 and 1.5 mM HEPES, pH 7.6). Each experiment was repeated 3 times for a total of 30 embryos or larvae analyzed per compound of the invention per developmental staged tested. Data were only recorded for experiments in which the percentage of normal embryos or larvae in the control group was at least 90%. Embryos and larvae were exposed to compound of the invention at 2-4 cells, 4 hpf, and at 1, 2, 3, 4, and 7 dpf and evaluated for signs of toxicity 24 hours later. In determining the maximum tolerated concentration (MTC) for each compound of the invention, all post-exposure embryos and larvae were allowed to develop in larva medium to 9 dpf, so as to detect any deleterious effects appearing after this 24-hour window. This method is also described in Ducharme N A, et al Reprod Toxicol. 2015 55: 3-10; Zhang C et al. *Curr Protoc Toxicol.* 2003; Chapter 1: Unit 1.7; Maes J, et al *PLoS One.* 2012; 7(10): e43850; and Panzica-Kelly J M, et al. *Res B Dev Reprod Toxicol.* 2010; 89(5): 382-95 the disclosure of which is incorporated herein by cross-reference in its entirety.

(iii) Determining GLP-1 Measurement in Mice

The efficacy of the compounds of the invention having the structure set forth in formula I or salts or solvates thereof as described according to any aspect, embodiment or example hereof in glucose metabolism and/or maintaining glucose homeostasis in vivo may be tested by any suitable method known in the art e.g., using any known glucose metabolism model known in the art.

For example, at about 0, 20 and 90 minutes post glucose load, 20 μl of arterial blood may be sampled in K3-EDTA and KR-62436 containing tubes to collect plasma and samples are quickly store at −80° C. Plasma samples of 4 to 6 animals may be pool together and assayed to quantify the levels of active GLP-1 (such as GLP-1 (7-36)amide) using commercially available ELISA kits.

In a slight variation on the above method GLP-1 measurement in mice can be carried out by Peripheral GLP-1 stimulation and measurement in C57bl/6J mice. After 6 hours of fasting, the mice are weighed, and drug volumes are calculated. A compound of the invention is given by oral gavage at a dosage of 20 mg/kg in a volume inferior to 5 µl per gram of body weight. After 30 minutes, the mice are gavaged with a 50% solution of D-glucose dissolved in tap water, to deliver 2 mg/g in a volume inferior to 5 µl/g. At 2 minutes post-glucose gavage, a blood sample is collected from the submandibular vein into an EDTA coated prechilled tube containing a panel of protease inhibitors. The plasma is separated by spinning at 1,500 g for 20 minutes at 4 C. the plasma is then collected and snap frozen on dry ice and store at −20 C before proceeding with hormone quantification. For hormone quantification the samples are thawed and total GLP-1 levels are quantified, GLP1(7-36)amide+GLP-1(9-36)amide, in 20 µL of plasma with the commercial ELISA kit from Millipore EZGLP1T-36K. This method is also described in Windelov J A et al *Diabetologia*. 2017 60(10):2066-2075 and Panaro B L et al *Diabetes*. 2017; 66(6):1626-1635, the disclosure of which is incorporated herein by cross-reference in its entirety.

(iv) Determining Effect of Compounds of Formula I on Glucose Metabolism In Vivo.

The efficacy of the compounds of the invention having the structure set forth in formula I or salts or solvates thereof as described according to any aspect, embodiment or example hereof in glucose metabolism and/or maintaining glucose homeostasis in vivo may be tested by any suitable method known in the art e.g., by a short-term oral glucose tolerance test (OGTT) in mice.

For example, OGTT test in mice may be performed by an oral gavage of about 6-hour fasted, about 10-week old Wild Type, and diabetic db/db mice with 10 mg/kg of each synthetic compound of formula I or a salt or solvate thereof. E.g., if the compound or the salt forms are used, these are dissolved in an appropriate solvent. After about 30 minutes the glycaemia (time 0) may be measured and gavage 2 mg/g of Glucose in water. Glycaemia can be monitored via tail artery sampling at time e.g., 10, 20, 30, 60, 90 and 120 minutes after the glucose load.

In an alternative method, the morning of the glucose tolerance test mice are transferred to a cage with fresh water but no food. After 6 hours of fasting each animal is weighed and drug volumes are calculated. Experimental drugs are given by oral gavage at a dosage of 20 mg/kg in a volume inferior to 5 µl per gram of body weight. After 30 minutes, the tail is wiped clean with 70% ethanol, and the tail artery is pricked with a sterile scalpel blade to measure at time 0' the arterial blood glycaemia with a handheld glucomete. Within 2 minutes gavage the animals with a 50% solution of D-glucose dissolved in tap water, to deliver 2 mg/g in a volume inferior to 5 µl/g. At 10', 20', 30'. 60' and 90 minutes post glucose gavage, the glycaemia measurements and repeated by pricking the tail artery each time more proximally to the animal body. The Animal's behaviour is monitor for the absence of any possible tail bleeding. The OGTT procedure is described in Windelov J A et al *Diabetologia*. 2017 60(10):2066-2075; Panaro B L et al *Diabetes*. 2017 66(6):1626-1635 and Andrikopoulos S et al *Am J Physiol Endocrinol Metab*. 2008 295(6): E1323-32 the disclosure of which is incorporated herein by cross-reference in its entirety.

(v) Testing Long Term Chronic Anti Diabetic and Anti Atherosclerotic Effects of Compounds of Formula I In Vivo.

For chronic studies, animals such as mice may be gavaged daily with 10 mg/kg over a period of 14 weeks, and weight, glycaemia, as well as GLP-1 and Insulin levels, may be monitored before, during and after the treatment. Both wild-type and db/db mice may be utilized.

For determine the possible anti-atherosclerotic efficacy of the synthetic compounds of formula I or salts or solvates thereof in an atherosclerotic background, LDL-R deficient mice fed a high-fat diet, may be use. In one example, such mice may be treated daily with about 10 mg/kg of Synthetic compounds for about 14 weeks, and plasmatic markers such as triglycerides, total cholesterol maybe be monitored from arterial samples of blood. Post-mortem atherosclerotic lesions can then be quali-quantitatively assessed via IHC in normally affected regions such as the aortic root and arch of the animal. The anti-atherosclerotic procedure is described in Narasimhulu C A et al *J Med Food*. 2015; 18(1): 11-20; Xu R X et al *Chronic Dis Transl Med*. 2017; 4(2): 117-126; Zhang T T et al *Med Chem Comm*. 2017; 9(2): 254-263; Baker E J et al *Mol Aspects Med*. 2018; Karagiannis A D et al *Curr Atheroscler Rep*. 2018; 20(4):20; Wiśniewska A et al *Int J Mol Sci*. 2017 Aug. 4; 18(8) the disclosure of which is incorporated herein by cross-reference in its entirety.

(vi) Testing Binding to GPR119 of Compounds of Formula I.

Binding of the compounds of the invention having the structure set forth in formula I or salts or solvates thereof as described according to any aspect, embodiment or example hereof, to GPR119 may be determined by any method known in the art, or by determining the equilibrium dissociation constant KD of the compounds, salts or solvates with GPR119 as described in Christoffer Norn et al., *Structure*, 2015 December Vol:1; 23(12) pp:2377-86., the disclosure of which is incorporated herein by cross-reference in its entirety.

(vii) Testing NASH/NAFLD Activity of Compounds of Formula I.

Compounds of the invention are preferably tested for NAFLD/NASH in an in vitro model: liver progenitor cells are grown in oleate and palmitate enriched media to mimic NAFLD conditions, according to the method of Gómez-Lechón, M. J. et al., 2007. *Chemico-biological interactions*, 165(2), pp. 106-16. Compounds of the invention are then introduced onto those cells to determine the compounds ability to treat NAFLD conditions.

In an alternative test, mice are animals fed the Surwit diet (The industry standard Murine model of metabolic syndrome and NAFLD/NASH is the Surwit diet (High fat, high carbohydrate, high fructose) fed C57bl/6 mouse, as described in: Kohli R, et al: *Hepatology* 2010; 52:934-944, which is incorporated herein by reference). According to this method are gavaged daily with compound of the invention for 4 weeks. The animals are then terminated, and NAFLD/NASH pathological status is evaluated and compared to vehicle treated control animals. As an alternative to C57bl/6 mice, db/db diabetic mice can be tested for glucose response to compounds of the invention. Animals are gavaged daily with compounds of the invention for 4 weeks. The animals are then rerminated and NAFLD/NASH pathological status will be evaluated and compared to vehicle treated control animals, using immunohistochemistry.

3. Pharmaceutical or Therapeutic Compositions

In a second aspect, the present invention also relates to a therapeutic or pharmaceutical composition comprising at least one compound or salt or solvate according to the first aspect or any other broad aspect or embodiment or example thereof. Alternatively, or in addition, the pharmaceutical composition may further comprise oleoyl-LPI or a pharmaceutically acceptably salt or solvate thereof. Preferably, the pharmaceutical composition according to this aspect further comprises a pharmaceutically acceptable carrier and/or excipient and/or diluent.

In certain embodiments of this aspect of the invention, the compound of formula I or a salt or solvate thereof is provided in a therapeutic composition comprising at least one such compound or a pharmaceutically acceptable salt or solvate thereof and/or oeoyl-LPI or a or a pharmaceutically acceptable salt or solvate thereof.

In certain alternate embodiments of any broad aspect of the invention, the compound of formula I or a salt or solvate thereof is provided as a pharmaceutical composition comprising at least one compound of formula I or a pharmaceutically acceptable salt or solvate thereof and/or oleoyl-LPI or a or a pharmaceutically acceptable salt or solvate thereof, and a pharmaceutically acceptable carrier, excipient and/or diluent.

Preferably, for administration to a subject, the therapeutic or pharmaceutical composition is provided as a pharmaceutically acceptable composition. When in this form the composition will be pharmaceutical formulated together with one or more pharmaceutically acceptable carriers (e.g., additives) and/or diluents and/or excipients.

As used here, the term "pharmaceutically acceptable" refers to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

Methods for preparing administrable compositions are apparent to those skilled in the art, and are described in more detail in, for example, Remington's Pharmaceutical Science, 15th ed., Mack Publishing Company, Easton, Pa., hereby incorporated by reference in its entirety.

As used here, the term "pharmaceutically-acceptable carrier" or "a pharmaceutically acceptable excipient" or "pharmaceutically acceptable diluent" means a pharmaceutically-acceptable material, composition or vehicle, such as a liquid or solid filler, diluent, excipient, manufacturing aid (e.g., lubricant, talc magnesium, calcium or zinc stearate, or steric acid), or solvent encapsulating material, involved in carrying or transporting the subject compound from one organ, or portion of the body, to another organ, or portion of the body Each carrier, diluent and excipient must be "acceptable" in the sense of being compatible with the other ingredients of the formulation and not injurious to the patient. It is a material that is not biologically or otherwise undesirable i.e., the material can be applied to an individual along with the active agent without causing unacceptable biological effects or interacting in a deleterious manner with any one or more of the components of the composition in which it is contained. Some examples of materials that can serve as pharmaceutically-acceptable carriers, diluents and excipients include, but are not limited to: (1) sugars, such as lactose, glucose and sucrose; (2) starches, such as corn starch and potato starch; (3) cellulose, and its derivatives, such as sodium carboxymethyl cellulose, methylcellulose, ethyl cellulose, microcrystalline cellulose and cellulose acetate; (4) powdered tragacanth; (5) malt; (6) gelatin; (7) lubricating agents, such as magnesium stearate, sodium lauryl sulfate and talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol (PEG); (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) pH buffered solutions; (21) polyesters, polycarbonates and/or polyanhydrides; (22) bulking agents, such as polypeptides and amino acids (23) serum component, such as serum albumin, HDL and LDL; (22) $C_2$-$C_{12}$ alcohols, such as ethanol; and (23) other non-toxic compatible substances employed in pharmaceutical formulations. Wetting agents, binding agents, fillers, lubricants, colouring agents, disintegrants, release agents, coating agents, sweetening agents, flavouring agents, perfuming agents, preservative, water, salt solutions, alcohols, antioxidants, polyethylene glycols, gelatin, lactose, amylose, magnesium stearate, talc, silicic acid, viscous paraffin, hydroxymethylcellulose, polyvinylpyrrolidone and the like can also be present in the formulation. The terms such as "excipient", "carrier", "diluent" and "pharmaceutically acceptable carrier" or the like are used interchangeably herein.

Examples of pharmaceutically acceptable carriers, excipients or diluents are demineralised or distilled water; saline solution; vegetable based oils such as peanut oil, safflower oil, olive oil, cottonseed oil, maize oil, sesame oils such as peanut oil, safflower oil, olive oil, cottonseed oil, maize oil, sesame oil, arachis oil or coconut oil; silicone oils, including polysiloxanes, such as methyl polysiloxane, phenyl polysiloxane and methylphenyl polysolpoxane; volatile silicones; mineral oils such as liquid paraffin, soft paraffin or squalane; cellulose derivatives such as methyl cellulose, ethyl cellulose, carboxymethylcellulose, sodium carboxymethylcellulose or hydroxypropylmethylcellulose; lower alkanols, for example ethanol or iso-propanol; lower aralkanols; lower polyalkylene glycols or lower alkylene glycols, for example polyethylene glycol, polypropylene glycol, ethylene glycol, propylene glycol, 1,3-butylene glycol or glycerin; fatty acid esters such as isopropyl palmitate, isopropyl myristate or ethyl oleate; polyvinylpyrridone; agar; carrageenan; gum tragacanth or gum acacia, and petroleum jelly. Typically, the carrier or carriers will form from 10% to 99.9% by weight of the compositions.

The compositions described herein can additionally contain other adjunct components conventionally found in pharmaceutical compositions, at their art-established usage levels. Thus, for example, the compositions can contain additional, compatible, pharmaceutically-active materials such as, for example, antipruritics, astringents, local anaesthetics or anti-inflammatory agents. However, such materials, when added, should not unduly interfere with the biological activities of the components of the compositions described herein.

As described in detail below, the pharmaceutical acceptable compositions described herein can be specially formulated for administration in solid or liquid form, including those adapted for the following: (1) oral administration, for example, drenches (aqueous or nonaqueous solutions or suspensions), lozenges, dragees, capsules, pills, tablets (e.g., those targeted for buccal, sublingual, and systemic absorption), boluses, powders, granules, pastes for application to the tongue; (2) parenteral administration, for example, by subcutaneous, intramuscular, intravenous or epidural injection as, for example, a sterile solution or suspension, or sustained-release formulation; (3) injection directly into the organ needing treatment such as by intraparenchymal (into the brain), intrathecal, intraventricular or intrahepatic administration; (4) topical application, for example, as a cream, lotion, gel, ointment, or a controlled-release patch or spray applied to the skin; (5) in an aerosol form suitable for administration by inhalation, such as by intranasal inhalation or oral inhalation, (6) intravaginally or intrarectally, for example, as a pessary, cream, suppository or foam; (7) sublingually; (8) ocularly as an eye drop; (9) transdermally; (10) transmucosally; or (11) nasally.

In one embodiment, the pharmaceutical composition of the invention is administered by injection such as by parenteral injection (such as by subcutaneous, intramuscular or intravenous injection) or locally to tissues and organs such as by, intrathecal, intraventricular or intrahepatic administration.

Pharmaceutical compositions suitable for injection include sterile aqueous solutions (where water soluble) or dispersions and sterile powders for the extemporaneous preparation of sterile injectable solutions or dispersions. Ideally, the composition is stable under the conditions of manufacture and storage and may include a preservative to stabilise the composition against the contaminating action of microorganisms such as bacteria and fungi.

Sterile injectable solutions can be prepared by incorporating the pharmaceutical composition of the invention in the required amount in an appropriate solvent with one or a combination of ingredients enumerated above, as required, followed by filtered sterilisation. By way of illustration, a single dose may be dissolved in 1 ml of isotonic NaCl solution and either added to 1000 ml of hypodermoclysis fluid or injected at the proposed site of infusion, (see for example, "Remington's Pharmaceutical Sciences" 15th Edition, pages 1035-1038 and 1570-1580).

In the case of injectable solutions, the carrier can be a solvent or dispersion medium containing, for example, water, Ringer's solution, isotonic saline, phosphate buffered saline, ethanol, polyol (for example, glycerol, propylene glycol (eg 1,2 propylene glycol), and liquid polyetheylene glycol, and the like), suitable mixtures thereof, and vegetable oils.

The proper fluidity can be maintained, for example, using a coating such as lecithin, by the maintenance of the required particle size in the case of dispersion and using surfactants. Prevention of the action of microorganisms can be achieved by including various anti-bacterial and or anti-fungal agents. Suitable agents are well known to those skilled in the art and include, for example, parabens, chlorobutanol, phenol, benzyl alcohol, ascorbic acid, thiomerosal, and the like. In many cases, it may be preferable to include isotonic agents, for example, sugars, polyalcohols such as mannitol, sorbitol, sodium chloride in the composition. Prolonged absorption of the injectable compositions can be brought about by including in the composition an agent which delays absorption, for example, aluminium monostearate and gelatin.

In a second embodiment, the pharmaceutical composition of the invention is administered orally, for example, with an inert diluent or an assimilable edible carrier. For oral therapeutic administration, the pharmaceutical composition may be incorporated with excipients and used in the form of ingestible tablets, buccal tablets, troches, capsules, elixirs, suspensions, syrups, wafers, and the like.

Some examples of suitable carriers, diluents, excipients and adjuvants for oral use include peanut oil, liquid paraffin, sodium carboxymethylcellulose, methylcellulose, sodium alginate, gum acacia, gum tragacanth, dextrose, sucrose, sorbitol, mannitol, gelatine and lecithin. In addition, these oral formulations may contain suitable flavouring and colourings agents.

When used in capsule form the capsules may be coated with compounds such as glyceryl monostearate or glyceryl distearate which delay disintegration. Tablets, troches, pills, capsules and the like can also contain the following: a binder such as gum tragacanth, acacia, corn starch or gelatin; excipients such as dicalcium phosphate; an additional disintegrating agent such as corn starch, potato starch, alginic acid and the like; a lubricant such as magnesium stearate; and a sweetening agent such as sucrose, lactose or saccharin or a flavouring agent such as peppermint, oil of wintergreen, or cherry flavouring.

When the dosage unit form is a capsule, it can contain, in addition to materials of the above type, a liquid carrier. Various other materials can be present as coatings or to otherwise modify the physical form of the dosage unit. For instance, tablets, pills, or capsules can be coated with shellac, sugar or both.

Liquid forms for oral administration (such as a syrup or elixir) can contain, in addition to the above agents, a liquid carrier, a sweetening agent (e.g. sucrose), a preservative (eg methyl and propylparabens), a dye and flavouring such as cherry or orange flavour. Suitable liquid carriers include water, oils such as olive oil, peanut oil, sesame oil, sunflower oil, safflower oil, arachis oil, coconut oil, liquid paraffin, ethylene glycol, propylene glycol, polyethylene glycol, ethanol, propanol, isopropanol, glycerol, fatty alcohols, triglycerides or mixtures thereof.

Suspensions for oral administration may further comprise dispersing agents and/or suspending agents. Suitable suspending agents include sodium carboxymethylcellulose, methylcellulose, hydroxypropylmethyl-cellulose, poly-vinyl-pyrrolidone, sodium alginate or acetyl alcohol. Suitable dispersing agents include lecithin, polyoxyethylene esters of fatty acids such as stearic acid, polyoxyethylene sorbitol mono- or di-oleate, -stearate or -laurate, polyoxyethylene sorbitan mono- or di-oleate, -stearate or -laurate and the like. The emulsions for oral administration may further comprise one or more emulsifying agents. Suitable emulsifying agents include dispersing agents as exemplified above or natural gums such as guar gum, gum acacia or gum tragacanth.

In a third exemplary embodiment, the pharmaceutical composition of the invention is administered directly to the airways of a subject in the form of an aerosol or by nebulization. For use as aerosols, solution or suspension of the pharmaceutical acceptable compositions of the invention can be packaged in a pressurized aerosol container together with suitable propellants, for example, hydrocarbon propellants like propane, butane, or isobutane with conventional adjuvants. Such compositions can also be administered in a non-pressurized form such as in a nebulizer or atomizer.

Aerosols for the delivery to the respiratory tract are known in the art: see, for example, Adjei, A. and Garren, *J. Pharm. Res.*, 1: 565-569 (1990); Zanen, P. and Lamm, J-W. *J. Int. J. Pharm.*, 114: 111-115 (1995); Gonda, I. "Aerosols for delivery of therapeutic and diagnostic agents to the respiratory tract," in Critical Reviews in Therapeutic Drug Carrier Systems, 6:273-313 (1990); Anderson et al., Am. Rev. Respir. Dis., 140: 1317-1324 (1989)).

In a fourth exemplary embodiment, the pharmaceutical composition may be administered in the form of liposomes. Liposomes are generally derived from phospholipids or other lipid substances and are formed by mono- or multi-lamellar hydrated liquid crystals that are dispersed in an aqueous medium. Any non-toxic, physiologically acceptable and metabolisable lipid capable of forming liposomes can be used. The compositions in liposome form may contain stabilisers, preservatives, excipients and the like. The preferred lipids are the phospholipids and the phosphatidyl cholines (lecithins), both natural and synthetic. Methods to form liposomes are known in the art, and in relation to this specific reference is made to: Prescott, Ed., Methods in Cell Biology, Volume XIV, Academic Press, New York, N.Y. (1976), p. 33 et seq., the contents of which are incorporated herein by reference.

In addition, the therapeutic or pharmaceutical acceptable composition of the invention according to any aspect, embodiment or example described hereof, can be incorporated into sustained-release preparations and formulations. Such therapeutic or pharmaceutical compositions may further include a suitable buffer to minimise acid hydrolysis. Suitable buffer agent agents are well known to those skilled in the art and include, but are not limited to, phosphates, citrates, carbonates and mixtures thereof.

Compounds of the invention may also be administered in the form of a "prodrug". A prodrug is an inactive form of a compound which is transformed in vivo to the active form. Suitable prodrugs include esters, phosphonate esters etc, of the active form of the compound.

Additionally, pharmaceutical acceptable compositions can be implanted into a patient or injected using a drug delivery system. Coated delivery devices can also be useful. See, for example, Urquhart, et al., Ann. Rev. Pharmacol. Toxicol. 24: 199-236 (1984); Lewis, ed. "Controlled Release of Pesticides and Pharmaceuticals" (Plenum Press, New York, 1981); U.S. Pat. Nos. 3,773,919; 6,747,014; and U.S. Pat. No. 35 3,270,960.

In a further embodiment, the compounds of the present invention are provided in a functional food, nutraceutical, food supplement or dietary supplement. For example, functional foods, nutraceuticals, food supplements or dietary supplements may be produced comprising a therapeutically effective amount of the compound of Formula I or a salt or solvate thereof, or oleoyl-LPI or a salt or solvate thereof.

The therapeutically effective amount of a pharmaceutical compositions disclosed herein for any particular subject will depend upon a variety of factors including: the toxicity and therapeutic efficacy of the pharmaceutical composition; the severity of the ailment; the age, body weight, general health, sex and diet of the patient; the time of administration; the route of administration; the rate of sequestration of the compositions; the duration of the treatment; drugs used in combination or coincidental with the treatment, together with other related factors well known in medicine.

Toxicity and therapeutic efficacy can be determined by standard pharmaceutical procedures in cell cultures or experimental animals, e.g., for determining the $LD_{50}$ (the dose lethal to 50% of the population) and the $ED_{50}$ (the dose therapeutically effective in 50% of the population). The dose ratio between toxic and therapeutic effects is the therapeutic index and it can be expressed as the ratio $LD_{50}/ED_{50}$. Compositions that exhibit large therapeutic indices, are preferred.

The data obtained from the cell culture assays and animal models described herein can be used in formulating a range of therapeutically effective dosages for use in humans. The dosage of such compounds lies preferably within a range of circulating concentrations that include the $ED_{50}$ with little or no toxicity. The dosage can vary within this range depending upon the dosage form employed and the route of administration utilized.

The amount of compound of the invention described herein which can be combined with a carrier material to produce a dosage form will generally be that amount of the compound which produces a therapeutic effect. Generally, out of one hundred percent, this amount will range from about 0.1% to 99% of compound, preferably from about 5% to about 70%, most preferably from 10% to about 30%.

The dosage can be determined by a physician and adjusted, as necessary, to suit observed effects of the treatment. By way of illustration only the compositions may be administered so that the pharmaceutical acceptable compositions is given at a dose from 1 µg/kg to 150 mg/kg, 1 µg/kg to 100 mg/kg, 1 µg/kg to 50 mg/kg, 1 µg/kg to 20 mg/kg, 1 µg/kg to 10 mg/kg, 1 µg/kg to 1 mg/kg, 100 µg/kg to 100 mg/kg, 100 µg/kg to 50 mg/kg, 100 µg/kg to 20 mg/kg, 100 µg/kg to 10 mg/kg, 100 µg/kg to 1 mg/kg, 1 mg/kg to 100 mg/kg, 1 mg/kg to 50 mg/kg, 1 mg/kg to 20 mg/kg, 1 mg/kg to 10 mg/kg, 10 mg/kg to 100 mg/kg, 10 mg/kg to 50 mg/kg, or 10 mg/kg to 20 mg/kg. It is to be understood that ranges given here include all intermediate ranges, for example, the range 1 mg/kg to 10 mg/kg includes 1 mg/kg to 2 mg/kg, 1 mg/kg to 3 mg/kg, 1 mg/kg to 4 mg/kg, 1 mg/kg to 5 mg/kg, 1 mg/kg to 6 mg/kg, 1 mg/kg to 7 mg/kg, 1 mg/kg to 8 mg/kg, 1 mg/kg to 9 mg/kg, 2 mg/kg to 10 mg/kg, 3 mg/kg to 10 mg/kg, 4 mg/kg to 10 mg/kg, 5 mg/kg to 10 mg/kg, 6 mg/kg to 10 mg/kg, 7 mg/kg to 10 mg/kg, 8 mg/kg to 10 mg/kg, 9 mg/kg to 10 mg/kg etc. It is to be further understood that the ranges intermediate to the given above are also within the scope of the methods and compositions described herein, for example, in the range 1 mg/kg to 10 mg/kg, dose ranges such as 2 mg/kg to 8 mg/kg, 3 mg/kg to 7 mg/kg, 4 mg/kg to 6 mg/kg etc.

In certain examples of the invention an effective amount of the compound of formula I or a pharmaceutically acceptable salt or solvate thereof and/or oleoyl-LPI or a pharmaceutically acceptable salt or solvate thereof is given as a single dose of administration. In certain examples, the dose is given repeatedly. That is, treatment regimens will vary depending on the severity and type of disease, the overall health and age of the patient, and various other conditions to be considered by the treating physician. With respect to duration and frequency of treatment, it is typical for skilled clinicians to monitor subjects to determine when a treatment is providing therapeutic benefit, and to determine whether to increase or decrease dosage, increase or decrease administration frequency, discontinue treatment, resume treatment or make other alteration to treatment regimen.

Therapeutics or pharmaceutical acceptable compositions of the invention according to any aspect, embodiment or example described hereof, may be provided in a single bolus administration or in multiple doses or treatments and may also be applied by "continuous" therapy where a small amount of the therapeutic composition is provided continually over an extended time period.

Where multiple dosing is used in the treatment (including continuous therapy) the therapeutics or pharmaceutical composition will be administered by a dosing schedule that can vary from once a week to daily depending on several clinical factors, such as the subject's sensitivity to the compound of the invention used in the therapeutic or pharmaceutical composition. The desired dose to be administered in such a regime can be delivered as a single dose at one time or divided into sub-doses, e.g., 2-4 sub-doses and administered over a time period, e.g., at appropriate intervals through the day or other appropriate schedule. Such sub-doses can be administered as unit dosage forms.

In some embodiments, administration is chronic, e.g., one or more doses daily over a period of weeks or months. Examples of dosing schedules are administration daily, twice daily, three times daily or four or more times daily over a period of 1 week, 2 weeks, 3 weeks, 4 weeks, 1 month, 2 months, 3 months, 4 months, 5 months, or 6 months or more.

The desired dose can be administered using continuous infusion or delivery through a controlled release formulation. In that case, the pharmaceutical composition contained in each sub-dose must be correspondingly smaller to achieve the total daily dosage.

The dosage unit can also be compounded for delivery over several days, e.g., using a conventional sustained release formulation which provides sustained release of the pharmaceutical composition over a several days. Sustained release formulations are well known in the art and are particularly useful for delivery of agents at a site, such as could be used with the agents described herein. In this embodiment, the dosage unit contains a corresponding multiple of the daily dose.

(i) Combination Regimes

Therapeutic advantages may be realised through combination regimens. In certain embodiments of aspects of the invention directed to therapy methods, the method may further comprise the step of: administering the of the compound of formula I or a pharmaceutically acceptable salt or solvate thereof and/or oleoyl-LPI or a or a pharmaceutically acceptable salt or solvate thereof to a subject, with a second active agent that is an adjunct treatment for metabolic disorders or other disorders associated with impaired GPR119 and/or impaired GLP-1 biosynthesis and/or secretion that the patient is having or suffering from or is at risk of having or suffering from when delivered preventatively.

In one example, the second active agent provides an adjunct treatment or prevention for metabolic disorders or other disorders associated with impaired GPR119 and/or impaired GLP-1 biosynthesis and/or secretion in a subject.

In some examples, the additional agent administered is an anti-inflammatory agent such as a steroid, corticosteroids, COX-2 inhibitor, non-steroidal anti-inflammatory agent (NSAIDs), aspirin or any combination thereof. More particularly, the additional agent administered may be an anti-inflammatory agent, selected from the group consisting of Alclofenac; Alclometasone Dipropionate; Algestone Acetonide; Alpha Amylase; Amcinafal; Amcinafide; Amfenac Sodium; Amiprilose Hydrochloride; Anakinra; Anirolac; Anitrazafen; Apazone; Balsalazide Disodium; Bendazac; Benoxaprofen; Benzydamine Hydrochloride; Bromelains; Broperamole; Budesonide; Carprofen; Cicloprofen; Cintazone; Cliprofen; Clobetasol Propionate; Clobetasone Butyrate; Clopirac; Cloticasone Propionate; Cormethasone Acetate; Cortodoxone; Deflazacort; Desonide; Desoximetasone; Dexamethasone Dipropionate; Diclofenac Potassium; Diclofenac Sodium; Diflorasone Diacetate; Diflumidone Sodium; Diflunisal; Difluprednate; Diftalone, Dimethyl Sulfoxide; Drocinonide; Endrysone; Enlimomab; Enolicam Sodium; Epirizole; Etodolac; Etofenamate; Felbinac; Fenamole; Fenbufen; Fenclofenac; Fenclorac; Fendosal; Fenpipalone; Fentiazac; Flazalone; Fluazacort; Flufenamic Acid; Flumizole; Flunisolide Acetate; Flunixin; Flunixin Meglumine; Fluocortin Butyl; Fluorometholone Acetate; Fluquazone; Flurbiprofen; Fluretofen; Fluticasone Propionate; Furaprofen; Furobufen; Halcinonide; Halobetasol Propionate; Halopredone Acetate; Ibufenac; Ibuprofen; Ibuprofen Aluminum; Ibuprofen Piconol; Ilonidap; Indomethacin; Indomethacin Sodium; Indoprofen; Indoxole; Intrazole; Isoflupredone Acetate; Isoxepac; Isoxicam; Ketoprofen; Lofemizole Hydrochloride; Lomoxicam; Loteprednol Etabonate; Meclofenamate Sodium; Meclofenamic Acid; Meclorisone Dibutyrate; Mefenamic Acid; Mesalamine; Meseclazone; Methylprednisolone Suleptanate; Morniflumate; Nabumetone; Naproxen; Naproxen Sodium; Naproxol; Nimazone; Olsalazine Sodium; Orgotein; Orpanoxin; Oxaprozin; Oxyphenbutazone; Paranyline Hydrochloride; Pentosan Polysulfate Sodium; Phenbutazone Sodium Glycerate; Pirfenidone; Piroxicam; Piroxicam Cinnamate; Piroxicam Olamine; Pirprofen; Prednazate; Prifelone; Prodolic Acid; Proquazone; Proxazole; Proxazole Citrate; Rimexolone; Romazarit; Salcolex; Salnacedin; Salsalate; Salycilates; Sanguinarium Chloride; Seclazone; Sermetacin; Sudoxicam; Sulindac; Suprofen; Talmetacin; Talniflumate; Talosalate; Tebufelone; Tenidap; Tenidap Sodium; Tenoxicam; Tesicam; Tesimide; Tetrydamine; Tiopinac; Tixocortol Pivalate; Tolmetin; Tolmetin Sodium; Triclonide; Triflumidate; Zidometacin; Glucocorticoids; Zomepirac Sodium, and combinations thereof.

In some examples, the additional agent administered is an agent to treat diabetes. Such agents include those agents known in the art for treatment of diabetes and or for having anti-hyperglycemic activities, for example, inhibitors of dipeptidyl peptidase 4 (DPP-4) (e.g., Alogliptin, Linagliptin, Saxagliptin, Sitagliptin, Vildagliptin, and Berberine), biguanides (e.g., Metformin, Buformin and Phenformin), peroxisome proliferator-activated receptor (PPAR) modulators such as thiazolidinediones (TZDs) (e.g., Pioglitazone, Rivoglitazone, Rosiglitazone and Troglitazone), dual PPAR agonists (e.g., Aleglitazar, Muraglitazar and Tesaglitazar), sulfonylureas (e.g., Acetohexamide, Carbutamide, Chlorpropamide, Gliclazide, Tolbutamide, Tolazamide, Glibenclamide (Glyburide), Glipizide, Gliquidone, Glyclopyramide, and Glimepiride), meglitinides ("glinides") (e.g., Nateglinide, Repaglinide and Mitiglinide), glucagon-like peptide-1 (GLP-1) and analogs (e.g., Exendin-4, Exenatide, Liraglutide, Albiglutide), insulin and insulin analogs (e.g., Insulin lispro, Insulin aspart, Insulin glulisine, Insulin glargine, Insulin detemir, Exubera and NPH insulin), alpha-glucosidase inhibitors (e.g., Acarbose, Miglitol and Voglibose), amylin analogs (e.g. Pramlintide), Sodium-dependent glucose cotransporter T2 (SGLT T2) inhibitors (e.g., Dapgliflozin, Remogliflozin and Sergliflozin) and others (e.g. Benfluorex and Tolrestat).

In another example, the second active agent is selected from anti-obesity agents, anorectic agents, appetite suppressant and related agents. Diet and/or exercise can also have synergistic effects. Anti-obesity agents include, but are not limited to, apolipoprotein-B secretion/microsomal triglyceride transfer protein (apo-B/MTP) inhibitors, MCR-4 agonists, cholescystokinin-A (CCK-A) agonists, serotonin and norepinephrine reuptake inhibitors (for example, sibutramine), sympathomimetic agents, β3 adrenergic receptor agonists, dopamine agonists (for example, bromocriptine), melanocyte-stimulating hormone receptor analogs, cannabinoid 1 receptor antagonists [for example, compounds described in WO2006/047516), melanin concentrating hormone antagonists, leptons (the OB protein), leptin analogues, leptin receptor agonists, galanin antagonists, lipase inhibitors (such as tetrahydrolipstatin, i.e., Orlistat), anorectic agents (such as a bombesin agonist), Neuropeptide-γ antagonists, thyromimetic agents, dehydroepiandrosterone or an analogue thereof, glucocorticoid receptor agonists or antagonists, orexin receptor antagonists, urocortin binding protein antagonists, glucagon-like peptide-1 receptor agonists, ciliary neutrophic factors (such as Axokine™), human agouti-related proteins (AGRP), ghrelin receptor antagonists, histamine 3 receptor antagonists or reverse agonists, neuromedin U receptor agonists, noradrenergic anorectic agents (for example, phentermine, mazindol and the like) and appetite suppressants (for example, bupropion).

Where compounds of the invention are administered in conjunction with other therapies, dosages of the co-administered compounds will of course vary depending on the type of co-drug employed, on the specific drug employed, on the condition being treated and so forth.

A combined preparation or pharmaceutical composition can comprise a compound of the invention as defined above or a pharmaceutical acceptable salt thereof and at least one active ingredient selected from:

a. anti-diabetic agents such as insulin, insulin derivatives and mimetics; insulin secretagogues such as the sulfonylureas, e.g., Glipizide, glyburide and Amaryl; insulinotropic sulfonylurea receptor ligands such as meglitinides, e.g., nateglinide and repaglinide; insulin sensitizer such as protein tyrosine phosphatase-IB (PTP-IB) inhibitors such as PTP-112; GSK3 (glycogen synthase kinase-3) inhibitors such as SB-517955, SB-4195052, SB-216763, NN-57-05441 and NN-57-05445; RXR ligands such as GW-0791 and AGN-194204; sodium-dependent glucose cotransporter inhibitors such as T-1095; glycogen phosphorylase A inhibitors such as BAY $R_{3401}$; biguanides such as metformin; alpha-glucosidase inhibitors such as acarbose; GLP-I (glucagon like peptide-1), GLP-I analogs such as Exendin-4 and GLP-I mimetics; DPPIV (dipeptidyl peptidase IV) inhibitors such as DPP728, LAF237 (vildagliptin—Example 1 of WO 00/34241), MK-0431, saxagliptin, GSK23A; an AGE breaker; a thiazolidone derivative (glitazone) such as pioglitazone, rosiglitazone, or (R)-1-{4-[5-methyl-2-(4-trifluoromethyl-phenyl)-oxazol-4-ylmethoxy]-benzenesulfonyl}-2,3-dihydro-1H-indole-2-carboxylic acid described in the patent application WO 03/043985, as compound 19 of Example 4, a non-glitazone type PPAR gamma agonist e.g. GI-262570; Diacylglycerol acetyltransferase (DGAT) inhibitors such as those disclosed in WO 2005044250, WO 2005013907, WO 2004094618 and WO 2004047755;

b. hypolipidemic agents such as 3-hydroxy-3-methylglutaryl coenzyme A (HMG-CoA) reductase inhibitors, e.g., lovastatin and related compounds such as those disclosed in U.S. Pat. No. 4,231,938, pitavastatin, simvastatin and related compounds such as those disclosed in U.S. Pat. Nos. 4,448,784 and 4,450,171, pravastatin and related compounds such as those disclosed in U.S. Pat. No. 4,346,227, cerivastatin, mevastatin and related compounds such as those disclosed in U.S. Pat. No. 3,983,140, velostatin, fluvastatin, dalvastatin, atorvastatin, rosuvastatin and related statin compounds disclosed in U.S. Pat. No. 5,753,675, rivastatin, pyrazole analogs of mevalonolactone derivatives as disclosed in U.S. Pat. No. 4,613,610, indene analogs of mevalonolactone derivatives as disclosed in PCT application WO 86/03488, 6-[2-(substituted-pyrrol-1-yl)-alkyl)pyran-2-ones and derivatives thereof as disclosed in U.S. Pat. No. 4,647,576, Searle's SC-45355 (a 3-substituted pentanedioic acid derivative) dichloroacetate, imidazole analogs of mevalonolactone as disclosed in PCT application WO 86/07054, 3-carboxy-2-hydroxy-propane-phosphonic acid derivatives as disclosed in French Patent No. 2,596,393, 2,3-disubstituted pyrrole, furan and thiophene derivatives as disclosed in European Patent Application No. 0221025, naphthyl analogs of mevalonolactone as disclosed in U.S. Pat. No. 4,686,237, octahydronaphthalenes such as disclosed in U.S. Pat. No. 4,499,289, keto analogs of mevinolin (lovastatin) as disclosed in European Patent Application No. 0,142,146 A2, and quinoline and pyridine derivatives disclosed in U.S. Pat. Nos. 5,506,219 and 5,691,322. In addition, phosphinic acid compounds useful in inhibiting HMG CoA reductase suitable for use herein are disclosed in GB 2205837; squalene synthase inhibitors; FXR (farnesoid X receptor) and LXR (liver X receptor) ligands; cholestyramine; fibrates; nicotinic acid and aspirin;

c. an anti-obesity agent or appetite regulating agent such as a CB 1 activity modulator, melanocortin receptor (MC4R) agonists, melanin-concentrating hormone receptor (MCHR) antagonists, growth hormone secretagogue receptor (GHSR) antagonists, galanin receptor modulators, orexin antagonists, CCK agonists, GLP-I agonists, and other Pre-proglucagon-derived peptides; NPYI or NPY5 antagonsist, NPY2 and NPY4 modulators, corticotropin releasing factor agonists, histamine receptor-3 (H3) modulators, aP2 inhibitors, PPAR gamma modulators, PPAR delta modulators, acetyl-CoA carboxylase (ACC) inihibitors, 11-β-HSD-1 inhibitors, adinopectin receptor modulators; beta 3 adrenergic agonists, such as AJ9677 (Takeda/Dainippon), L750355 (Merck), or CP331648 (Pfizer) or other known beta 3 agonists as disclosed in U.S. Pat. Nos. 5,541,204, 5,770,615, 5,491,134, 5,776,983 and 5,488,064, a thyroid receptor beta modulator, such as a thyroid receptor ligand as disclosed in WO 97/21993 (U. Cal SF), WO 99/00353 (KaroBio) and GB98/284425 (KaroBio), a SCD-1 inhibitor as disclosed in WO2005011655, a lipase inhibitor, such as orlistat or ATL-962 (Alizyme), serotonin receptor agonists, (e.g., BVT-933 (Biovitrum)), monoamine reuptake inhibitors or releasing agents, such as fenfluramine, dexfenfluramine, fluvoxamine, fluoxetine, paroxetine, sertraline, chlorphentermine, cloforex, clortermine, picilorex, sibutramine, dexamphetamine, phentermine, phenylpropanolamine or mazindol, anorectic agents such as topiramate (Johnson & Johnson), CNTF (ciliary neurotrophic factor)/Axokine® (Regeneron), BDNF (brain-derived neurotrophic factor), leptin and leptin receptor modulators, phentermine, leptin, bromocriptine, dexamphetamine, amphetamine, fenfluramine, dexfenfluramine, sibutramine, orlistat, dexfenfluramine, mazindol, phentermine, phendimetrazine, diethylpropion, fluoxetine, bupropion, topiramate, diethylpropion, benzphetamine, phenylpropanolamine or ecopipam, ephedrine, pseudoephedrine;

d. anti-hypertensive agents such as loop diuretics such as ethacrynic acid, furosemide and torsemide; diuretics such as thiazide derivatives, chlorithiazide, hydrochlorothiazide, amiloride; angiotensin converting enzyme (ACE) inhibitors such as benazepril, captopril, enalapril, fosinopril, lisinopril, moexipril, perinodopril, quinapril, ramipril and trandolapril; inhibitors of the Na-K-ATPase membrane pump such as digoxin; neutralendopeptidase (NEP) inhibitors e.g. thiorphan, terteo-thiorphan, SQ29072; ECE inhibitors e.g. SLV306; ACE/NEP inhibitors such as omapatrilat, sampatrilat and fasidotril; angiotensin II antagonists such as candesartan, eprosartan, irbesartan, losartan, telmisartan and valsartan, in particular valsartan; renin inhibitors such as aliskiren, terlakiren, ditekiren, RO 66-1132, RO-66-1168; beta-adrenergic receptor blockers such as acebutolol, atenolol, betaxolol, bisoprolol, metoprolol, nadolol, propranolol, sotalol and timolol; inotropic agents such as digoxin, dobutamine and milrinone; calcium channel blockers such as amlodipine, bepridil, diltiazem, felodipine, nicardipine, nimodipine, nifedipine, nisoldipine and verapamil; aldosterone receptor antagonists; aldosterone synthase inhibitors; and dual ET/All antagonist such as those disclosed in WO 00/01389.

e. a HDL increasing compound;
f. Cholesterol absorption modulator such as Zetia® and KT6-971;
g. Apo-Al analogues and mimetics;
h. thrombin inhibitors such as Ximelagatran;
i. aldosterone inhibitors such as anastrazole, fadrazole, eplerenone;
j. Inhibitors of platelet aggregation such as aspirin, clopidogrel bisulfate;
k. estrogen, testosterone, a selective estrogen receptor modulator, a selective androgen receptor modulator;
[0056] 1) a chemotherapeutic agent such as aromatase inhibitors e.g. femara, anti-estrogens, topoisomerase I inhibitors, topoisomerase II inhibitors, microtubule active agents, alkylating agents, antineoplastic antimetabolites, platin compounds, compounds decreasing the protein kinase activity such as a PDGF receptor tyrosine kinase inhibitor preferably Imatinib ({N-{5-[4-(4-methyl-piperazino-methyl)-benzoylamido]-2-methylphenyl}-4-(3-pyridyl)-2-pyrimidine-amine})
described in the European patent application EP-A-0 564 409 as example 21 or 4-Methyl-N-[3-(4-methyl-imidazol-1-yl)-5-trifluoromethyl-phenyl]-3-(4-pyridin-3-yl-pyrimidin-2-ylamino)-benzamide described in the patent application WO 04/005281 as example 92; and
l. an agent interacting with a 5-HT$_3$ receptor and/or an agent interacting with 5-HT$_4$ receptor such as tegaserod described in the U.S. Pat. No. 5,510,353 as example 13, tegaserod hydrogen maleate, cisapride, cilansetron;
m. an agent for treating tobacco abuse, e.g., nicotine receptor partial agonists, bupropion hypochloride (also known under the tradename Zyban®) and nicotine replacement therapies;
n. an agent for treating erectile dysfunction, e.g., dopaminergic agents, such as apomorphine), ADD/ADHD agents (e.g., Ritalin®, Strattera®, Concerta® and Adderall®);
o. an agent for treating alcoholism, such as opioid antagonists (e.g., naltrexone (also known under the tradename Re Via®) and nalmefene), disulfiram (also known under the tradename Antabuse®), and acamprosate (also known under the tradename Campral®)). In addition, agents for reducing alcohol withdrawal symptoms may also be co-administered, such as benzodiazepines, beta-blockers, clonidine, carbamazepine, pregabalin, and gabapentin (Neurontin®);

Those skilled in the art will appreciate that the pharmaceutical compositions according to any aspect, embodiment or example described hereof may be administered as part of a combination therapy approach to metabolic disorders or other disorders associated with impaired GPR119 and/or impaired GLP-1 biosynthesis and/or secretion in a subject. In combination therapy, the respective agents may be administered simultaneously or sequentially in any order. When administered sequentially, it may be preferred that the components be administered by the same route.

In some examples where the two agents are applied separately, one would generally ensure that a significant time period did not expire between the time of each delivery, such that both agents would still be able to exert an advantageously combined effect. In such instances, it is contemplated that one would typically administer both modalities within about 12-24 hours of each other and, more preferably, within about 6-12 hours of each other, with a delay time of only about 12 hours being most preferred, in some situations, it may be desirable to extend the time for treatment significantly, however, where several days (2, 3, 4, 5, 6 or 7) to several weeks (1, 2, 3, 4, 5, 6, 7 or 8) lapse between the respective administrations. It also is conceivable that more than one administration of a drug will be desired.

When pharmaceutical acceptable compositions of the invention, and a second active agent are administered in different pharmaceutical compositions, routes of administration may be different. For example, the pharmaceutical acceptable composition of the invention is administered by any appropriate route known in the art including, but not limited to oral or parenteral routes, including intravenous, intramuscular, subcutaneous, transdermal, airway (aerosol), pulmonary, nasal, rectal, and topical (including buccal and sublingual) administration, and the second pharmaceutically active agent is administration by a different route, e.g. a route commonly used in the art for administration of said pharmaceutically active agent. In a non-limiting example, the pharmaceutical acceptable compositions of the invention can be administered orally, while the second pharmaceutically active agent can be administrated by injection.

In other embodiments, the present invention relates to a method of preparing a pharmaceutical composition, comprising combining and/or admixing a therapeutically effective amount of the compound of formula I or a pharmaceutically acceptable salt or solvate thereof and/or oleoyl-LPI or a or a pharmaceutically acceptable salt or solvate thereof, with at least one pharmaceutically acceptable carrier, excipient and/or diluent.

4. Methods of Agonizing GPR119 in a Cell

In a third broad aspect, there is provided a method of agonizing and/or a partially agonizing and/or a reverse antagonizing GPR119 in a cell, comprising contacting a cell capable of expressing GPR119 with an effective amount of a compound, or salt or solvate thereof according to the first aspect, or any embodiment or example thereof and/or oleoyl-LPI or a salt or solvate thereof and/or the pharmaceutical composition according to the second aspect or embodiment or example described herein throughout. For example, the contacting is performed ex vivo and/or in vivo. The cell may a pancreatic cell or a cell of the GI tract e.g., the cell is an L-cell or a pancreatic β cell.

In a fourth broad aspect, there is provided a method of agonizing and/or a partially agonizing and/or a reverse antagonizing GPR119 in a cell, comprising contacting a cell comprising or already expressing GPR119 with an effective amount of an effective amount of a compound, or salt or solvate thereof according to the first aspect, embodiment or example thereof and/or oleoyl-LPI or a salt or solvate thereof and/or the pharmaceutical composition according to the second aspect or embodiment or example described herein throughout. For example, the contacting is performed ex vivo and/or in vivo. The cell may be a pancreatic cell or a cell of the GI tract e.g., the cell is an L-cell or a pancreatic β cell.

Compounds of the invention modulate the activity of GPR119 and, as such, are useful for treating diseases or disorders in which the activity of GPR119 contributes to the pathology and/or symptomology of the disease. This invention further provides compounds of this invention for use in the preparation of medicaments for the treatment of diseases or disorders in which GPR119 activity contributes to the pathology and/or symptomology of the disease.

The resultant pathologies of Type II diabetes are impaired insulin signaling at its target tissues and failure of the insulin-producing cells of the pancreas to secrete an appropriate degree of insulin in response to a hyperglycemic signal. Current therapies to treat the latter include inhibitors of the β-cell ATP-sensitive potassium channel to trigger the release of endogenous insulin stores, or administration of exogenous insulin. Neither of these achieves accurate normalization of blood glucose levels and both carry the risk of inducing hypoglycemia. For these reasons, there has been intense interest in the development of pharmaceuticals that function in a glucose-dependent action, i.e. potentiators of glucose signaling. Physiological signaling systems which function in this manner are well-characterized and include the gut peptides GLP-I, GIP and PACAP. These hormones act via their cognate G-protein coupled receptor to stimulate the production of cAMP in pancreatic β-cells. Accordingly, agonists of the invention similarly functioning, β-cell GPCRs, including GPR119, stimulate the release of endogenous insulin and consequently promote normoglycemia in Type II diabetes. It is also established that increased cAMP, for example as a result of GLP-I stimulation, promotes β-cell proliferation, inhibits β-cell death and thus improves islet mass. This positive effect on β-cell mass is expected to be beneficial in both Type II diabetes, where insufficient insulin is produced, and Type I diabetes, where β-cells are destroyed by an inappropriate autoimmune response.

Some β-cell GPCRs, including GPR119, are also present in the hypothalamus where they modulate hunger, satiety, decrease food intake, controlling or decreasing weight and energy expenditure. Hence, given their function within the hypothalamic circuitry, agonists or inverse agonists of these receptors mitigate hunger, promote satiety and therefore modulate weight.

It is also well-established that metabolic diseases exert a negative influence on other physiological systems. Thus, there is often the codevelopment of multiple disease states (e.g. type I diabetes, type II diabetes, inadequate glucose tolerance, insulin resistance, hyperglycemia, hyperlipidemia, hypertriglyceridemia, hypercholesterolemia, dyslipidemia, obesity or cardiovascular disease in "Syndrome X") or secondary diseases which clearly occur secondary to diabetes (e.g. kidney disease, peripheral neuropathy). Thus, it is expected that effective treatment of the diabetic condition will in turn be of benefit to such interconnected disease states.

In an embodiment, the invention provides a therapeutic method comprising contacting a cell capable of expressing GPR119 with an effective amount of a compound of the invention to increase levels of glucose-dependent insulinotropic polypeptide (GIP) and pancreatic polypeptide (PPY). For example, neuroprotection, learning and memory, seizures and peripheral neuropathy. GLP-I and GLP-I receptor agonists have been shown to be effective for treatment of neurodegenerative diseases and other neurological disorders. GLP-I and exendin-4 have been shown to stimulate neurite outgrowth and enhance cell survival after growth factor withdrawal in PC 12 cells. In a rodent model of neurodegeneration, GLP-I and exendin-4 restore cholinergic marker activity in the basal forebrain. Central infusion of GLP-I and exendin-4 also reduce the levels of amyloid-β peptide in mice and decrease amyloid precursor protein amount in cultured PC 12 cells. GLP-I receptor agonists have been shown to enhance learning in rats and the GLP-I receptor knockout mice show deficiencies in learning behavior. The knockout mice also exhibit increased susceptibility to kainate-induced seizures which can be prevented by administration of GLP-I receptor agonists. GLP-I and exendin-4 has also been shown to be effective in treating pyridoxine-induced peripheral nerve degeneration, an experimental model of peripheral sensory neuropathy.

In an embodiment, the invention provides a therapeutic method comprising contacting a cell capable of expressing GPR119 with an effective amount of a compound of the invention to modulate GIP to enhance sensorimotor coordination and memory recognition. GIP has also been shown to have effects on proliferation of hippocampal progenitor cells and in enhancing sensorimotor coordination and memory recognition.

In another embodiment, the invention provides a therapeutic method comprising contacting a cell capable of expressing GPR119 with an effective amount of a compound of the invention to modulate GLP-2 and treat short bowel syndrome (SBS). Several studies in animals and from clinical trials have shown that GLP-2 is a trophic hormone that plays an important role in intestinal adaptation. Its role in regulation of cell proliferation, apoptosis, and nutrient absorption has been well documented. Short bowel syndrome is characterized by malabsorption of nutrients, water and vitamins as a result of disease or surgical removal of parts of the small intestine (eg. Crohn's disease). Therapies that improve intestinal adaptation are thought to be beneficial in treatment of this disease. In fact, phase II studies in SBS patients have shown that teduglutide, a GLP-2 analog, modestly increased fluid and nutrient absorption.

In yet another embodiment, the invention provides a therapeutic method comprising contacting a cell capable of expressing GPR119 with an effective amount of a compound of the invention to increase levels of GIP and GLP-I to treat osteoporosis. GLP-I has been shown to increase calcitonin and calcitonin related gene peptide (CGRP) secretion and expression in a murine C-cell line (CA-77). Calcitonin inhibits bone resorption by osteoclasts and promotes mineralization of skeletal bone. Osteoporosis is a disease that is characterized by reduced bone mineral density and thus GLP-I induced increase in calcitonin might be therapeutically beneficial.

GIP has been reported to be involved in upregulation of markers of new bone formation in osteoblasts including collagen type I mRNA and in increasing bone mineral density. Like GLP-I, GIP has also been shown to inhibit bone resorption.

In a further embodiment, the invention provides a therapeutic method comprising contacting a cell capable of expressing GPR119 with an effective amount of a compound of the invention to increase levels of GIP and PPY to treat gastric emptying. GPR119 located on the pancreatic polypeptide (PP) cells of the islets has been implicated in the secretion of PPY. PPY has been reported to have profound effects on various physiological processes including modulation of gastric emptying and gastrointestinal motility. These effects slow down the digestive process and nutrient uptake and thereby prevent the postprandial elevation of blood glucose. PPY can suppress food intake by changing the expression of hypothalamic feeding-regulatory peptides.

PP-overexpressing mice exhibited the thin phenotype with decreased food intake and gastric emptying rate.

In accordance with the foregoing, the present invention further provides a method for preventing or ameliorating the symptomology of any of the diseases or disorders described above in a subject in need thereof, which method comprises administering to said subject a therapeutically effective amount (See, "Administration and Pharmaceutical Compositions", infra) of a compound of Formula I or a pharmaceutically acceptable salt thereof. For any of the above uses, the required dosage will vary depending on the mode of administration, the particular condition to be treated and the effect desired.

5. Methods of Inducing Secretion and/or Synthesis GLP-1 in a Cell

In a fifth aspect, there is also provided a method of inducing and/or increasing secretion and/or synthesis and/or activity of GLP-1 in a cell, comprising contacting a cell capable of secreting and/or expressing GLP-1 with an effective amount of a compound, or salt or solvate thereof according to the first aspect, or any embodiment or example thereof and/or oleoyl-LPI or a salt or solvate thereof and/or the pharmaceutical composition of according to second aspect or any embodiment or example thereof.

In some examples of the methods according to the third, fourth and fifth broad aspects described herein, each method may be performed in a subject suffering from or suspected of having or is at a risk of developing a metabolic disorder such as obesity and/or diabetes (e.g., a type 2 diabetes).

6. Uses of Oleoyl-LPI Compounds

In a sixth aspect, there is provided a use of the compound, or salt or solvate thereof according to the first aspect or any embodiment or example thereof, and/or oleoyl-LPI or a salt or solvate thereof and/or the pharmaceutical composition according to the second aspect or any embodiment or example thereof in agonizing and/or a partially agonizing and/or a reverse antagonizing GPR119 in a cell e.g., ex vivo or in vivo. Such uses include, without limitation, those uses identified in section 4 above and in the following section.

In one preferred example, the cell is a pancreatic cell or a cell of the GI tract e.g., the cell is an L-cell or a pancreatic β cell.

In a particular form of the invention the inventive compounds described herein can be used as therapeutic and prophylatic anti atherosclerotic agents, for, atherosclerosis, arteriosclerosis, cardiovascular disease, stroke, cerebrovascular ischemia, heart disease, coronary heart disease, ischemic heart disease, angina and heart attack.

In yet another aspect, there is provided a method of treating or preventing Non-alcoholic fatty liver disease (NAFLD), Non-Alcoholic Steatohepatitis (NASH), fatty liver, liver fibrosis, cirrhosis, hepatocarcinoma (HCC), liver disease related to iron overload disorder, alcoholic liver disease in a subject in need thereof, said method comprising administering to the subject a therapeutically effective amount of the compound, or salt or solvate thereof according to the first broad aspect or any embodiment or example thereof, and/or oleoyl-LPI or a salt or solvate and/or the pharmaceutical composition according to second aspect or any embodiment or example thereof.

NAFLD is one of the types of fatty liver which occurs when fat is deposited (steatosis) in the liver due to causes other than excessive alcohol use. NASH is the most extreme and fast progressing subtype of NAFLD. NAFLD is the most common liver disorder in developed countries.

NAFLD is related to insulin resistance and the metabolic syndrome; a combination of improved diet and exercise appeared to be the most efficient way to manage NAFLD and reduce insulin resistance. It may respond to treatments originally developed for other insulin-resistant states (e.g. diabetes mellitus type 2) such as metformin, and thiazolidinediones. Up to 80% of obese people have the disease and up to 20% normal-weight people might develop it.

NAFLD can cause liver dysfunction related symptoms. NAFLD can be incidentally diagnosed following abnormal liver function tests during routine blood tests or after a hepatic steatosis is detected by biopsy. Indeed, in cases of symptoms or signs attributable to liver disease or when tests show abnormal liver chemistries, NAFLD should be suspected and investigated.

The metabolic syndrome is a chronic disease affecting a growing population of subjects, with expanding socio-economical costs for both developed and developing countries worldwide. NAFLD and NASH are considered as a direct hepatic consequence to this metabolic stressor, with a tight relationship with type 2 diabetes as described in Yach D, et al: *Nature Medicine* 2006; 12:62-66; Marchesini G et al: *Hepatology* 2003; 37:917-923, and Sanyal A J: *Gastroenterology* 2002; 123:1705-1725 the contents of which are herein incorporated by reference in their totality.

In a seventh aspect, there is provided a use of the compound, or salt or solvate thereof according to the first aspect or any embodiment or example thereof, and/or oleoyl-LPI or a salt or solvate thereof and/or the pharmaceutical composition according to the second aspect or any embodiment or example thereof in inducing and/or increasing secretion GLP-1 from a cell and/or inducing and/or increasing synthesis and/or activity of GLP-1 in a cell ex vivo or in vivo. In one such example, the cell is a pancreatic cell or a cell of the GI tract e.g., the cell is an L-cell or a pancreatic β cell.

7. Method of Treating or Preventing a Metabolic Disorder

As compounds or salts or solvates of the invention and therapeutic or pharmaceutical compositions including said compounds or salt or solvates, can ameliorate or prevent metabolic disorders such as those associated with impaired glucose homeostasis e.g., those disorder that mediated by GPR119 activation and/or GLP-1 biosynthesis and/or secretion, the present invention provides treatment or prevention of such disorders, including both pre-treatment (in the case of a medical procedure) and treatment after onset of symptoms of a metabolic disorder or condition has occurred.

In a eighth aspect, there is provided a method of treating or preventing a metabolic disorder in a subject in need thereof, said method comprising administering to the subject a therapeutically effective amount of the compound, or salt or solvate thereof according to the first broad aspect or any embodiment or example thereof, and/or oleoyl-LPI or a salt or solvate and/or the pharmaceutical composition according to second aspect or any embodiment or example thereof.

In one example, the administration of induces and/or increases secretion of GLP-1 from cells of the GI tract in the subject and/or induces and/or increases synthesis and/or activity of GLP-1 in cells of the subject.

In one example, the metabolic disorder is diabetes and/or obesity (e.g., type 2 diabetes). The subject may be suffering from or is at a risk of developing one or more such metabolic disorders.

In a nineth aspect, there is provided a use of a therapeutically effective amount of the compound, or salt or solvate thereof according to the first broad aspect or any embodiment or example thereof, and/or oleoyl-LPI or a salt or solvate and/or the pharmaceutical composition according to second aspect or any embodiment or example thereof in the treatment or prevention of one or more metabolic disorders in a subject in need thereof.

In tenth aspect, there is provided a use of an effective amount of the compound, or salt or solvate thereof according to the first broad aspect or any embodiment or example thereof, and/or oleoyl-LPI or a salt or solvate in the preparation of a medicament for the treatment or prevention of one or more metabolic disorders in a subject in need thereof.

In another aspect, there is provided a use of a therapeutically effective amount of the compound, or salt or solvate thereof according to the first broad aspect or any embodiment or example thereof, and/or oleoyl-LPI or a salt or solvate and/or the pharmaceutical composition according to second aspect or any embodiment or example thereof in agonizing and/or a partially agonizing and/or a reverse antagonizing GPR119 in subject and/or for inducing and/or increasing secretion and/or synthesis of GLP-1 in a subject.

In yet a further aspect, there is provided a use of the compound, or salt or solvate thereof according to the first broad aspect or any embodiment or example thereof, and/or oleoyl-LPI or a salt or solvate and/or the pharmaceutical composition according to second aspect or any embodiment or example thereof in the preparation of a medicament for agonizing and/or a partially agonizing and/or a reverse antagonizing GPR119 in subject and/or for inducing and/or increasing secretion and/or synthesis of GLP-1 in a subject.

In one example, according to any method or use described in any broad aspect hereof, or embodiment or example thereof, the subject is having or suffering from or is at a risk of developing one or more metabolic disorders. For example, the metabolic disorders are selected from obesity, diabetes and a combination thereof. In one preferred example, the diabetes is a type 2 diabetes. In one preferred example, the subject is a human.

In an embodiment of the invention is a method for treatment of a metabolic disorder and/or a metabolic-related disease in an individual comprising administering to the individual in need of such treatment a therapeutically effective amount of a compound of the invention or a pharmaceutical composition thereof.

Metabolic disorders and metabolic-related diseases are selected from, but not limited to, hyperlipidemia, obesity, type 1 diabetes, type 2 diabetes mellitus, idiopathic type 1 diabetes (Type Ib), latent autoimmune diabetes in adults (LADA), early-onset type 2 diabetes (EOD), youth-onset atypical diabetes (YOAD), maturity onset diabetes of the young (MODY), malnutrition-related diabetes, gestational diabetes, atherosclerosis, arteriosclerosis, cardiovascular disease, stroke, cerebrovascular ischemia, heart disease, coronary heart disease, ischemic heart disease, angina and heart attack, Non-alcoholic fatty liver disease (NAFLD), Non-Alcoholic Steatohepatitis (NASH), fatty liver, liver fibrosis, cirrhosis, hepatocarcinoma (HCC), liver disease related to iron overload disorder and alcoholic liver disease, coronary heart disease, ischemic stroke, restenosis after angioplasty, peripheral vascular disease, intermittent claudication, myocardial infarction (e.g. necrosis and apoptosis), dyslipidemia, post-prandial lipemia, conditions of impaired glucose tolerance (IGT), conditions of impaired fasting plasma glucose, metabolic acidosis, ketosis, arthritis, obesity, osteoporosis, hypertension, congestive heart failure, left ventricular hypertrophy, peripheral arterial disease, diabetic retinopathy, macular degeneration, cataract, diabetic nephropathy, glomerulosclerosis, chronic renal failure, diabetic neuropathy, metabolic syndrome, syndrome X, premenstrual syndrome, coronary heart disease, angina pectoris, thrombosis, atherosclerosis, myocardial infarction, transient ischemic attacks, stroke, vascular restenosis, hyperglycemia, hyperinsulinemia, hyperlipidemia, hypertrygliceridemia, insulin resistance, impaired glucose metabolism, conditions of impaired glucose tolerance, conditions of impaired fasting plasma glucose, obesity, erectile dysfunction, skin and connective tissue disorders, foot ulcerations and ulcerative colitis, endothelial dysfunction and impaired vascular compliance.

8. Preparation of a Medicament

In another aspect, there is provided a method for preparing a medicament or a pharmaceutical composition according to the second aspect. The method comprises combining and/or admixing (i) a therapeutically effective amount of oleoyl-LPI or a pharmaceutically acceptable salt or solvate thereof and/or compound of formula I or salt or solvate thereof according to the first broad aspect or any embodiment or example thereof, and (ii) a pharmaceutically acceptance carrier, excipient and/or diluent.

In yet a further aspect, there is provided a method for manufacturing the compound, or salt or solvate thereof according to the first broad aspect or any embodiment or example thereof. In a related further broad aspect, the present invention also provides those compounds, or salts or solvates thereof produced by performing this method.

In another aspect, there is provided a use of a therapeutically effective amount of the compound, or salt or solvate thereof according to the first broad aspect or any embodiment or example thereof, and/or oleoyl-LPI or a salt or solvate thereof in the preparation of a medicament for agonizing and/or a partially agonizing and/or a reverse antagonizing GPR119 in a subject in need thereof and/or for up-regulating activity and/or synthesis and/or secretion of GLP-1 in a subject in need thereof. Preferably, the subject is subject suffering from or suspected of having or is at a risk of developing a metabolic disorder. For example, the metabolic disorder is selected from obesity and diabetes e.g., a type 2 diabetes.

In yet a further aspect, there is provided a use of a therapeutically effective amount of the compound, or salt or solvate thereof according to the first aspect or any embodiment or example thereof, and/or oleoyl-LPI or a salt or solvate thereof in the preparation of a medicament for inducing and/or increasing secretion GLP-1 from a cell and/or inducing and/or increasing synthesis and/or activity of GLP-1 in a cells of a subject in need thereof. Preferably, the subject is subject suffering from or suspected of having or is at a risk of developing a metabolic disorder. For example, the metabolic disorder is selected from obesity and diabetes e.g., a type 2 diabetes.

EXAMPLES

Example 1: Materials and Methods (i) Materials Used

Lipids (Oleoyl, Arachidonyl, Stearoyl and Heptadecenoyl) were purchased from Avanti Lipids. Stocks were dissolved in methanol:chloroform and stored at −20° C. Oleoylethanolamide (OEA), Lysophosphatidylcholine (LPC) and DPP-IV inhibitor (KR-62436), PD98059 were purchase from Sigma and dissolved in DMSO. OEA obtained from Cayman Chemicals, Ann Harbour, US was dissolved in 1% DMSO and used for cAMP experiment. AR-231,453 and Arvanil were obtained from Abcam, and H89 was from Santa Cruz. GeneJET RNA Purification Kit, Maxima Reverse Transcription Kit and Maxima SYBR Green/ROX qPCR Master Mix Kit were all purchased from Thermo Scientific.

(ii) Culturing of NCI-H716 and Glutag

NCI-H716 cells were maintained in 75 $cm^2$ tissue culture flasks (Corning) in RPMI 1640 media containing 2.0 mM L-glutamine, 1.5 g/L sodium bicarbonate, 10 mM HEPES buffer, 1.0 mM sodium pyruvate, and 4.5 g/L glucose and supplemented with 10% FBS at a 37° C. and 5% $CO_2$. When plating for experiment, cell adhesion and endocrine differentiation were initiated by growing cells in dishes coated with growth factor reduced Matrigel diluted at the ratio of 1:2 (Becton Dickinson, Bedford, MA) in high-glucose DMEM, 10% FBS, 2 mM glutamine, 100 IU/ml penicillin, and 100 µg/ml streptomycin as described previously by De Bruine, a P., Dinjens, W. N., van der Linden, E. P., Pijls, M. M., Moerkerk, P. T., & Bosman, F. T. (1993) *The American Journal of Pathology*, Vol 142(3), pp 773-782, the disclosure of which is incorporated herein in its entirety by reference.

Glutag cells were maintained in low glucose DMEM (Sigma) (1 g/L) containing 2.0 mM L-glutamine, 1.0 mM sodium pyruvate and supplemented with 10% FBS, 100 IU/ml penicillin, 100 µg/ml streptomycin at a 37° C. and 5% $CO_2$.

COS-7 cells were cultured in Dulbecco's modified Eagle medium (DMEM) 1885 supplemented with 10% FBS, 26 mg/ml L-glutamine and 180 IU/ml penicillin+45 µg/L streptomycin (Pen Strep) (Life Technologies, CA, USA) at 37° C. and 10% $CO_2$. The COS-7 cells were transiently transfected with GPR119 or pcDNA by the calcium phosphate transfection method for 5 hours in 37° C., 10% $CO_2$ as described by Kissow H, Hartmann B, Hoist J J, Viby N E, Hansen L S, Rosenkilde M M, Hare K J, Poulsen S S. Regul Pept. 2012. Vol: 179(1-3), pp 91-100; the disclosure of which is incorporated herein in its entirety by way of reference.

(iii) siRNA Transfection (a) Transfection of Adherent Cells (Glutag)

Transfection was performed according to the "Lipofectamine transfection protocol" (Invitrogen, Life Technologies) and optimised for a 6-well plate format. Briefly, cells were plated in complete growth medium at a density of $3.0 \times 10^5$/well in a 6-well plate and incubated at 37° C./5% $CO_2$. Twenty-four hours later, when cells were ~60% confluent, transfection was performed in RNAse-free conditions. 300 nM of total siRNA pool and 4.0 µl of Lipofectamine transfection reagent were diluted in separate tubes in Optimem and incubated for 5 min at room temperature (RT). The contents of the tubes were carefully mixed and incubated again for 20 min at RT. Cells were washed twice with sterile 1×PBS and incubated in 300 µL of Optimem. After 20 min, transfection complexes were added to the cells drop wise. Cells were then incubated for 4 hours before adding Optimem containing 30% serum without antibiotic. Cells were further incubated at 37° C./5% $CO_2$ for 48 h before secretion experiment. The transfected cells were harvested at the appropriate time point for protein expression analysis (between 2 and 4 days post transfection).

(b) Transfection of Suspension Cells (NCI-H716)

Transfection was performed according to the "Lipofectamine 2000 transfection protocol" (Invitrogen, Life Technologies) and optimised for a 6-well plate format. Briefly, about 300,000 cells were transfected in a 6-well plate coated with growth factor reduced Matrigel and incubated at 37° C., 5% $CO_2$. Transfection complexes were prepared by diluting 300 nM of siRNA in 150 µL Optimem and 4.5 µL of Lipofectamine 2000 (Invitrogen, Life Technologies) in 150 µL Optimem in separate tubes. The diluted siRNA and transfection reagent were then incubated for 5 min at RT. The contents of the tubes were carefully mixed and incubated again for 25 min at RT to allow Lipofectamine-siRNA complex formation before adding it to the cells. The plate was incubated at 37° C. in a 5% $CO_2$ incubator for 48 hours before experiment. After 12 hours of incubation, the transfected cells were collected and plated on growth factor reduced Matrigel at the density of $2.5 \times 10^4$/well in a 24-well plate and incubated at 37° C., 5% $CO_2$.

(c) Transfection siRNA Sequences Used

The human and murine siRNA sequences shown in Table 1 were used for all transfection experiments.

TABLE 1

Sequences for human (H) and murine (M) siRNA agaist GPR119 and GPR55 used in transfection experiments.

| siRNA | Target sequence |
|---|---|
| siRNA (H) GPR119 | UCAAAGCUCUCCGUACUGU, ACAGGUACCUUGCCAUCAA CCACUCAUCUAUGCCUAUU, ACCUAGUGCUGGAACGGUA (SEQ ID NO: 1) |
| siRNA(H) GPR55 | GAAUUCCGCAUGAACAUCA (SEQ ID NO: 2) |
| SIRNA (M) GPR55 | ACAGGGAAGUGGAGAGAUA (SEQ ID NO: 3) |
| SIRNA (M) GPR119 | CCUAUCACAUCGUCACUAU, UAACUAGCAUUGUGCAGGU UAUCUUACCUUAUCGGCUU, GGCCGUGGCUGAUACCUUG (SEQ ID NO: 4) |

Transfection efficiency was quantified by real-time RT-PCR. In brief, total RNA was extracted from GLUTag and NCI-H716 cells using a GeneJET RNA Purification Kit, according to the manufacturer's instructions and subjected to reverse transcription using Maxima Reverse Transcription Kit followed by real-time PCR using Maxima SYBR Green/ROX qPCR Master Mix Kit. GAPDH was used as normalisation control.

(iv) Protein Analysis by Western Blot Technique (a) Cell Extraction

When cell cultures reached 80-90%, media were removed and cells were washed twice with 1×PBS. The cells were lysed in 150 µl (for one well of a 6 well plate) of Triton X-100 lysis buffer, containing phosphatase inhibitor cocktail (1:1000) (Sigma Aldrich, UK) and protease inhibitor (1:1000, Sigma Aldrich, UK). Cells were detached with scrapers and lysate were collected and centrifuged at 10,000 rpm, 4° C. for 5 minutes. The supernatant was then transferred to a 1.5 ml microcentrifuge tube and used for protein quantification. Cell lysates were stored at −20° C. for longer storage. All lysates were prepared on ice.

(b) Immunoblotting and Visualisation

Non-specific antibody binding was prevented by incubating the nitrocellulose membrane in 5% milk in PBS-0.05% Tween-20 (v/v) for 30 minutes on a rotating plate. The membrane was then washed in PBS-0.05% Tween-20 (v/v) and then incubated with the primary antibody diluted in PBS-0.05% Tween-20 (v/v) on a rotating plate overnight at 4° C. After 24 hours, the membrane was washed 5× for 5 minutes with PBS-0.05% Tween-20 (v/v), and then incubated on a rotating plate with the appropriate secondary antibody for 1 hour at room temperature. Primary antibodies used were: GPR119 anti-goat (1:500) from Santa Cruz Biotechnology, GPR55 anti-rabbit from Cayman Chemical, Tubulin anti-mouse (1:10000) from Sigma-Aldrich, phospho-ERK, Active β-catenin from Cell Signaling and phosphor-CREB from R&D System Inc. The membrane was then washed with PBST, dried on filter paper followed by incubation with ECL Prime solution (Amersham Bioscience, UK) or with Immobillon Western Chemiluminescent HRP substrate (Merck Millipore, UK) for 5 minutes, placed in a cassette and exposed to a chemiluminescence film.

(v) Total RNA Extraction

Total RNA was extracted from the cells using GeneJET RNA Purification Kit according to the manufacturer's instructions. Briefly, cell pellets were re-suspended in 600 µl of lysis buffer supplemented with β-mercaptoethanol, vortexed for at least 10 seconds, and 360 µl of 100% ethanol was added to the cells and mixed by pipetting. 700 µl of the cell lysate was transferred in the GeneJET RNA purification column inserted in a collection tube, centrifuged for 1 minute for 12,000 rpm and the flow-through was discarded. Then, 700 µl of wash buffer 1 supplemented with ethanol was added in the purification column, centrifuged for 1 minute at 12,000 rpm and the flow-through was discarded. 600 µl of wash buffer 2 supplemented with ethanol was added in the purification column, centrifuged for 1 minute at 12,000 rpm, and then further 250 µl of wash buffer 2 was added in the purification column and centrifuged for 2 minutes at 12,000 rpm. Finally, 100 µl of nuclease free water was added in the purification column, centrifuged for 1 minute at 12,000 rpm in order to elute the RNA. The RNA product was then used for cDNA synthesis or stored at −80° C. until use. The cDNA synthesis was performed on ice according to manufacturer's instructions.

(vi) Real Time Quantitative Polymerase Chain Reaction (RT-qPCR)

RT-qPCR was performed according to manufacturer's instructions (Cat. No. K0222, Fermentas). Briefly, about 100 ng of cDNA was mixed with 7.5 µl of 2× Maxima SYBR green/Fluorescein qPCR mix, 1 µl of forward and reverse primers (10 µM stock) to a final volume of 15 µl. GADPH cDNAs were also amplified as an internal control. All experiments were performed in triplicate. The data were collected at the extension step. The relative changes in gene expression quantification were calculated using the relative ddCT analysis mode of the ABI 7500 Real-Time PCR system software.

The primer pairs used were based on published sequence for human and mouse GPR119 (Lauffer, L. M., Iakoubov, R., & Brubaker, P. L. (2009). *Diabetes*, Vol 58 (May), pp 1058-1066; Soga, T., Ohishi, T., Matsui, T., Saito, T., Matsumoto, M., Takasaki, J., Furuichi, K. (2005), *Biochemical and Biophysical Research Communications*, Vol 326(4), pp 744-751, the disclosures of which are incorporated herein by reference in their entirety).

Sequence for human and animal GPR55 were described by (Ryberg et al., 2007) from 5' to 3' as:

```
a. GPR119 (Human) forward:
                              (SEQ ID NO: 5)
TCTGGTCAGCCCAACTCTCT;

b. GPR119 (Human) reverse:
                              (SEQ ID NO: 6)
CACGTGGGCATCCTCTTTTA;

c. GPR119 (Mouse) forward:
                              (SEQ ID NO: 7)
TGATGGTGTTGGCCTTTGCTTCAC;

d. GPR119 (Mouse) reverse:
                              (SEQ ID NO: 8)
TGGTAAAGGCAGCATTTGTGG CAG;

e. GPR55 (Human) forward:
                              (SEQ ID NO: 9)
GTTTCCATGGGAAAGTGGAA;

f. GPR55 (Human) reverse:
                              (SEQ ID NO: 10)
GGAAGGAGACCACGAAGACA;

g. GPR55 (Mouse) forward:
                              (SEQ ID NO: 11)
CTATCTACATGATCAACTTGGCTGTTT;

h. GPR55 (Mouse) reverse:
                              (SEQ ID NO: 12)
TGTGGCAGGACCATCTTGAA;

i. GAPDH (Human) forward:
                              (SEQ ID NO: 13)
AGGGCTGCTTTTAACTCTGGT;

j. GAPDH (Human) reverse:
                              (SEQ ID NO: 14)
CCCCACTTGATTTTGGAGGGA;

k. GAPDH (Mouse) forward:
                              (SEQ ID NO: 15)
GCACAGTCAAGGCCGAGAAT;
and l. GAPDH (Mouse) reverse:
                              (SEQ ID NO: 16)
GCCTTCTCCATGGTGGTGAA.
```

Other siRNA human and murine sequences used include:

```
a. siRNA Human GPR119 #1:
                              (SEQ ID NO: 17)
CTCCCTCATCATTGCTACTAA.

b. siRNA Human GPR119 #2:
                              (SEQ ID NO: 18)
CGGGCTGTGGTTAGTGTCTTA.

c. siRNA Human GPR119 #3:
                              (SEQ ID NO: 19)
CAGTCTCTGCTTCACCTTGAA.

d. siRNA Human GPR119 #4:
                              (SEQ ID NO: 20)
CAGGAGTGTCACCTCTACCTA.

e. siRNA Murine GPR119 #5:
                              (SEQ ID NO: 21)
CCGTTACTTCCAGATCATGAA.

f. siRNA Murine GPR119 #6:
                              (SEQ ID NO: 22)
CTGAGCCTATAGCACATCTAA.
```

-continued

```
g. siRNA Murine GPR119 #7:
                            (SEQ ID NO: 23)
TGGCCTTTGCTTCACCTTGAA.

h. siRNA Murine GPR119 #8:
                            (SEQ ID NO: 24)
TTCTCCCTAGATGAAGTATTA.
```

(vii) Primary Cell Study

Mice were euthanized, and 5 cm of colon were used for isolation of epithelial cells following as previously described by Reimann, F., Habib, A. M., Tolhurst, G., Parker, H. E., Rogers, G. J., & Gribble, F. M. (2008), *Cell Metabolism*, Vol 8(6), pp 532-539, the disclosure of which is incorporated herein by reference in its entirety. Briefly, colon segments were dissected from 10 week-old C57BL/6 male mice. Segments were cut open longitudinally and washed quickly in DMEM (serum-free) to remove luminal contents. Colon was chopped into about 1-2 mm pieces and digested with about 0.5 mg/ml collagenase-P for 15 min. Resulting cell suspensions were filtered through 70 μm nylon cell strainers (BD Falcon, UK), centrifuged at 300 g for 5 min, and pellets re-suspended in DMEM supplemented with 10% FBS. The purified cells were collected and cultured on 24-well Matrigel-coated plates at 37° C. in DMEM (25 mM glucose), 10% FBS, 2 mM L-glutamine, 1% penicillin/streptomycin. On the day of GLP-1 assay, cells were washed twice with PBS, and then treated with LPI or vehicle Methanol: Chloroform, (M:C), v/v for 2 h at 37° C. Supernatants were collected for GLP-1 quantification using the active GLP-1 ELISA kit from Millipore.

After euthanasia, pancreatic islets were isolated as described in detail elsewhere (Carter, J. D., S. B. Dula, K. L. Corbin, R. P. Wu and C. S. Nunemaker (2009), *Biological Procedures Online*, Vol 11(1), pp:3-31). Following purification, islets were rested overnight at 37° C. in a humidified atmosphere of 95% air and 5% CO2 in RPMI 1640 medium supplemented with 10% FBS, 100 units/ml penicillin and 0.1 mg/ml streptomycin.

(viii) Secretion Studies

Approximately 80,000 Glutag cells were plated in poly-L-lysine-coated 24-well culture plates and grown to about 80% confluence. NCI-H716 cells were seeded on growth factor reduced Matrigel™ (Becton Dickinson, Bedford, MA) in DMEM medium, supplemented with 10% FBS the day before the experiment. For NCI-H716 cells, approximately 25,000 cells were needed for this secretion experiment in order to have good stimulation with lower basal GLP-1 secretion. In brief, Glutag and NCI-H716 cells were washed twice and then incubated for 2 h with FBS-free DMEM containing 1% (M:C) alone (negative control), 10 μM forskolin as positive control (Sigma-Aldrich), or with different concentrations of Oleoyl-LPI. M:C was used as a solvent to prepare stock solutions of fatty acid derivatives and inhibitors. For secretion experiments, medium and cells were collected separately.

In separate studies, GLUTag or NCI-H716 cells were pre-treated for 1 hour with medium alone (1% DMSO, negative control), PD98059 (50 μM; Sigma Chemical Co.), H89 (10 μM; Santa Cruz) followed by treatment with oleoyl-LPI (20 μM), OEA (10 μM), AR231453(1 μM), PMA (10 μM) or forskolin (10 μM, positive control) in the presence of inhibitors, as appropriate, for about 2 h. Medium GLP-1 secretion was calculated as total GLP-1 content of medium normalised for the basal secretion of the control.

Glucose-stimulated insulin secretion (GSIS) was performed on isolated mouse islets after resting them overnight in supplemented RPMI 1640 medium at 37° C. in a humidified atmosphere of 95% air and 5% $CO_2$. Briefly, islets were hand-picked and placed in groups of five into individual micro centrifuge tubes. Islets were washed twice, then incubated with Krebs buffer (KRB, 115 mM NaCl; 4.7 mM KCl; 1.28 mM $CaCl_2·2H_2O$; 1.2 mM $KH_2PO_4$; 1.2 mM $MgSO_4·7H_2O$; 10 mM $NaHCO_3$; 10 mM HEPES; 0.5% BSA; pH 7.4) supplemented with 1.1 mM glucose for 40 minutes at 37° C. Supernatants were discarded, then islets were incubated with KRB supplemented with 16.7 mM glucose for 20 minutes. Supernatants were collected for insulin determination using Mouse Ultrasensitive Insulin ELISA (Mercodia, Uppsala, Sweden) according to manufacturer instructions and data was reported as picograms of Insulin per islet in 20 minutes (pg/islet/20 min).

(ix) cAMP Assay

COS-7 cells were transfected with about 40 μg GPR119 DNA or pcDNA3 per 175 $m^2$ flask. One day after transfection, the cells were seeded out (about 35,000 cell/well) in a 96 well white plate (Perkin Elmer, Massachusetts, USA). The cells were washed twice the following day and incubated for 30 min, at 37° C. with HBS and 1 mM IBMX (Sigma Aldrich, USA). Agonists were added for 30 min in the assay medium. The Hithunter® cAMP XS+ (DiscoveRx, Fremont, USA) was carried out by following the manufacturer's instructions.

Example 2: Oleoyl-LPI Enhances Secretion of GLP-1 in In Vitro and Ex-Vivo Preparations In order to investigate the role of different LPI species in enteroendocrine cells, murine (Glutag) and human (NCI-H716) L-cells were stimulated with the following different species of LPI: Arachidonyl-LPI, Stearoyl-LPI, Heptadecenoyl-LPI and oleoyl-LPI, as well as with OEA and LPC. Experiments were performed in duplicate, n=4 and the level of total GLP-1 was measured by ELISA. The results are shown in FIG. 1A and FIG. 1B.

In this experiment, OEA and LPC were used as a comparison to LPI due to its proposed role in secretion of GLP-1. Forskolin and PMA have been reported to potently enhances GLP-1 release in Glutag cells and NCI-H716 and as such were chosen as positive control in this experiment.

Figure 1B:
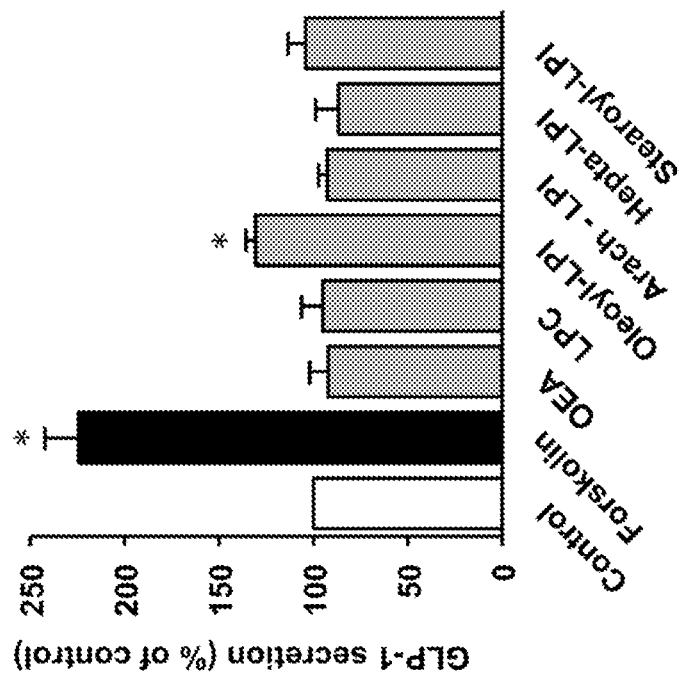

As shown in FIGS. 1A and 1B, oleoyl-LPI significantly stimulated GLP-1 secretion to 126±5% in Glutag cells and 124±7.4% in NCI-H716 cells. Interestingly, the results obtained herein indicate that oleoyl-LPI stimulated GLP-1 release by Glutag and NCI-H716 cells is higher than OEA which has been previously reported to be able to induce GLP-1 released in these cells.

Figure 1C:
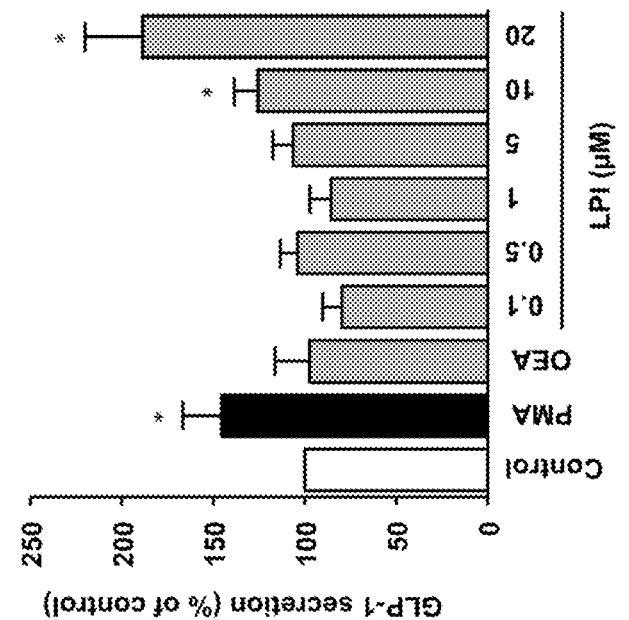
Figure 1D:
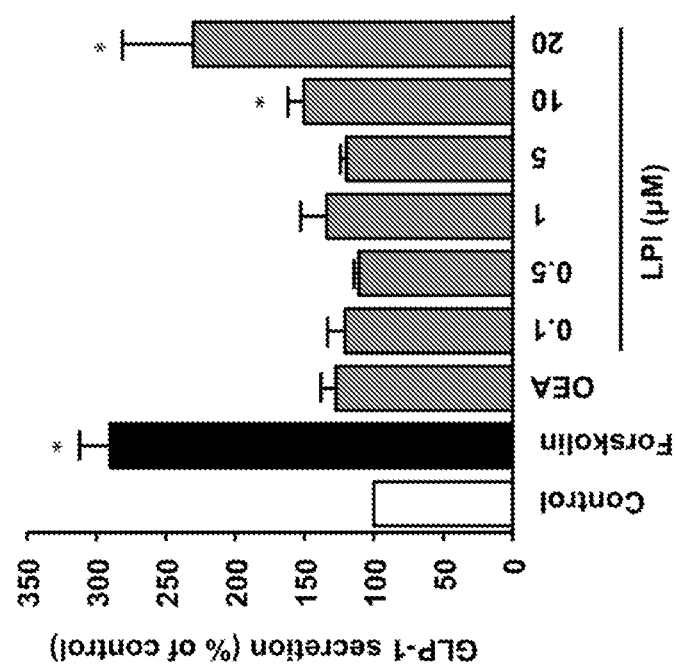

The inventors next investigated the effect of different oleoyl-LPI concentration on GLP-1 secretion in both Glutag and NCI-H716 cell lines. Results of dose response experiments as shown in FIG. 10 and FIG. 1D demonstrate that oleoyl-LPI is able to stimulate GLP-1 release when used for example at a concentration of 10 μM and 20 μM (se FIGS. 1C and D).

Taken together, these data demonstrate that oleoyl-LPI is the specific species of LPI that is responsible for enhancing GLP-1 secretion from L-cells.

Example 3: Oleoyl-LPI Induces GLP-1 Secretion in Glucose Independent Manner

Earlier studies suggested that glucose could stimulate GLP-1 secretion in dose-dependent manner. However, the absence of any observed GLP-1 secretion induced by OEA in the above example has triggered the inventors to investigate whether different glucose concentrations in secretion would have an effect on GLP-1 release induced by OEA or oleoyl-LPI.

Figure 2B:
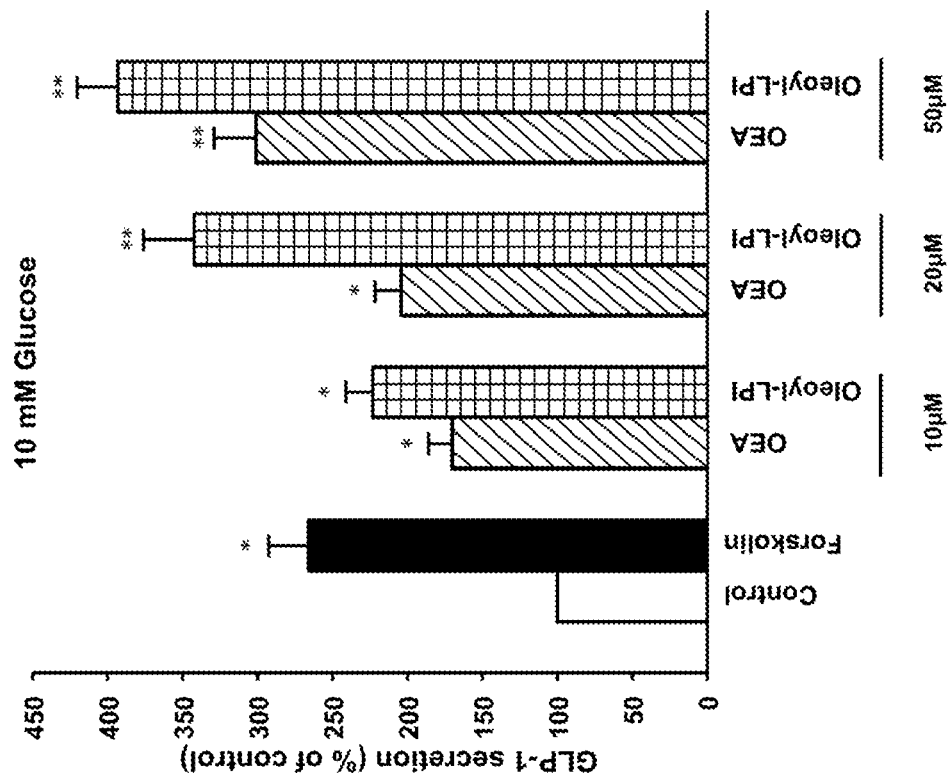
FIG. 2 is a graphical representation demonstrating that oleoyl-LPI induces GLP-1 secretion in glucose independent manner. Panels A and B show results of dose response of GLP-1 release in different glucose concentration of 5 mM (panel A) and 10 mM (panel B). The dose response of GLP-1 released was normalised of number of cells measured in parallel. Glutag and NCI-H761 cells were incubated with vehicle alone, oleoyl-LPI, OEA, LPC forskolin (10 µM) and PMA (1 µM) as positive control for 2 hours. Results were normalised as percentage of cell treated with vehicle (control). For panels A and B data are shown as means±SEM of n=3 from independent experiments performed in duplicates. Student t-test: *p<0.05, **P<0.01. Panel C show results of dose response of GLP-1 release in a glucose concentration of 20 mM.
Figure 2A:
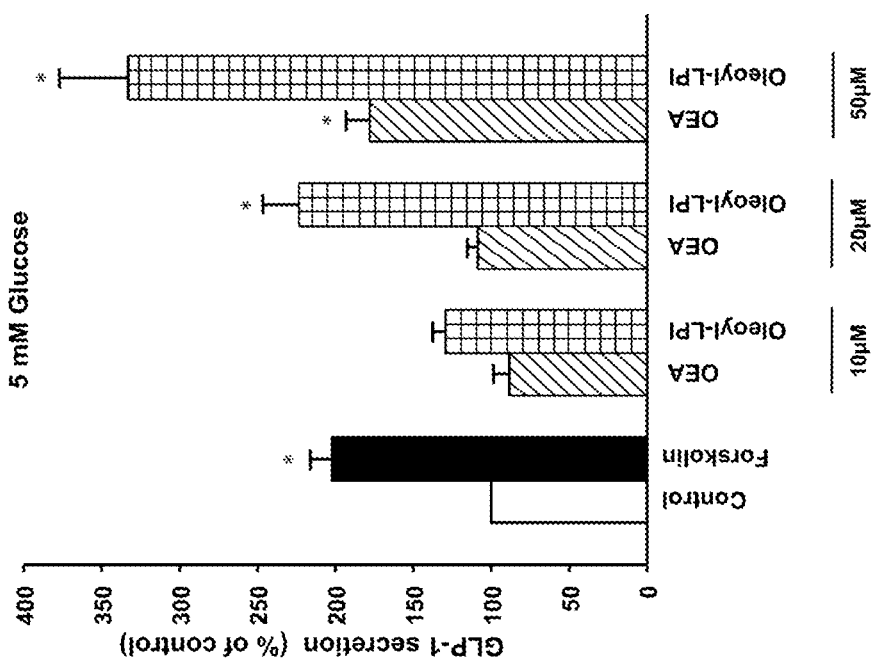
Figure 2C:
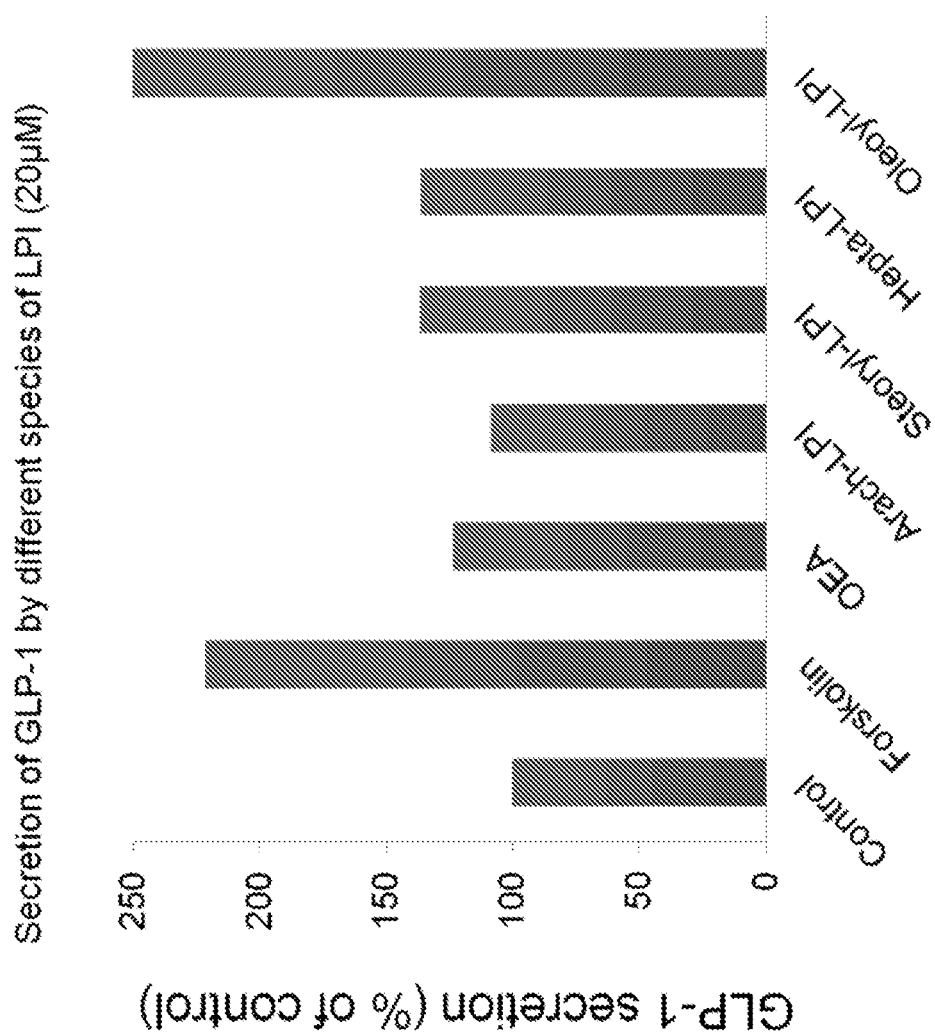

To determine the effect of glucose in oleoyl-LPI induced GLP-1 secretion, the inventors conducted dose-response experiment in the presence of 5 mM and 10 mM glucose in the secretion medium with the results outlined in FIG. 2A and FIG. 2B. The results obtained demonstrate that at 5 mM glucose, OEA is only able to stimulate GLP-1 secretion in higher concentration (50 µM) (178±15%). In contrast, oleoyl-LPI dose dependently increased GLP-1 secretion in culture media, 10 µM (126±8%), 20 µM (223±23%) and 50 µM (333±45%), see FIG. 2A. Also, at 10 mM glucose, OEA dose-dependently stimulate GLP-1 secretion in similar manner of oleoyl-LPI, see FIG. 2B.

Taken together, these data indicate that oleoyl-LPI induces GLP-1 secretion in glucose independent manner.

Example 4: Oleoyl-LPI Induced Secretion of GLP-1 is not Regulated by GPR55

Previous studies have identified LPI as endogenous ligand for GPR55 and which may play a role in gut motility and satiety. Although GPR55 is abundantly located along GI tract, the role of GPR55 in GLP-1 regulation has never before been studied. The inventors' finding shown in the above examples that oleoyl-LPI induces secretion of GLP-1, also triggered the inventors to investigate whether this specific species of LPI (i.e., oleoyl-LPI) is able to activate GPR55 in order to stimulate the GLP-1 release.

To investigate the relationship between oleoyl-LPI and GPR55 in secretion of GLP-1, GLUTag and NCI-H716 cells were transfected with specific GPR55 siRNA or scrambled siRNA (control). The effect of down-regulation of GPR55 was assessed at the protein level by Western blot analysis (FIGS. 3A and B) and resulting in substantial knockdown of 80% GPR55 mRNA in Glutag cells (FIG. 3E) as determined by real-time RT-PCR. Densitometry analysis results clearly demonstrated the downregulation of GPR55 proteins (FIGS. 3C and D).

Figure 3G:
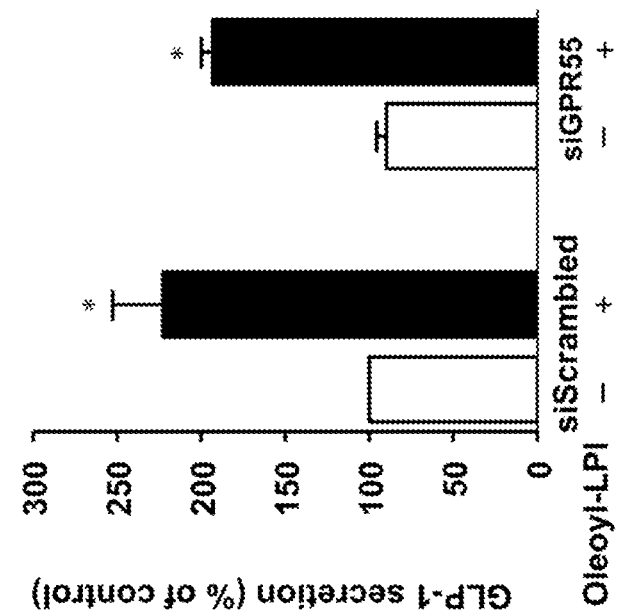
FIG. 3 is a graphical representation demonstrating that oleoyl-LPI induces secretion of GLP-1 is not regulated by GPR55. Panels A and B) demonstrate representative Western blot analysis showing the down-regulation of GPR55 in Glutag and NCI-H716-H716 cells at 48 hours post transfection. Tubulin was used as loading control. Panels C and D) show results of densitometry analysis of the protein expression. Panel E) shows mRNA levels of transfected Glutag cells with siRNA. Panels F and G) demonstrate the effect of transfected cells on GLP-1 released when treated with oleoyl-LPI (20 µM). Glutag and NCI-H761 cells were incubated with the vehicle alone and oleoyl-LPI for 2 hours. GLP-1 release was normalised to number of cells measured in parallel on the same day. Panels H and I) show results of secretion of GLP-1 by mixed primary colonic culture from wild type mice and GPR55$^{-/-}$ upon stimulation with oleoyl-LPI. All results shown were normalised to percentage of protein concentration of cell treated with vehicle (control). Data are shown as means±SEM of n=3 from independent experiments performed in duplicates. Student t-test: *p<0.05.
Figure 3F:
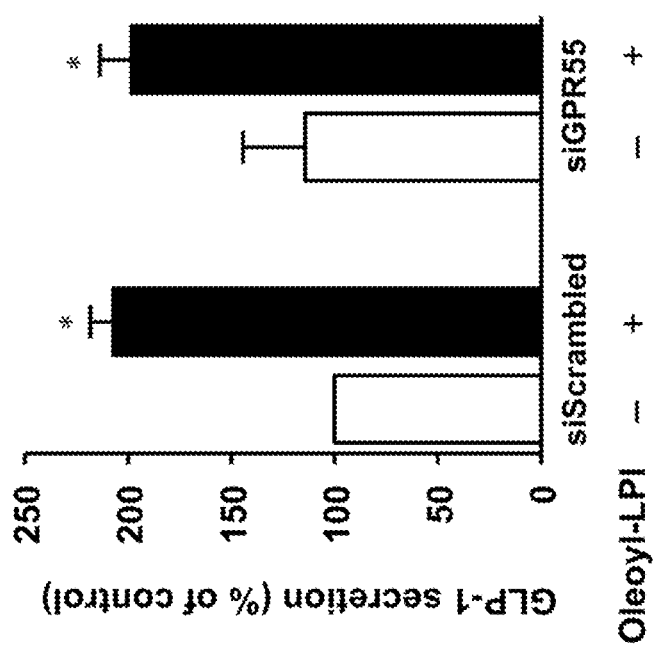

The transfected cells were then treated with oleoyl-LPI in order to assess the effect of the down-regulation of GPR55 on GLP-1 secretion, with the results shown in FIG. 3F and FIG. 3G. In this secretion experiment, transfected cells were still capable of releasing a substantial level of GLP-1 when treated with Oleoyl-LPI for 2 hours. There are no different between GLP-1 secretion in scrambled and siGPR55 transfected cells. These results demonstrate that down-regulation of GPR55 in Glutag and NCI-H761 cells has no effect on GLP-1 secretion when treated with oleoyl-LPI.

Figure 3I:
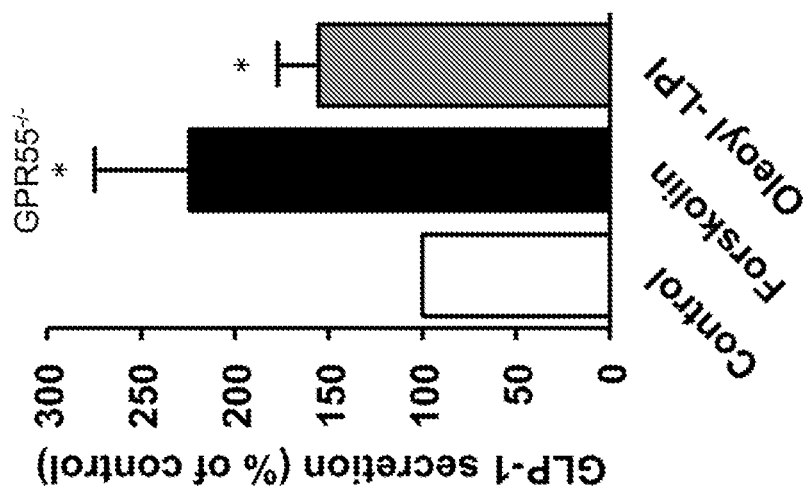
Figure 3H:
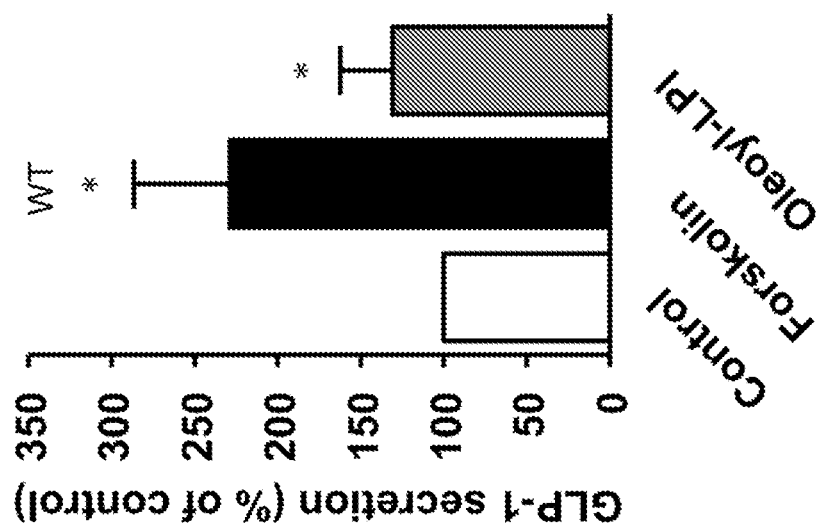

To further validate the lack of effect of GPR55 on the GLP-1 secretion when treated with oleoyl-LPI, the inventors investigated the effects oleoyl-LPI has on primary culture of mixed colonic preparations from wild type and GPR55$^{-/-}$ mice. Mixed colonic preparation method for GLP-1 secretion was employed as previously described by Diakogiannaki, E., Pais, R., Tolhurst, G., Parker, H. E., Horscroft, J., Rauscher, B., Reimann, F. (2013), *Diabetologia*, Vol 56(12), pp 2688-96; Psichas, A., Sleeth, M. L., Murphy, K. G., Brooks, L., Bewick, G. A., Hanyaloglu, a C., Frost, G, *International Journal of Obesity* (2015) 39(3): 424-9; and Tolhurst, G., Zheng, Y., Parker, H. E., Habib, A. M., Reimann, F., & Gribble, F. M. (2011), *Endocrinology*, Vol 152(2), pp 405-13; the disclosures of each of these references are hereby incorporated herein in their entirety by reference. The results are provided in FIG. 3H and FIG. 3I. As shown, two hours treatment of mixed colonic preparation with oleoyl-LPI significantly increased GLP-1 levels to 131±32% form the basal secretion in wild type mice (FIG. 3H). Similar results were obtained when primary cells from GPR55−/− mice were used (FIG. 3I).

Taken together, these data confirm that GLP-1 induced secretion by oleoyl-LPI is not regulated by GPR55.

Example 5: GPR119 Mediates Oleoyl-LPI Induces GLP-1 Secretion from L-Cells as Well as Insulin Secretion from Pancreatic n-Cells To determine the potential role of GPR119 in oleoyl-LPI stimulated GLP-1 release, Glutag and NCI-H716 cells were transiently transfected with siRNA's directed to GPR119 and subjected to secretion assay, as outlined in Example 1.

The transfected cells were then treated with oleoyl-LPI in order to assess the effect of the down-regulation on GLP-1 secretion (FIGS. 4E, 4F, 4G and 4H).

Treatment with oleoyl-LPI on the siGPR119-transfected cells significantly reduced the GLP-1 secretion to the basal level.

Figure 4B:
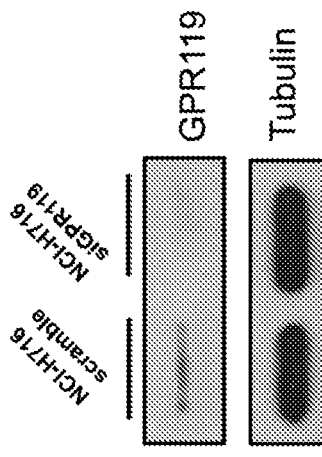
FIG. 4 is a graphical representation demonstrating that GPR119 mediates oleoyl-LPI induced GLP-1 secretion from L-cells as well as Insulin secretion from pancreatic β-cells. Panels A and B) provide representative Western blot analysis results showing the down-regulation of GPR119 in Glutag and NCI-H716 at 48 hours post transfection. Tubulin was used as loading control. Panel C) provides results of the densitometry analysis of down-regulation of GPR119 proteins. Panel D) demonstrates that mRNA level of GPR119 was also down-regulated in Glutag cells. Panels E and F) demonstrate the effect of transfected cells on GLP-1 released when treated with oleoyl-LPI (20 µM). Glutag cells (panel E) and NCI-H761 cells (panel F) were incubated with the vehicle alone and oleoyl-LPI for 2 hours. GLP-1 release was normalised to number of cells measured in parallel on the same day. Data are expressed as percentage over untreated and are shown as means±SEM of n=3 from independent experiments performed in duplicates. Student t-test: *p<0.05. Panel G) shows the effects of oleoyl-LPI on primary culture of mixed colonic preparation from wild type and GPR119$^{-/-}$ mice, whereby oleoyl-LPI was unable to induce GLP-1 release in GPR119$^{-/-}$ mice compared to their wild type (normal) control. Panel H) demonstrates evaluation of the ability of pancreatic islets cell (i.e., pancreatic β cells) isolated from wild type and GPR119$^{-/-}$ mice to secrete insulin in response to oleoyl-LPI in the presence of glucose. Following isolation, pancreatic islets were rested overnight. GSIS experiments were performed incubating islets with 16.7 mM of glucose in the presence or absence of oleoyl-LPI (20 μM) for 20 minutes. Data represent means±SEM; n=3 GPR119$^{-/-}$ and n=4 WT animals; **p<0.01. The results in panel H demonstrate that oleoyl-LPI can enhance acute insulin secretion by approximately 50% in the presence of 16.7 mM of glucose. GPR119$^{-/-}$ islets completely lost the ability to respond to oleoyl-LPI stimulation, indicating that expression of GPR119 in pancreatic islets is necessary for oleoyl-LPI stimulation of insulin secretion.
Figure 4D:
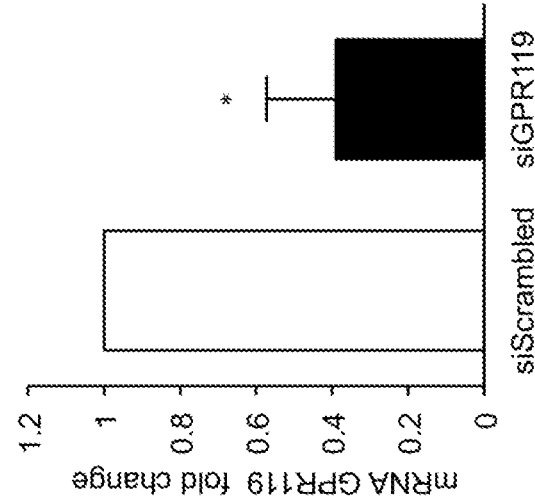
Figure 4A:
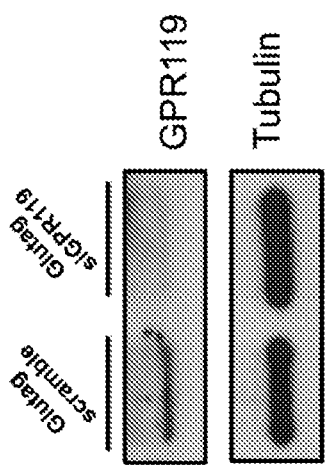
Figure 4C:
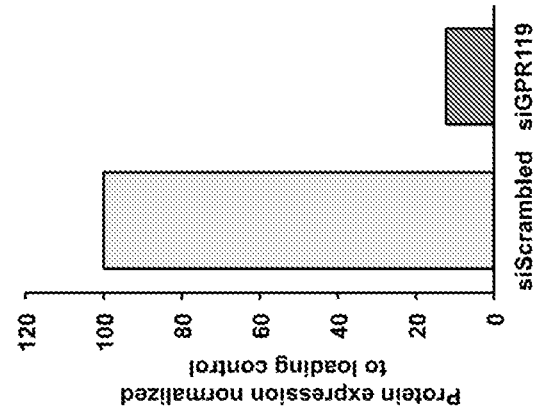
Figure 4F:
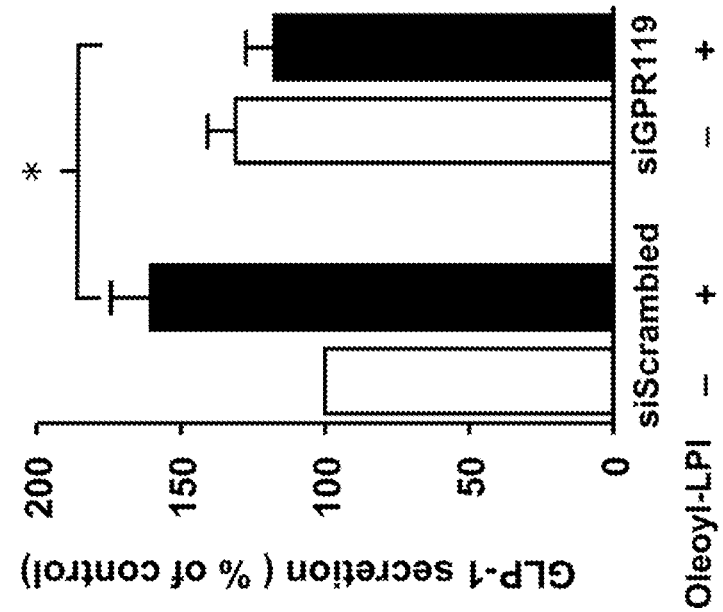
Figure 4E:
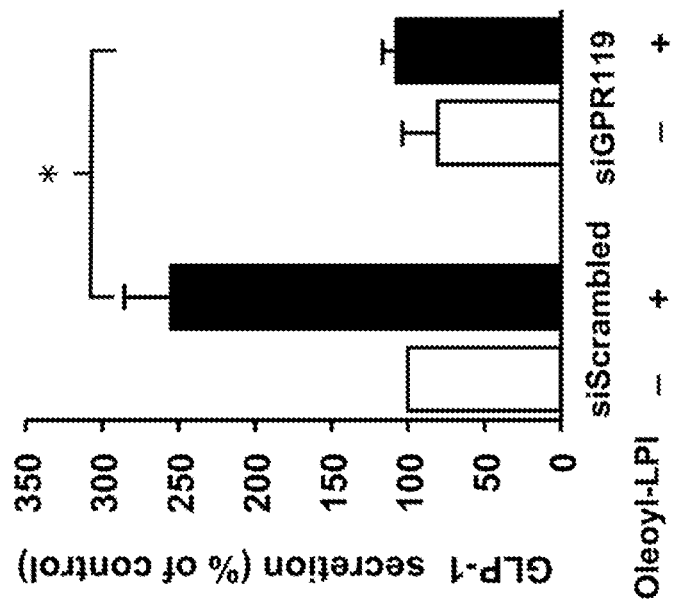

Specifically, a Western blot analysis indicated down-regulation of GPR119 in these cells (see FIG. 4A and FIG. 4B). Similarly, the corresponding densitometry analysis also demonstrated downregulation of GPR119 proteins in Glutag cells (see FIG. 4C) which also confirmed by mRNA analysis (see FIG. 4D). The siRNA was able to reduce the level of GPR119 mRNA by 80% after 48 h incubation in Glutag cells (see FIG. 4D).

Figures 4G, 4H:
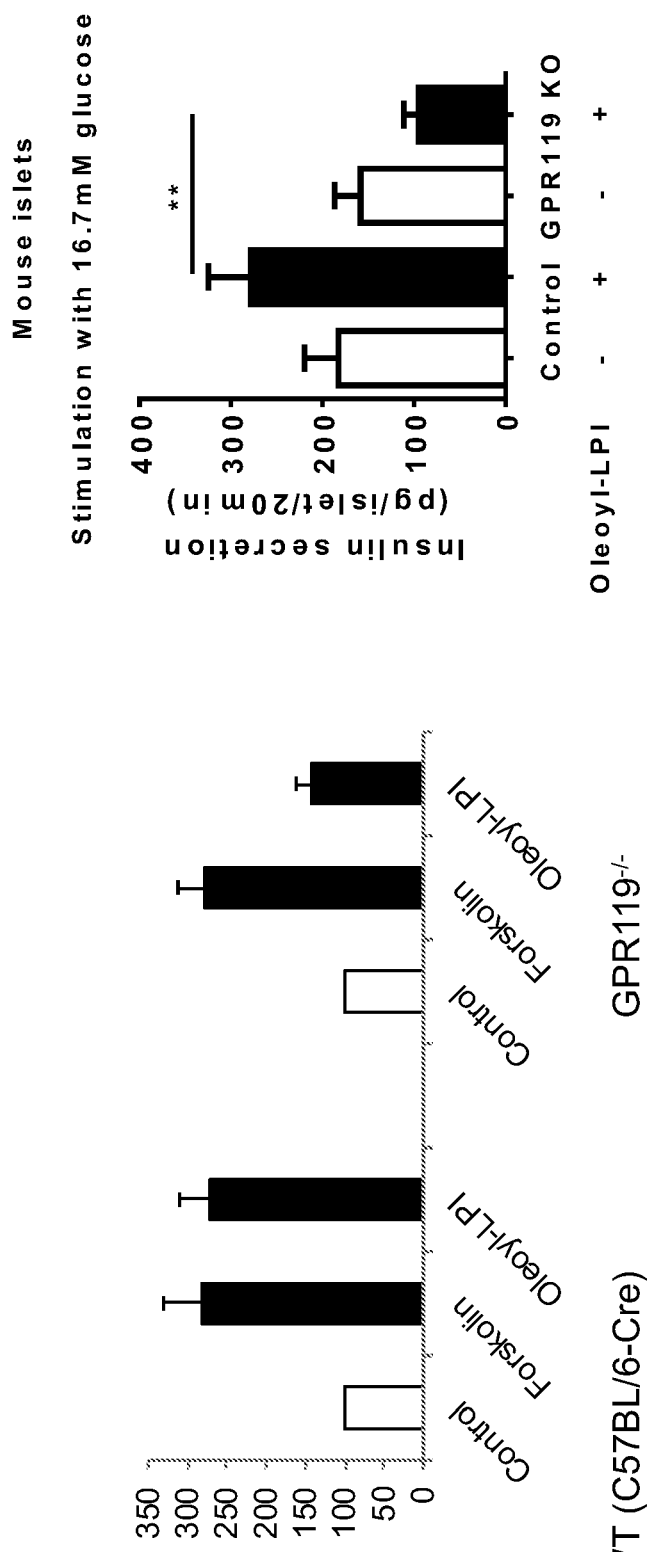

The effects of oleoyl-LPI on primary culture of mixed colonic preparation from wild type and GPR119$^{-/-}$ mice was then investigated. Interestingly, oleoyl-LPI was unable to induce GLP-1 release in GPR119$^{-/-}$ mice compared to their wild type control (FIG. 4G).

Together, these data demonstrate that, down-regulation of GPR119 in Glutag and NCI-H716 cells and absence of GPR119 expression in mice is able to impair the Oleoyl-LPI-induced GLP-1 secretion.

LPI was previously shown to directly stimulate insulin secretion from pancreatic β-cells (Metz, S. a. (1986), *The Journal of Pharmacology and Experimental Therapeutics*, Vol:238(3), pp:819-32) and more recently it has been reported that this LPI effect is GPR55-independent (Liu B, Song S, Ruz-Maldonado I, Pingitore A, Huang G C, Baker D, Jones P M, Persaud S J. *Diabetes Obes Metab*. December 2016, Vol:18(12), pp:1263-1273). This example also evaluated the ability of pancreatic islets (i.e., pancreatic β cells) isolated from wild type and GPR119$^{-/-}$ mice to secrete insulin in response to oleoyl-LPI in the presence of glucose. The results demonstrated that oleoyl-LPI can enhance acute insulin secretion by approximately 50% in the presence of 16.7 mM of glucose. Interestingly, GPR119$^{-/-}$ islets completely lost the ability to respond to oleoyl-LPI stimulation (see FIG. 4H), indicating that expression of GPR119 in pancreatic islets is necessary for oleoyl-LPI stimulation of insulin secretion.

Taken together these data demonstrate that, down-regulation of GPR119 in Glutag and NCI-H716 cells is able to impair the Oleoyl-LPI-induced GLP-1 secretion. The results also demonstrate GPR119 mediates oleoyl-LPI induced GLP-1 secretion from L-cells as well as Insulin secretion from pancreatic β-cells.

Example 6: A Weak GPR119 Antagonist is Unable to Block GLP-1 Secretion in Enteroendocrine L-Cells The transient receptor potential vanilloid 1 (TRPV1) agonist, Arvanil (also known by its chemical name N-arachidonoyl-vanillyl-amide), is also a known to be an antagonist of GPR119 and has been previously shown to be capable of blocking OEA induced GLP-1 secretion in Glutag cells. Furthermore, OEA has been reported to activate TRVP1. Accordingly, this example investigated whether Arvanil was able to block the GLP-1 secretion induced by oleoyl-LPI.

To this effect, Glutag cells were treated with OEA, oleoyl-LPI or AR-231,453 (a known agonists of GPR119 and having the formula $C_{21}H_{24}FN_7O_5S$) and in combination with Arvanil. Two hours treatment of Glutag cells with AR-231,453 significantly increases GLP-1 secretion although this increase was not as potent as previously reported when compared to OEA. On the other hand, combination treatment of Arvanil together with AR-231,453 significantly reduced GLP-1 secretion, demonstrating a blocking activity of Arvanil (see FIG. 5).

Figure 5:
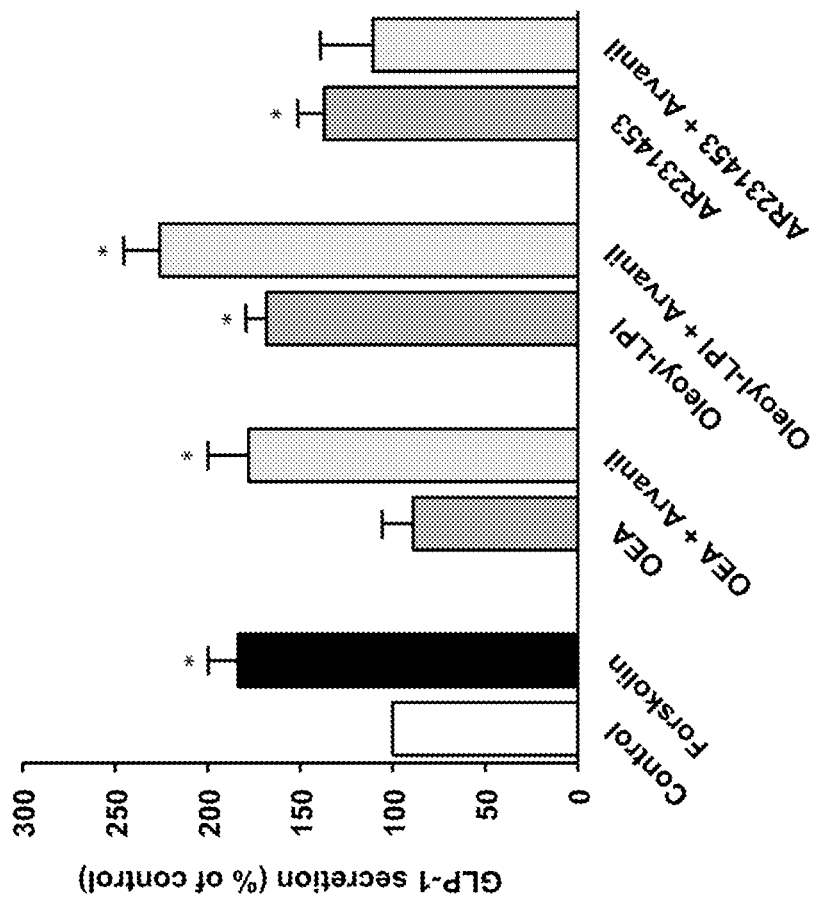
FIG. 5 is a graphical representation demonstrating that Arvanil is a weak GPR119 antagonist that is unable to block GLP-1 secretion in enteroendocrine L-cell. The results show the effect of GLP-1 secretion by Glutag cells when treated with oleoyl-LPI, OEA, Arvanil and AR-231,453 in different glucose concentration. Cells were incubated with the vehicle alone, oleoyl-LPI, OEA, Arvanil, AR-231,453 or in combination of oleoyl-LPI+Arvanil, OEA+Arvanil or AR-231,453+Arvanil for 2 hours. GLP-1 release was normalised to number of cells measured in parallel on the same day. Data are expressed as percentage over untreated and are means±SEM of n=3 from independent experiments performed in duplicates. Student t-test: *p<0.05.

Previously it was shown that AR-231,453 and glucose can act additively in order to stimulate GLP-1. Interestingly, the results provided herein demonstrate that a combination treatment of Arvanil with either OEA or LPI significantly enhanced GLP-1 secretion (FIG. 5). This data demonstrate that Arvanil did not completely inhibit GPR119 activity and indicate that Arvanil may stimulate GLP-1 secretion through different mechanism. Based on the results herein, the inventors conclude that Arvanil is a weak antagonist for GPR119 and is unable to block GLP-1 secretion in enteroendocrine L-cells.

Example 7: Intracellular ERK Activation is Involved in Oleoyl-LPI Induced GLP-1 Secretion Phosphorylation of extracellular regulated kinase (ERK) by several ligands has been identified to be involved in GLP-1 secretion. In this example, the inventors set to determine whether oleoyl-LPI is able activate pERK in the enteroendocrine L-cells. For this purpose, a time course experiment was run over 2 hours as in the GLP-1 secretion assay, with the results shown in FIG. 6.

Figure 6A:
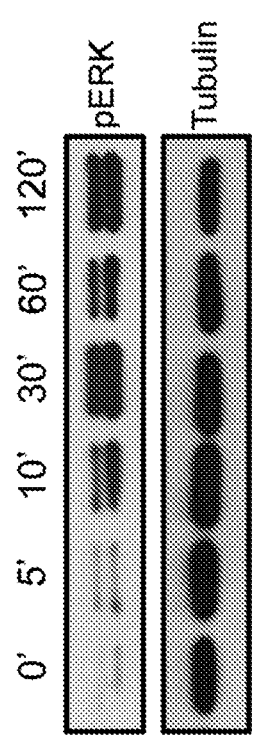
FIG. 6 is a graphical representation demonstrating that Intracellular ERK activation is involved in oleoyl-LPI induces GLP-1 secretion. Panel A) provides a representative Western blot result showing activation of phosphoERK in time course experiment in Glutag cells when stimulated with oleoyl-LPI. Panel B). demonstrates a densitometry analysis of the pERK activation in the time course experiment. Panel C) provides a representative Western blot showing phosphorylation of ERK by transfected GPR119 and GPR55 in Glutag cells. Panel D) shows densitometry analysis of the pERK by transfected GPR119 and GPR55. Panel E) shows a representative Western blot showing ERK phosphorylation in time course experiment siGPR119 transfected cells. Panel F) demonstrates a densitometry analysis of the time course experiment. Panel G) provides a representative Western blot analysis showing pERK inhibition by MEK inhibitor. Panel H) shows a densitometry analysis of MEK inhibition of pERK. Panel I) shows an effect of the MEK inhibitor on GLP-1 secretion where Glutag cells were incubated with oleoyl-LPI or vehicle for 2 hours. Panel J) provides a representative Western blot of pERK inhibition in Glutag treated with MEK inhibitor. Panel K) shown results of densitometry analysis of the pERK inhibition. Panel L) demonstrates that effect of MEK inhibition of NCI-H716 cells in GLP-1 secretion. Panel M) provides a representative Western blot of the pERK inhibition in NCI-H716-H716 cells. Panel N) shows the result of a densitometry analysis of the pERK inhibition. For all panels, GLP-1 release was normalised to number of cells measured in parallel on the same day. Data are expressed as percentage over untreated and are means±SEM of n=3 from independent experiments performed in duplicates. Student t-test: *p<0.05.
Figure 6B:
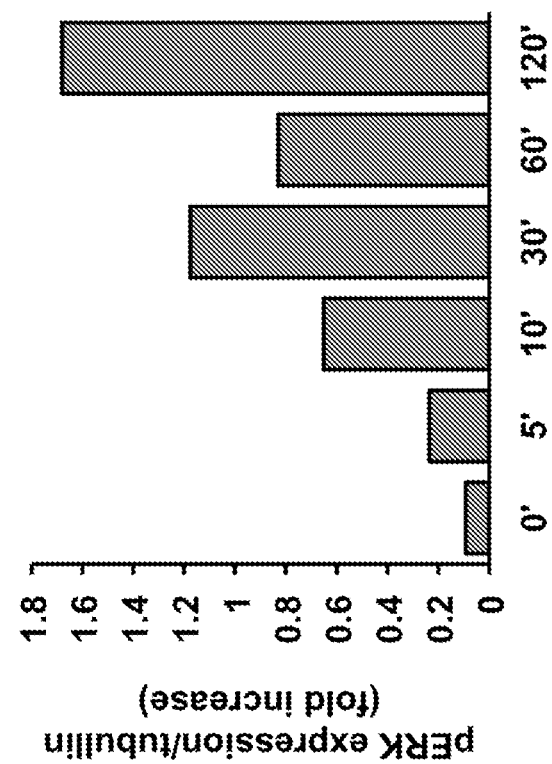
Figure 6C:
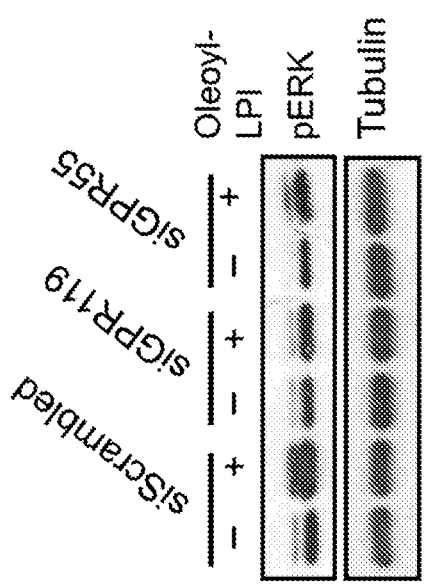
Figure 6D:
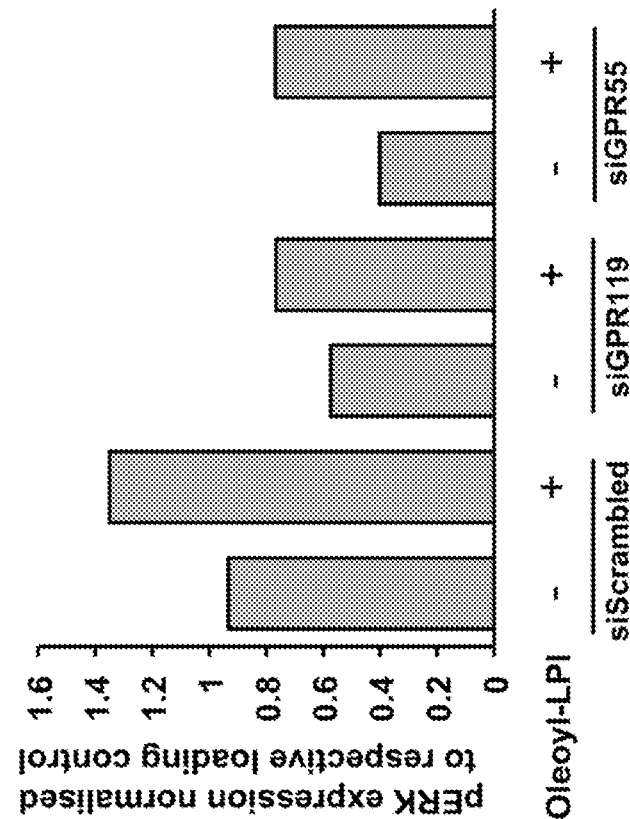
Figure 6G:
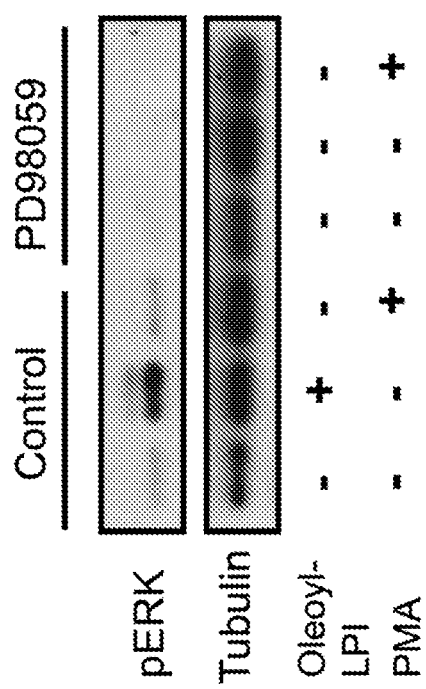
Figure 6H:
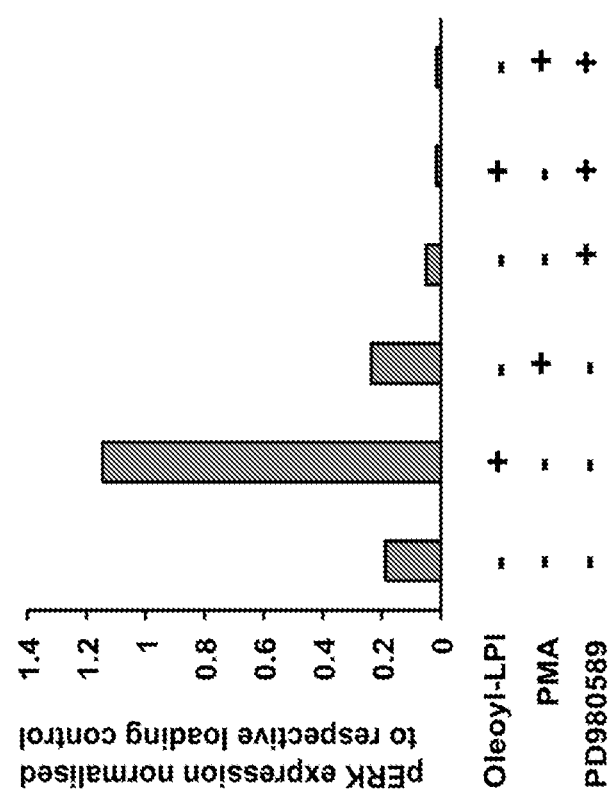
Figure 6K:
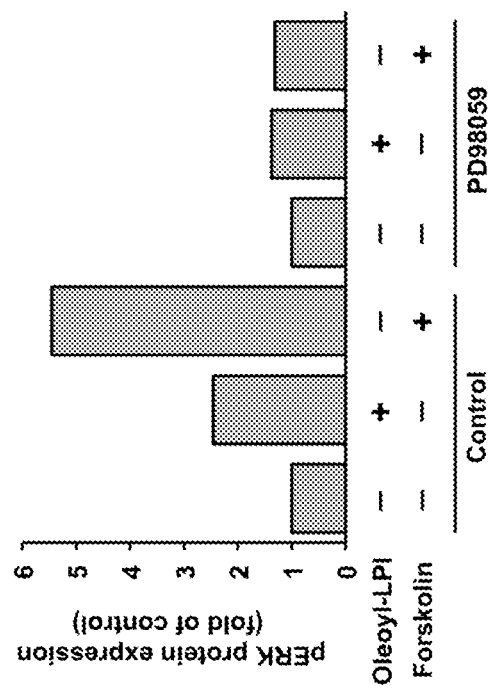
Figure 6I:
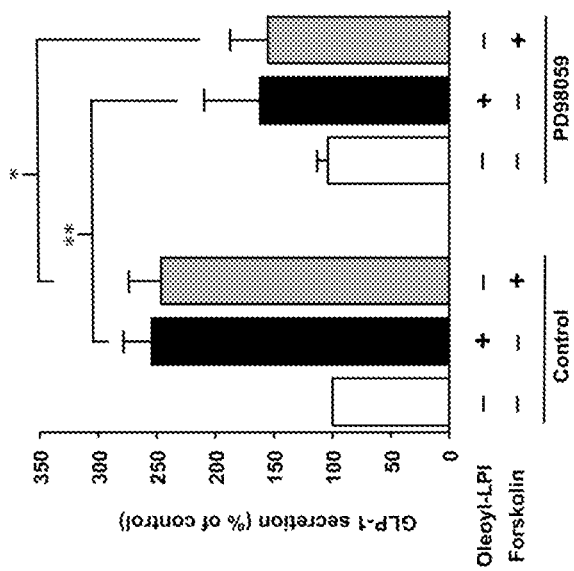
Figure 6J:
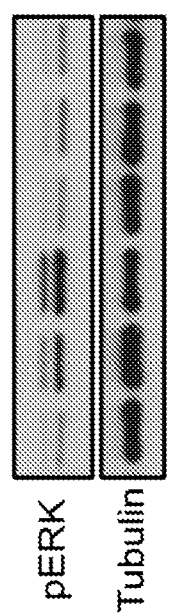
Figure 6N:
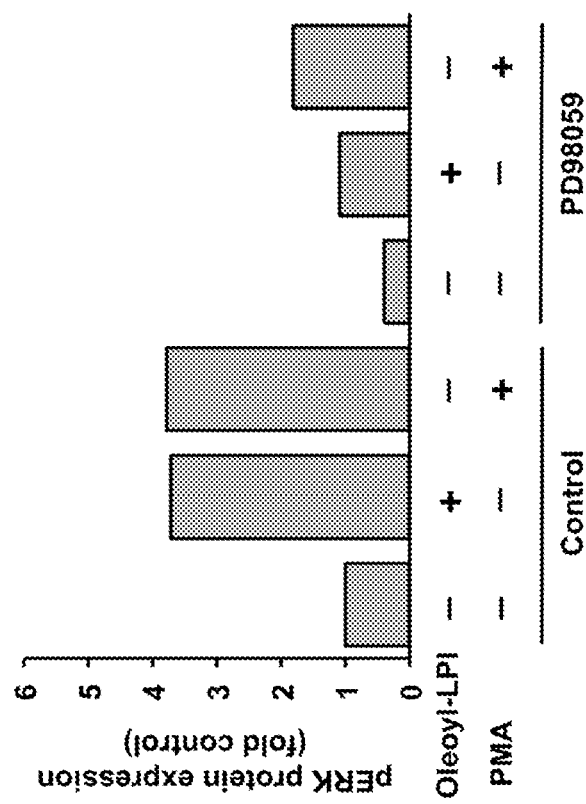
Figure 6L:
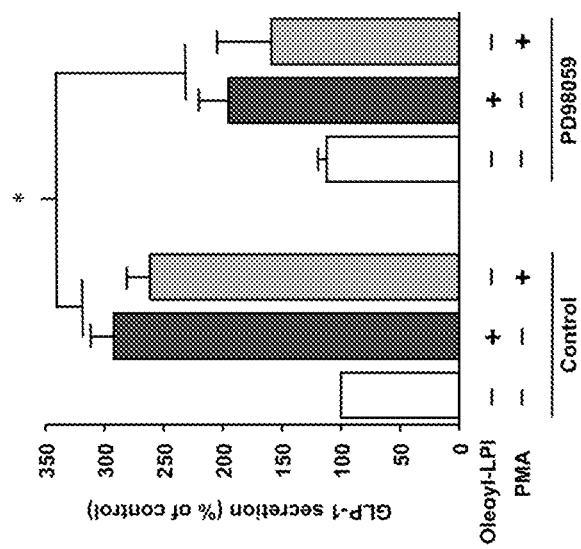
Figure 6M:
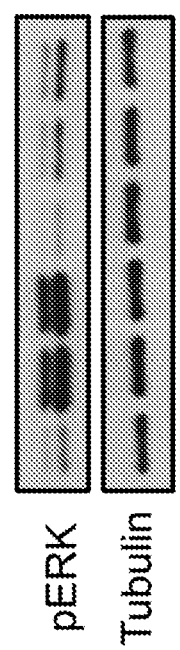

Specifically, as demonstrated in FIG. 6A, oleoyl-LPI stimulation increased p-ERK within 10 min and sustained a high level for 120 min. Also, densitometry analysis results shown in FIG. 6B, demonstrate the ratio of phosphorylation of ERK to control. In order to relate the effect of downregulation of GPR119 and GPR55 with ERK phosphorylation, the transfected cells were stimulated with oleoyl-LPI and the protein expression assessed by Western blotting. The result is shown in FIG. 6C and FIG. 6D and demonstrates that both of the transfected cells exhibited very low pERK when compared to scramble.

FIG. 6E and FIG. 6F show results of further time course experiment of stimulation of siGPR119 transfected cells with oleoyl-LPI and revealed no ERK phosphorylation after 10 min and that ERK phosphorylation completely diminished 30 min later.

To further investigate the role of ERK signalling pathway in oleoyl-LPI induced GLP-1 secretion, Glutag and NCI-H716 cells were pre-treated with PD98059 which is a potent inhibitor of methyl ethyl ketone (MEK), for 1 hour prior to oleoyl-LPI stimulation. The PD98059 inhibitor was kept in the medium throughout the secretion experiment in order to avoid the reversible action. Pre-treatment of NCI-H716-H716 cells with PD98059 demonstrated to substantially reduced ERK phosphorylation (see FIG. 6G). Densitometry analysis shows that pERK is completely reduced diminished (see FIG. 6H). Furthermore, treatment of Glutag and NCI-H716 with PD98058 significantly reduced oleoyl-LPI induced GLP-1 secretion (see FIGS. 6I and J).

Together these results demonstrate that oleoyl-LPI induced GLP-1 secretion may involve Intracellular ERK activation.

Example 8: Oleoyl-LPI Stimulates cAMP Production in GPR119 Transfected COS-7 Cells and Activate cAMP Response-Element Binding (CREB) in Enteroendocrine L-Cells Activation of PKA is able to stimulate proglucagon gene transcription and GLP-1 synthesis in Glutag cells and primary fetal rat intestinal culture. It is also thought that ligand binding to GPR119 acts to activates the subunit of the receptor that signals via adenylate cyclase to enhance cAMP and protein kinase A. Earlier studies have also shown that an increase of proglucagon gene transcription in L cells which may be mediated through a cAMP-response element (CRE) in the 5'-flanking sequence of the gene. Cyclic AMP-response element binding (CREB) is a cellular transcription factor that binds to CRE and play a role in decreasing or increasing the transcription of the downstream genes. The findings provided in the above examples, demonstrate that that GPR119 activation is required for oleoyl-LPI induced GLP-1 secretion. However, there is uncertainty concerning whether GLP-1 synthesis and secretion is regulated by GPR119.

Accordingly, the work outlined in this example evaluates whether activation of GPR119 by oleoyl-LPI in enteroendocrine L cell affect the proglucagon gene expression by monitoring the CREB activity. To achieve this evaluation, COS7 cells were used to examine cAMP responses to oleoyl-LPI with comparison to OEA in highly expressed GPR119 cells (as outlined in Example 1), with the results in FIG. 7.

Figure 7A:
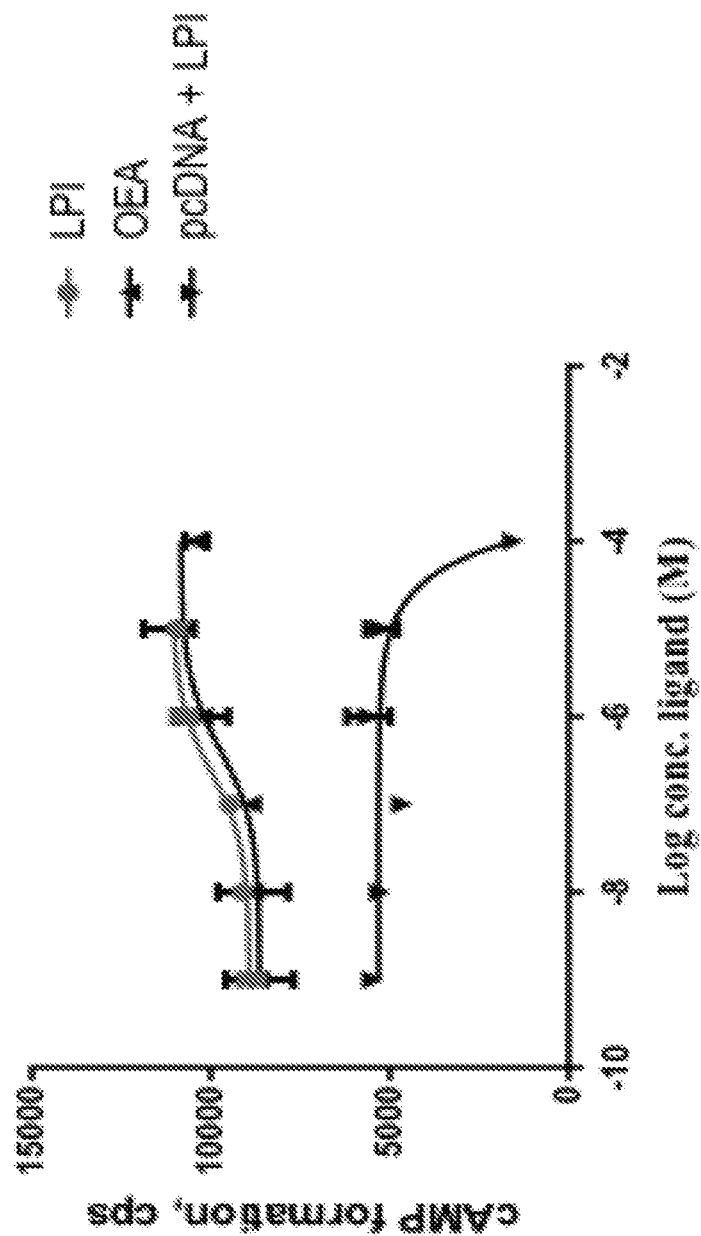
FIG. 7 is a graphical representation demonstrating that oleoyl-LPI stimulates cAMP production in GPR119 transfected COS-7 cells and activate cAMP response-element binding (CREB) in enteroendocrine L-cells. Panel A) provides results of a dose-response analysis of the effect of oleoyl-LPI and OEA on cAMP accumulation in COS7 cells stably expressing human GPR119 cells. Panel B) shows an effect of PKA inhibition on GLP-1 secretion by Glutag cells. Panel C) provides a Western blot analysis of phosphor-CREB inhibition. Panel D) shows results of a densitometry analysis of PKA inhibition of CREB phosphorylation in Glutag cells. Panel E) shows an effect of PKA inhibition on GLP-1 secretion by NCI-H716 cells. Panel F) shows results of a densitometry analysis of PKA inhibition of CREB phosphorylation in NCI-H716 cells. Panel H) shows a dose-response analysis of effect of oleoyl-LPI and OEA on cAMP accumulation in COS7 cells stably expressing human GPR119 cells. In all panels, GLP-1 release was normalised to number of cells measured in parallel on the same day. Data are expressed as percentage over untreated and are means±SEM of n=3 from independent experiments performed in duplicates. Student t-test: *p<0.05, **p<0.01.
Figure 7D:
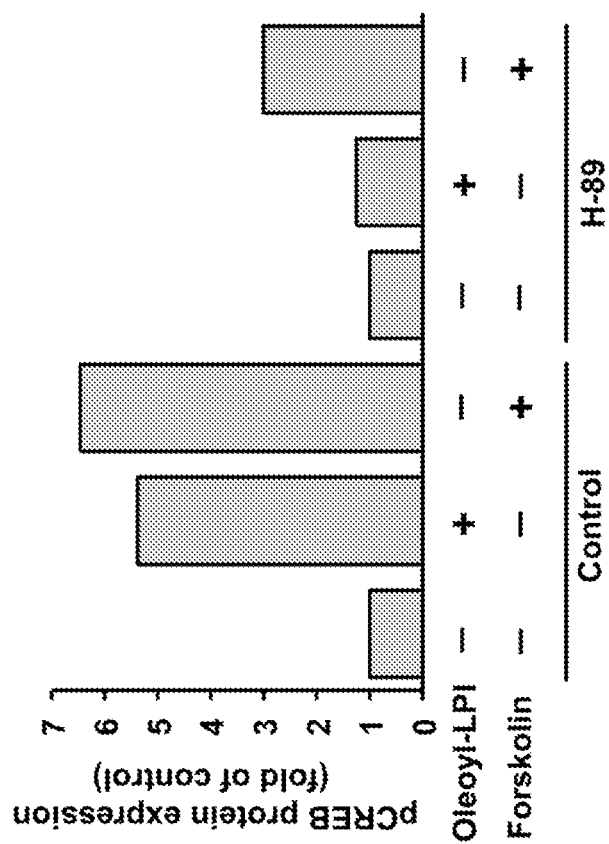
Figure 7B:
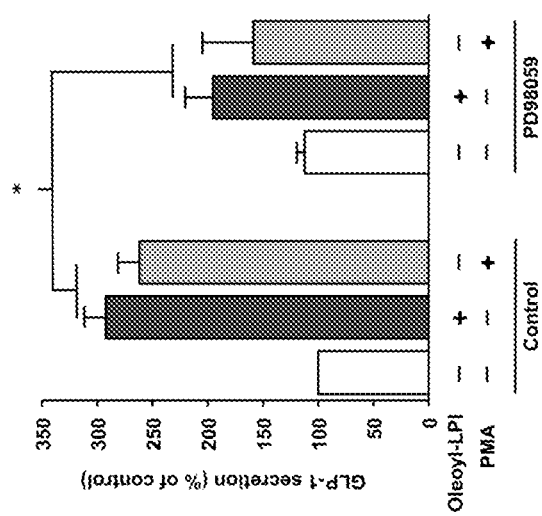
Figure 7C:
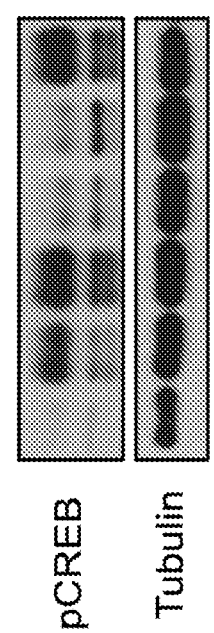
Figure 7G:
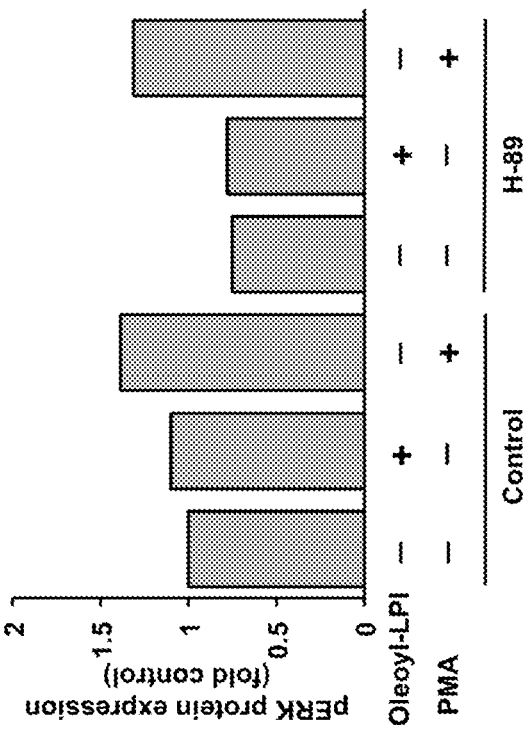
Figure 7E:
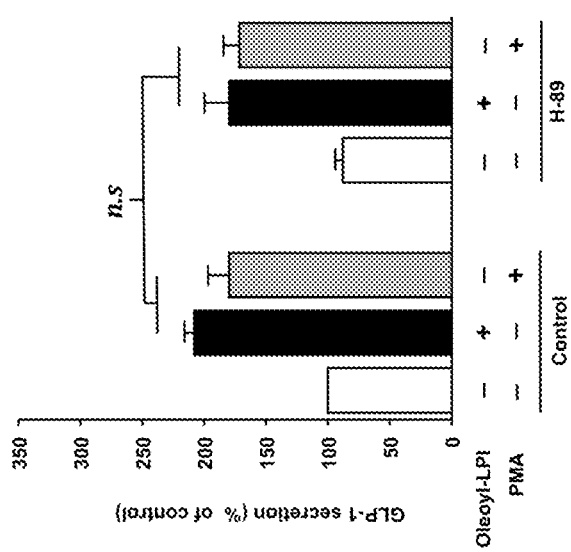
Figure 7F:
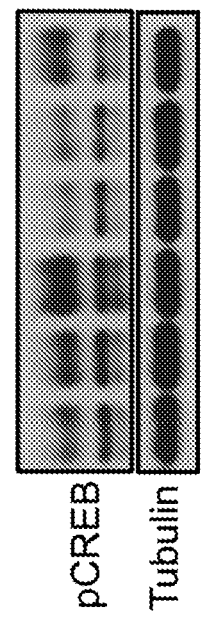
Figure 7H:
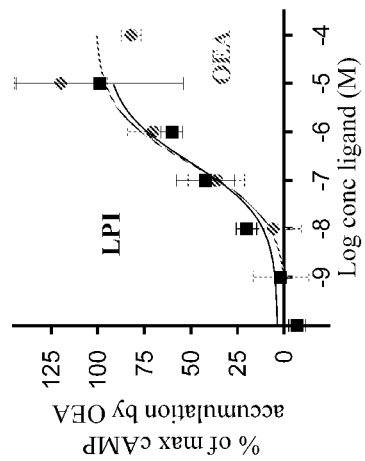

Specifically, as shown in FIGS. 7A and 7H, treatment with oleoyl-LPI was able to increase the production of cAMP in a similar manner as OEA and a higher potency (oleoyl-LPI EC50 as 239 nM and 422 nM for OEA).

To determine whether an increase in cAMP would also led to secretion of GLP-1, Glutag and NCI-H716 cells were pre-treated with PKA inhibitor, H89 (10 µM) before stimulation with oleoyl-LPI. As shown in FIG. 7B and FIG. 7C, pre-treatment with PKA inhibitor demonstrates an observable reduction in GLP-1 secretion. Further Western blot analysis confirmed that phosphorylation of CREB at both Ser133 was indeed inhibited upon pre-treatment with H89 (see FIG. 7D). Interestingly, assessment by Western blot also revealed that oleoyl-LPI is able to stimulate CREB phosphorylation in the control cells (see FIG. 7C). Therefore, these data indicate that oleoyl-LPI is able to stimulate cAMP production that triggers the PKA and phosphorylation of CREB through GPR119.

The observed reduction in GLP-1 secretion demonstrated herein shows that PKA stimulation of CREB phosphorylation might also increase proglucagon gene expression and may mediate GLP-1 synthesis and eventually GLP-1 secretion.

Example 9: Testing for Ex Vivo Activity of Oleoyl-LPI and Compounds Having a Structure of Formula I in Stimulating GLP-1 Biosynthesis and Secretion in Animal Cells of the GI Tract This example demonstrates efficacy of both the oleoyl-LPI ligand of GPR115 and two compounds of formula I, in stimulating GLP-1 biosynthesis and secretion ex vivo in guinea pig GI tract cells exposed to these compounds.

The results provided in the earlier examples above demonstrate efficacy of the endogenous GPR119 ligand, oleoyl-LPI, in stimulating GLP-1 biosynthesis and secretion in human and murine L cells and in primary colonic cell preparation.

As a consequence, the inventors went on to prepare compounds having the structure of formula I as outlined in the examples that follow.

This example sets out to evaluate the efficacy of compounds of formula I of the present invention in stimulating GLP-1 biosynthesis and secretion and to assess whether such compounds possess a similar activity as oleoyl-LPI on mediating GLP-1 biosynthesis and secretion ex vivo.

To test for this, a pregnant guinea pig was anesthetized with isoflurane and sacrificed via intra-cardial injection of pentobarbital. Colon and rectum were quickly collected and intraluminal content washed out with ice-cold HBSS. After a thorough cleansing from the faecal material, and gentle scraping of the internal mucosa, the tissue was minced into 3 to 5-millimetre pieces and resuspended into 50 ml of ice cold HBSS. Pellet was spun down and washed again in 50 ml of ice-cold HBSS. Supernatant was carefully removed, and the epithelial fragments were then resuspended for 30 minutes at 37° C. into a 5 ml solution of HEPES 25 mM, collagenase-P 1 mg/ml in HBSS, pH 7.4 at 37° C.

The tissue was then pelleted and resuspended further for about 30 to 40 additional minutes at 37° C. within a 10 ml solution of 1 mg/ml collagenase-P as above.

After the digestion, about 40 ml of pre-warmed DMEM complete media was added (FBS 10%, glucose 4.5 g/L, glutamine 4 mM, sodium pyruvate 1 mM, HEPES 25 mM, sodium bicarbonate 3.7 g/L, Pen/Strep 1× and Ciprofloxacin 10 µg/ml pH 7.4 at 37° C.). Crypts and individual cells were isolated with a 100 µM nylon strainer, spun down at 200 g for 5 minutes, resuspended into 10 ml of DMEM complete media and plated into 20 wells of a 24-well plate coated with a 3D gel of 3 mg/ml Matrigel (BD, Biosciences, Oxford, UK). After one day of incubation at 37° C. 5% $CO_2$ in a humidified incubator, cells were washed with 500 µl of warm HBSS, and treated with 250 µl DMEM serum free (Complete medium without FBS) additioned with KR-62436 10 µg/ml and individually the following drugs or compounds: Forskolin and IBMX (20 µM each), oleoyl-LPI, and the two oleoyl-LPI analogs and/or derivatives ps297b (prepared as described in example 13) and ps316a (prepared as described in example 22) were all tested in quadruplicate at 20 µM.

After a 2-hour long incubation at 37 C 5% $CO_2$, the supernatants were collected on ice, and quickly stored at −80 µC. Active GLP-1 levels (7-37 amide and 7-36) were quantified on 50 µl of supernatant with an ELISA commercial kit (EMD Millipore). DMSO was used as a negative control, the combination of Forskolin and IBMX was included as positive control activators GLP-1. GLP-1 levels measured were standardized against the DMSO control. Results are shown in FIG. 8.

Figure 8:
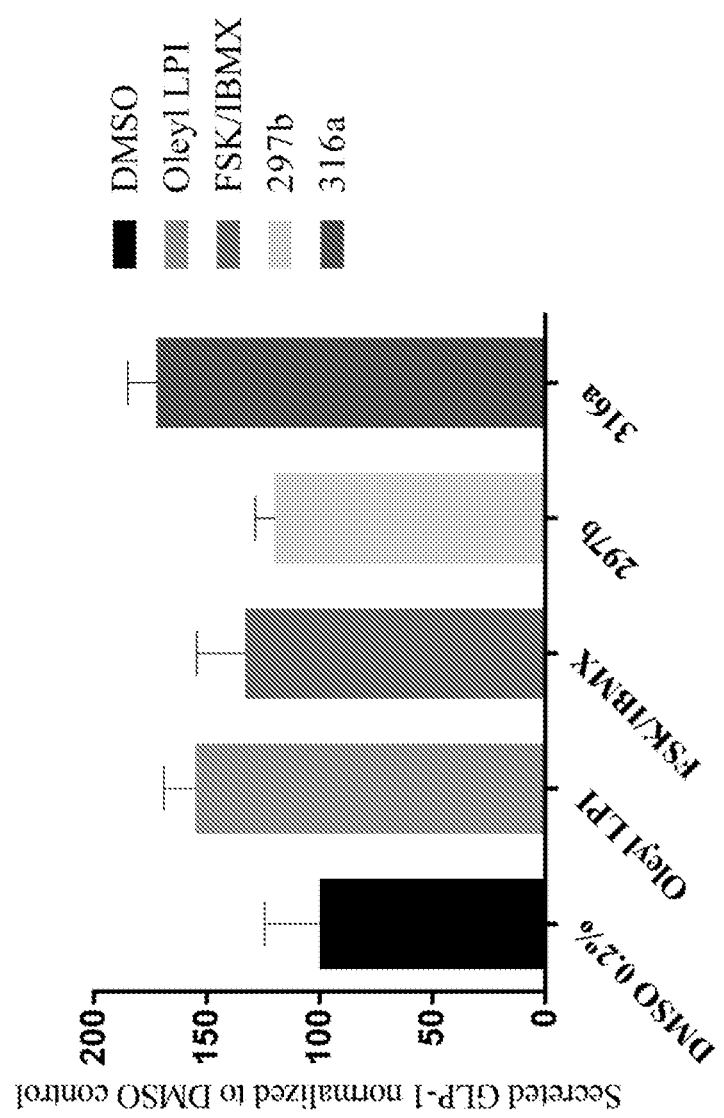
FIG. 8 is a graphical representation demonstrating efficacy of compounds of the present invention having the structure of formula I in stimulating synthesis and secretion of GLP-1 following 2 hours incubation ex vivo with cells of the GI tract obtained from guinea pig. Cells were incubated with Forskolin and IBMX (each at 20 μM), oleoyl-LPI (20 μM), the synthetic compounds ps297b (20 μM) and ps316a (20 μM) for 2 hours in quadruplicates. 0.2% DMSO was used as negative control, and the combination of Forskolin and IBMX was used as positive control. GLP-1 levels were measured and standardized against the DMSO control. Results are shown as the standardized output reading and the error bars represent means±SEM of independent experiments performed in quadruplicates.

As shown in FIG. 8, oleoyl-LPI and compounds ps297b and ps316a stimulated biosynthesis and secretion ex vivo from the guinea pig GI tract cells. Surprisingly ps316a compound was able to stimulate GLP-1 levels above those observed for the endogenous GRP119 ligand, oleoyl-LPI.

The $EC_{50}$ levels each one of oleoyl-LPI, compound ps297b and compound ps316a were also measured in quadruplicates at the conclusion of the 2 hour incubation. Guinea pig cells obtained as described above were also incubated with 20 OA OEA in quadruplicates and subjected to 2-hour long incubation at 37 C 5% $CO_2$ as described above and $EC_{50}$ levels measured. Results of $EC_{50}$ obtained for oleoyl-LPI, compound ps297b, compound ps316a, and OEA are provided in Table 2 below.

TABLE 2

| $EC_{50}$ results following ex vivo incubation with colonic cells of the GI tract obtained from guinea pig. ||
|---|---|
| Compound tested | $EC_{50}$ |
| Oleyl-LPI | 32.68 µM |
| OEA | 30.73 µM |
| 297b | 30.04 µM |
| 316a | 22.35 µM |

The results shown in Table 2 indicate that both compounds ps297b and ps316a were able to stimulate GPL-1 biosynthesis and secretion for GI tract cells at observed lower concentration than those attained using the endogenous Oleyl-LPI. The results also demonstrate that both ps297b and ps316a compounds remained stable after 2 hours incubation ex vivo.

Taken together these data demonstrate that the compounds of formula I tested, (ps297b and ps316a), are both effective in stimulating GLP-1 biosynthesis and secretion in animal cells, which is comparable, if not better to the efficacy of the endogenous GPR119 ligand, oleoyl-LPI. These data also demonstrate the surprising and unexpected result compounds of formula I of the present invention can remain stable and able to attain stimulation effect on biosynthesis and secretion of GLP-1 ex vivo at concentrations lower than those achieved by the endogenous GPR119 ligand, oleoyl-LPI. The results implicate a role for compounds of formula I of the present invention in stimulating GLP-1 biosynthesis and secretion and their use in maintaining glucose homeostasis and in therapy of metabolic disorders such as diabetes and obesity.

Example 10: Synthesis of a Compound of Formula I: ps292a

This example demonstrates production of a synthetic compound of formula I, entitled by the inventors "ps292a" and having the general formula III:

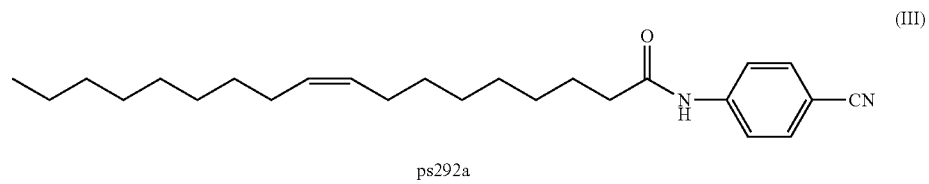

ps292a

General schematic of this process resulting in a compound of formula (III) is shown in FIG. 9.

Specifically, oxalyl chloride (0.71 mL, 8.24 mmol) was added over 10 min to a solution of oleic acid (2 mL, 6.34 mmol) and dimethylformamide (also known as DMF) (3 drops) in methylene chloride (DCM) (10 mL) at 0° C., and the solution stirred at room temperature overnight. The solvent and excess oxalyl chloride was removed in vacuo and the residue redissolved in DCM (10 mL). This solution was added dropwise to a solution of 4-aminobenzonitrile (0.61 g, 5.14 mmol) in DCM (10 mL) and Et$_3$N (1 mL) that had been cooled in an ice bath. Upon complete addition, the solution was stirred at room temperature overnight. The solution was washed with saturated Na$_2$CO$_3$ solution (3×20 mL), H$_2$O (20 mL), and brine (20 mL), and dried over MgSO$_4$. The resulting residue was subjected to column chromatography, using a gradient elution of EtOAc/petroleum spirits to afford the product as a pale yellow oil that solidified upon cooling.

Yield: 1.50 g (76%).

Fourier transform infrared spectroscopy (FT-IR) (ATR) V$_{max}$/cm$^{-1}$: 3258 br w, 2920 m, 2851 m, 2220 m, 1673 s, 1595 s, 1535 s. $^1$H-NMR δ/ppm (CDCl$_3$): 7.66 (2H, d, $^3J_{H,H}$=8.6 Hz, Ar CH), 7.60 (2H, d, $^3J_{H,H}$=8.6 Hz, Ar CH), 7.39 (1H, s, NH), 5.29-5.40 (2×1H, 2×m, 2×olefinic CH), 2.38 (2H, m, NHCOCH$_2$), 1.95-2.05 (2×2H, 2×m, 2×CH$_2$), 1.73 (2H, m, CH$_2$), 1.24-1.42 (10×2H, 10×m, 10×CH$_2$), 0.87 (3H, m, CH$_3$). $^{13}$C-NMR δ/ppm (CDCl$_3$): 172.0 (CONH), 142.3 (Ar C), 130.2 (olefinic CH), 129.8 (olefinic CH), 133.4 (Ar CH), 119.5 (Ar CH), 119.0 (Ar C), 106.9 (CN), 37.9 (NHCOCH$_2$), 32.0 (CH$_2$), 29.9 (CH$_2$), 29.8 (CH$_2$), 29.6 (CH$_2$), 29.45 (CH$_2$), 29.44 (CH$_2$), 29.38 (CH$_2$), 29.3 (CH$_2$), 29.2 (CH$_2$), 27.4 (CH$_2$), 27.3 (CH$_2$), 25.5 (CH$_2$), 22.8 (CH$_2$), 14.3 (CH$_3$).

Example 11: Synthesis of a Compound of Formula I: ps293a

This example demonstrates production of a synthetic compound of formula I, entitled by the inventors "ps293a" and having the general formula IV:

General schematic of this process resulting in a synthetic compound of formula (IV) is shown in FIG. 10.

Specifically, oxalyl chloride (0.53 mL, 6.18 mmol) was added over 10 min to a solution of oleic acid (1.5 mL, 4.75 mmol) and DMF (3 drops) in DCM (10 mL) at 0° C., and the solution stirred at room temperature overnight. The solvent and excess oxalyl chloride was removed in vacuo and the residue redissolved in DCM (10 mL). This solution was added dropwise to a solution of methyl 4-aminobenzoate (0.58 g, 3.85 mmol) in DCM (10 mL) and Et$_3$N (1 mL) that had been cooled in an ice bath. Upon complete addition, the solution was stirred at room temperature overnight. The solution was washed with saturated Na$_2$CO$_3$ solution (3×20 mL), H$_2$O (20 mL), and brine (20 mL), and dried over MgSO$_4$. The resulting residue was subjected to column chromatography, using a gradient elution of EtOAc/petroleum spirits to afford a pale yellow solid. The solid was triturated with cold petroleum spirits to afford the product as a white solid.

Yield: 1.12 g (70%).

FT-I (ATR) V$_{max}$/cm$^{-1}$: 3279 br w, 2917 m, 2849 m, 1716 s, 1655 s, 1607 m, 1540 m, 1465 w. $^1$H-NMR δ/ppm (d$_6$-DMSO): 10.22 (1H, s, NH), 7.93 (2H, d, $^3J_{H,H}$=8.8 Hz, Ar CH), 7.76 (2H, d, $^3J_{H,H}$=8.8 Hz, Ar CH), 5.31-5.40 (2×1H, 2×m, 2× olefinic CH), 3.85 (3H, s, CO$_2$CH$_3$), 2.37 (2H, m, NHCOCH$_2$), 1.96-2.06 (2×2H, 2×m, 2×CH$_2$), 1.62 (2H, m, CH$_2$), 1.21-1.39 (10×2H, 10×m, 10×CH$_2$), 0.88 (3H, m, CH$_3$). $^{13}$C-NMR δ/ppm (d$_6$-DMSO): 171.8 (CONH), 165.8 (CO$_2$Me), 143.7 (Ar C), 130.2 (Ar CH), 129.62 (olefinic CH), 129.57 (olefinic CH), 123.6 (Ar C), 118.3 (Ar CH), 51.8 (CO$_2$CH$_3$), 36.5 (NHCOCH$_2$), 31.2 (CH$_2$), 29.1 (CH$_2$), 29.0 (CH$_2$), 28.8 (CH$_2$), 28.7 (CH$_2$), 28.62 (CH$_2$), 28.60 (CH$_2$), 28.56 (CH$_2$), 28.5 (CH$_2$), 26.5 (CH$_2$), 24.9 (CH$_2$), 22.1 (CH$_2$), 13.9 (CH$_3$).

Example 12: Synthesis of a Compound of Formula I: ps294a

This example demonstrates production of a synthetic compound of formula I, entitled by the inventors "ps294a" and having the general formula V:

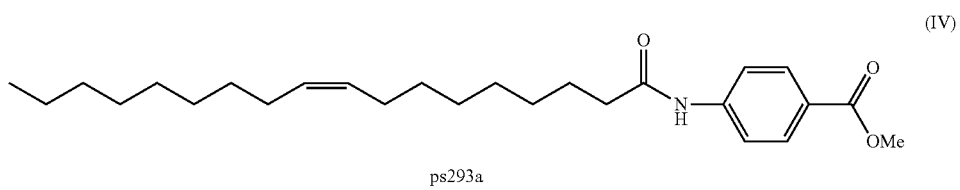

ps293a

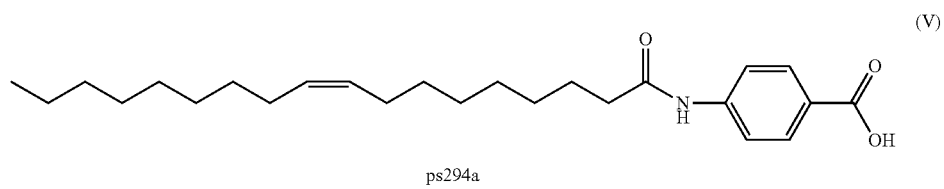 [SMILES: CCCCCCCC/C=C\CCCCCCCC(=O)Nc1ccc(C(=O)O)cc1]

ps294a

General schematic of this process resulting in a synthetic compound of formula (V) is shown in FIG. 11.

Specifically, A 1M NaOH (0.55 mL) solution was added to a solution of ps293a (0.19 g, 0.45 mmol) in MeOH/THF (1:1, 2 mL) and heated at 60° C. overnight. The solution was acidified with 1M HCl, causing a white solid to precipitate. The mixture was stirred for 5 min and the solid was collected, washed with $H_2O$ (4×5 mL), MeOH/THF (1:1, 2×5 mL), and petroleum spirits (2×5 mL), and dried to afford the product as a white solid.

Yield: 0.15 g (85%).

FT-I (ATR) $V_{max}$/cm$^{-1}$: 3317 br w, 2921 m, 2852 m, 1655 s, 1608 w, 1510 m, 1467 w. $^1$H-NMR δ/ppm (d$_6$-DMSO): 10.18 (1H, s, NH), 7.90 (2H, d, $^3J_{H,H}$=8.6 Hz, Ar CH), 7.73 (2H, d, $^3J_{H,H}$=8.6 Hz, Ar CH), 5.30-5.40 (2×1H, 2×m, 2× olefinic CH), 2.36 (2H, m, NHCOCH$_2$), 1.95-2.08 (2×2H, 2×m, 2×CH$_2$), 1.62 (2H, m, CH$_2$), 1.21-1.38 (10×2H, 10×m, 10×CH$_2$), 0.88 (3H, m, CH$_3$). $^{13}$C-NMR δ/ppm (d$_6$-DMSO): 171.8 (CONH), 167.0 (002H), 143.3 (Ar C), 130.3 (Ar CH), 129.67 (olefinic CH), 129.60 (olefinic CH), 125.1 (Ar C), 118.2 (Ar CH), 36.5 (NHCOCH$_2$), 31.3 (CH$_2$), 29.1 (CH$_2$), 29.08 (CH$_2$), 28.83 (CH$_2$), 28.68 (CH$_2$), 28.64 (CH$_2$), 28.63 (CH$_2$), 28.60 (CH$_2$), 28.5 (CH$_2$), 26.6 (CH$_2$), 25.0 (CH$_2$), 22.1 (CH$_2$), 13.9 (CH$_3$).

Example 13: Synthesis of a Compound of Formula I: ps297b

This example demonstrates production of a synthetic compound of formula I, entitled by the inventors "ps297b" and having the general formula VI:

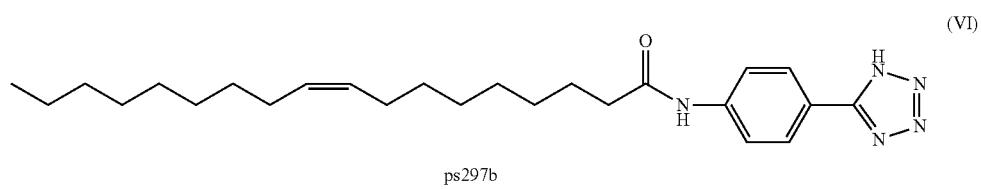

ps297b

General schematic of this process resulting in a synthetic compound of formula (VI) is shown in FIG. 12.

Specifically, concentrated HCl (0.81 mL, 8.29 mmol, 32%) was added to a solution of Et$_3$N (1.16 mL, 8.29 mmol) in toluene (20 mL) that had been cooled in an ice bath, and the mixture stirred until no more fumes were observed. NaN$_3$ (0.56 g, 8.29 mmol) and ps292 (0.63 g, 1.66 mmol) were added and the mixture heated at reflux for 2 d. The toluene was removed, and the resulting residue suspended in H$_2$O and acidified with concentrated HCl (~1 mL). The resulting solid was stirred for 5 min and then collected, washed with H$_2$O (5×10 mL), dried, then washed with DCM (3×10 mL) and dried, affording the product as a white solid.

Yield: 219 mg (36%).

FT-I (ATR) $V_{max}$/cm$^{-1}$: 3308 br w, 2919 m, 2850 m, 1669 s, 1600 s, 1539 s. $^1$H-NMR δ/ppm (d$_6$-DMSO): 10.20 (1H, s, NH), 8.00 (2H, m, Ar CH), 7.84 (2H, m, Ar CH), 5.30-5.42 (2×1H, 2×m, 2× olefinic CH), 2.38 (2H, m, NHCOCH$_2$), 1.96-2.08 (2×2H, 2×m, 2×CH$_2$), 1.64 (2H, m, CH$_2$), 1.20-1.39 (10×2H, 10×m, 10×CH$_2$), 0.87 (3H, m, CH$_3$). $^{13}$C-NMR δ/ppm (d$_6$-DMSO): 171.7 (CONH), 154.9 (tetrazolyl C), 141.8 (Ar C), 129.63 (olefinic CH), 129.59 (olefinic CH), 127.6 (Ar CH), 119.2 (Ar CH), 118.4 (Ar C), 36.4 (NHCOCH$_2$), 31.2 (CH$_2$), 29.1 (CH$_2$), 28.8 (CH$_2$), 28.65 (CH$_2$), 28.63 (CH$_2$), 28.56 (CH$_2$), 28.5 (CH$_2$), 26.5 (CH$_2$), 25.0 (CH$_2$), 22.1 (CH$_2$), 13.9 (CH$_3$).

Example 14: Synthesis of a Compound of Formula I: ps298a and ps298b

This example demonstrates production of synthetic compounds of formula I, entitled by the inventors "ps298a and ps298b" and having the general formulae VII and VIII respectively:

mL), brine (1×10 mL) and dried over MgSO$_4$. The resulting residue was subjected to column chromatography, using a gradient elution of EtOAc/petroleum spirits to afford both N2- and N1-methylated compounds as white solids.

Yield: N2 isomer, 54.9 mg (54%); N1 isomer, 18.3 mg (18%).

N2 isomer (ps298a): FT-I (ATR) $V_{max}$/cm$^{-1}$: 3282 br w, 2918 m, 2850 m, 1655 s, 1598 w, 1548 m. $^1$H-NMR δ/ppm (d$_6$-DMSO): 10.13 (1H, s, NH), 8.01 (2H, d, $^3J_{H,H}$=8.7 Hz, Ar CH), 7.81 (2H, d, $^3J_{H,H}$=8.7 Hz, Ar CH), 5.32-5.41 (2×1H, 2×m, 2× olefinic CH), 4.44 (3H, s, NCH$_3$), 2.37 (2H, m, NHCOCH$_2$), 1.97-2.06 (2×2H, 2×m, 2×CH$_2$), 1.63 (2H, m, CH$_2$), 1.22-1.40 (10×2H, 10×m, 10×CH$_2$), 0.88 (3H, m, CH$_3$). $^{13}$C-NMR δ/ppm (d$_6$-DMSO): 171.6 (CONH), 164.0 (tetrazolyl C), 141.2 (Ar C), 129.65 (olefinic CH), 129.60 (olefinic CH), 126.9 (Ar CH), 121.3 (Ar C), 119.2 (Ar CH), 39.5 (NCH$_3$), 36.4 (NHCOCH$_2$), 31.2 (CH$_2$), 29.1 (CH$_2$), 28.8 (CH$_2$), 28.7 (CH$_2$), 28.65 (CH$_2$), 28.6 (CH$_2$), 28.5 (CH$_2$), 26.5 (CH$_2$), 25.0 (CH$_2$), 22.1 (CH$_2$), 13.9 (CH$_3$).

N1 isomer (ps298b): FT-I (ATR) $V_{max}$/cm$^{-1}$: 3300 br w, 2920 s, 2851 m, 1659 s, 1595 w, 1524 m. $^1$H-NMR δ/ppm (d$_6$-DMSO): 10.20 (1H, s, NH), 7.87 (2H, m, Ar CH), 7.84 (2H, m, Ar CH), 5.32-5.41 (2×1H, 2×m, 2× olefinic CH), 4.20 (3H, s, NCH$_3$), 2.39 (2H, m, NHCOCH$_2$), 1.98-2.07 (2×2H, 2×m, 2×CH$_2$), 1.64 (2H, m, CH$_2$), 1.22-1.40 (10×2H, 10×m, 10×CH$_2$), 0.88 (3H, m, CH$_3$). $^{13}$C-NMR δ/ppm (d$_6$-DMSO): 171.8 (CONH), 153.7 (tetrazolyl C), 141.8 (Ar C), 129.65 (olefinic CH), 129.60 (olefinic CH), 126.3 (Ar CH), 119.0 (Ar CH), 117.7 (Ar C), 36.5 (NHCOCH$_2$), 35.1 (NCH$_3$), 31.2 (CH$_2$), 29.1 (CH$_2$), 28.8 (CH$_2$), 28.65 (CH$_2$), 28.63 (CH$_2$), 28.61 (CH$_2$), 28.6 (CH$_2$), 28.5 (CH$_2$), 26.5 (CH$_2$), 25.0 (CH$_2$), 22.1 (CH$_2$), 13.9 (CH$_3$).

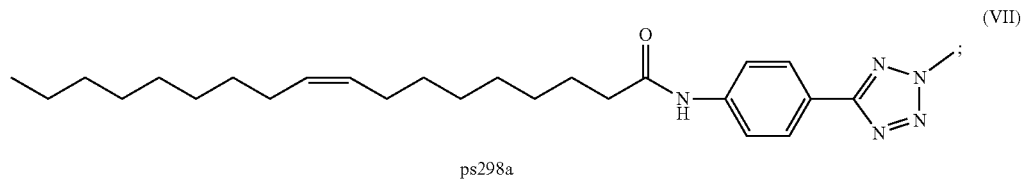

ps298a (VII)

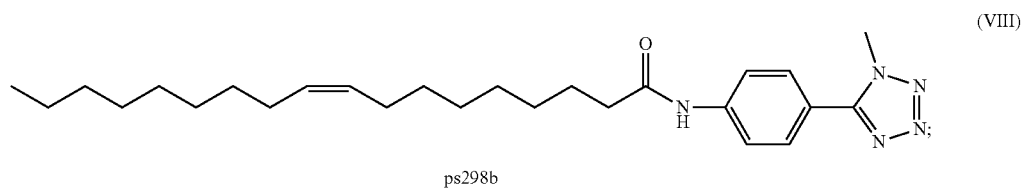

ps298b (VIII)

General schematic of this process resulting in synthetic compounds being the N2- and N1-methylated isomer compounds of the general formulae (VII) and (VIII) are shown in FIG. 13.

Specifically, methyl iodide (16 μL, 0.26 mmol) was added to a suspension of ps297b (100 mg, 0.23 mmol) and K2003 (65 mg, 0.47 mmol) in acetone (5 mL) and heated at reflux overnight. The mixture was concentrated in vacuo then redissolved in EtOAc (10 mL) and washed with H$_2$O (3×10

Example 15: Synthesis of a Compound of Formula I: ps300b

This example demonstrates production of a synthetic compound of formula I entitled by the inventors "ps300b" and having the general formula IX:

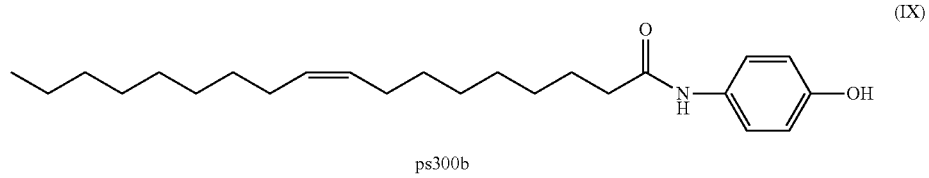

(IX)

ps300b

General schematic of this process resulting in a synthetic compound of formula (IX) is shown in FIG. 14.

Specifically, $^{i}Pr_2EtN$ (0.49 mL, 2.84 mmol) was added to a solution of oleic acid (0.50 mL, 1.42 mmol) and HBTU (0.59 g, 1.56 mmol) in DMF (4 mL) and stirred at room temperature for 45 min. 4-Aminophenol (0.16 g, 1.42 mmol) was added and the solution was stirred at room temperature overnight. EtOAc (50 mL) was added and the solution was washed with $H_2O$ (3×20 mL), saturated $Na_2CO_3$ (2×20 mL), and brine (1×20 mL), and dried over $MgSO_4$. The resulting residue was subjected to column chromatography, using a gradient elution of EtOAc/petroleum spirits to afford an off-white solid. The solid was triturated with cold petroleum spirits to afford the product as a white solid.

Yield: 0.30 g (56%).

FT-I (ATR) $V_{max}/cm^{-1}$: 3278 br w, 2917 m, 2850 m, 1648 s, 1615 w, 1558 m, 1516 m. $^1$H-NMR δ/ppm ($d_6$-DMSO): 9.59 (1H, s, NH), 9.14 (1H, s, OH), 7.38 (2H, d, $^3J_{H,H}$=8.9 Hz, Ar CH), 6.70 (2H, d, $^3J_{H,H}$=8.9 Hz, Ar CH), 5.31-5.41 (2×1H, 2×m, 2× olefinic CH), 2.25 (2H, m, $NHCOCH_2$), 1.95-2.08 (2×2H, 2×m, 2×$CH_2$), 1.59 (2H, m, $CH_2$), 1.21-1.39 (10×2H, 10×m, 10×$CH_2$), 0.88 (3H, m, $CH_3$). $^{13}$C-NMR δ/ppm ($d_6$-DMSO): 170.4 (CONH), 153.0 (Ar C), 131.0 (Ar C), 129.64 (olefinic CH), 129.61 (olefinic CH), 120.8 (Ar CH), 114.9 (Ar CH), 36.3 ($NHCOCH_2$), 31.3 ($CH_2$), 29.1 ($CH_2$), 29.08 ($CH_2$), 29.0 ($CH_2$), 28.81 ($CH_2$), 28.68 ($CH_2$), 28.66 ($CH_2$), 28.60 ($CH_2$), 28.5 ($CH_2$), 26.6 ($CH_2$), 26.5 ($CH_2$), 25.2 ($CH_2$), 22.1 ($CH_2$), 13.9 ($CH_3$).

Example 16: Synthesis of a Compound of Formula I: ps301a

This example demonstrates production of a synthetic compound of formula I entitled by the inventors "ps301a" and having the general formula X:

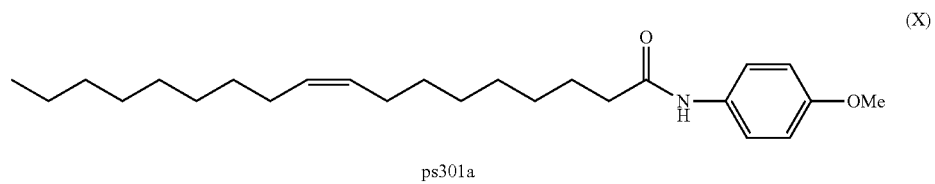

(X)

ps301a

Figure 15:
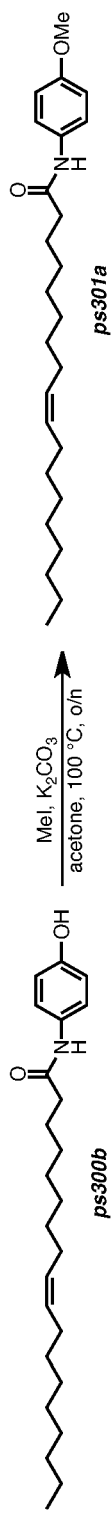
FIG. 15 is a pictorial representation of the chemical process used herein to produce the analog and/or derivative of oleoyl-LPI having the general formula (X) and referred to herein as compounds "ps301a".

General schematic of this process resulting in a synthetic compound of formula (X) is shown in FIG. 15.

Specifically, methyl iodide (20 µL, 0.29 mmol) was added to a suspension of ps300b (100 mg, 0.27 mmol) and K2003 (74 mg, 0.54 mmol) in acetone (5 mL) and heated at reflux overnight. An additional portion of methyl iodide (20 µL, 0.29 mmol) was added and the mixture was heated at reflux overnight. The mixture was concentrated in vacuo then redissolved in EtOAc (10 mL) and washed with $H_2O$ (3×10 mL), brine (1×10 mL) and dried over $MgSO_4$. Petroleum spirits (4 mL) was added and the resulting solid was collected, washed with petroleum spirits (3×5 mL), and dried to afford the product as a white solid.

Yield: 63.2 mg (60%).

FT-I (ATR) $V_{max}/cm^{-1}$: 3284 br w, 2917 m, 2849 m, 1649 s, 1605 w, 1549 m, 1514 m. $^1$H-NMR δ/ppm ($d_6$-DMSO): 9.71 (1H, s, NH), 7.51 (2H, d, $^3J_{H,H}$=9.0 Hz, Ar CH), 6.89 (2H, d, $^3J_{H,H}$=9.0 Hz, Ar CH), 5.31-5.42 (2×1H, 2×m, 2× olefinic CH), 3.74 (1H, s, $OCH_3$), 2.28 (2H, m, $NHCOCH_2$), 1.97-2.07 (2×2H, 2×m, 2×$CH_2$), 1.60 (2H, m, $CH_2$), 1.21-1.39 (10×2H, 10×m, 10×$CH_2$), 0.88 (3H, m, $CH_3$). $^{13}$C-NMR δ/ppm ($d_6$-DMSO): 170.7 (CONH), 155.0 (Ar C), 132.5 (Ar C), 129.65 (olefinic CH), 129.61 (olefinic CH), 120.5 (Ar CH), 113.7 (Ar CH), 55.1 ($OCH_3$), 36.3 ($NHCOCH_2$), 31.3 ($CH_2$), 29.1 ($CH_2$), 29.01 ($CH_2$), 29.0 ($CH_2$), 28.8 ($CH_2$), 28.67 ($CH_2$), 28.66 ($CH_2$), 28.60 ($CH_2$), 28.5 ($CH_2$), 26.57 ($CH_2$), 26.55 ($CH_2$), 25.2 ($CH_2$), 22.1 ($CH_2$), 13.9 ($CH_3$).

Example 17: Synthesis of a Compound of Formula I: ps306a

This example demonstrates production of a synthetic compound of formula I, entitled by the inventors "ps306a" and having the general formula XI:

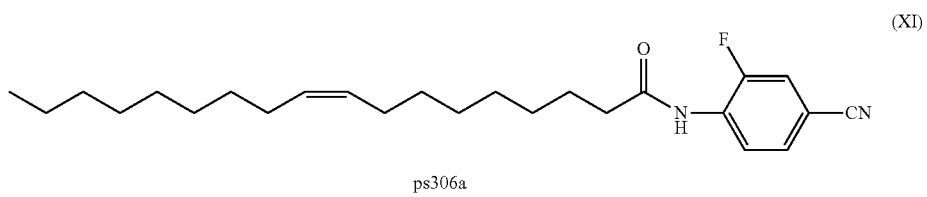

ps306a (XI)

Figure 16:
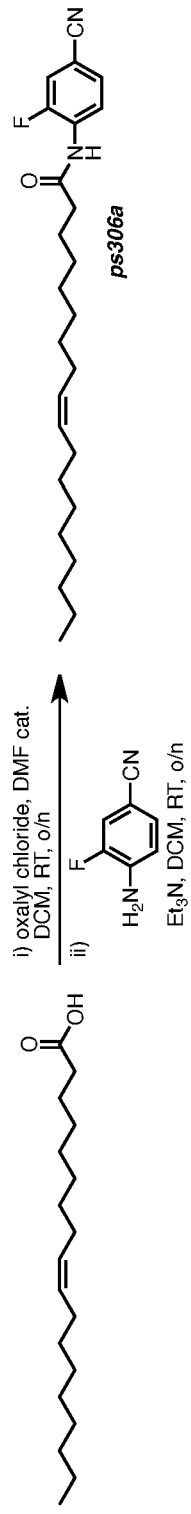
FIG. 16 is pictorial representation of the chemical process used herein to produce the analog and/or derivative of oleoyl-LPI having the general formula (XI) and referred to herein as compounds "ps306a".

General schematic of this process resulting in a synthetic compound of formula (XI) is shown in FIG. 16.

Specifically, oxalyl chloride (0.71 mL, 8.24 mmol) was added over 10 min to a solution of oleic acid (2 mL, 6.34 mmol) and DMF (3 drops) in DCM (10 mL) at 0° C., and the solution stirred at room temperature overnight. The solvent and excess oxalyl chloride was removed in vacuo and the residue redissolved in DCM (10 mL). This solution was added dropwise to a solution of 3-fluoro-4-aminobenzonitrile (0.70 g, 5.14 mmol) in DCM (10 mL) and $Et_3N$ (1 mL) that had been cooled in an ice bath. Upon complete addition, the solution was stirred at room temperature overnight. The solution was washed with saturated $Na_2CO_3$ solution (3×20 mL), $H_2O$ (20 mL), and brine (20 mL), and dried over $MgSO_4$. The resulting residue was subjected to column chromatography, using a gradient elution of EtOAc/petroleum spirits to afford the product as a white.

Yield: 1.59 g (61%).

FT-I (ATR) $V_{max}$/cm$^{-1}$: 3319 br w, 2919 m, 2850 m, 2236 w, 1681 s, 1616 w, 1589 m, 1519 s. $^1$H-NMR δ/ppm (d$_6$-DMSO): 10.07 (1H, s, NH), 8.33 (1H, dd, $^3J_{H,H}$=8.5 Hz, $^4J_{H,F}$=7.9 Hz, Ar CH), 7.89 (1H, dd, $^3J_{H,F}$=11.0 Hz, $^4J_{H,H}$=2.0 Hz, Ar CH), 7.66 (1H, ddd, $^3J_{H,H}$=8.5 Hz, $^4J_{H,H}$=2.0 Hz, $^5J_{H,F}$=0.9 Hz, Ar CH), 5.29-5.40 (2×1H, 2×m, 2× olefinic CH), 2.47 (2H, m, NHCOCH$_2$), 1.96-2.04 (2×2H, 2×m, 2×CH$_2$), 1.61 (2H, m, CH$_2$), 1.23-1.37 (10×2H, 10× m, 10×CH$_2$), 0.87 (3H, m, CH$_3$). $^{13}$C-NMR δ/ppm (d$_6$-DMSO): 172.4 (CONH), 151.6 (d, $^1J_{C,F}$=247 Hz, Ar CF), 131.7 (d, $^2J_{C,F}$=11.1 Hz, Ar C), 129.6 (olefinic CH), 129.5 (olefinic CH), 129.3 (d, $^3J_{C,F}$=3.4 Hz, Ar CH), 122.9 (d, $^4J_{C,F}$=2.7 Hz, Ar CH), 119.2 (d, $^2J_{C,F}$=23.3 Hz, Ar CH), 117.9 (d, $^4J_{C,F}$=2.7 Hz, CN), 105.7 (d, $^3J_{C,F}$=9.4 Hz, Ar C), 35.9 (NHCOCH$_2$), 31.3 (CH$_2$), 29.09 (CH$_2$), 29.08 (CH$_2$), 28.8 (CH$_2$), 28.7 (CH$_2$), 28.62 (CH$_2$), 28.59 (CH$_2$), 28.55 (CH$_2$), 28.5 (CH$_2$), 26.6 (CH$_2$), 24.9 (CH$_2$), 22.1 (CH$_2$), 13.9 (CH$_3$).

Example 18: Synthesis of a Compound of Formula I: ps309a

This example demonstrates production of a synthetic compound of formula I, entitled by the inventors "ps309a" and having the general formula XII:

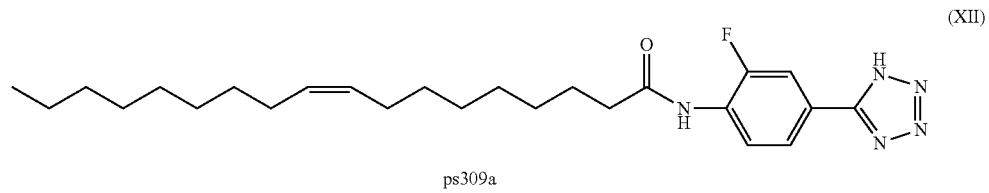

ps309a (XII)

Figure 17:
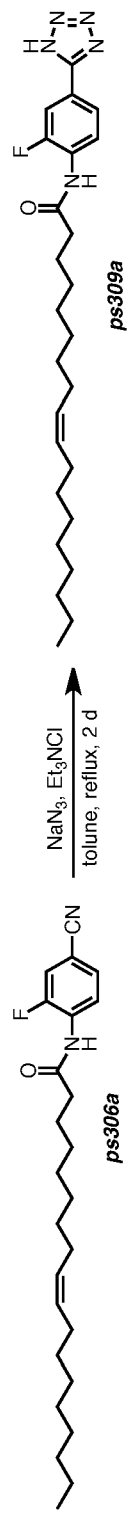
FIG. 17 is a pictorial representation of the chemical process used herein to produce the analog and/or derivative of oleoyl-LPI having the general formula (XII) and referred to herein as compounds "ps309a".

General schematic of this process resulting in a synthetic compound of formula (XII) is shown in FIG. 17.

Specifically, concentrated HCl (0.65 mL, 6.61 mmol, 32%) was added to a solution of Et$_3$N (0.92 mL, 6.61 mmol) in toluene (20 mL) that had been cooled in an ice bath, and the mixture stirred until no more fumes were observed. NaN$_3$ (0.45 g, 6.61 mmol) and ps306a (0.53 g, 1.32 mmol) were added and the mixture heated at reflux for 2 d. The toluene was removed and the resulting residue suspended in H$_2$O and acidified with concentrated HCl (~1 mL). The resulting solid was stirred for 5 min and then collected, washed with H$_2$O (5×10 mL), dried, then washed with DCM (3×10 mL) and dried, affording the product as a white solid.

Yield: 379 mg (65%).

FT-I (ATR) $V_{max}$/cm$^{-1}$: 3271 br w, 2921 m, 2851 m, 1669 m, 1650 m, 1602 m, 1582 m, 1527 s. $^1$H-NMR δ/ppm (d$_6$-DMSO): 9.95 (1H, s, NH), 8.27 (1H, t, $^3J_{H,H}$=8.2 Hz, Ar CH), 7.83-7.93 (2×1H, 2×m, 2×Ar CH), 5.29-5.41 (2×1H, 2×m, 2× olefinic CH), 2.46 (2H, m, NHCOCH$_2$), 1.96-2.06 (2×2H, 2×m, 2×CH$_2$), 1.63 (2H, m, CH$_2$), 1.20-1.39 (10×2H, 10×m, 10×CH$_2$), 0.87 (3H, m, CH$_3$). $^{13}$C-NMR δ/ppm (d$_6$-DMSO): 172.0 (CONH), 154.5 (tetrazolyl C), 152.8 (d, $^1J_{C,F}$=246 Hz, Ar CF), 129.57 (olefinic CH), 129.62 (olefinic CH), 129.1 (d, $^2J_{C,F}$=11.4 Hz, Ar C), 123.9 (Ar CH), 123.2 (d, $^3J_{C,F}$=3.4 Hz, Ar CH), 120.2 (d, $^3J_{C,F}$=8.4 Hz, Ar C), 113.9 (d, $^2J_{C,F}$=22.3 Hz, Ar CH), 35.9 (NHCOCH$_2$), 31.3 (CH$_2$), 29.1 (CH$_2$), 28.8 (CH$_2$), 28.7 (CH$_2$), 28.62 (CH$_2$), 28.57 (CH$_2$), 28.49 (CH$_2$), 26.6 (CH$_2$), 25.0 (CH$_2$), 22.1 (CH$_2$), 13.9 (CH$_3$).

Example 19: Synthesis of a Compound of Formula I: ps308c

This example demonstrates production of a synthetic compound of formula I, entitled by the inventors "ps308c" and having the general formula XIII:

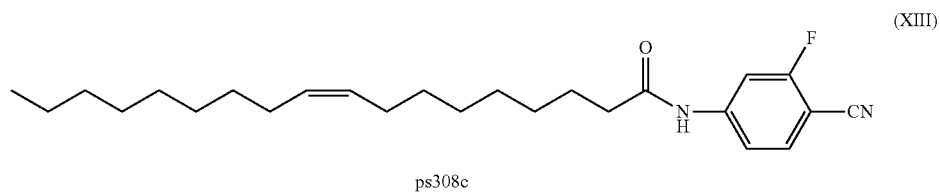

ps308c (XIII)

Figure 18:
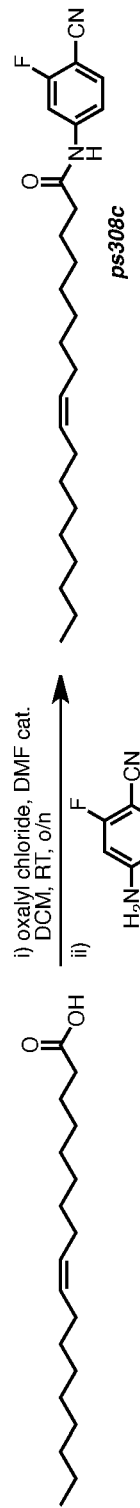
FIG. 18 a is pictorial representation of the chemical process used herein to produce the analog and/or derivative of oleoyl-LPI having the general formula (XIII) and referred to herein as compounds "ps308c".

General schematic of this process resulting in a synthetic compound of formula (XIII) is shown in FIG. 18.

Specifically, oxalyl chloride (0.71 mL, 8.24 mmol) was added over 10 min to a solution of oleic acid (2 mL, 6.34 mmol) and DMF (3 drops) in DCM (10 mL) at 0° C., and the solution stirred at room temperature overnight. The solvent and excess oxalyl chloride was removed in vacuo and the residue redissolved in DCM (10 mL). This solution was added dropwise to a solution of 2-fluoro-4-aminobenzonitrile (0.70 g, 5.14 mmol) in DCM (10 mL) and Et$_3$N (1 mL) that had been cooled in an ice bath. Upon complete addition, the solution was stirred at room temperature overnight. The solution was washed with saturated Na$_2$CO$_3$ solution (3×20 mL), H$_2$O (20 mL), and brine (20 mL), and dried over MgSO$_4$. The resulting residue was subjected to column chromatography, using a gradient elution of EtOAc/petroleum spirits to afford the product as a white.

Yield: 1.03 g (50%).

FT-I (ATR) $V_{max}$/cm$^{-1}$: 3350 m, 2920 m, 2850 m, 2229 m, 1700 s, 1620 s, 1593 m, 1529 s. $^1$H-NMR δ/ppm (d$_6$-DMSO): 10.55 (1H, s, NH), 7.89 (1H, dd, $^3J_{H,F}$=12.6 Hz, $^4J_{H,H}$=2.0 Hz, Ar CH), 7.85 (1H, dd, $^3J_{H,H}$=8.6 Hz, $^4J_{H,F}$=7.9 Hz, Ar CH), 7.46 (1H, dd, $^3J_{H,H}$=8.6 Hz, $^4J_{H,H}$=2.0 Hz, Ar CH), 5.29-5.40 (2×1H, 2×m, 2× olefinic CH), 2.39 (2H, m, NHCOCH$_2$), 1.96-2.05 (2×2H, 2×m, 2×CH$_2$), 1.61 (2H, m, CH$_2$), 1.21-1.38 (10×2H, 10×m, 10×CH$_2$), 0.87 (3H, m, CH$_3$). $^{13}$C-NMR δ/ppm (d$_6$-DMSO): 172.4 (CONH), 163.0 (d, $^3J_{C,F}$=252 Hz, Ar CF), 145.6 (d, $^3J_{C,F}$=11.7 Hz, CN), 134.2 (d, $^3J_{C,F}$=3.4 Hz, Ar CH), 129.6 (olefinic CH), 129.5 (olefinic CH), 115.1 (d, $^4J_{C,F}$=2.7 Hz, Ar CH), 114.3 (Ar C), 105.5 (d, $^2J_{C,F}$=24.7 Hz, Ar CH), 93.1 (d, $^2J_{C,F}$=15.4 Hz, Ar C), 36.5 (NHCOCH$_2$), 31.3 (CH$_2$), 29.07 (CH$_2$), 29.04 (CH$_2$), 28.8 (CH$_2$), 28.7 (CH$_2$), 28.59 (CH$_2$), 28.57 (CH$_2$), 28.5 (CH$_2$), 28.4 (CH$_2$), 26.6 (CH$_2$), 24.7 (CH$_2$), 22.1 (CH$_2$), 13.9 (CH$_3$).

Example 20: Synthesis of a Compound of Formula I: ps312a

This example demonstrates production of a synthetic compound of formula I entitled by the inventors "ps312a" and having the general formula XIV:

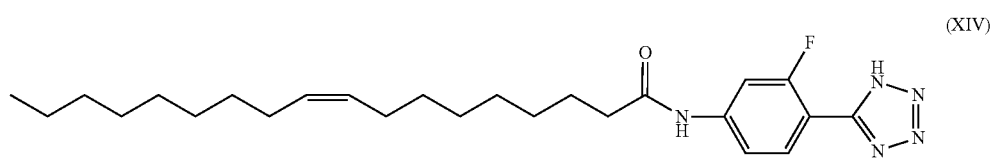

ps312a (XIV)

Figure 19:
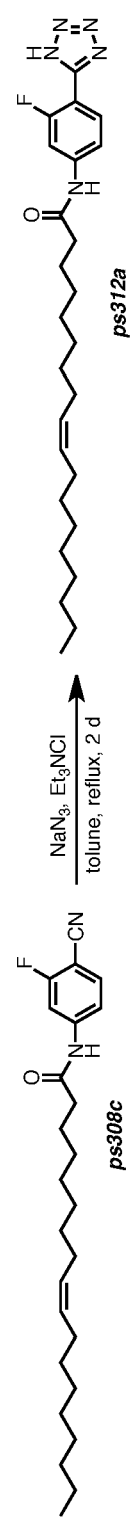
FIG. 19 is a pictorial representation of the chemical process used herein to produce the analog and/or derivative of oleoyl-LPI having the general formula (XIV) and referred to herein as compounds "ps312a".

General schematic of this process resulting in a synthetic compound of formula (XIV) is shown in FIG. 19.

Specifically, concentrated HCl (0.60 mL, 6.12 mmol, 32%) was added to a solution of Et$_3$N (0.85 mL, 6.12 mmol) in toluene (20 mL) that had been cooled in an ice bath, and the mixture stirred until no more fumes were observed. NaN$_3$ (0.42 g, 6.12 mmol) and ps308c (0.49 g, 1.22 mmol) were added and the mixture heated at reflux for 2 d. The toluene was removed and the resulting residue suspended in H$_2$O and acidified with concentrated HCl (~1 mL). The resulting solid was stirred for 5 min and then collected, washed with H$_2$O (5×10 mL), dried, then washed with DCM (3×10 mL) and dried, affording the product as a white solid.

Yield: 276 mg (51%).

FT-I (ATR) V$_{max}$/cm$^{-1}$: 3267 br w, 2951 m, 2852 m, 1669 s, 1630 w, 1606 s, 1540 s. $^1$H-NMR δ/ppm (d$_6$-DMSO): 10.43 (1H, s, NH), 8.02 (1H, m, Ar CH), 7.92 (1H, dd, $^3J_{H,F}$=13.5 Hz, $^4J_{H,H}$=2.0 Hz, Ar CH), 7.51 (1H, dd, $^3J_{H,H}$=8.6 Hz, $^4J_{H,H}$=2.0 Hz, Ar CH), 5.30-5.41 (2×1H, 2×m, 2× olefinic CH), 2.39 (2H, m, NHCOCH$_2$), 1.96-2.06 (2×2H, 2×m, 2×CH$_2$), 1.63 (2H, m, CH$_2$), 1.19-1.39 (10× 2H, 10×m, 10×CH$_2$), 0.87 (3H, m, CH$_3$). $^{13}$C-NMR δ/ppm (d$_6$-DMSO): 172.2 (CONH), 159.2 (d, $^1J_{C,F}$=249 Hz, Ar CF), 143.6 (d, $^2J_{C,F}$=11.7 Hz, Ar C), 130.1 (d, $^3J_{C,F}$=3.6 Hz, Ar CH), 129.7 (olefinic CH), 129.6 (olefinic CH), 127.8 (Ar C), 115.2 (d, $^4J_{C,F}$=2.8 Hz, Ar CH), 106.0 (d, $^2J_{C,F}$=26.1 Hz, Ar CH), 36.5 (NHCOCH$_2$), 31.3 (CH$_2$), 29.09 (CH$_2$), 29.07 (CH$_2$), 28.8 (CH$_2$), 28.7 (CH$_2$), 28.63 (CH$_2$), 28.58 (CH$_2$), 28.5 (CH$_2$), 26.6 (CH$_2$), 24.8 (CH$_2$), 22.1 (CH$_2$), 13.9 (CH$_3$).

Example 21: Synthesis of a Compound of Formula I: ps314b

Figure 20:
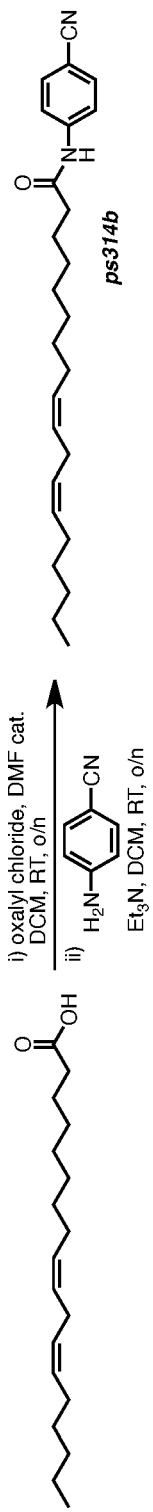
FIG. 20 is a pictorial representation of the chemical process used herein to produce the analog and/or derivative of oleoyl-LPI having the general formula (XV) and referred to herein as compounds "ps314b".

This example demonstrates production of a synthetic compound of formula I entitled by the inventors "ps314b" and having the general formula XV:

General schematic of this process resulting in a synthetic compound of formula (XV) is shown in FIG. 20.

Specifically, oxalyl chloride (0.72 mL, 8.36 mmol) was added over 10 min to a solution of linoleic acid (2 mL, 6.43 mmol) and DMF (3 drops) in DCM (10 mL) at 0° C., and the solution stirred at room temperature overnight. The solvent and excess oxalyl chloride was removed in vacuo and the residue redissolved in DCM (10 mL). This solution was added dropwise to a solution of 4-aminobenzonitrile (0.68 g, 5.79 mmol) in DCM (10 mL) and Et$_3$N (1 mL) that had been cooled in an ice bath. Upon complete addition, the solution was stirred at room temperature overnight. The solution was washed with saturated Na$_2$CO$_3$ solution (3×20 mL), H$_2$O (20 mL), and brine (20 mL), and dried over MgSO$_4$. The resulting residue was subjected to column chromatography, using a gradient elution of EtOAc/petroleum spirits to afford the product as a pale yellow oil.

Yield: 1.72 g (70%).

FT-I (ATR) V$_{max}$/cm$^{-1}$: 3329 br w, 2926 m, 2855 m, 2226 m, 1730 w, 1705 w, 1676 m, 1593 s, 1512 s. $^1$H-NMR δ/ppm (d$_6$-DMSO): 10.33 (1H, s, NH), 7.74-7.83 (2×2H, 2×m, 2×Ar CH), 5.26-5.45 (4×1H, 4×m, 4×olefinic CH), 2.78 (2H, m, CH$_2$), 2.38 (2H, m, NHCOCH$_2$), 2.01-2.08 (2×2H, 2×m, 2×CH$_2$), 1.62 (2H, m, CH$_2$), 1.23-1.41 (7×2H, 7×m, 7×CH$_2$), 0.88 (3H, m, CH$_3$). $^{13}$C-NMR δ/ppm (d$_6$-DMSO): 172.1 (CONH), 143.5 (Ar C), 133.2 (Ar CH), 129.69 (olefinic CH), 129.67 (olefinic CH), 127.73 (olefinic CH), 129.7 (olefinic CH), 119.1 (Ar C), 118.9 (Ar CH), 104.6 (CN), 36.5 (NHCOCH$_2$), 30.9 (CH$_2$), 29.0 (CH$_2$), 28.7 (CH$_2$), 28.6 (CH$_2$), 28.56 (CH$_2$), 28.5 (CH$_2$), 26.58 (CH$_2$), 26.57 (CH$_2$), 25.2 (CH$_2$), 24.8 (CH$_2$), 21.9 (CH$_2$), 13.9 (CH$_3$).

Example 22: Synthesis of a Compound of Formula I: ps316a

This example demonstrates production of a synthetic compound of formula I entitled by the inventors "ps316a" and having the general formula XVI:

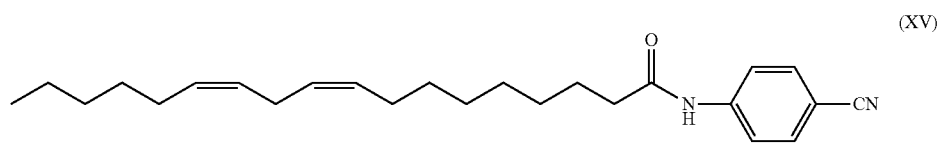

(XV)

ps314b

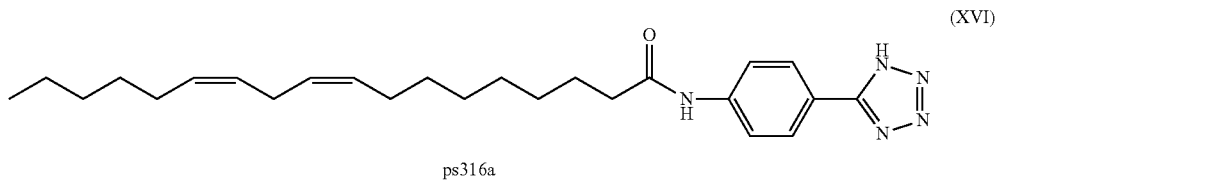 [SMILES: CCCCC/C=C\C/C=C\CCCCCCCC(=O)Nc1ccc(-c2nnn[nH]2)cc1]

ps316a

General schematic of this process resulting in a synthetic compound of formula (XVI) is shown in FIG. 21.

Specifically, concentrated HCl (0.78 mL, 7.93 mmol, 32%) was added to a solution of Et₃N (1.11 mL, 7.93 mmol) in toluene (20 mL) that had been cooled in an ice bath, and the mixture stirred until no more fumes were observed. NaN₃ (0.54 g, 7.93 mmol) and ps314b (0.60 g, 1.59 mmol) were added and the mixture heated at reflux for 2 d. The toluene was removed and the resulting residue suspended in H₂O and acidified with concentrated HCl (~1 mL). The resulting solid was stirred for 5 min and then collected, washed with H₂O (5×10 mL), dried, then washed with DCM (3×10 mL) and dried, affording the product as a white solid.

Yield: 0.45 g (66%).

FT-I (ATR) $V_{max}$/cm$^{-1}$: 3306 br w, 2926 m, 2855 m, 1668 s, 1600 s, 1537 s, 1500 s. $^1$H-NMR δ/ppm (d₆-DMSO): 10.20 (1H, s, NH), 8.00 (2H, d, $^3J_{H,H}$=8.7 Hz, Ar CH), 7.84 (2H, d, $^3J_{H,H}$=8.7 Hz, Ar CH), 5.28-5.42 (4×1H, 4×m, 4×olefinic CH), 2.77 (2H, m, CH₂), 2.38 (2H, m, NHCOCH₂), 1.99-2.09 (2×2H, 2×m, 2×CH₂), 1.63 (2H, m, CH₂), 1.22-1.40 (7×2H, 7×m, 7×CH₂), 0.88 (3H, m, CH₃). $^{13}$C-NMR δ/ppm (d₆-DMSO): 171.7 (CONH), 154.9 (tetrazolyl C), 141.9 (Ar C), 129.71 (olefinic CH), 129.69 (olefinic CH), 127.74 (olefinic CH), 129.71 (olefinic CH), 127.7 (Ar CH), 119.2 (Ar CH), 118.4 (Ar C), 36.5 (NHCOCH₂), 30.9 (CH₂), 29.0 (CH₂), 28.7 (CH₂), 28.66 (CH₂), 28.63 (CH₂), 28.5 (CH₂), 26.61 (CH₂), 26.59 (CH₂), 25.2 (CH₂), 25.0 (CH₂), 21.9 (CH₂), 13.9 (CH₃).

Example 23: Synthesis of a Compound of Formula I: ps315a

This example demonstrates production of a synthetic compound of formula I, entitled by the inventors "ps315a" and having the general formula XVII:

General schematic of this process resulting in a synthetic compound of formula (XVII) is shown in FIG. 22.

Specifically, oxalyl chloride (0.71 mL, 8.24 mmol) was added over 10 min to a solution of oleic acid (2 mL, 6.34 mmol) and DMF (3 drops) in DCM (10 mL) at 0° C., and the solution stirred at room temperature overnight. The solvent and excess oxalyl chloride was removed in vacuo and the residue redissolved in DCM (10 mL). This solution was added dropwise to a solution of 3-aminobenzonitrile (0.61 g, 5.14 mmol) in DCM (10 mL) and Et₃N (1 mL) that had been cooled in an ice bath. Upon complete addition, the solution was stirred at room temperature overnight. The solution was washed with saturated Na₂CO₃ solution (3×20 mL), H₂O (20 mL), and brine (20 mL), and dried over MgSO₄. The resulting residue was subjected to column chromatography, using a gradient elution of EtOAc/petroleum spirits to afford the product as a pale orange oil that solidified upon cooling.

Yield: 1.89 g (96%)

FT-I (ATR) $V_{max}$/cm$^{-1}$: 3314 br w, 2920 m, 2852 m, 2230 w, 1740 w, 1704 w, 1671 s, 1586 s, 1545 m. $^1$H-NMR δ/ppm (d₆-DMSO): 10.23 (1H, s, NH), 8.14 (1H, m, Ar CH), 7.82 (1H, m, Ar CH), 7.49-7.57 (2×1H, 2×m, 2×Ar CH), 5.29-5.41 (2×1H, 2×m, 2× olefinic CH), 2.35 (2H, m, NHCOCH₂), 1.96-2.08 (2×2H, 2×m, 2×CH₂), 1.62 (2H, m, CH₂), 1.21-1.39 (10×2H, 10×m, 10×CH₂), 0.87 (3H, m, CH₃). $^{13}$C-NMR δ/ppm (d₆-DMSO): 171.8 (CONH), 140.1 (Ar C), 130.1 (Ar CH), 129.6 (olefinic CH), 129.5 (olefinic CH), 126.4 (Ar CH), 123.4 (Ar CH), 121.5 (Ar CH), 118.7 (Ar C), 111.5 (CN), 36.4 (NHCOCH₂), 31.2 (CH₂), 29.08 (CH₂), 29.06 (CH₂), 28.8 (CH₂), 28.7 (CH₂), 28.63 (CH₂), 28.58 (CH₂), 28.5 (CH₂), 26.6 (CH₂), 24.9 (CH₂), 22.1 (CH₂), 13.9 (CH₃).

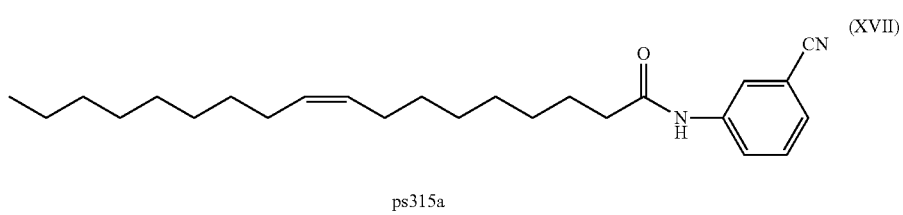 [SMILES: CCCCCCCC/C=C\CCCCCCCC(=O)Nc1cccc(C#N)c1]

ps315a

Example 24: Synthesis of a Compound of Formula I: ps318a

This example demonstrates production of a synthetic compound of formula I, entitled by the inventors "ps318a" and having the general formula XVIII:

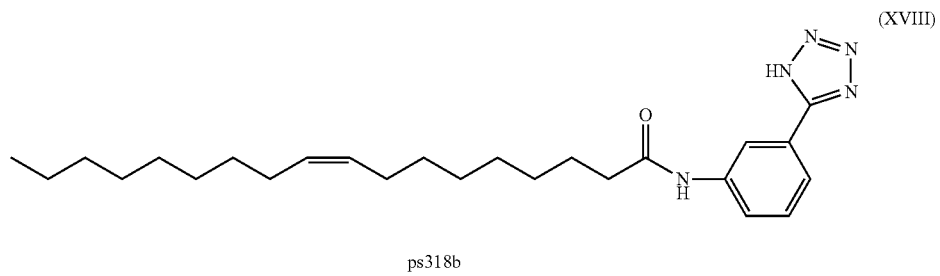

ps318b

General schematic of this process resulting in a synthetic compound of formula (XVIII) is shown in FIG. 23.

Specifically, concentrated HCl (0.73 mL, 7.48 mmol, 32%) was added to a solution of $Et_3N$ (1.04 mL, 7.48 mmol) in toluene (20 mL) that had been cooled in an ice bath, and the mixture stirred until no more fumes were observed. $NaN_3$ (0.51 g, 7.48 mmol) and ps315a (0.57 g, 1.50 mmol) were added and the mixture heated at reflux for 2 d. The toluene was removed and the resulting residue suspended in $H_2O$ and acidified with concentrated HCl (~1 mL). The resulting solid was stirred for 5 min and then collected, washed with $H_2O$ (5×10 mL), dried, then washed with DCM (3×10 mL) and dried, affording the product as a white solid.

Yield: 0.48 g (76%)

FT-I (ATR) $V_{max}/cm^{-1}$: 3545 br w, 3278 br w, 2920 m, 2851 m, 1657 s, 1576 m, 1535 m. $^1$H-NMR δ/ppm ($d_6$-DMSO): 10.20 (1H, s, NH), 8.44 (1H, dd, $^3J_{H,H}$=7.2 Hz, $^4J_{H,H}$=1.6 Hz, Ar CH), 7.77 (1H, ddd, $^3J_{H,H}$=8.2 Hz, $^4J_{H,H}$=2.0 Hz, $^4J_{H,H}$=1.0 Hz, Ar CH), 7.70 (1H, ddd, $^3J_{H,H}$=7.7 Hz, $^4J_{H,H}$=1.6 Hz, $^4J_{H,H}$=1.0 Hz, Ar CH), 7.55 (1H, dd, $^3J_{H,H}$=8.2 Hz, $^3J_{H,H}$=7.7 Hz, Ar CH), 5.31-5.41 (2×1H, 2×m, 2× olefinic CH), 2.37 (2H, m, $NHCOCH_2$), 1.95-2.08 (2×2H, 2×m, 2×$CH_2$), 1.64 (2H, m, $CH_2$), 1.21-1.39 (10×2H, 10×m, 10×$CH_2$), 0.87 (3H, m, $CH_3$). $^{13}$C-NMR δ/ppm ($d_6$-DMSO): 171.6 (CONH), 155.6 (tetrazolyl C), 140.2 (Ar C), 129.8 (Ar CH), 129.64 (olefinic CH), 129.59 (olefinic CH), 124.8 (Ar C), 121.4 (Ar CH), 121.3 (Ar CH), 117.3 (Ar CH), 36.4 ($NHCOCH_2$), 31.2 ($CH_2$), 29.1 ($CH_2$), 28.8 ($CH_2$), 28.65 ($CH_2$), 28.63 ($CH_2$), 28.56 ($CH_2$), 28.49 ($CH_2$), 26.56 ($CH_2$), 26.55 ($CH_2$), 25.0 ($CH_2$), 22.1 ($CH_2$), 13.9 ($CH_3$).

Example 25: Synthesis of a Compound of Formula I: ps317b

This example demonstrates production of a synthetic compound of formula I, entitled by the inventors "ps317b" and having the general formula XIX:

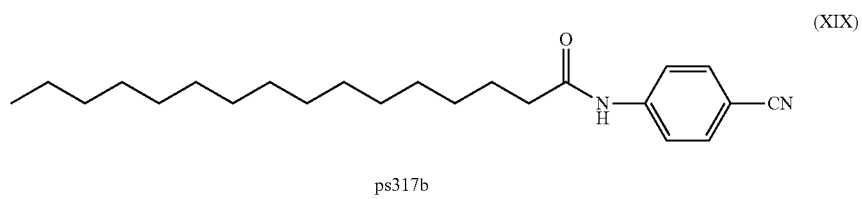

ps317b

Figure 24:
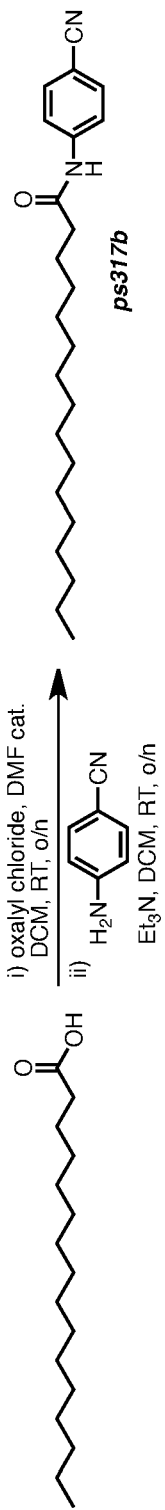
FIG. 24 is a pictorial representation of the chemical process used herein to produce the analog and/or derivative of oleoyl-LPI having the general formula (XIX) and referred to herein as compounds "ps317b".

General schematic of this process resulting in a synthetic compound of formula (XIX) is shown in FIG. 24.

Specifically, oxalyl chloride (0.87 mL, 10.14 mmol) was added over 10 min to a suspension of palmitic acid (2 g, 7.80 mmol) and DMF (3 drops) in DCM (10 mL) at room temperature, and the suspension stirred at room temperature overnight. The solvent and excess oxalyl chloride was removed in vacuo and the residue redissolved in DCM (10 mL). This solution was added dropwise to a solution of 4-aminobenzonitrile (0.83 g, 7.02 mmol) in DCM (10 mL) and Et$_3$N (1 mL) that had been cooled in an ice bath. Upon complete addition, the solution was stirred at room temperature overnight. The solution was washed with saturated Na$_2$CO$_3$ solution (3×20 mL), H$_2$O (20 mL), and brine (20 mL), and dried over MgSO$_4$. The resulting residue was suspended in methanol (20 mL) and stirred for 5 min. The solid was collected, washed with methanol (5×10 mL), and dried to afford the product as a white solid.

Yield: 1.71 g (61%).

FT-I (ATR) $V_{max}$/cm$^{-1}$: 3310 br w, 2915 s, 2849 m, 2224 w, 1674 m, 1605 m, 1528 m. $^1$H-NMR δ/ppm (d$_6$-DMSO): 10.30 (1H, s, NH), 7.81 (2H, d, $^3J_{H,H}$=8.8 Hz, Ar CH), 7.78 (2H, d, $^3J_{H,H}$=8.8 Hz, Ar CH), 2.38 (2H, m, NHCOCH$_2$), 1.62 (2H, m, CH$_2$), 1.21-1.37 (12×2H, 12× m, 12×CH$_2$), 0.89 (3H, m, CH$_3$). $^{13}$C-NMR δ/ppm (d$_6$-DMSO): 172.1 (CONH), 143.5 (Ar C), 133.2 (Ar CH), 119.1 (Ar C), 118.9 (Ar CH), 104.6 (CN), 36.5 (NHCOCH$_2$), 31.3 (CH$_2$), 29.02 (CH$_2$), 29.00 (CH$_2$), 28.98 (CH$_2$), 28.94 (CH$_2$), 28.8 (CH$_2$), 28.71 (CH$_2$), 28.68 (CH$_2$), 28.5 (CH$_2$), 24.8 (CH$_2$), 22.1 (CH$_2$), 13.9 (CH$_3$).

Example 26: Synthesis of a Compound of Formula I: ps320c

This example demonstrates production of a synthetic compound of formula I, entitled by the inventors "ps320c" and having the general formula XX:

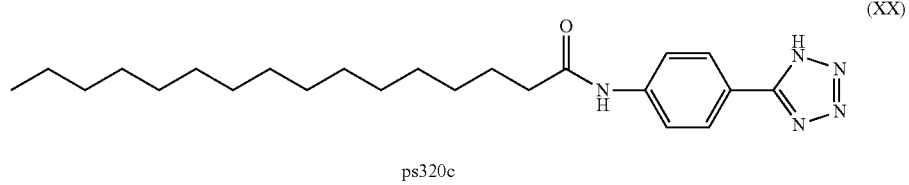

ps320c (XX)

Figure 25:
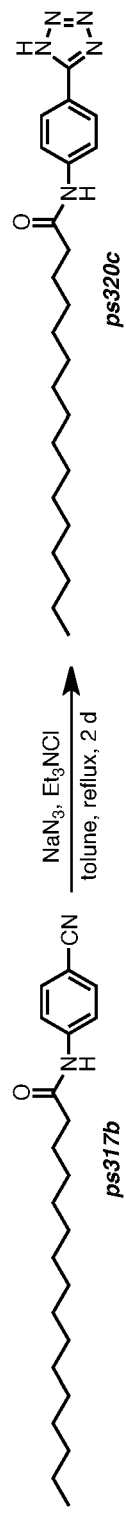
FIG. 25 is a pictorial representation of the chemical process used herein to produce the analog and/or derivative of oleoyl-LPI having the general formula (XX) and referred to herein as compounds "ps320c".

General schematic of this process resulting in a synthetic compound of formula (XX) is shown in FIG. 25.

Specifically, concentrated HCl (0.78 mL, 7.99 mmol, 32%) was added to a solution of Et$_3$N (1.11 mL, 7.99 mmol) in toluene (20 mL) that had been cooled in an ice bath, and the mixture stirred until no more fumes were observed. NaN$_3$ (0.54 g, 7.99 mmol) and ps317b (0.57 g, 1.60 mmol) were added and the mixture heated at reflux for 2 d. The toluene was removed and the resulting residue suspended in H$_2$O and acidified with concentrated HCl (~1 mL). The resulting solid was stirred for 5 min and then collected, washed with H$_2$O (5×10 mL), dried, then washed with DCM (10×10 mL) and dried, affording the product as a white solid.

Yield: 0.41 g (65%).

FT-I (ATR) $V_{max}$/cm$^{-1}$: 3558 br w, 3290 br w, 2917 s, 2847 m, 1663 s, 1618 w, 1597 w, 1534 s. $^1$H-NMR δ/ppm (d$_6$-DMSO): 10.23 (1H, s, NH), 8.01 (2H, d, $^3J_{H,H}$=8.6 Hz, Ar CH), 7.84 (2H, d, $^3J_{H,H}$=8.6 Hz, Ar CH), 2.38 (2H, m, NHCOCH$_2$), 1.63 (2H, m, CH$_2$), 1.20-1.38 (12×2H, 12×m, 12×CH$_2$), 0.88 (3H, m, CH$_3$). $^{13}$C-NMR δ/ppm (d$_6$-DMSO): 171.7 (CONH), 155.1 (tetrazolyl C), 141.7 (Ar C), 127.6 (Ar CH), 119.2 (Ar CH), 118.8 (Ar C), 36.4 (NHCO CH$_2$), 31.3 (CH$_2$), 29.0 (CH$_2$), 28.98 (CH$_2$), 28.96 (CH$_2$), 28.9 (CH$_2$), 28.74 (CH$_2$), 28.7 (CH$_2$), 28.6 (CH$_2$), 25.0 (CH$_2$), 22.1 (CH$_2$), 13.9 (CH$_3$).

Example 27: Synthesis of a Compound of Formula I: ps319

This example demonstrates production of a synthetic compound of formula I, entitled by the inventors "ps319" and having the general formula XXI:

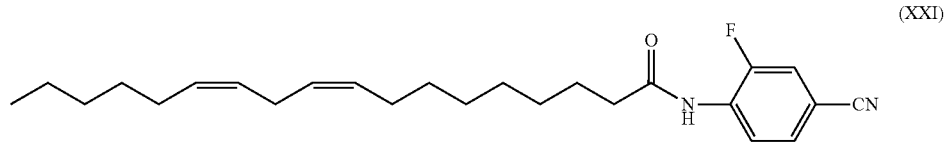

ps319 (XXI)

Figure 26:
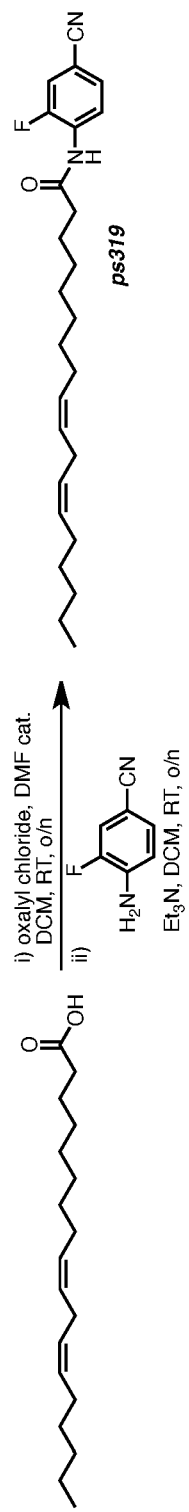
FIG. 26 is a pictorial representation of the chemical process used herein to produce the analog and/or derivative of oleoyl-LPI having the general formula (XXI) and referred to herein as compounds "ps319".

General schematic of this process resulting in a synthetic compound of formula (XXI) is shown in FIG. 26.

Specifically, oxalyl chloride (0.72 mL, 8.36 mmol) was added over 10 min to a solution of linoleic acid (2 mL, 6.43 mmol) and DMF (3 drops) in DCM (10 mL) at 0° C., and the solution stirred at room temperature overnight. The solvent and excess oxalyl chloride was removed in vacuo and the residue redissolved in DCM (10 mL). This solution was added dropwise to a solution of 3-fluoro-4-aminobenzonitrile (0.79 g, 5.79 mmol) in DCM (10 mL) and Et$_3$N (1 mL) that had been cooled in an ice bath. Upon complete addition, the solution was stirred at room temperature overnight. The solution was washed with saturated Na$_2$CO$_3$ solution (3×20 mL), H$_2$O (20 mL), and brine (20 mL), and dried over MgSO$_4$. The resulting residue was subjected to column chromatography, using a gradient elution of EtOAc/petroleum spirits to afford the product as a pale yellow oil that solidified upon cooling.

Yield: 0.98 g (39%).

FT-I (ATR) $V_{max}$/cm$^{-1}$: 3328 br w, 2925 m, 2855 m, 2232 w, 1709 m, 1616 m, 1594 m, 1517 s. $^1$H-NMR δ/ppm (d$_6$-DMSO): 10.07 (1H, s, NH), 8.32 (1H, m, Ar CH), 7.91 (1H, dd, $^3J_{H,F}$=11.1 Hz, $^4J_{H,H}$=1.9 Hz, Ar CH), 7.68 (1H, ddd, $^3J_{H,H}$=8.6 Hz, $^4J_{H,H}$=1.9 Hz, $^5J_{H,F}$=0.9 Hz Ar CH), 5.28-5.43 (4×1H, 4×m, 4× olefinic CH), 2.77 (2H, m, CH$_2$), 2.48 (2H, m, NHCOCH$_2$), 2.00-2.10 (2×2H, 2×m, 2×CH$_2$), 1.61 (2H, m, CH$_2$), 1.24-1.40 (7×2H, 7×m, 7×CH$_2$), 0.88 (3H, m, CH$_3$). $^{13}$C-NMR δ/ppm (d$_6$-DMSO): 172.4 (CONH), 151.7 (d, $^1J_{C,F}$=247 Hz, Ar CF), 131.6 (d, $^2J_{C,F}$=11.2 Hz, Ar C), 129.70 (olefinic CH), 129.68 (olefinic CH), 129.3 (d, $^3J_{C,F}$=3.5 Hz, Ar CH), 127.74 (olefinic CH), 127.71 (olefinic CH), 122.9 (d, $^4J_{C,F}$=2.9 Hz, Ar CH), 119.3 (d, $^2J_{C,F}$=23.4 Hz, Ar CH), 105.7 (d, $^3J_{C,F}$=9.3 Hz, Ar C), 117.9 (d, $^3J_{C,F}$=2.7 Hz, CN), 35.9 (NHCOCH$_2$), 30.9 (CH$_2$), 29.0 (CH$_2$), 28.7 (CH$_2$), 28.6 (CH$_2$), 28.52 (CH$_2$), 28.5 (CH$_2$), 26.6 (CH$_2$), 25.2 (CH$_2$), 24.9 (CH$_2$), 21.9 (CH$_2$), 13.9 (CH$_3$).

Example 28: Synthesis of a Compound of Formula I: ps323b

This example demonstrates production of a synthetic compound of, entitled by the inventors "ps323b" and having the general formula XXII:

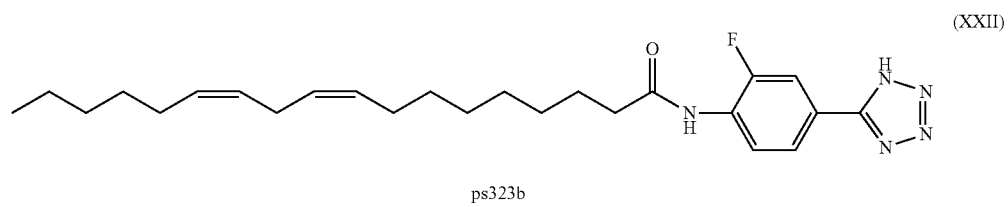

ps323b

Figure 27:
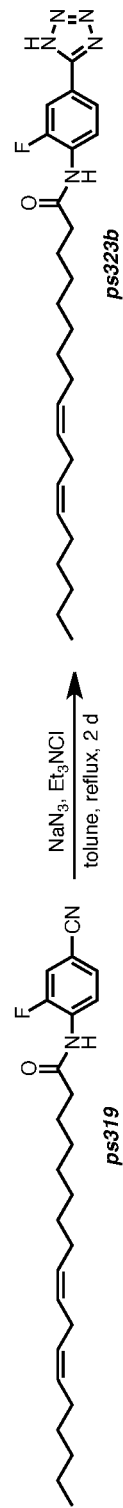
FIG. 27 is a pictorial representation of the chemical process used herein to produce the analog and/or derivative of oleoyl-LPI having the general formula (XXII) and referred to herein as compounds "ps323b".

General schematic of this process resulting in a synthetic compound of formula (XXII) is shown in FIG. 27.

Specifically, concentrated HCl (0.76 mL, 7.78 mmol, 32%) was added to a solution of Et$_3$N (1.08 mL, 7.78 mmol) in toluene (20 mL) that had been cooled in an ice bath, and the mixture stirred until no more fumes were observed. NaN$_3$ (0.53 g, 7.78 mmol) and ps319 (0.61 g, 1.56 mmol) were added and the mixture heated at reflux for 2 d. The toluene was removed and the resulting residue suspended in H$_2$O and acidified with concentrated HCl (~1 mL). The resulting solid was stirred for 5 min and then collected and washed with H$_2$O (5×10 mL). The solid was dissolved in DCM (30 mL) and washed with H$_2$O (3×30 mL), and dried over MgSO$_4$. The resulting residue was triturated with DCM (2×3 mL), petroleum spirits (3×10 mL), and then dried to afford the product as a white solid.

Yield: 0.39 g (58%).

FT-I (ATR) $V_{max}$/cm$^{-1}$: 2922 w, 2854 w, 1734 s, 1667 w, 1524 w, 1444 w. $^1$H-NMR δ/ppm (d$_6$-DMSO): 9.92 (1H, s, NH), 8.20 (1H, t, $^3J_{H,H}$=8.2 Hz, Ar CH), 7.86-7.95 (2×1H, 2× m, 2×Ar CH), 5.28-5.44 (4×1H, 4×m, 4× olefinic CH), 2.77 (2H, m, CH$_2$), 2.46 (2H, m, NHCOCH$_2$), 2.00-2.09 (2×2H, 2×m, 2×CH$_2$), 1.63 (2H, m, CH$_2$), 1.23-1.40 (7×2H, 7×m, 7×CH$_2$), 0.88 (3H, m, CH$_3$). $^{13}$C-NMR δ/ppm (d$_6$-DMSO): 172.0 (CONH), 155.2 (tetrazolyl C), 153.0 (d, $^1J_{C,F}$=245.5 Hz, Ar CF), 129.7 (2× olefinic CH), 128.4 (d, $^2J_{C,F}$=11.5 Hz, Ar C), 127.75 (olefinic CH), 127.72 (olefinic CH), 124.0 (Ar CH), 122.9 (d, $^3J_{C,F}$=3.2 Hz, Ar CH), 121.6 (d, $^3J_{C,F}$=8.0 Hz, Ar C), 113.7 (d, $^2J_{C,F}$=22.2 Hz, Ar CH), 35.8 (NHCOCH$_2$), 30.9 (CH$_2$), 29.0 (CH$_2$), 28.7 (CH$_2$), 28.63 (CH$_2$), 28.57 (CH$_2$), 28.53 (CH$_2$), 26.61 (CH$_2$), 26.59 (CH$_2$), 25.2 (CH$_2$), 25.0 (CH$_2$), 21.9 (CH$_2$), 13.9 (CH$_3$).

Example 29: Synthesis of a Compound of Formula I: ps321a

This example demonstrates production of a synthetic compound of formula I, entitled by the inventors "ps321a" and having the general formula XXIII:

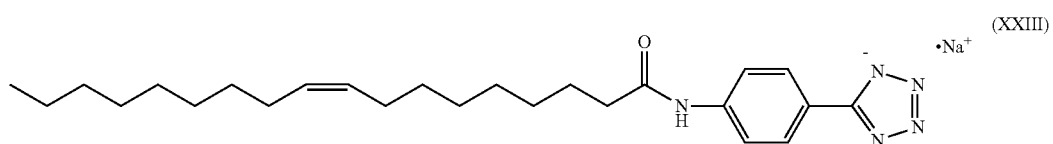

ps321a

Figure 28:
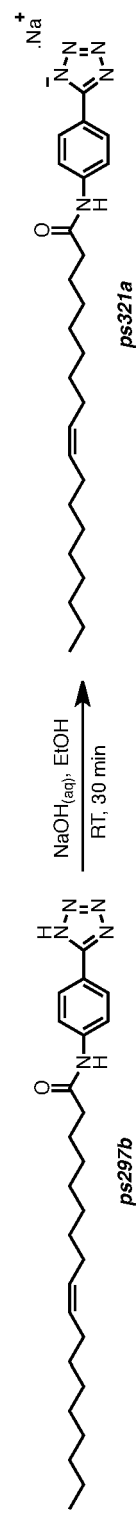
FIG. 28 is a pictorial representation of the chemical process used herein to produce the analog and/or derivative of oleoyl-LPI having the general formula (XXIII) and referred to herein as compounds "ps321a".
Figure 29A:
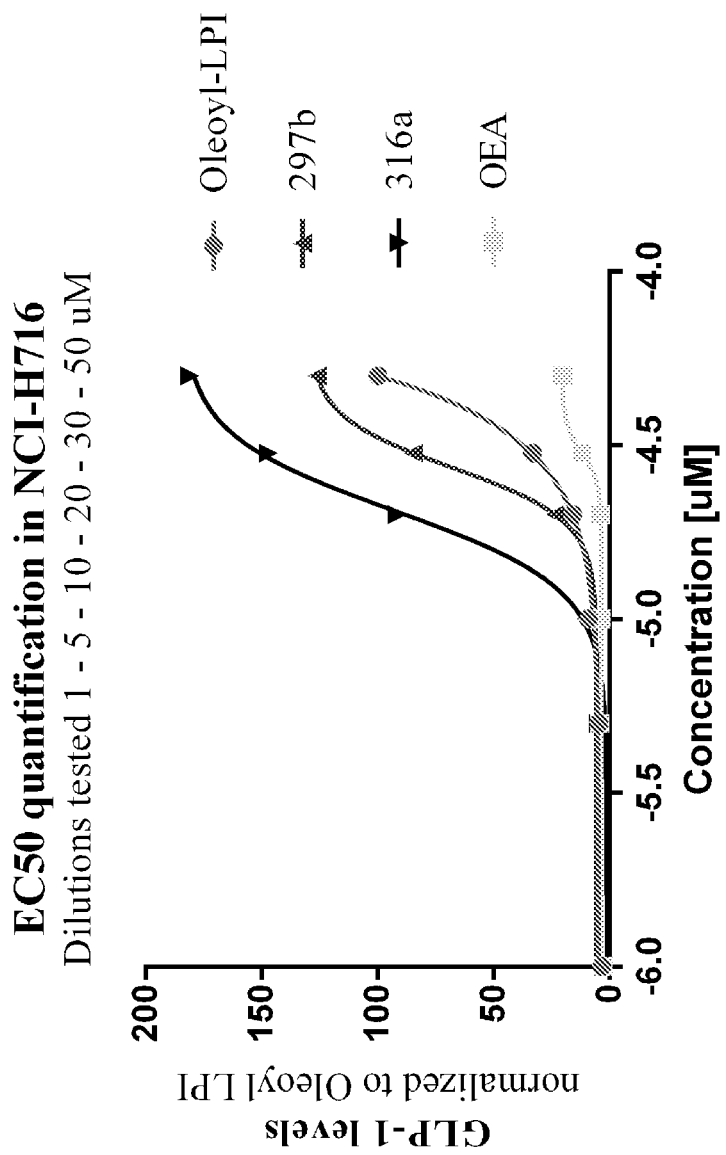
FIG. 29 is a graphical representation demonstrating efficacy of compounds of the present invention having the structure of formula I in stimulating synthesis and secretion of GLP-1 in NCI-H716 cells of an in vitro human L cells model. Panels A-D show results of 4 separate individual experiments measuring EC50 values of GLP-1 secretion levels from NCI-H716 incubated for 2 hours with varying concentrations of oleoyl-LPI, OEA, compound ps297b and compound ps316a, normalized a percentage of GLP-1 secretion obtained for maximal concentrations of oleoyl-LPI. Panel E show final EC50 averages of EC50 values for GLP-1 secretion levels obtained from combining EC50 data from the 4 individual experiments in panels A-D (normalized to for maximal concentrations of oleoyl-LPI). Results in panel E are shown as the standardized output reading and the error bars represent means±SEM of the four independent experiments.
Figure 29B:
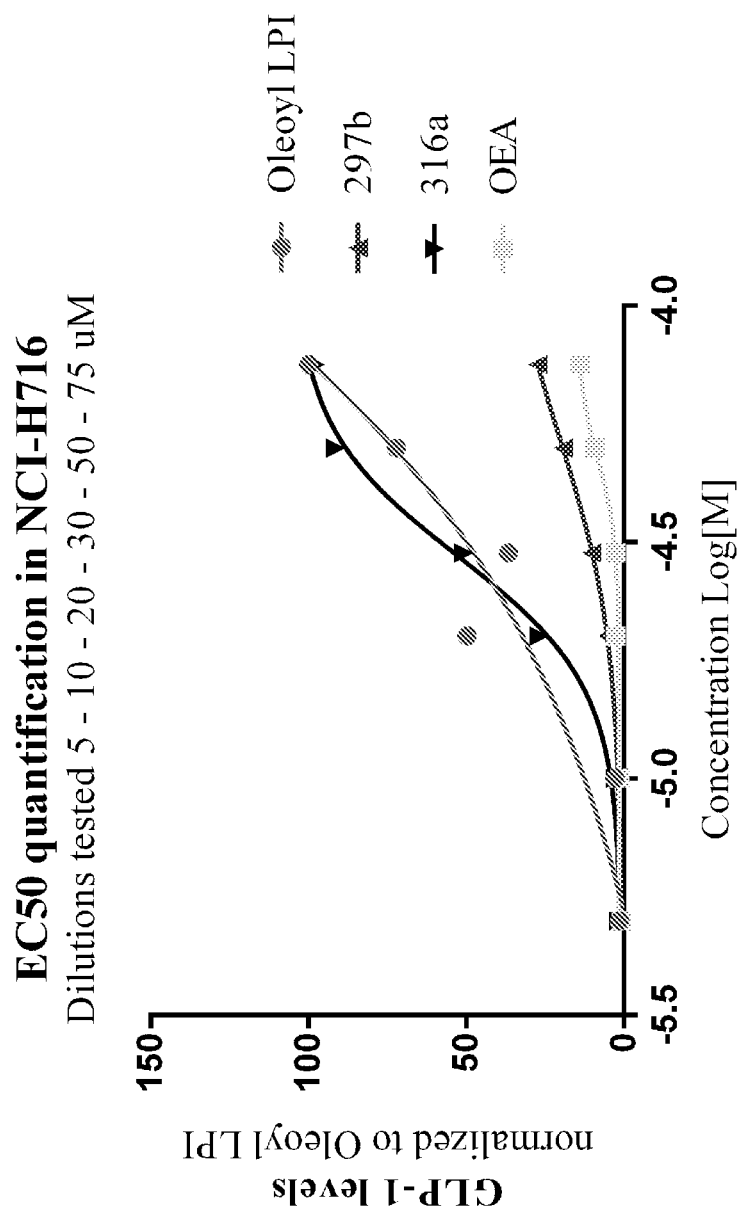
Figure 29C:
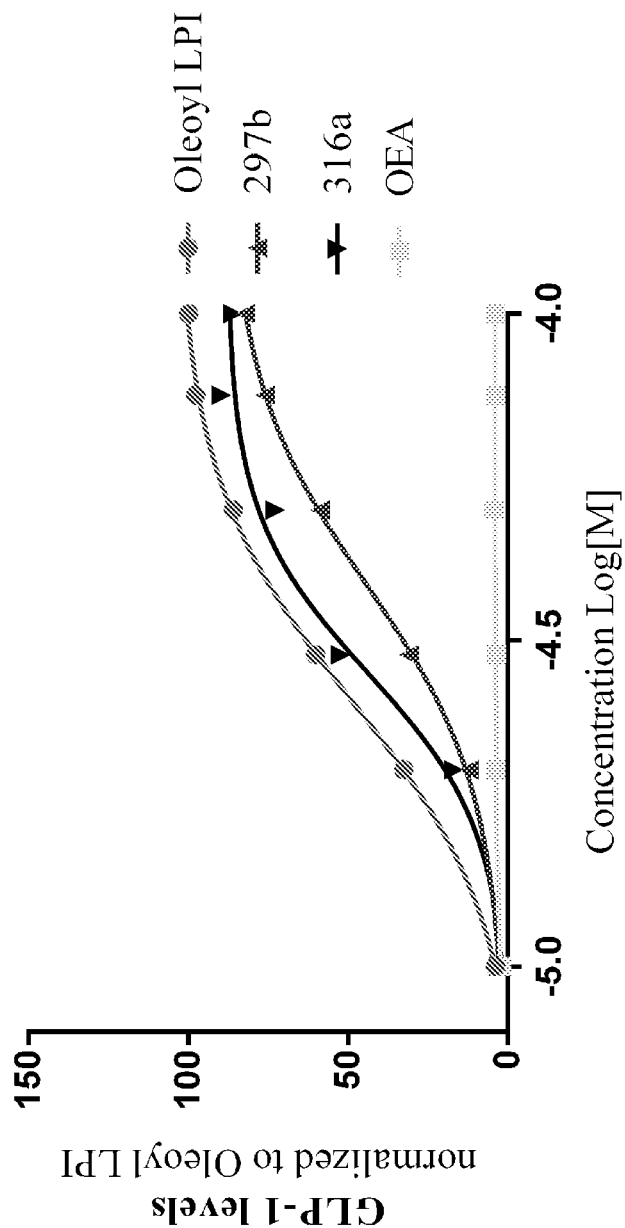
Figure 29D:
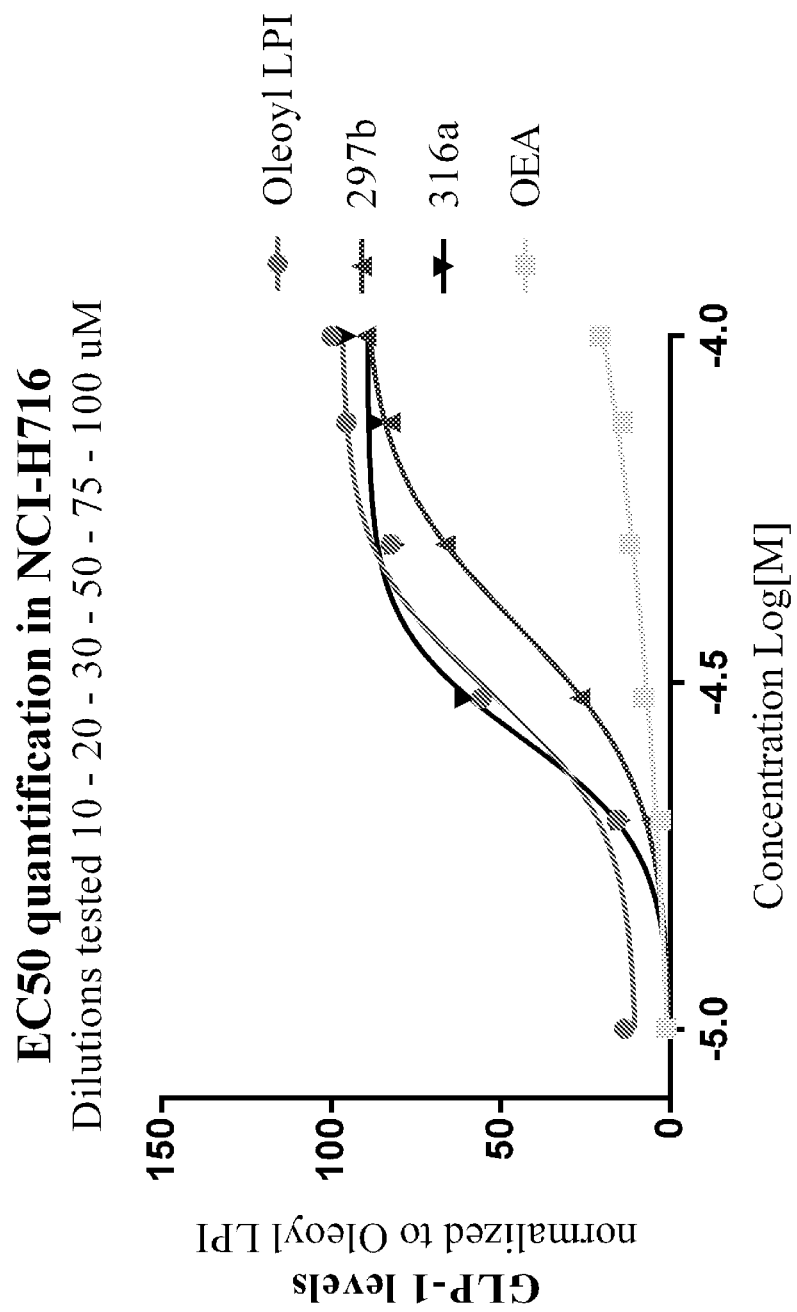
Figure 29E:
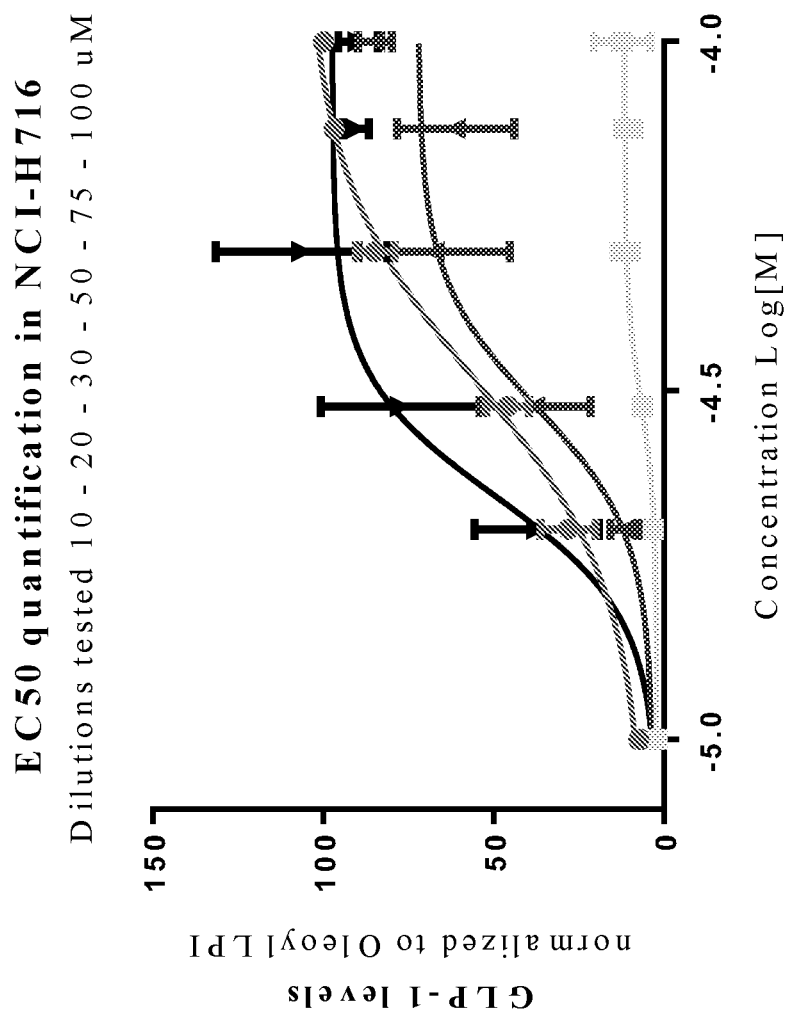

General schematic of this process resulting in synthetic analog and/or derivative compound of formula (XXIII) is shown in FIG. 28.

Specifically, an aqueous solution of NaOH (11.95 μL, 6.33 M, 0.076 mmol), was added to a solution of ps297b (32.2 mg, 0.076 mmol) in ethanol (2 mL) and the solution stirred at room temperature for 30 min. The solution was dried and the resulting residue was azeotropically dried by repeated dissolution in ethanol and evaporation steps. DCM (2 mL) and $Et_2O$ (5 mL) were added to the dried residue and the resulting solid was collected, washed with $Et_2O$ (2×5 mL), and dried to afford the product as a white solid.

Yield: 17.3 mg (51%).

FT-I (ATR) $V_{max}$/cm$^{-1}$: 3316 br w, 2922 m, 2852 m, 1662 s, 1603 s, 1541 m. 1H-NMR δ/ppm ($d_6$-DMSO): 9.87 (1H, s, NH), 7.90 (2H, d, $^3J_{H,H}$=8.8 Hz, Ar CH), 7.62 (2H, d, $^3J_{H,H}$=8.8 Hz, Ar CH), 5.31-5.42 (2×1H, 2×m, 2× olefinic CH), 2.33 (2H, m, $NHCOCH_2$), 1.97-2.09 (2×2H, 2×m, 2×$CH_2$), 1.63 (2H, m, $CH_2$), 1.22-1.40 (10×2H, 10×m, 10×$CH_2$), 0.88 (3H, m, $CH_3$). $^{13}$C-NMR δ/ppm ($d_6$-DMSO): 171.0 (CONH), 160.3 (tetrazolate C), 138.1 (Ar C), 129.64 (olefinic CH), 129.62 (olefinic CH), 127.6 (Ar C), 126.0 (Ar CH), 118.9 (Ar CH), 36.4 ($NHCOCH_2$), 31.2 ($CH_2$), 29.09 ($CH_2$), 29.07 ($CH_2$), 28.8 ($CH_2$), 28.68 ($CH_2$), 28.67 ($CH_2$), 28.66 ($CH_2$), 28.56 ($CH_2$), 28.5 ($CH_2$), 26.57 ($CH_2$), 26.55 ($CH_2$), 25.1 ($CH_2$), 22.1 ($CH_2$), 13.9 ($CH_3$).

Example 30: Testing for Activity of Oleoyl-LPI and Compounds Having a Structure of Formula I in Stimulating GLP-1 Biosynthesis and Secretion in NCI-H716 Cells as an In Vitro Human L Cells Model—Part I This example demonstrates efficacy of both the oleoyl-LPI and various compounds of formula I, in stimulating GLP-1 biosynthesis and secretion in NCI-H716 cells exposed to these compounds. NCI-H716 is a human derived cell line originally isolated from ascites fluid of a colorectal adenocarcinoma of a 33 year old Caucasian male. This cell line is currently the main human model available in the art for the in vitro study of GLP-1.

The results provided in the earlier examples above demonstrate efficacy of the endogenous GPR119 ligand, oleoyl-LPI, in stimulating GLP-1 biosynthesis and secretion in both human and murine L cells (including NCI-H716) and in primary colonic cell preparation.

The inventors went on to prepare compounds having the structure of formula I as outlined in the previous examples.

This example sets out to evaluate the efficacy of the compounds of formula I of the present invention in stimulating GLP-1 biosynthesis and secretion in the art recognized in vitro human L cells model of GLP-1 and to assess whether such compounds possess a similar activity as oleoyl-LPI on mediating GLP-1 biosynthesis and secretion in such in vitro model.

To evaluate the GLP-1 biosynthesis and secreting capabilities of the compounds of formula I in vitro using the human-derived cell line NCI-H716, 50,000 such cells were seeded per well of a 24-well plate pre-coated with a thin layer of Matrigel (0.15 mg/ml) in RPMI complete (RPMI additioned with FBS 10%, Glucose 2 g/L, Glutamine 4 mM, Sodium Bicarbonate 2 g/L, Pen/Strep 1× pH 7.4 at 37° C.) and incubated at 37° C. in humidified 5% $CO_2$ atmosphere to induce endocrine differentiation.

After 48 hours, media was withdrawn and cells washed once with warm HBSS (Hank's balanced salt solution) and then incubated in duplicate for 2 hours with the different dilutions of the oleoyl-LPI, OEA, DMSO (as negative control), a test compound of formula I, and KR-62436 10 μg/ml, all dissolved in RPMI serum free (RPMI complete without FBS) at 37° C. in humidified 5% $CO_2$ incubator. Supernatant were quickly collected on ice and stored at −80° C. before quantification of GLP-1 with a commercial ELISA (EMD Millipore) specific for active-GLP-1 species.

The compounds of formula I initially tested were ps2907b and ps316a. With results are shown in FIG. 29.

Displayed graphs are presented as percentage of GLP-1 secretion obtained for maximal concentrations of oleoyl-LPI.

EC50s were individually calculated using GraphPad Prism 6 software (La Jolla California, USA) for every experiment and final averages presented ±SEM of indicated number of experiments, n=4 for compound 297b and 316a, n=2 oleoyl-LPI and OEA.

EC50s were calculated using the GraphPad Prism 6 software (La Joalla California, USA). EC50s variability is expressed as 95% Confidence Intervals from n=4.

The results confirm those results obtain during ex vivo GLP-1 secretion assays performed in example 9, and demonstrate that the compounds of formula I tested, (ps297b and ps316a), are effective in stimulating GLP-1 biosynthesis and secretion in the in vitro human L cells model for GLP-1.

Example 31: Testing for Activity of Oleoyl-LPI and Compounds Having a Structure of Formula I in Stimulating GLP-1 Biosynthesis and Secretion in NCI-H716 Cells as an In Vitro Human L Cells Model—Part II This example demonstrates efficacy of various compounds of formula I, in stimulating GLP-1 biosynthesis and secretion in NCI-H716 cells, an in vitro human L cells model form GLP-1 secretion.

This example sets out to evaluate the efficacy of additional (not previously tested) compounds of formula I of the present invention in stimulating GLP-1 biosynthesis and secretion in the art recognized in vitro human L cells model of GLP-1.

To evaluate the GLP-1 biosynthesis and secreting capabilities of the compounds of formula I in vitro using the human-derived cell line NCI-H716, 50,000 such cells were seeded per well of a 24-well plate pre-coated with a thin layer of Matrigel (0.15 mg/ml) in RPMI complete (RPMI additioned with FBS 10%, Glucose 2 g/L, Glutamine 4 mM, Sodium Bicarbonate 2 g/L, Pen/Strep 1×pH 7.4 at 37° C.) and incubated at 37° C. in humidified 5% $CO_2$ atmosphere to induce endocrine differentiation.

After 48 hours, media was withdrawn and cells washed twice with pre-warm HBSS (Hank's balanced salt solution) and then incubated in duplicate for 2 hours with 250 μl of 20 μM of either oleoyl-LPI, DMSO (as negative control) or a test compound of formula I, and KR-62436 μg/ml, all dissolved in RPMI serum free (RPMI complete without FBS) at 37° C. in humidified 5% $CO_2$ incubator. Compounds of formula I tested were ps297b, ps316a, ps318a, ps319a, ps321a and ps323.

Supernatant were quickly collected on ice and stored at −80° C. before quantification of GLP-1 with a commercial ELISA (EMD Millipore) specific for active-GLP-1 species (e.g., GLP-1 (7-36) amide) and GLP-1 (9-36) amide).

EC50s were individually calculated using GraphPad Prism 6 software (La Jolla California, USA) for every experiment and final averages presented ±SEM of indicated number of experiments, n=4, for compounds 297b and 316a, n=2 oleoyl-LPI and OEA.

EC50s were calculated using the GraphPad Prism 6 software (La Joalla California, USA). EC50s variability is expressed as 95% Confidence Intervals from n=4.

Figure 30A:
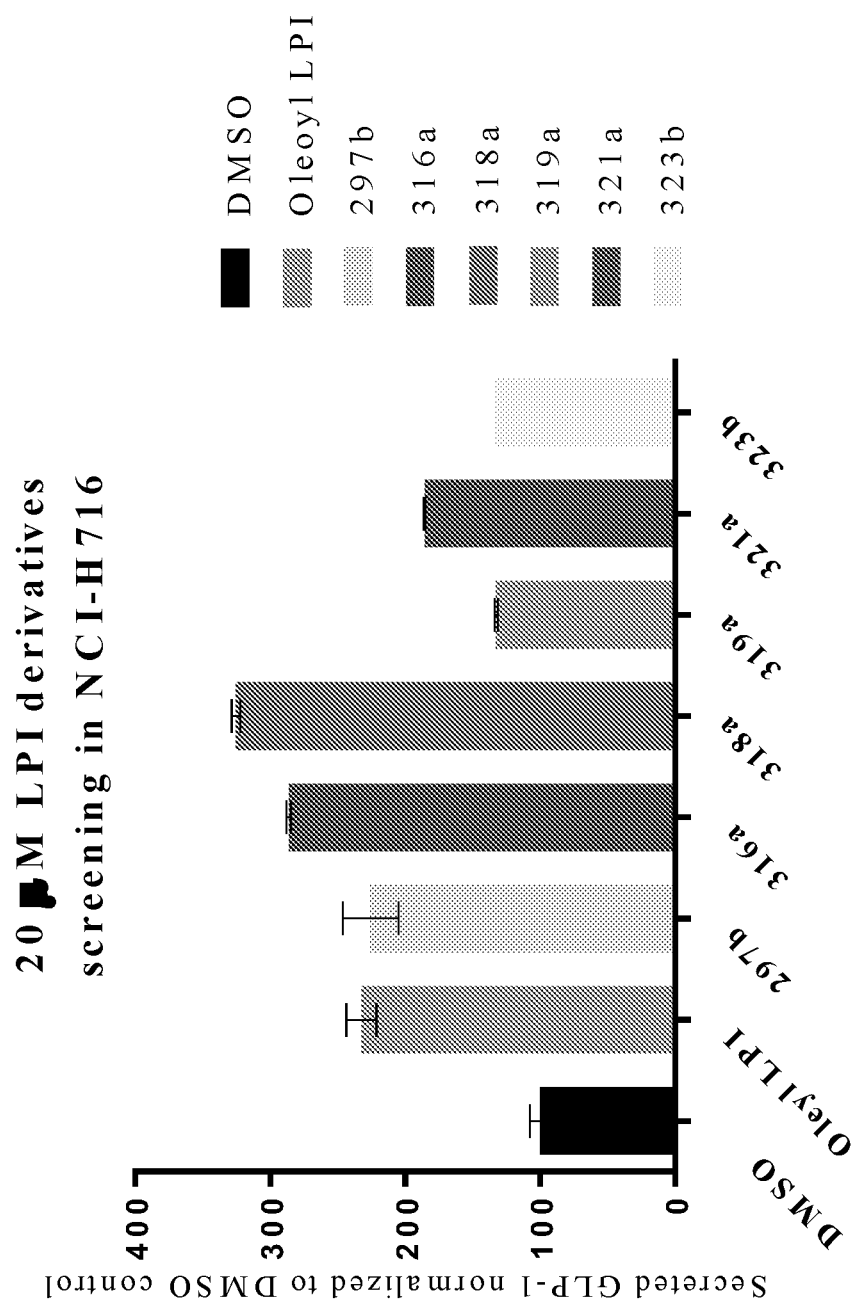
FIG. 30 is a graphical representation demonstrating efficacy of compounds of the present invention having the structure of formula I in stimulating synthesis and secretion of GLP-1 in NCI-H716 cells of an in vitro human L cells model. Panel A and B show EC50 GLP-1 secretion levels for oleoyl-LPI, ps297b, ps316a, ps318a, ps319a, ps321a and ps323. EC50 data are expressed as a percentage of secretion normalized against DMSO vehicle control treated cells, and variability is expressed as 95% Confidence Intervals from n=4. Panel B and C also demonstrate that the three compounds showing the strongest activity in modulating GLP-1 biosynthesis and secretion (ps297b, ps316a, ps318a) are those having unsaturated lipid chains (1 or 2 double bonds in the lipid chain).

EC50 data are expressed as a percentage of secretion normalized against DMSO vehicle control treated cells. Results are shown in FIG. 30.

The results obtained (see FIG. 30A) demonstrate that all compounds of formula I tested ps297b, ps316a, ps318a, ps319a, ps321a and ps323 were able to mediate GLP-1 biosynthesis and secretion from NCI-H716 L cells. Compounds ps297b was able to induce GLP-1 biosynthesis and secretion from NCI-H716 cells at levels comparable to that of oleoyl-LPI, and ps316a and ps318 demonstrated ability to induce GLP-1 biosynthesis and secretion from NCI-H716 cells at levels higher than those achieved from oleoyl-LPI. These results surprisingly demonstrate that ps297b, ps316a and ps318a are very efficient modulators of GLP-1 biosynthesis and secretion, with ps316a and ps318a being even more efficient that the endogenous oleoyl-LPI in inducing GLP-1 biosynthesis and secretion in vitro in human L cells.

Figure 30B:
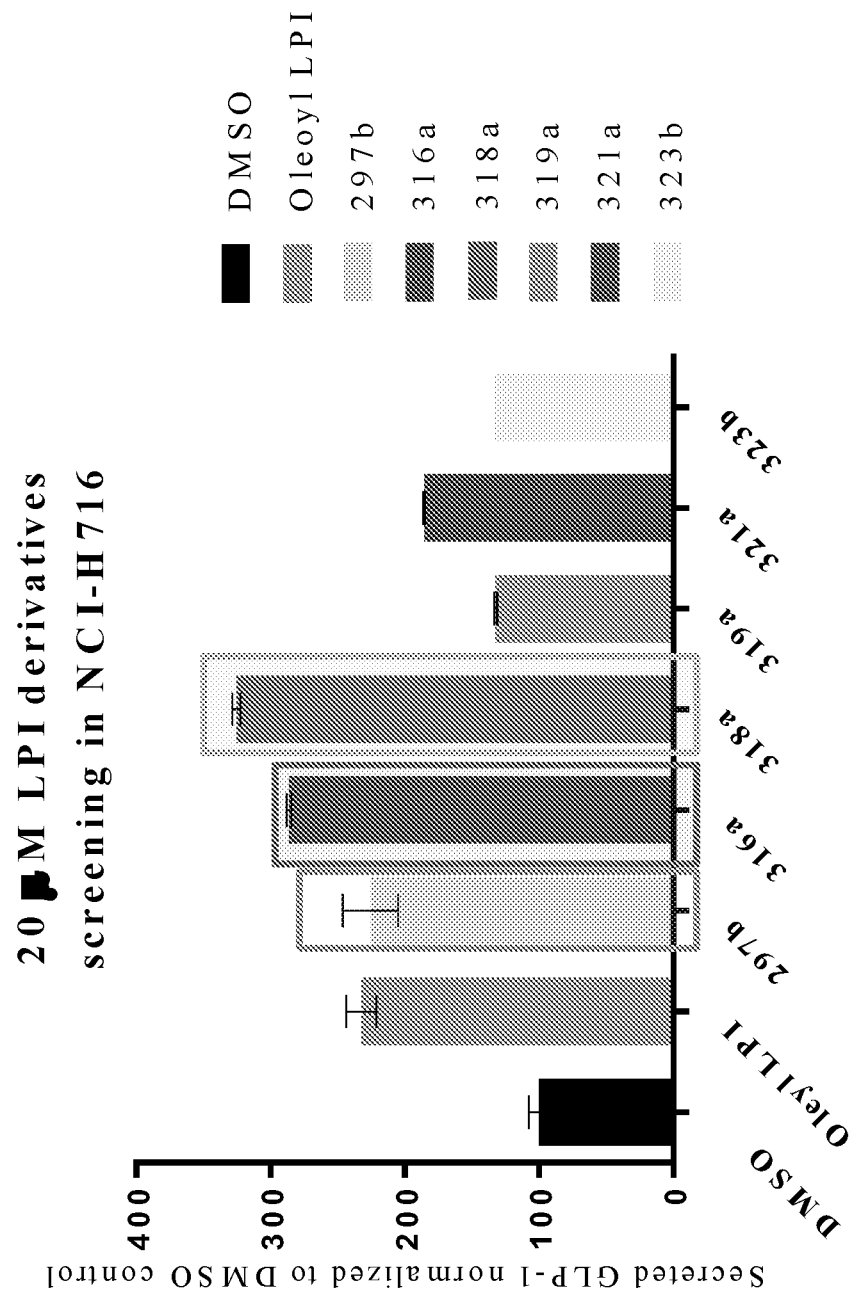
Figure 30C:
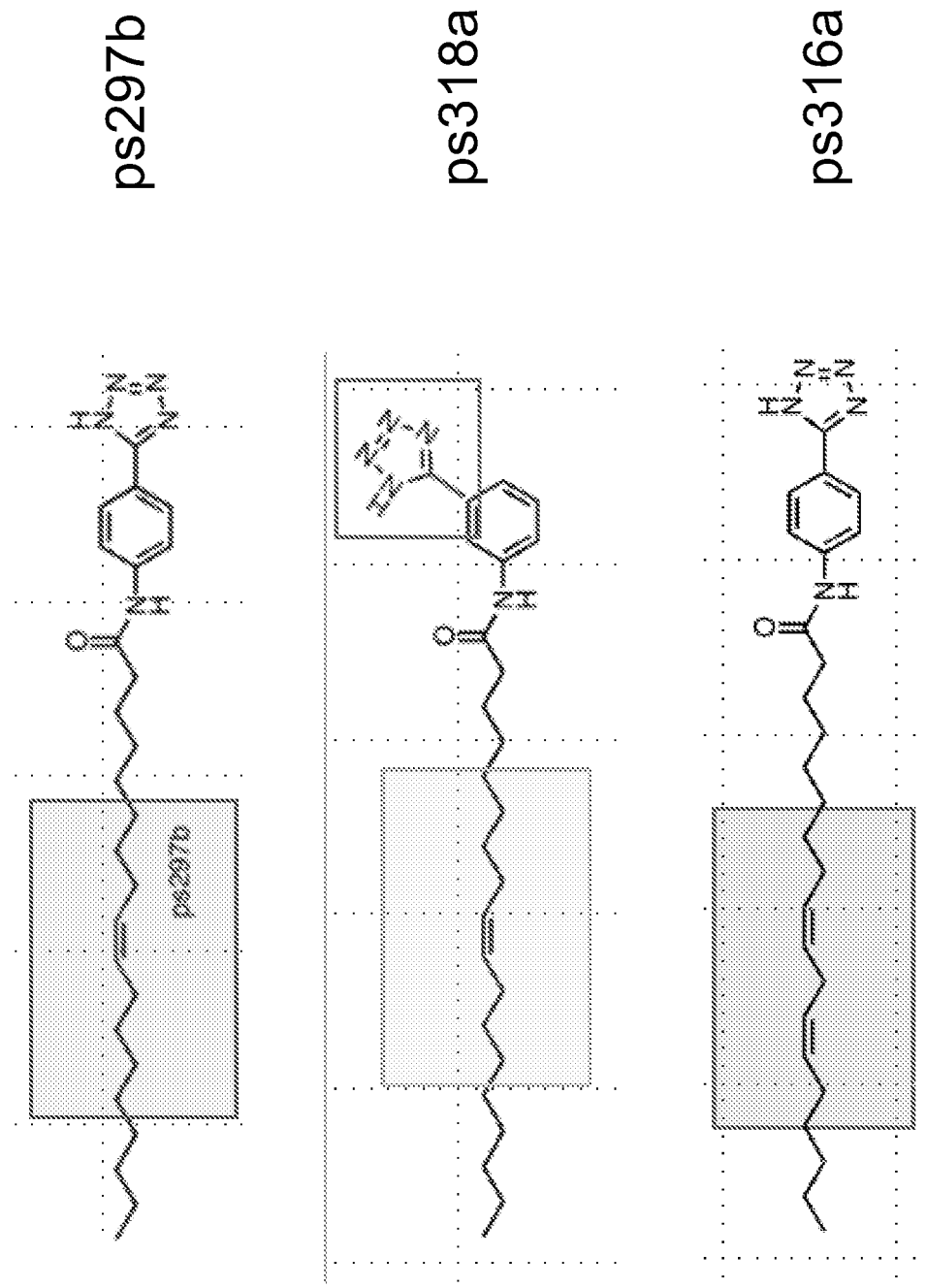

Furthermore, as shown in FIGS. 30B and 30C, the results interestingly demonstrate that the three compounds showing the strongest activity in modulating GLP-1 biosynthesis and secretion (ps297b, ps316a, ps318a) are those having unsaturated lipid chains (1 or 2 double bonds in the lipid chain).

Example 32: Testing for Activity of Oleoyl-LPI and Compounds Having a Structure of Formula I in Stimulating GLP-1 Biosynthesis and Secretion in NCI-H716 Cells as an In Vitro Human L Cells Model—Part III This example also demonstrates efficacy of various compounds of formula I, in stimulating GLP-1 biosynthesis and secretion in NCI-H716 cells, an in vitro human L cells model form GLP-1 secretion.

This example sets out to evaluate the efficacy of additional (not previously tested) compounds of formula I of the present invention in stimulating GLP-1 biosynthesis and secretion in the art recognized in vitro human L cells model of GLP-1.

Figures 31A, 31B:
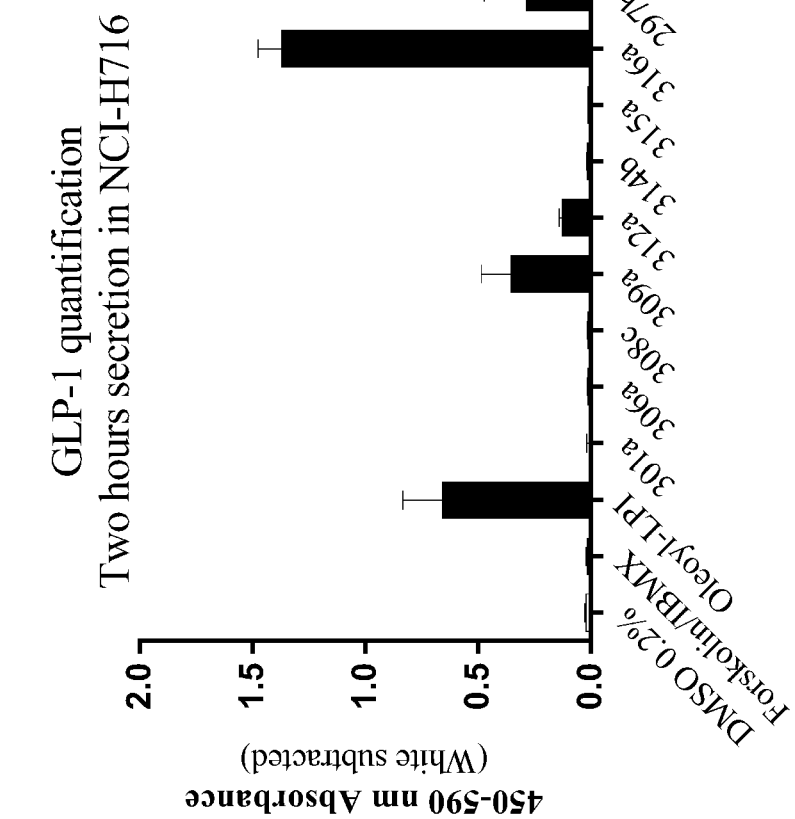
FIG. 31 is a graphical representation demonstrating efficacy of compounds of the present invention having the structure of formula I in stimulating synthesis and secretion of GLP-1 in NCI-H716 cells of an in vitro human L cells model. Panel A and B show EC50 GLP-1 secretion levels for oleoyl-LPI, ps293a, ps294a, ps297b, ps298a, ps298b ps300b (Panel A) and ps301a, ps306a, ps308a, ps309a, ps312a, ps314b, ps315a, ps316a, and ps297b (Panel B). EC50 data are expressed as a percentage of secretion normalized against DMSO vehicle control treated cells, and variability is expressed as 95% Confidence Intervals from n=4.

The following compound of formula I were tested for GLP-1 secretion NCI-H716 cells essentially as describe in examples 30 and 31 above: ps297b, ps293a, ps294a, ps298a, ps300b, ps301, ps306a, ps308c, ps309a, ps312a, ps314b, ps315a, ps316a. EC50 secretion readouts are provided in FIG. 31A and FIG. 31B.

Example 33: Testing for Activity of Oleoyl-LPI and Compounds Having a Structure of Formula I in Stimulating GLP-1 Biosynthesis and Secretion in NCI-H716 Cells as an In Vitro Human L Cells Model—Part IV This example also demonstrates efficacy of various compounds of formula I, in stimulating GLP-1 biosynthesis and secretion in NCI-H716 cells, an in vitro human L cells model form GLP-1 secretion.

This example sets out to evaluate the efficacy of 21 synthetic compounds of formula I in stimulating GLP-1 biosynthesis and secretion in the art recognized in vitro human L cells model of GLP-1.

Compounds of formula I were tested for GLP-1 secretion in NCI-H716 cells essentially as describe in examples 30 and 31 above. EC50 GLP-1 secretion readout results were standardized relative to maximum GLP-1 secretion obtained with oleoyl-LPI. EC50 readout results were rated as low GLP-1 secretion activity (0-20% of maximum GLP-1 secretion achieved with oleoyl-LPI), moderate (21-79% of maximum GLP-1 secretion achieved with oleoyl-LPI), and high GLP-1 activity (80% and more of maximum GLP-1 secretion achieved with oleoyl-LPI). Results are shown in Table 3 below. Table 3 also outlines the $R_1$, $R_2$ and $R_3$ substituents of the compounds of formula I.

TABLE 3

GLP-1 secretion activity results obtained for 21 compounds of formula I relative to maximum GLP-1 secretion for maximum, $R_1$, $R_2$ and $R_3$ substituents of the compounds of formula I are also indicated.

| Compound | $R_1$ | $R_2$ | $R_3$ | GLP-1 secretion Activity relative to oleoyl-LPI |
|---|---|---|---|---|
| 297b | H | Tetrazole | oleoyl | High |
| 316a | H | Tetrazole | linoleoyl | High |
| 318a | H | Tetrazole (meta to amide) | oleoyl | High |
| 309a | F (meta to tetrazole) | Tetrazole | oleoyl | High |
| 312a | F (ortho to tetrazole) | Tetrazole | oleoyl | Moderate |
| 292a | H | CN | oleoyl | Low |
| 293a | H | $CO_2Me$ | oleoyl | Low |
| 294a | H | $CO_2H$ | oleoyl | Low |
| 298a | H | N2-methyltetrazole | oleoyl | Low |
| 298b | H | N1-methyltetrazole | oleoyl | Low |
| 300b | H | OH | oleoyl | Low |
| 301a | H | OMe | oleoyl | Low |
| 306a | F (meta to CN) | CN | oleoyl | Low |
| 308c | F (ortho to CN) | CN | oleoyl | Low |
| 314b | H | CN | linoleoyl | Low |
| 315a | H | CN (meta to amide) | oleoyl | Low |
| 317b | H | CN | palmitoyl | Low |
| 319 | F (meta to amide) | CN | linoleoyl | Low |
| 320c | H | Tetrazole | palmitoyl | Low |
| 321a | H | Sodium tetrazolate | oleoyl | Low |
| 323b | F (meta to tetrazole) | Tetrazole | linoleoyl | Low |

Example 34: Testing for Toxicity of a Compound Having a Structure of Formula I Zebrafish Two-days old *Danio rerio* larvae were dechorionated and treated for 3 days with increasing amount of a synthetic compound of formula I such as ps297b. Cardiotoxicity of the synthetic compound was assessed by measuring the heartbeat, the movement, and teratogenicity (hatching rate, mortality rate (LD50). This is repeated at least three times with about 10 larvae per concentration tested. Preliminary experiment with ps297b shows no sign of toxicity up to 200 micromolar of this compound (results not shown).

Figure 32:
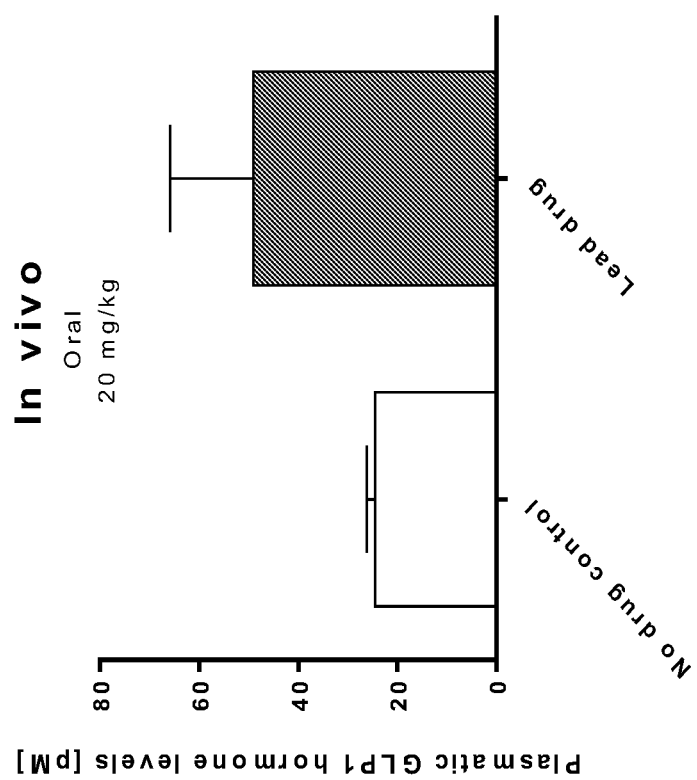
FIG. 32 is a graphical representation demonstrating the effectiveness of compound of the formula VI (ps297b) at increasing GLP-1 release after administration by oral gavage of a dose of 20 mg/kg to wild type mice in an Oral Glucose GLP-1 secretion test. Active GLP-1 levels were measured in samples collected 2 minutes post glucose load. N=3

Example 35: Testing for Stimulating GLP-1 Biosynthesis and Secretion in Mice Mice were sampled at about 2 minutes post glucose load, 20 µl of arterial blood may be sampled in K3-EDTA and KR-62436 containing tubes to collect plasma and samples are quickly store at −80° C. Plasma samples of 4 to 6 animals may be pool together and assayed to quantify the levels of active GLP-1 (such as GLP-1 (7-36)amide) using commercially available ELISA kits. FIG. 32 is a graphical representation demonstrating the effectiveness of compound of the formula VI (ps297b) at increasing GLP-1 release after administration by oral gavage of a dose of 20 mg/kg to wild type mice in an Oral Glucose GLP-1 secretion test. Active GLP-1 levels were measured in samples collected 2 minutes post glucose load. N=3

---

The invention claimed is:

1. A compound which is selected from the group consisting of:

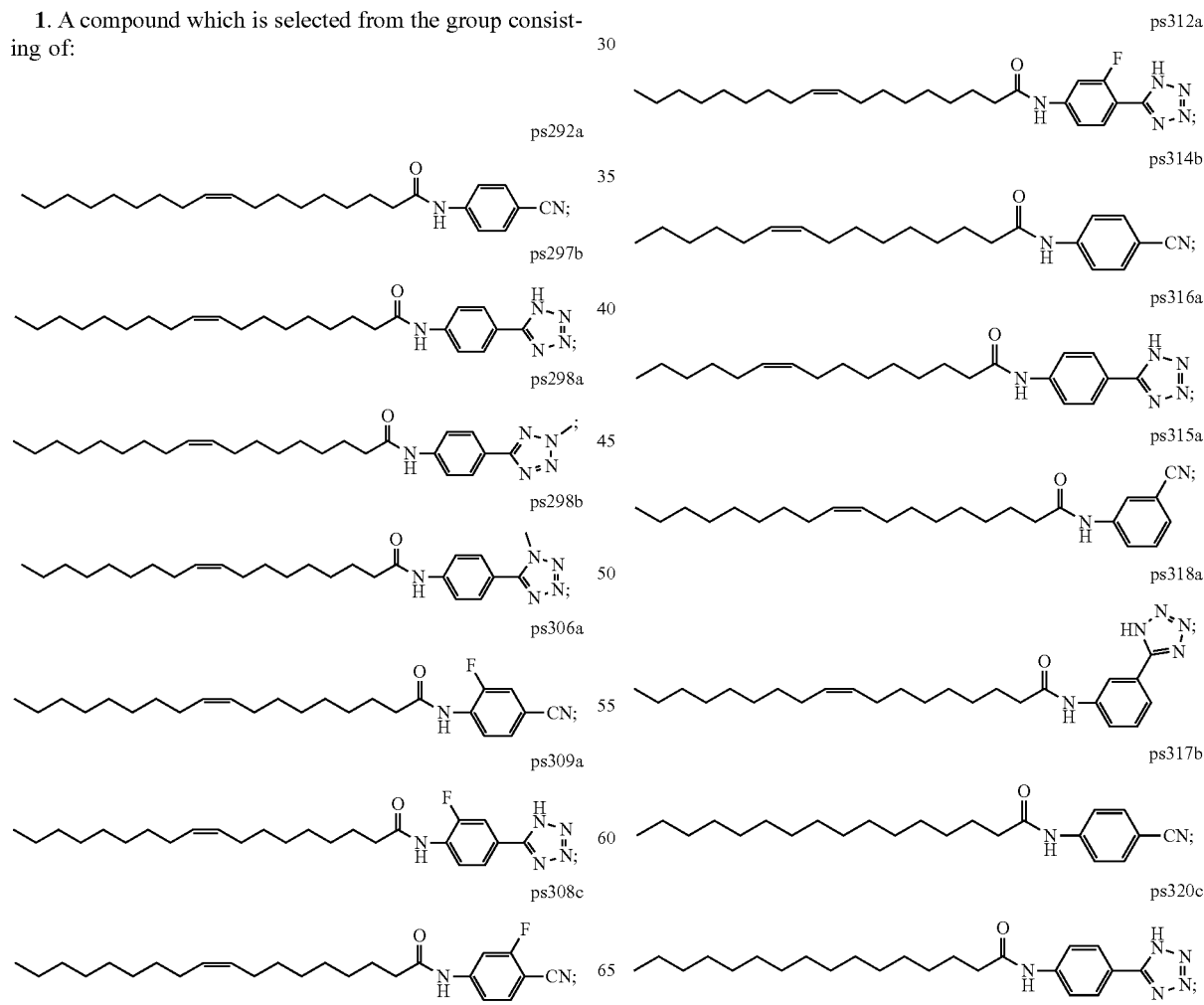

-continued
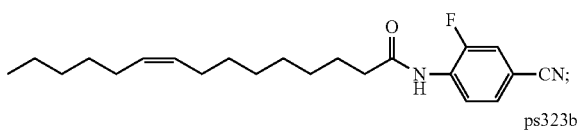
ps319
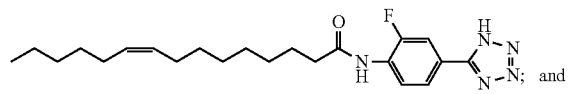
ps323b; and
-continued
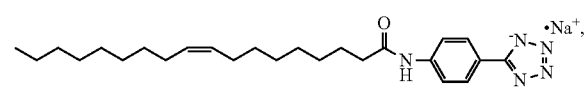
ps321a
or a salt or solvate thereof.
2. The compound according to claim 1, which is selected from the group consisting of:
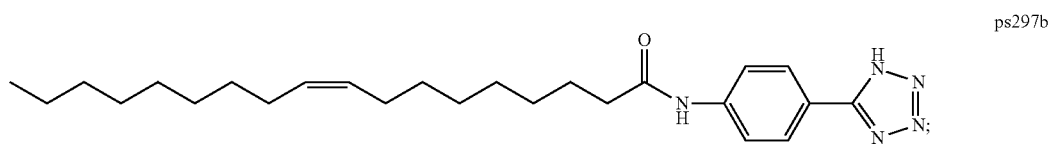
ps297b
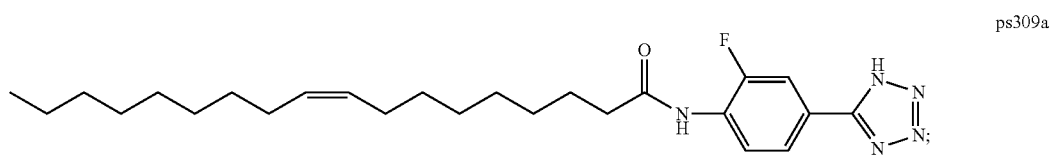
ps309a
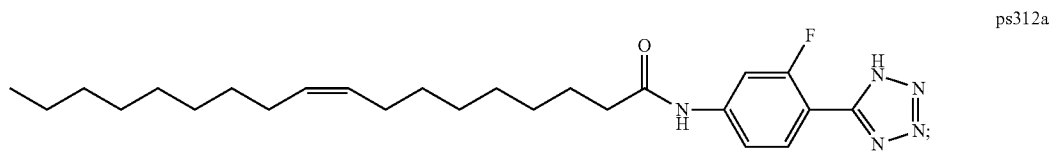
ps312a
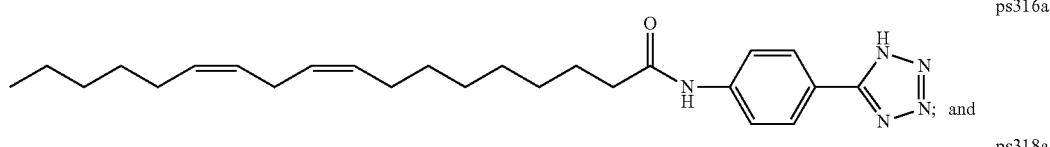
ps316a; and
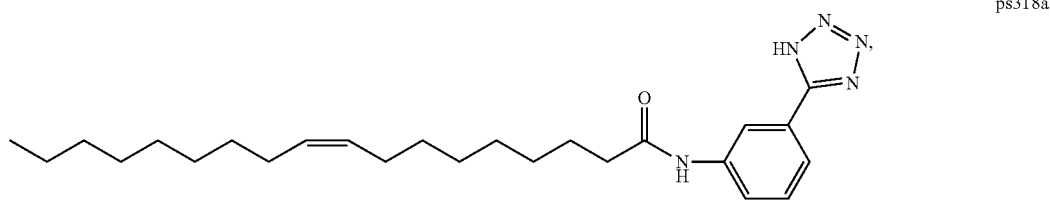
ps318a
or a salt or solvate thereof.
3. The compound according to claim 2, which is:
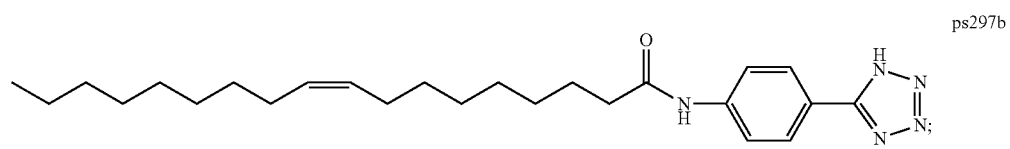 [SMILES: CCCCCCCC/C=C\CCCCCCCC(=O)Nc1ccc(-c2nnn[nH]2)cc1]
ps297b
or a salt or solvate thereof.

4. The compound according to claim 2, which is:
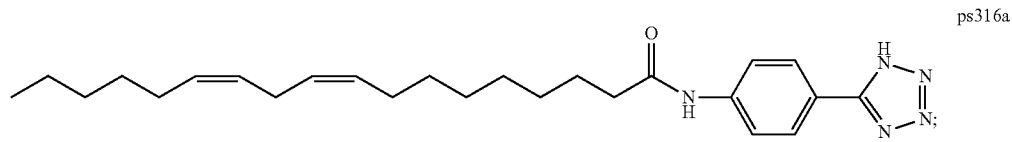 [SMILES: CCCCC/C=C\C/C=C\CCCCCCCC(=O)Nc1ccc(-c2nnn[nH]2)cc1]
ps316a
or a salt or solvate thereof.
5. The compound according to claim 2, which is:
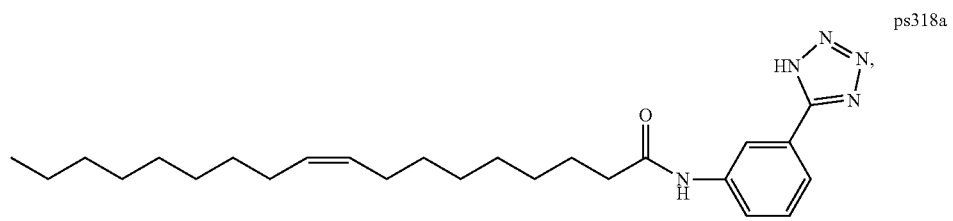 [SMILES: CCCCCCCC/C=C\CCCCCCCC(=O)Nc1cccc(-c2nnn[nH]2)c1]
ps318a
or a salt or solvate thereof.
6. The compound according to claim 3, which is:
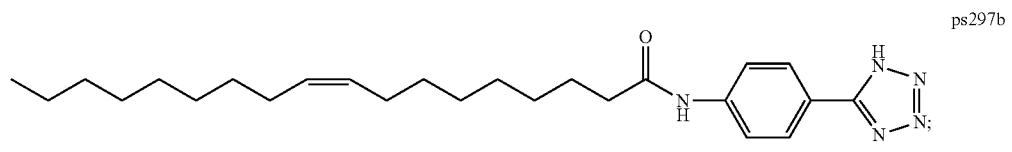 [SMILES: CCCCCCCC/C=C\CCCCCCCC(=O)Nc1ccc(-c2nnn[nH]2)cc1]
ps297b
or a salt thereof.
7. The compound according to claim 4, which is:
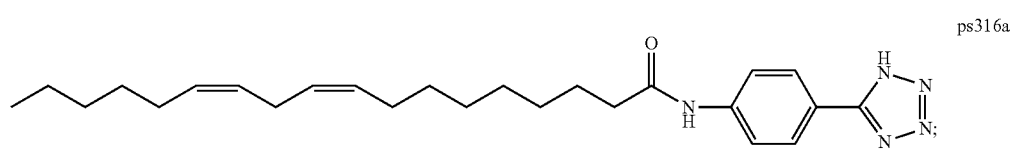 [SMILES: CCCCC/C=C\C/C=C\CCCCCCCC(=O)Nc1ccc(-c2nnn[nH]2)cc1]
ps316a
or a salt thereof.
8. The compound according to claim 5, which is:
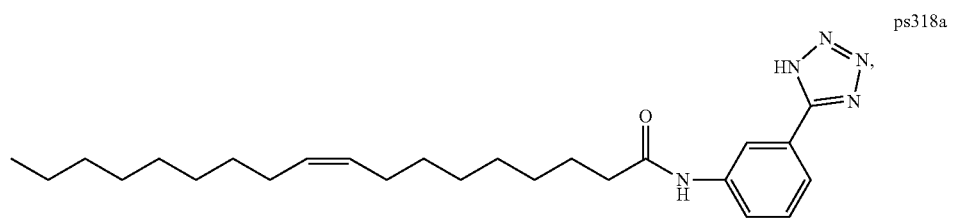 [SMILES: CCCCCCCC/C=C\CCCCCCCC(=O)Nc1cccc(-c2nnn[nH]2)c1]
ps318a
or a salt thereof.

9. A pharmaceutical composition comprising the compound or salt or solvate thereof according to claim 1, wherein said salt or solvate is pharmaceutically acceptable; and wherein said pharmaceutical composition further comprises a pharmaceutically acceptable carrier and/or excipient.

10. The pharmaceutical composition according to claim 9, wherein the compound or salt or solvate thereof is a compound which is selected from the group consisting of:

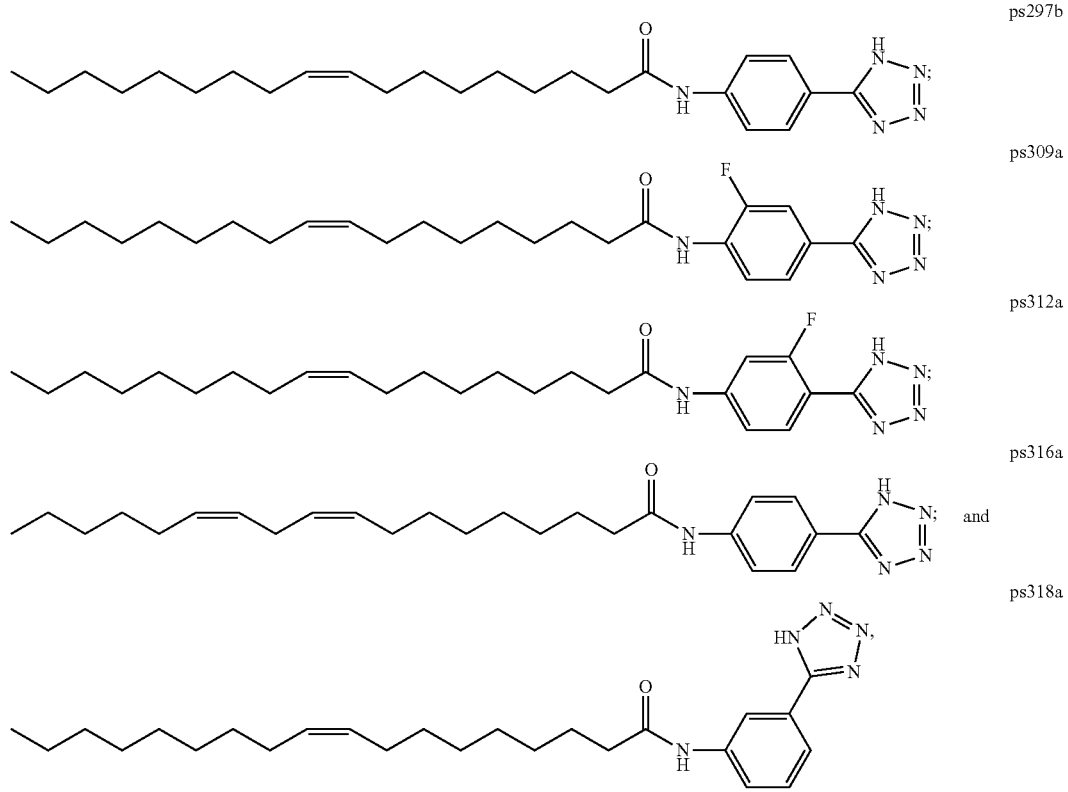

or a salt or solvate thereof.

11. A method of inducing and/or increasing secretion and/or synthesis and/or activity of GLP-1 in a cell, said method comprising contacting a cell capable of expressing and/or secreting GLP-1 with an effective amount of the compound, or salt or solvate thereof according to claim 1.

12. The method according to claim 11, wherein the compound or salt or solvate thereof is a compound which is selected from the group consisting of:

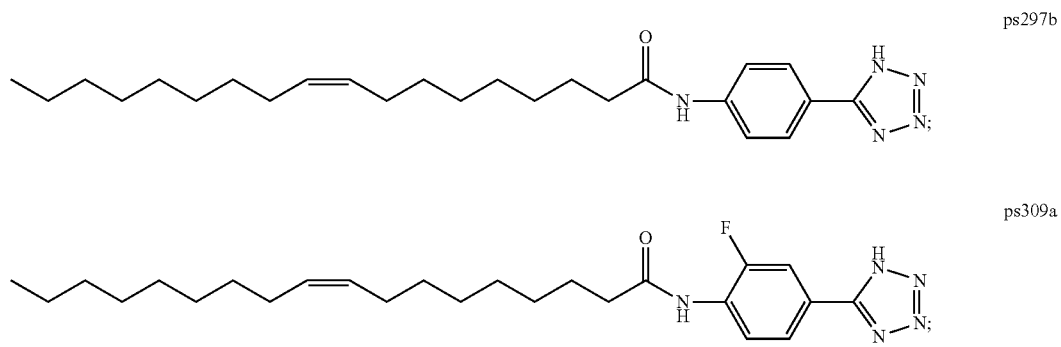

-continued
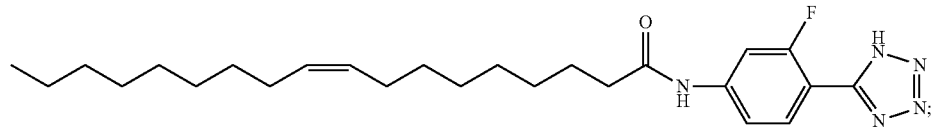
ps312a
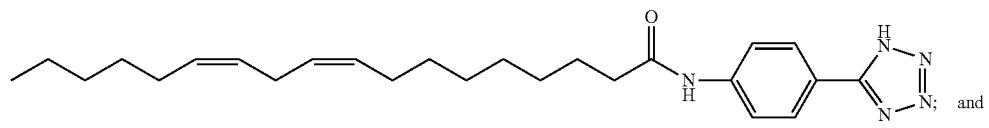
ps316a
and
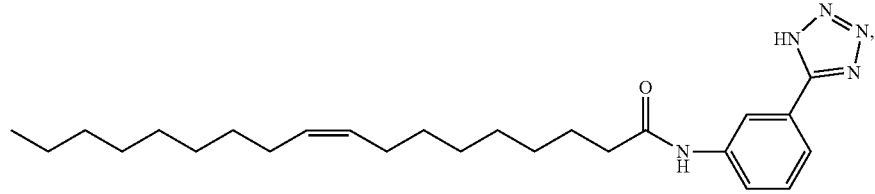
ps318a
or a salt or solvate thereof.
* * * * *

SEQUENCE LISTING

```
<160> NUMBER OF SEQ ID NOS: 24

<210> SEQ ID NO 1
<211> LENGTH: 76
<212> TYPE: RNA
<213> ORGANISM: Homo sapiens

<400> SEQUENCE: 1
ucaaagcucu ccguacugua cagguaccuu gccaucaacc acucaucuau gccuauuacc     60
uagugcugga acggua                                                    76

<210> SEQ ID NO 2
<211> LENGTH: 19
<212> TYPE: RNA
<213> ORGANISM: Homo sapiens

<400> SEQUENCE: 2
gaauuccgca ugaacauca                                                 19

<210> SEQ ID NO 3
<211> LENGTH: 19
<212> TYPE: RNA
<213> ORGANISM: Mus musculus

<400> SEQUENCE: 3
acagggaagu ggagagaua                                                 19

<210> SEQ ID NO 4
<211> LENGTH: 76
<212> TYPE: RNA
<213> ORGANISM: Mus musculus

<400> SEQUENCE: 4
ccuaucacau cgucacuauu aacuagcauu gugcagguua ucuuaccuua ucggcuuggc     60
cguggcugau accuug                                                    76

<210> SEQ ID NO 5
<211> LENGTH: 20
<212> TYPE: DNA
<213> ORGANISM: Homo sapiens

<400> SEQUENCE: 5
tctggtcagc ccaactctct                                                20

<210> SEQ ID NO 6
<211> LENGTH: 20
```

```
<212> TYPE: DNA
<213> ORGANISM: Homo sapiens

<400> SEQUENCE: 6
cacgtgggca tcctctttta                                              20

<210> SEQ ID NO 7
<211> LENGTH: 24
<212> TYPE: DNA
<213> ORGANISM: Mus musculus

<400> SEQUENCE: 7
tgatggtgtt ggcctttgct tcac                                         24

<210> SEQ ID NO 8
<211> LENGTH: 24
<212> TYPE: DNA
<213> ORGANISM: Mus musculus

<400> SEQUENCE: 8
tggtaaaggc agcatttgtg gcag                                         24

<210> SEQ ID NO 9
<211> LENGTH: 20
<212> TYPE: DNA
<213> ORGANISM: Homo sapiens

<400> SEQUENCE: 9
gtttccatgg gaaagtggaa                                              20

<210> SEQ ID NO 10
<211> LENGTH: 20
<212> TYPE: DNA
<213> ORGANISM: Homo sapiens

<400> SEQUENCE: 10
ggaaggagac cacgaagaca                                              20

<210> SEQ ID NO 11
<211> LENGTH: 27
<212> TYPE: DNA
<213> ORGANISM: Mus musculus

<400> SEQUENCE: 11
ctatctacat gatcaacttg gctgttt                                      27

<210> SEQ ID NO 12
<211> LENGTH: 20
<212> TYPE: DNA
<213> ORGANISM: Mus musculus

<400> SEQUENCE: 12
tgtggcagga ccatcttgaa                                              20

<210> SEQ ID NO 13
<211> LENGTH: 21
<212> TYPE: DNA
<213> ORGANISM: Homo sapiens

<400> SEQUENCE: 13
agggctgctt ttaactctgg t                                            21

<210> SEQ ID NO 14
```

```
<211> LENGTH: 21
<212> TYPE: DNA
<213> ORGANISM: Homo sapiens

<400> SEQUENCE: 14
ccccacttga ttttggaggg a                                              21

<210> SEQ ID NO 15
<211> LENGTH: 20
<212> TYPE: DNA
<213> ORGANISM: Mus musculus

<400> SEQUENCE: 15
gcacagtcaa ggccgagaat                                                20

<210> SEQ ID NO 16
<211> LENGTH: 20
<212> TYPE: DNA
<213> ORGANISM: Mus musculus

<400> SEQUENCE: 16
gccttctcca tggtggtgaa                                                20

<210> SEQ ID NO 17
<211> LENGTH: 21
<212> TYPE: DNA
<213> ORGANISM: Homo sapiens

<400> SEQUENCE: 17
ctccctcatc attgctacta a                                              21

<210> SEQ ID NO 18
<211> LENGTH: 21
<212> TYPE: DNA
<213> ORGANISM: Homo sapiens

<400> SEQUENCE: 18
cgggctgtgg ttagtgtctt a                                              21

<210> SEQ ID NO 19
<211> LENGTH: 21
<212> TYPE: DNA
<213> ORGANISM: Homo sapiens

<400> SEQUENCE: 19
cagtctctgc ttcaccttga a                                              21

<210> SEQ ID NO 20
<211> LENGTH: 21
<212> TYPE: DNA
<213> ORGANISM: Homo sapiens

<400> SEQUENCE: 20
caggagtgtc acctctacct a                                              21

<210> SEQ ID NO 21
<211> LENGTH: 21
<212> TYPE: DNA
<213> ORGANISM: Mus musculus

<400> SEQUENCE: 21
ccgttacttc cagatcatga a                                              21
```

-continued

```
<210> SEQ ID NO 22
<211> LENGTH: 21
<212> TYPE: DNA
<213> ORGANISM: Mus musculus

<400> SEQUENCE: 22
ctgagcctat agcacatcta a                                              21

<210> SEQ ID NO 23
<211> LENGTH: 21
<212> TYPE: DNA
<213> ORGANISM: Mus musculus

<400> SEQUENCE: 23
tggcctttgc ttcaccttga a                                              21

<210> SEQ ID NO 24
<211> LENGTH: 21
<212> TYPE: DNA
<213> ORGANISM: Mus musculus

<400> SEQUENCE: 24
ttctccctag atgaagtatt a                                              21
```